(12) United States Patent
Shoda et al.

(10) Patent No.: US 6,575,631 B2
(45) Date of Patent: Jun. 10, 2003

(54) ROLLING BEARING AND ROLLING BEARING DEVICE

(75) Inventors: Yoshio Shoda, Kanagawa (JP); Jun Liu, Kanagawa (JP); Yukio Sato, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/970,804

(22) Filed: Oct. 5, 2001

(65) Prior Publication Data

US 2002/0085773 A1 Jul. 4, 2002

Related U.S. Application Data

(63) Continuation-in-part of application No. 09/584,130, filed on May 31, 2000.

(30) Foreign Application Priority Data

| May 31, 1999 | (JP) | ............................................. 11-152757 |
| Oct. 5, 2000 | (JP) | ........................................ 2000-305929 |
| Oct. 23, 2000 | (JP) | ........................................ 2000-323086 |
| Oct. 23, 2000 | (JP) | ........................................ 2000-323206 |
| Dec. 28, 2000 | (JP) | ........................................ 2000-403102 |
| Mar. 27, 2001 | (JP) | ........................................ 2001-90814 |
| Jun. 14, 2001 | (JP) | ........................................ 2001-180535 |
| Sep. 26, 2001 | (JP) | ........................................ 2001-294399 |

(51) Int. Cl.[7] .............................................. F16C 29/04
(52) U.S. Cl. ........................ 384/47; 384/447; 384/619
(58) Field of Search ........................ 384/47, 447, 619, 384/51, 50

(56) References Cited

U.S. PATENT DOCUMENTS

| 1,235,116 A | 7/1917 | Coppage |
| 4,606,654 A | 8/1986 | Yatsu et al. .................. 384/447 |
| 4,648,729 A | 3/1987 | Jones .......................... 384/615 |
| 4,746,232 A | 5/1988 | Gugel ......................... 384/619 |
| 4,974,972 A | 12/1990 | Boosler, Jr. et al. ......... 384/447 |

FOREIGN PATENT DOCUMENTS

| DE | 6920874 | 12/1969 | |
| DE | 32 48 980 A1 | 8/1983 | |
| DE | 33 08735 A1 | 10/1983 | ........... F16C/19/36 |
| DE | 36 14390 A1 | 10/1987 | ........... F16C/33/61 |
| DE | 38 24 914 A1 | 1/1990 | |
| DE | 41 42 313 A1 | 6/1993 | |
| DE | 43 34 195 A1 | 3/1994 | ........... F16C/33/30 |
| DE | 44 11 287 A1 | 10/1994 | |
| DE | 196 54 545 A1 | 7/1997 | |
| DE | 197 29 450 C2 | 12/1999 | |
| DE | 198 60 150 A1 | 7/2000 | |
| DE | 100 27 105 A1 | 2/2001 | |
| EP | 0 992 696 A1 | 1/1999 | |
| JP | 8-1294 | 1/1996 | ........... F16C/33/36 |
| JP | 9-126233 | 5/1997 | ........... F16C/19/36 |

OTHER PUBLICATIONS

Patent Abstracts of Japan, Yabe Shunichi et al. Publication No. 2000065072 A, Published Mar. 3, 2000.
Patent Abstracts of Japan, Yamada Hiroshi et al. Publication No. 2000087983 A Published Mar. 28, 2000.

*Primary Examiner*—Lenard A. Footland
(74) *Attorney, Agent, or Firm*—Sughrue Mion, PLLC

(57) ABSTRACT

Into a raceway groove formed between outer and inner races, there are incorporated a plurality of rolling elements of which outside diameters serving as the rolling contact surfaces thereof each has a curvature in the axial direction as well and also each of which has a radius smaller than the radius of the raceway surfaces of the outer and inner races. The rolling elements are arranged in such a manner that the mutually adjoining rolling elements cross each other alternately and also that the outside diameters of the respective rolling elements are always contacted at two points with the raceway surfaces of one race and the raceway surfaces of the other race.

28 Claims, 77 Drawing Sheets

ROLLING BEARING AND ROLLING BEARING DEVICE

This is a Continuation-In-Part application based on U.S. Patent application Ser. No. 09/584,130 filed May 31, 2000.

BACKGROUND OF THE INVENTION

The present invention relates to a bearing which is capable of receiving a radial load, axial loads in two directions, and a moment load. The bearing may be used in several applications, such as an industrial machine, a robot, a medical instrument, a semiconductor/liquid crystal manufacturing apparatus, an optical instrument, an opto-electronic instrument, and so on.

As such, the present invention also relates to a rolling bearing device to be utilized in the spindle of a machine tool or another general high-speed rotation machine.

The present invention further relates to a rolling bearing for a compressor pulley.

Conventionally, as a bearing which is capable of receiving a radial load, axial loads in two directions, and a moment load, there are known a cross roller bearing and a four-point contact ball bearing. In the conventional cross roller bearing, between an inner race 100 and an outer race 200, there is incorporated a cylindrical-shaped roller 300 (see FIG. 94). On the other hand, in the conventional four-point contact ball bearing, between an inner race 100 and an outer race 200, there is incorporated a ball 400 (see FIG. 95).

However, in the conventional cross roller bearing and four-point contact ball bearing, there are found the following problems to be solved.

(1) In the case of the cross roller bearing, since a rolling element is a cylindrical-shaped roller 300 and the rolling contact surface 301 of the roller 300 is line contacted with a raceway groove 500, there is produced large torque.

(2) In the case of the four-point contact ball bearing, because a rolling element is a ball, when the bearing receives a pure axial load or when an axial load is dominant over a radial load, the four-point contact ball bearing produces smaller torque than the cross roller bearing of the same size.

On the other hand, when a radial load is dominant over an axial load or when the bearing receives a pure radial load, each ball 400 is contacted with a raceway groove 500 at four points 401, 401, 401 and 401 and, therefore, there occurs large spin slippage between the ball 400 and raceway groove 500, which results in large torque.

As the bearing to be used in the high-speed rotation machine such as the machine tool spindle, there has been employed in the prior art an angular ball bearing or a four-point contact ball bearing, as shown in FIGS. 96 to 98, for its high speed and axial rigidity. Reference numeral 900 designates a rotation shaft.

In FIG. 96, the radial load is borne by two cylindrical roller bearings 600, and axial loads in the two directions are borne or the axial displacements are restricted by two angular ball bearings 700.

In FIG. 97, the four angular ball bearings 700 bear the radial loads together with one cylindrical roller bearing 600 while bearing the axial loads in the two direction or restricting the axial displacements.

In FIG. 98, the radial load is borne by the two cylindrical roller bearings 600 as in FIG. 96, but the axial loads in the two directions are borne or the axial displacements are restricted by one four-point ball bearing 800, as shown in FIG. 99.

In these Figures: reference numeral 801 designates an outer race; numeral 802 an inner race; numeral 803 a rolling element; and numeral 804 a retainer.

The prior arts thus far described have the following problem.

In the structures of FIGS. 96 and 97 using the angular ball bearing 700, this one angular ball bearing 700 can bear only the axial load in one direction. In order to bear the axial loads in the two directions, therefore, it is customary to employ two or more angular ball bearings 700 in combination.

However, the bearing to be used in the high-speed rotation machine such as the machine tool spindle is demanded to have a high precision and therefore has a high price. As the number of angular ball bearings 700 to be arranged becomes the larger, moreover, the axial size of the bearing device becomes the larger therefore, the bearing device and accordingly the entire system cannot be made compact to cause a problem that the cost rises for the entire device.

In the structure employing the four-point contact ball bearing shown in FIG. 98 and FIG. 99, moreover, the single bearing can bear the radial load, the axial loads in the two directions, and the moment load so that the single four-point ball bearing 800 can realize the functions of the two angular ball bearings. Therefore, this structure has merits of a compact size and a low cost. Where the radial load is dominant over the axial loads or where a pure radial load is borne, however, the individual balls 803 of the four-point contact ball bearing 800 make contacts at four points with the races 801 and 802. Therefore, the balls 803 spin largely to cause a problem that a small spin wear performance cannot be attained. This problem is made especially serious by the action of the centrifugal force, especially in the case of the machine tool rotating at a high speed.

In order to improve the spin wear performance even a little, moreover, the clearance between the bearings is usually set positive. As a result, the rigidity of the bearings is lowered to exert adverse effects on the rigidity of the entirety of the bearing system for supporting the rotation shaft.

SUMMARY OF THE INVENTION

The present invention aims at solving the above problems found in the conventional cross roller bearing and four-point contact ball bearing. Accordingly, it is an object of the invention to provide a rolling bearing which can control spin slippage between a rolling element and a raceway groove and can reduce rolling resistance to realize low torque, thereby being able to receive a radial load, axial loads in two directions, and a moment load.

In attaining the above object, according to the invention, there is provided a rolling bearing, wherein a plurality of rolling elements are incorporated between a pair of races, each of the two races has a raceway groove defined by two raceway surfaces each having a radius larger than the radius of each of the rolling elements, the outside diameter of each rolling element serving as the rolling contact surface thereof has a curvature in the axial direction of the rolling element as well, the mutually adjoining ones of the rolling elements are arranged in such a manner that they cross each other alternately, and the outside diameter of each rolling element is always contacted at two points with the raceway surfaces of one of the races as well as with the raceway surfaces of the other.

The above-mentioned object can also be achieved by a rolling bearing comprising:

a first race and a second race, each having at least one raceway surface; and a plurality of rolling elements rotatably disposed between the first race and the second race, each of the rolling elements having a rolling contact peripheral surface defined by rotating a curved bus line about a rotation axis of the rolling element, the curved bus line having a predetermined curvature that is smaller than a radius of the at least one raceway surface, wherein the rolling contact peripheral surface of each of the rolling elements always contacts one point on each of the at least one raceway surface of the first race and the at least one raceway surface of second race, and wherein mutually adjoining rolling elements are arranged in a circumferential direction of the rolling bearing such that their rotation axes alternately cross one another.

One embodiment of the rolling bearing according to the present invention, each of the rolling elements may include at least one flat surface.

Another embodiment of the rolling bearing according to the present invention, each of the rolling elements may include two mutually opposing and flat-surfaces In the rolling bearing according to the present invention, it is advantageous that each of the rolling elements is a top and bottom cut-shaped ball which is formed by cutting upper and lower portions of a ball so as to define the two mutually opposing and flat-surfaces.

In the rolling bearing according to the present invention, it is advantageous that each of the rolling elements is a top or bottom cut-shaped ball.

In the rolling bearing according to the present invention, it is advantageous that the first race comprises a first and a second raceway surface.

In the rolling bearing according to the present invention, it is advantageous that the first race further comprises a fastener operable to secure the first and second raceway surfaces to one another.

In the rolling bearing according to the present invention, it is advantageous that the second race comprises a first and a second raceway surface.

In the rolling bearing according to the present invention, it is advantageous that the second race further comprises a fastener operable to secure the first and second raceway surfaces to one another.

In the rolling bearing according to the present invention, it is advantageous to further include a placement device into which the mutually adjoining rolling elements are incorporated in such a manner that their rotation axes alternately cross one another.

In the rolling bearing according to the present invention, it is advantageous that the placement device is a retainer having alternately formed two-hold portions.

In the rolling bearing according to the present invention, it is advantageous that the placement device is a plurality of separators each having a diameter smaller than a diameter of each of the rolling elements and also having two recess-shaped arc grooves at mutually opposing surfaces in a crossing manner.

In the rolling bearing according to the present invention, it is advantageous that the placement device is a retainer having a number of pockets into which a same number of the rolling elements are respectively inserted, wherein the pockets are alternatively disposed on a periphery portion of the retainer in a staggered manner and arranged in a predetermined interval in the circumferential direction thereof.

In the rolling bearing according to the present invention, it is advantageous that at least one of the at least one raceway surface and the plurality of rolling elements includes a stainless steel.

In the rolling bearing according to the present invention, it is advantageous that at least one of the at least one raceway surface and the plurality of rolling elements includes a ceramic material.

In the rolling bearing according to the present invention, it is advantageous that at least one of the at least one raceway surface and the plurality of rolling elements includes a resin material.

In the rolling bearing according to the present invention, it is advantageous that at least one of the at least one raceway surface and the plurality of rolling elements includes an anti-corrosive coating on a surface thereof.

In the rolling bearing according to the present invention, it is advantageous to further include sealing plates interposed between the first race and the second race.

In the rolling bearing according to the present invention, it is advantageous to further include a flange formed in at least one of the first race and the second race.

In the rolling bearing according to the present invention, it is advantageous to further include a lubricant-containing polymer member disposed in an internal space of the bearing.

In the rolling bearing according to the present invention, it is advantageous that an internal clearance of the bearing is set to a negative value.

Moreover, the object can also be attained by a rolling bearing for a compressor pulley comprising:

at least one bearing, the bearing including:

a first race and a second race, each having at least one raceway surface; and a plurality of rolling elements rotatably disposed between the first race and the second race, each of the rolling elements having a rolling contact peripheral surface defined by rotating a curved bus line about a rotation axis of the rolling element, the curved bus line having a predetermined curvature that is smaller than a radius of the at least one raceway surface, wherein the rolling contact peripheral surface of each of the rolling elements always contacts one point on each of the at least one raceway surface of the first race and the at least one raceway surface of second race, and wherein mutually adjoining rolling elements are arranged in a circumferential direction of the rolling bearing such that their rotation axes alternately cross one another.

In addition to this, the present invention has been conceived in view of the above-mentioned problems intrinsic to the prior arts, and has an object to provide a rolling bearing device which can spare the space and lower the cost and which is suited for high-speed rotations of a machine tool.

The object of the present invention can also be achieved by a rolling bearing device for supporting a rotation shaft by a bearing comprising:

at least one bearing, the bearing including:

a first race and a second race, each having at least one raceway surface; and a plurality of rolling elements rotatably disposed between the first race and the second race, each of the rolling elements having a rolling contact peripheral surface defined by rotating a curved bus line about a rotation axis of the rolling element, the curved bus line having a predetermined curvature that is smaller than a radius of the at least one raceway surface, wherein the rolling contact peripheral surface of each of the rolling elements always contacts one point on each of the at least one raceway surface of the first race and the at least one raceway surface of second race, and wherein mutually adjoining rolling elements are arranged in a circumferential direction of the rolling bearing such that their rotation axes alternately cross one another.

Further, the present invention has been conceived in view of those problems of the prior art, and has an object to provide a rolling bearing for a compressor pulley, which has a high moment rigidity and an excellent spinning wear performance and which can make the bearing compact and lower the cost.

In order to achieve the above-specified object, according to the present invention, there is provided technical means: a rolling bearing for a compressor pulley, comprising: a pair of races having two raceway surfaces each having a larger radius of curvature than the rolling element radius; and a plurality of rolling elements, the outside diameter of which has a curvature, too, in the axial direction for rolling contact surfaces and which are alternately arranged in a crossing manner to contact with the raceway surfaces of one and the other races always having mutually opposing outside diameters, individually at one point and totally at two points, whereby one is used for the pulley of a cooler compressor of an automobile.

To achieve the objective, the present invention may provide, as technical means, a roller bearing comprising: a pair of races, each having a raceway groove defined by two raceway surfaces, said raceway groove having a diameter greater than the radius of a rolling element; a plurality of rolling elements to be incorporated between said pair of races; the outside diameter of each of said rolling elements, which diameter is to act also as a rolling contact surface, having curvature in an axial direction; continuous rolling elements being arranged such that the outside diameter of one rolling element crosses the outside diameter of another, adjacent rolling element with an angle therebetween; two points of contact always existing between the outside diameter of each of said rolling elements and said raceway surface of one race and said raceway surface of the other race; and sealing plates which are interposed between the pair of races.

Further, the present invention may provide a roller bearing comprising: a pair of races, each having a raceway groove defined by two raceway surfaces, said raceway groove having a diameter greater than the radius of a rolling element; a plurality of rolling elements to be incorporated between said pair of races; the outside diameter of each of said rolling elements, which diameter is to act also as a rolling contact surface, having curvature in an axial direction; continuous rolling elements being arranged such that the outside diameter of one rolling element crosses the outside diameter of another, adjacent rolling element with an angle therebetween; two points of contact always existing between the outside diameter of each of said rolling elements and said raceway surface of one race and said raceway surface of the other race; and a flange which is formed in either or both of the pair of races.

The present invention may also provide a roller bearing comprising: a pair of races, each having a raceway groove defined by two raceway surfaces, said raceway groove having a diameter greater than the radius of a rolling element; a plurality of rolling elements to be incorporated between said pair of races; the outside diameter of each of said rolling elements, which diameter is to act also as a rolling contact surface, having curvature in an axial direction; continuous rolling elements being arranged such that the outside diameter of one rolling element crosses the outside diameter of another, adjacent rolling element with an angle therebetween; two points of contact always existing between the outside diameter of each of said rolling elements and said raceway surface of one race and said raceway surface of the other race; and the internal space of the bearing which is filled with a lubricant-containing polymer member.

To achieve the object, the present invention provides, as technical means, a roller bearing comprising: a pair of races, each having a raceway groove defined by two raceway surfaces, said raceway groove having a diameter greater than the radius of a rolling element; a plurality of rolling elements to be incorporated between said pair of races; the outside diameter of each of said rolling elements, which diameter is to act also as a rolling contact surface, having curvature in an axial direction; continuous rolling elements being arranged such that the outside diameter of one rolling element crosses the outside diameter of another, adjacent rolling element with an angle therebetween; two points of contact always existing between the outside diameter of each of said rolling elements and said raceway surface of one race and said raceway surface of the other race; and internal clearance of said bearing being set to a negative value by means of application of pre-load.

To the end, according to the invention, there is provided a rolling bearing comprising a plurality of rolling elements built in between a pair of races, each of the races having a raceway groove having a raceway surface having a larger radius than the radius of the rolling element and at least one of the races consisting of two raceway surfaces, wherein each of the rolling elements has an outer shape like a ball with one side cut, the outer diameter of each of the rolling elements as a rolling contact surface also has a curvature in an axial direction, the rolling elements are placed like a cross alternately on the circumference of a circle, and the outer diameter of each of the rolling elements is in contact with one point on the raceway surface of one race and one point on the raceway surface of the other race, the races always facing each other.

To the end, according to the invention, there is provided a rolling bearing comprising a plurality of rolling elements built in between a pair of races, each of the races having a raceway groove having a raceway surface having a larger radius than the radius of the rolling element and at least one of the races consisting of two raceway surfaces, wherein the outer diameter of each of the rolling elements as a rolling contact surface also has a curvature in an axial direction and the rolling elements are placed like a cross alternately on the circumference of a circle and wherein the outer diameter of each of the rolling elements is in contact with one point on the raceway surface of one race and one point on the raceway surface of the other race, the races always facing each other, wherein the invention is characterized by the fact that the following configuration is adopted:

Stainless steel, ceramics, resin, or the like is used as the material of all or at least one of the three elements of the inner and outer races making up one pair of races and the rolling elements, or anticorrosive coating treatment is executed on the surface of at least one of the three elements of the inner race, the outer race, and the rolling elements of the bearing depending on the use environment.

The present invention has been conceived in view of those problems intrinsic to the prior arts. It is another object to provide a rolling bearing device which can spare the space and lower the cost and which is suited for high-speed rotations of a machine tool.

In order to achieve the above-specified object, according to technical means of the present invention, there is provided a rolling bearing device for supporting a rotation shaft by a bearing, characterized: by comprising at least one rolling bearing including a plurality of rolling elements incorporated between a pair of races; in that each of said races has a raceway groove composed of raceway surfaces of a larger radius than that of the rolling elements; in that at least one of said races is composed of two raceway surfaces; in that said rolling elements are given a curvature in the axial direction at each their outside diameter for a rolling contact surface and are arranged alternately to cross each other on the circumference; and in that the outside diameter of each rolling element makes a totally two contacts with the raceway surface of one of the mutually opposing races and the raceway surface of the other mutually opposing race.

Moreover, there is provided a rolling bearing device in which the rotation shaft is supported by one rolling bearing having the above-specified construction and two cylindrical roller bearings.

Moreover, there is provided a rolling bearing device in which the rotation shaft is supported by two rolling bearings having the above-specified construction and one cylindrical roller bearings.

To the end, according to the invention, there is provided a rolling bearing comprising a plurality of rolling elements built in between a pair of races, each of the races having a raceway groove having a raceway surface having a larger radius than the radius of the rolling clement and at least one of the races consisting of two raceway surfaces, wherein each of the rolling elements has an outer shape like a ball with one side cut, the outer diameter of each of the rolling elements as a rolling contact surface also has a curvature in an axial direction, the rolling elements are placed like a cross alternately on the circumference of a circle, and the outer diameter of each of the rolling elements is in contact with one point on the raceway surface of one race and one point on the raceway surface of the other race, the races always facing each other.

DETAILED DESCRIPTION OF THE PREFERRED EMBODIMENTS

Figure 1:
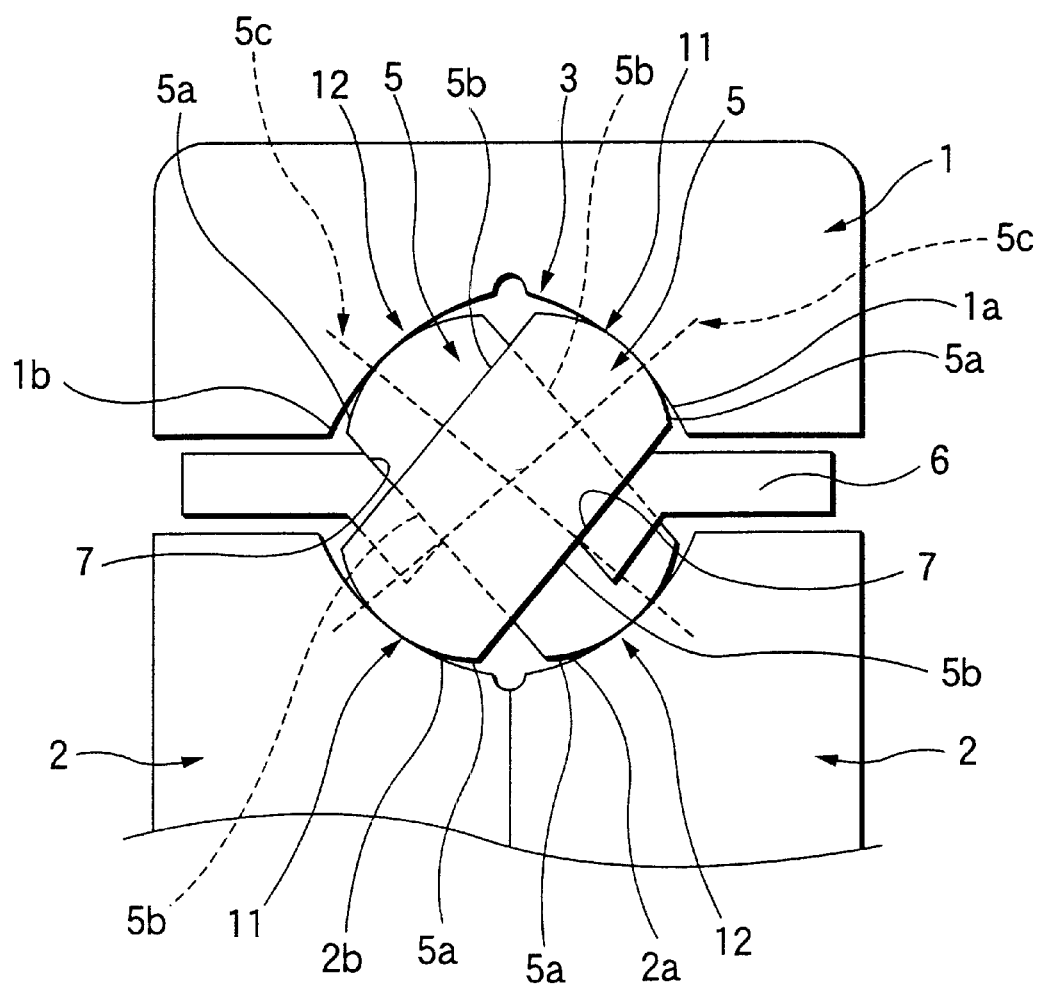
FIG. 1 is a longitudinal section view, omitted in part, of a rolling bearing according to a first embodiment of the invention.

Now, description will be given below of a mode for carrying out a rolling bearing according to the invention with reference to the accompanying drawings.

By the way, the present mode is just a mode disclosed for the purpose of explanation of a rolling bearing according to the invention, that is, the invention is not limited to the present mode at all but various changes are possible without departing from the scope of the invention.

The rolling bearing comprises one race (as an outer race) 1, the other race (as an inner race) 2, a raceway groove 3 defined by and between the inside diameter of the race 1 and the outside diameter of the race 2, and a plurality of rolling elements 5, 5, - - - respectively incorporated in the raceway groove 3.

The two races 1 and 2 are structured such that a raceway groove 3 having a desired shape can be formed by raceway surfaces 1a, 1b and 2a, 2b respectively formed on the inside diameter of one race (outer race) 1 and on the outside diameter of the other race (inner race) 2. As the rolling bearing, there may be used a rolling bearing of a type that one or both of the two races 1 and 2 is or are divided at the center thereof into two raceway sections in the axial direction thereof, or a rolling bearing of a type that neither of the two races 1 and 2 is divided.

Also, as the rolling bearing of the two-division type, there is available a rolling bearing which can be assembled in an integral body using a bolt, or a rivet 4.

The race groove 3 is defined by the raceway surfaces 1a, 1b and 2a, 2b each having a radius larger than the radius of each of the rolling elements 5.

Each of the raceway surfaces 1a, 1b and 2a, 2b may have an arbitrary shape such as a shape having an arch-shaped section, a V-like shape, a curved shape, or a linear shape, provided that it is suitable for the rolling motion of the rolling element 5. That is, the shape of the raceway surface is not limited to a specific shape; however, for example, there can be used a Gothic arch shape.

Each of the rolling elements 5 may have an arbitrary shape, provided that its outside diameter 5a serving as its rolling contact surface has at least one curvature in the axial direction of the rolling element 5 a radius of which is smaller than the radius of the respective raceway surfaces 1a, 1b and 2a, 2b. In other words, as shown in FIG. 2, each of said rolling elements 5 has a rolling contact peripheral surface S defined by rotating a curved bus line Y about its rotation axes X. The curved bus line Y has at least one predetermined curvatures each of which is smaller than any one of the radius of raceway surfaces of the respective raceway surfaces 1a, 1b and 2a, 2b.

However, in this embodiment, the curved bus line Y has a sole predetermined curvature smaller than any one of the radius of raceway surfaces of the respective raceway surfaces 1a, 1b and 2a, 2b.

The rolling elements 5 are arranged in such a manner that the mutually adjoining ones of the rolling elements 5 cross each other alternately, while the respective outer diameters 5a of the rolling elements 5 are always contacted at two points with the raceway surfaces 1a, 1b of one rance and the raceway surfaces 2a, 2b of the other race 2.

For example, the rolling element 5 may have a structure consisting of a top-and-bottom-cut-shaped ball having a set of mutually opposing surfaces 5b and 5b (that is, a structure obtained when the upper and lower portions of a ball are cut to thereby form the mutually opposing surfaces 5a and 5b; this expression will also be used hereinafter). The rolling elements 5, 5, - - - are respectively incorporated into the raceway groove 3 in such a mariner that their respective rotation axes 5c perpendicular to their associated mutually opposing surfaces 5b and 5b cross each other and, at the same time, the respective outside diameters 5a of the rolling elements 5 are always contacted at two points with the raceway surfaces 1a, 1b of one race 1 and the raceway surfaces 2a, 2b of the other race 2.

The cut widths of the upper and lower portions of the rolling element 5 are not limited to any specific dimensions, and these two cut widths may be equal to each other or may not; and, a ratio between the two cut widths can be selected arbitrarily without departing from the scope of the invention. In other words, the mutually opposing surfaces 5b and 5b of the rolling element 5 may be set symmetric or asymmetric; that is, either of the symmetric and asymmetric settings falls within the scope of the invention.

By the way, the whole shape of the rolling element 5, the presence or absence of the mutually opposing surfaces 4b, 5b, and the size of the curvature of the outside diameter 5a in the axial direction thereof are not limited to the above-described ones at all, but they can be changed arbitrarily without departing from the scope of the invention. That is, for example, the rolling element 5 may include, instead of the mutually opposing surfaces 5b, 5b, two surfaces not parallel to each other and may also have its own rotation axis 5c which is perpendicular to these two non-parallel surfaces.

Also, while the rolling elements 5, 5, - - - are incorporated in such a manner that the rotation axes 5c, 5c of the two mutually rolling elements 5, 5 respectively perpendicular to their associated mutually opposing surfaces 5b, 5b and 5b, 5b cross each other alternately, the crossing manner thereof may be at right angles or may not.

The crossing manner of the rolling elements 5 is not limited to a specific crossing manner, provided the mutually crossing rolling elements 5 are equal in total number on the two sides thereof. That is, the rolling elements 5 may cross each other one to one; or they may cross in the manner of two, one, one, and two, provided that the mutually crossing rolling elements 5 are equal in total number on the two sides thereof. Either of the crossing manners falls within the scope of the invention.

The movements of the respective rolling elements 5, 5 can be guided by a retainer 6, 6' or a separator (spacer) 8.

The shape of the retainer 6, 6' or separator (spacer) 8 is not limited to a specific shape, provided that it includes hold portions 7, - - - , pockets 13, - - - or grooves 9, 9. That is, the shape of the retainer 6 or separator (spacer) 8 can be selected and changed arbitrarily without departing from the scope of the invention.

In addition, the guiding system of the retainer 6, 6' is not limited to a specific one as described above. An inner race guiding type, an outer race guiding type or a rolling element guiding type can also be utilized instead of it. Further, a construction of the retainer 6, 6' is not limited to a specific one as described above. Namely, not only a single unit type but also a divided race components type can be utilized.

For example, in the case of the retainer 6, in the peripheral direction thereof, there are alternately formed two hold portions 7, 7 (or the pockets 13, - - - of the retainer 6') into which the mutually adjoining rolling elements 5, 5 can be incorporated in such a manner that, as described above, the rotation axes 5c, 5c thereof perpendicular to their associated mutually opposing surfaces 5b, 5b and 5b, 5b cross each other alternately.

The separator 8 has a diameter smaller than the diameter of each rolling element 5 and, in its mutually opposing surfaces 10, 10, there are formed two recess-shaped arc grooves 9, 9 in a mutually crossing manner, which are respectively capable of holding the mutually adjoining rolling elements 5, 5 in such a manner that, as described above, the rotation axes 5c, 5c thereof perpendicular to their associated mutually opposing surfaces 5b, 5b and 5b, 5b cross each other.

The curvature of the arc groove 9 can be set arbitrarily, that is, it may be set substantially equal to or larger than the curvature of the outside diameter 5a of the rolling element 5.

The manner of application of a preload between the rolling element and raceway surface is not limited to a specific one. That is, the preload may be applied or not in the bearing manufacturing stage, either of which applications manners falls within the scope of the invention.

As a material making the races 1, 2 and the rolling elements 5 of the rolling bearing, a bearing steel is usually used. However, another material such as stainless steel, ceramic or the like, which is suitable for increasing wear resistance or heat resistance, is also selectable in accordance with environment of usage of the rolling bearing.

In addition, as a retainer 6, 6' employed in the present invention, a machined retainer, a pressed retainer, a resin retainer or the like is also selectable in accordance with needs. Accordingly, a metal material (for example, brass, steel or the like) or a synthetic resin (for example, polyamide 66 (nylon 66), polyphenylene sulfide (PPS) or the like) suitable therefor is selectively utilized.

[Embodiments]

Next, description will be given below of the concrete embodiments of a rolling bearing according to the invention with reference to the accompanying drawings.

[First Embodiment]

Now, FIG. 1 shows a first embodiment of a rolling bearing according to the invention.

Figure 2A:
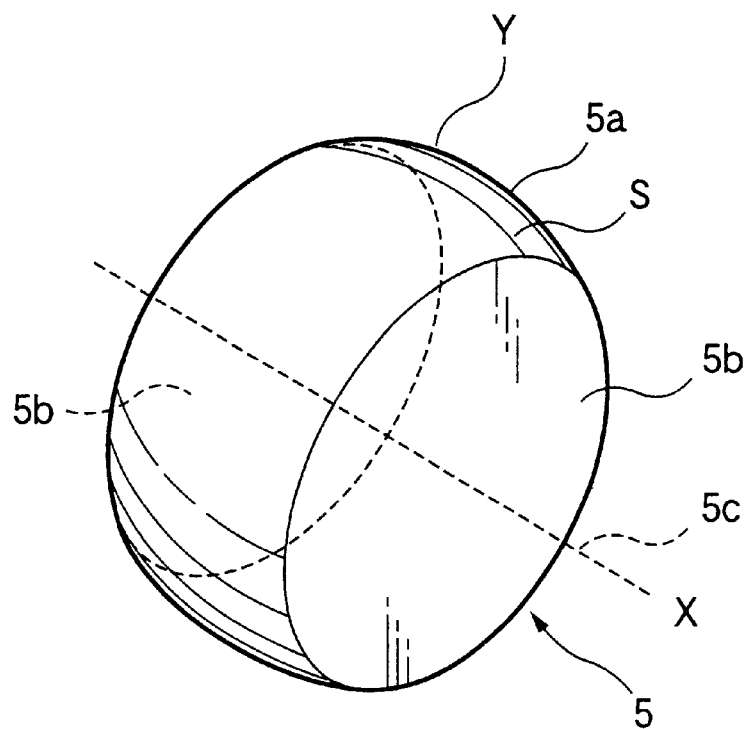
FIG. 2A is an enlarged perspective view of an embodiment of a rolling element employed in the invention.

Each of the rolling elements 5, 5, as shown in FIG. 2A, consists of a top-and-bottom-cut-shaped ball including a set of mutually opposing surfaces 5b and 5b; and the rolling element 5 is incorporated into a raceway groove 3 formed between an outer race 1 formed integral with the rolling bearing and two divided inner races 2, 2.

According to the present embodiment, the raceway groove 3 is formed in a Gothic arch defined by the raceway surfaces 1a, 1b and 2a, 2b of the outer and inner races respectively having a radius larger than the radius of the rolling element 5; and, the mutually opposing surfaces 5b and 5b of the rolling element (top-and-bottom-cut-shaped ball) 5 are formed so as to have a symmetry.

The rotation axes 5c, 5c of the rolling elements 5, 5 set perpendicular to their associated mutually opposing surfaces 5b, 5b and 5b, 5b are arranged so as to cross each other alternately, and the movements of the rolling elements 5, 5 are guided by the hold portions 7, 7 of a retainer 6.

In the case of the retainer 6, in the peripheral direction thereof, there are alternately formed two hold portions 7, 7 into which the mutually adjoining rolling elements 5, 5 can be incorporated in such a manner that, as described above, the rotation axes 5c, 5c thereof perpendicular to their associated mutually opposing surfaces 5b, 5b and 5b, 55b cross each other alternately.

Therefore, according to the first embodiment, the outside diameter 5a of the rolling element 5 is contacted at two points (the contact points are designated by 11, 11) with the raceway surface 1a of the outer race 1 and the raceway surface 2b of the inner race 2 which are disposed opposed to each other, while the mutually adjoining rolling elements 5 are respectively contacted (the contact points are designated by 12, 12) with the raceway surface 1b of the outer race 1 and the raceway surface 2a of the inner race 2.

Since the contact angles of the rolling elements 5, 5 cross each other alternately, the single bearing is able to receive a radial load, axial loads in two directions, and a moment load.

Also, because one rolling element 5 is point contacted only at the two points (11, 11) with the raceway surfaces 1a, 2b and the other rolling element 5 is point contacted only at the two points (12, 12) with the raceway surfaces 1b, 2a, there can be removed such large spin as in the conventional four-point contact bearing.

Further, since the manner of contact between the rolling elements 5, 5 and outer and inner races 1, 2 is the same as in an ordinary ball bearing, when compared with a cross roller bearing, there can be produced low roller resistance, which makes it possible to realize low torque.

[Second Embodiment]

Figure 3:
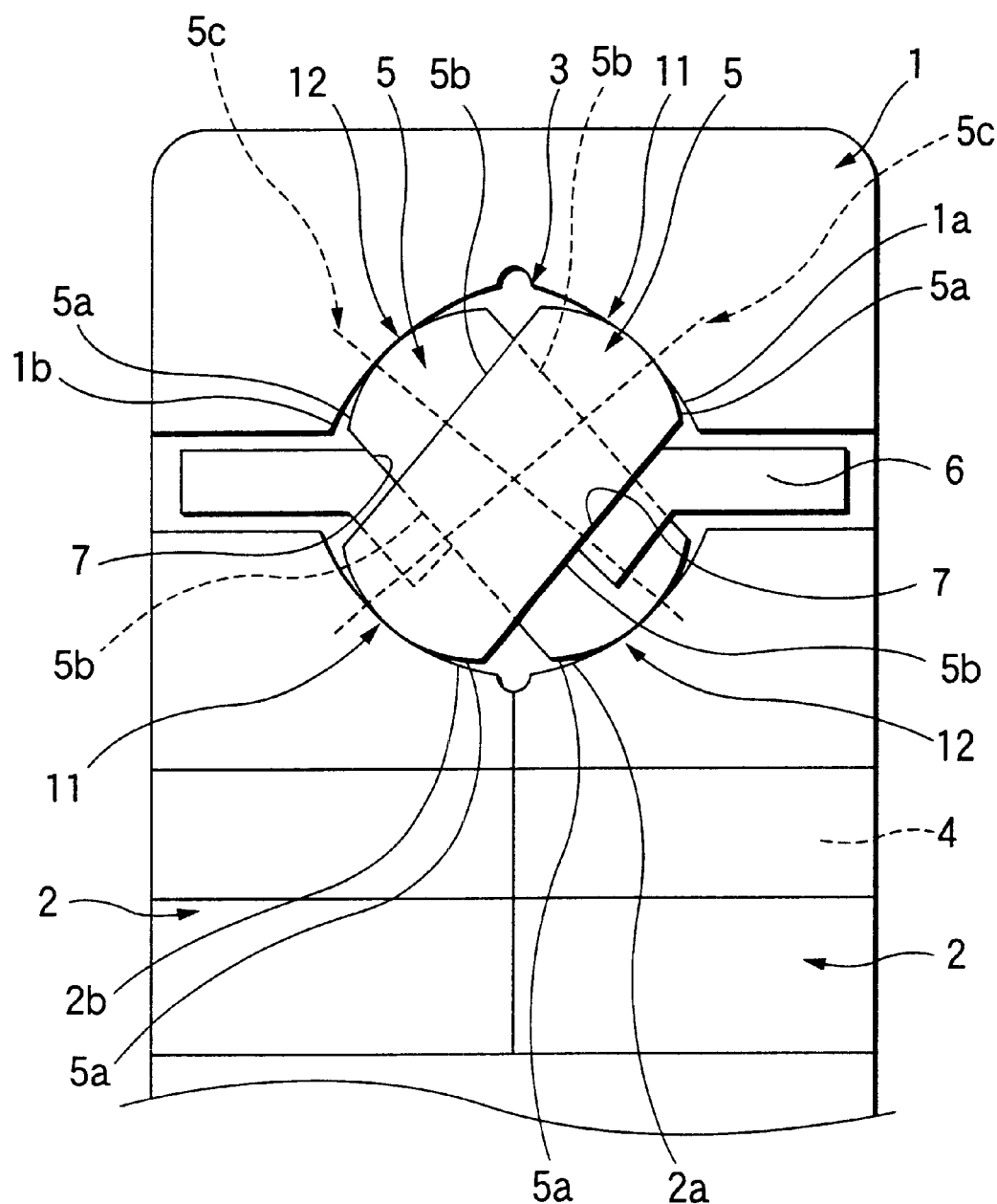
FIG. 3 is a longitudinal section view, omitted in part, of a rolling bearing according to a second embodiment of the invention.

Now, FIG. 3 shows a second embodiment of a rolling bearing according to the invention. In the present embodiment, the two divided inner races 2 and 2 are fixed together by a bolt or a rivet 4 to thereby eliminate the need for adjustment of a preload or a clearance between them.

The other remaining structures and operation effects of the present embodiment are the same as those of the first embodiment.

[Third Embodiment]

Figure 4:
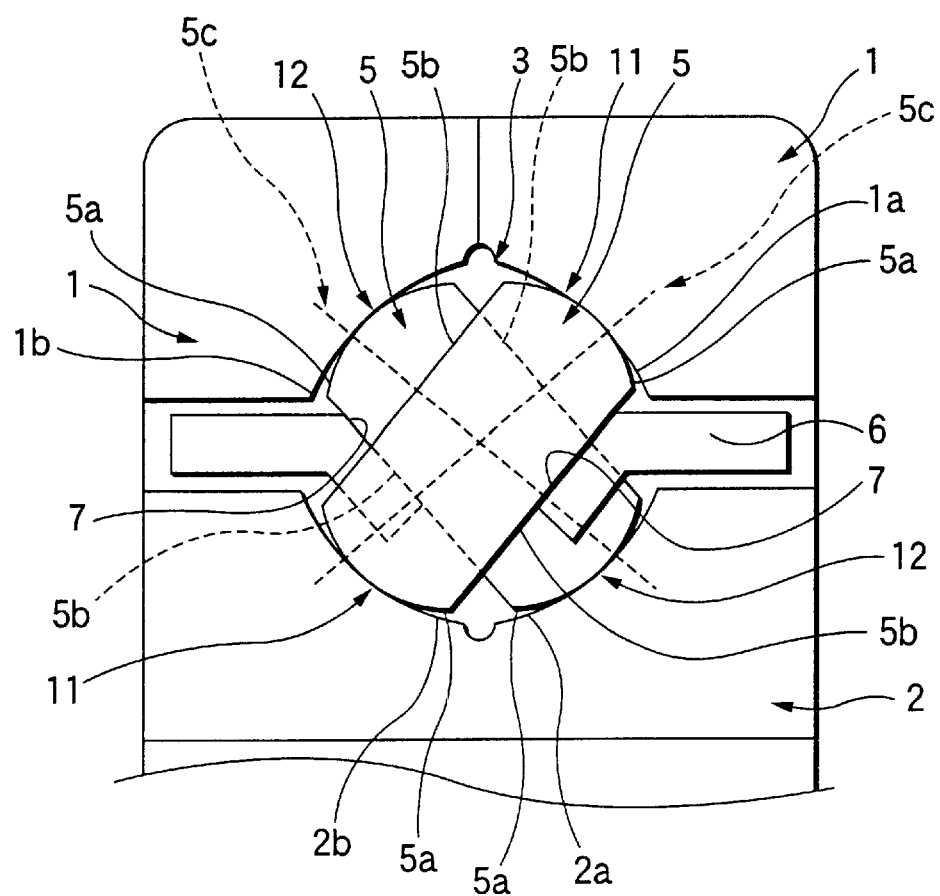
FIG. 4 is a longitudinal section view, omitted in part, of a rolling bearing according to a third embodiment of the invention.

Now, FIG. 4 shows a third embodiment of a rolling bearing according to the invention. In the present embodiment, instead of the integral outer race 1 and two divided inner races 2, 2 respectively employed in the first embodiment, there are employed two divided outer races 1, 1 and an integral inner race 2.

The other remaining structures and operation effects of the present embodiment are the same as those of the first embodiment.

[Fourth Embodiment]

Figure 5:
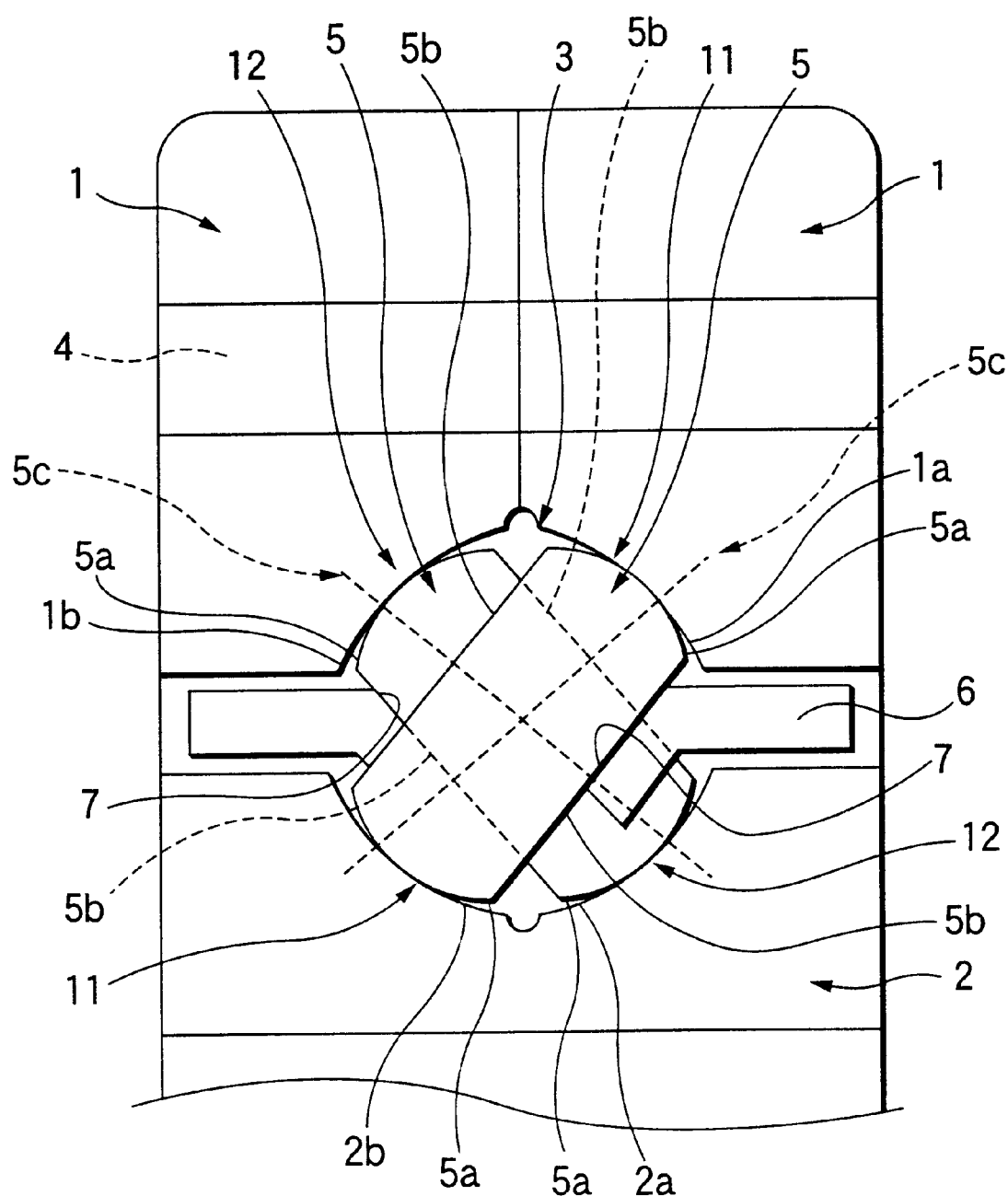
FIG. 5 is a longitudinal section view, omitted in part, of a rolling bearing according to a fourth embodiment of the invention.

Now, FIG. 5 shows a fourth embodiment of a rolling bearing according to the invention. In the present embodiment, the two divided outer races 1, 1 employed in the third embodiment are fixed together by a bolt or a rivet 4 to thereby eliminate the need for adjustment of a preload or a clearance between them.

The other remaining structures and operation effects of the present embodiment are the same as those of the first embodiment.

[Fifth Embodiment]

Figure 6:
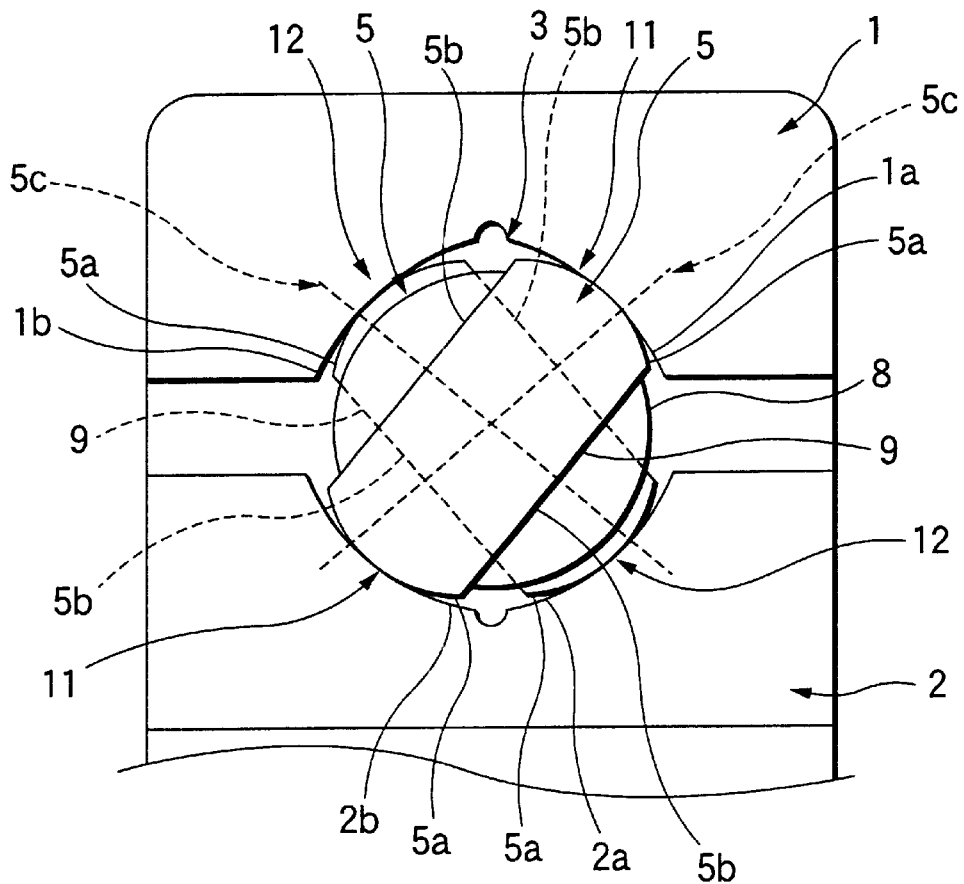
FIG. 6 is a longitudinal section view, omitted in part, of a rolling bearing according to a fifth embodiment of the invention.
Figure 7:
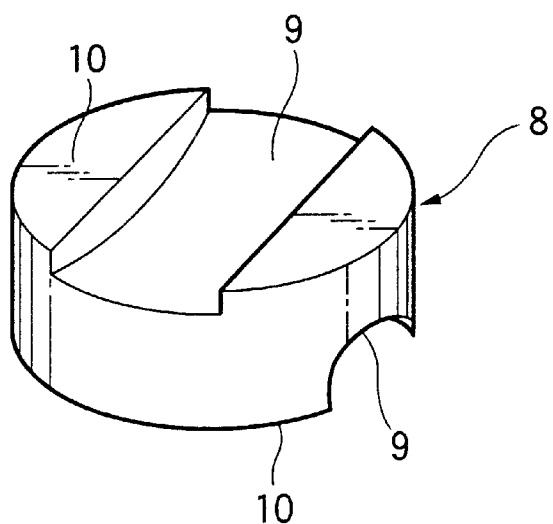
FIG. 7 is an enlarged perspective view of an embodiment of a separator employed in the invention.

Now, FIG. 6 shows a fifth embodiment of a rolling bearing according to the invention. In the present embodiment, as shown in FIG. 6, there are employed an integral outer race 1 and an integral inner race 2. In the outer race 1, there is formed a rolling element insertion hole. Also, instead of the retainer 6 used in the first embodiment, as shown enlargedly in FIG. 7, there is employed a separator 8; that is, the rolling elements 5, 5 are guided by the separator 8.

With use of this structure, the rolling bearing can be made more compact.

The other remaining structures and operation effects of the present embodiment are the same as those of the first embodiment.

The separator 8 has a diameter smaller than the diameter of each rolling element 5 and, in the two mutually opposing surfaces of the separator 8, there are formed recess-shaped arc grooves 9, 9 which are respectively used to hold the rolling elements 5, 5 in such a manner that, as described above, the rotation axes 5c, 5c thereof perpendicular to their associated mutually opposing surfaces 5b, 5b and 5b, 5b cross each other.

[Sixth Embodiment]

Figure 8:
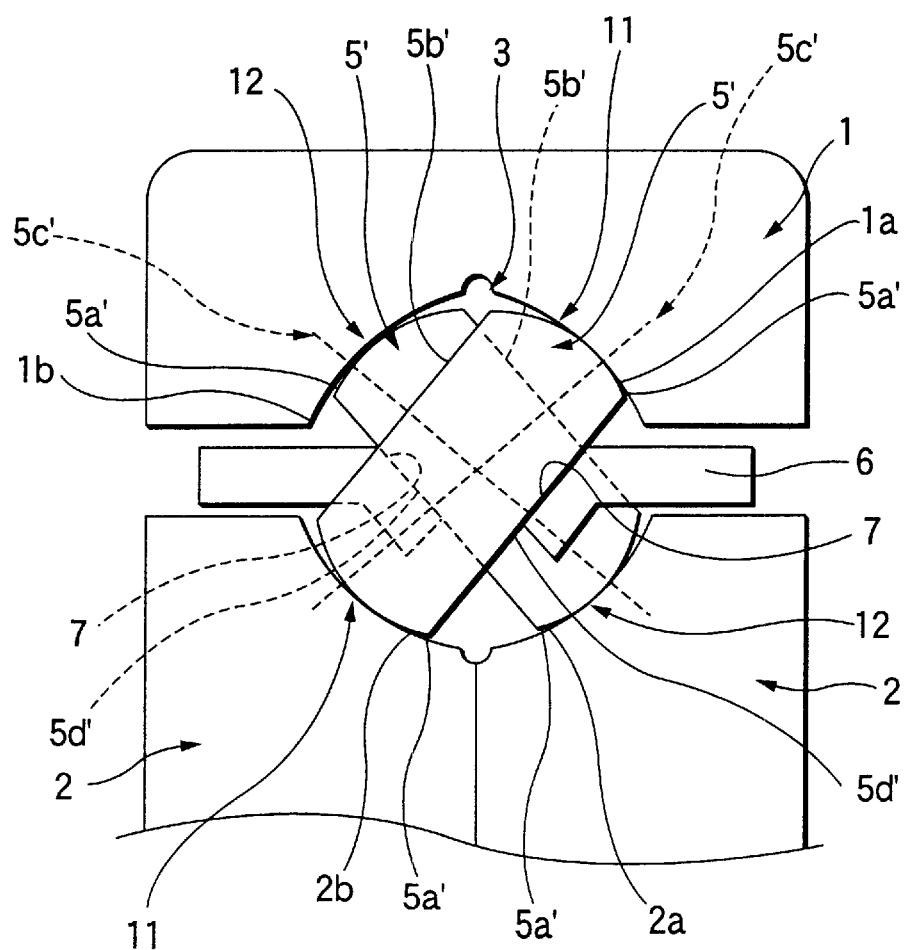
FIG. 8 is a longitudinal section view, omitted in part, of a rolling bearing according to a sixth embodiment of the invention.

Now, FIG. 8 a sixth embodiment of a rolling bearing according to the invention. The present embodiment is suitable for use in a high-speed rotation case.

Figure 9:
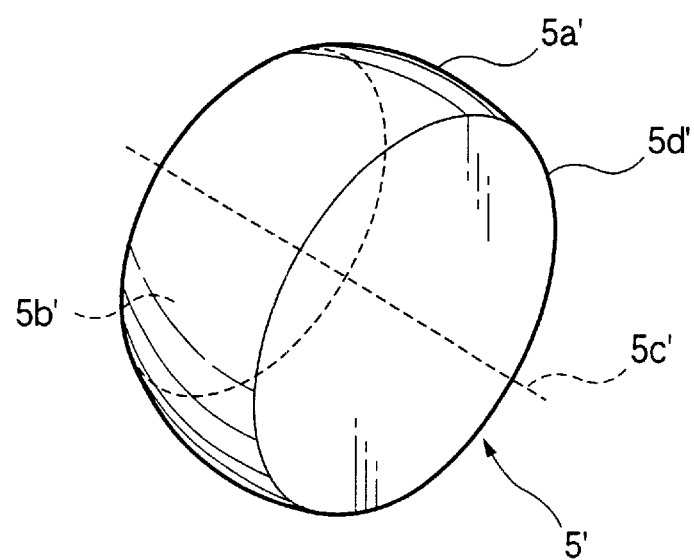
FIG. 9 is an enlarged perspective view of another embodiment of a rolling element employed in the invention.

In stead of the rolling element 5 including the two symmetric, mutually opposing surfaces 5b, 5b used in the first embodiment, there is employed a rolling element (a top-and-bottom-cut-shaped ball) 5' including two asymmetric, mutually opposing surfaces 5b', 5b' shown in FIG. 9, and the rolling element 5' is arranged in such a manner that the larger ends 5d' of the two mutually opposing surfaces 5b', 5b' thereof are disposed opposed to the inner race 2 of the present rolling bearing. With use of this structure, the rotation of the rolling element 5' can be stabilized further, which makes it possible to realize further reduced torque.

The other remaining structures and operation effects of the present embodiment are the same as those of the first embodiment.

[Seventh Embodiment]

Figure 10:
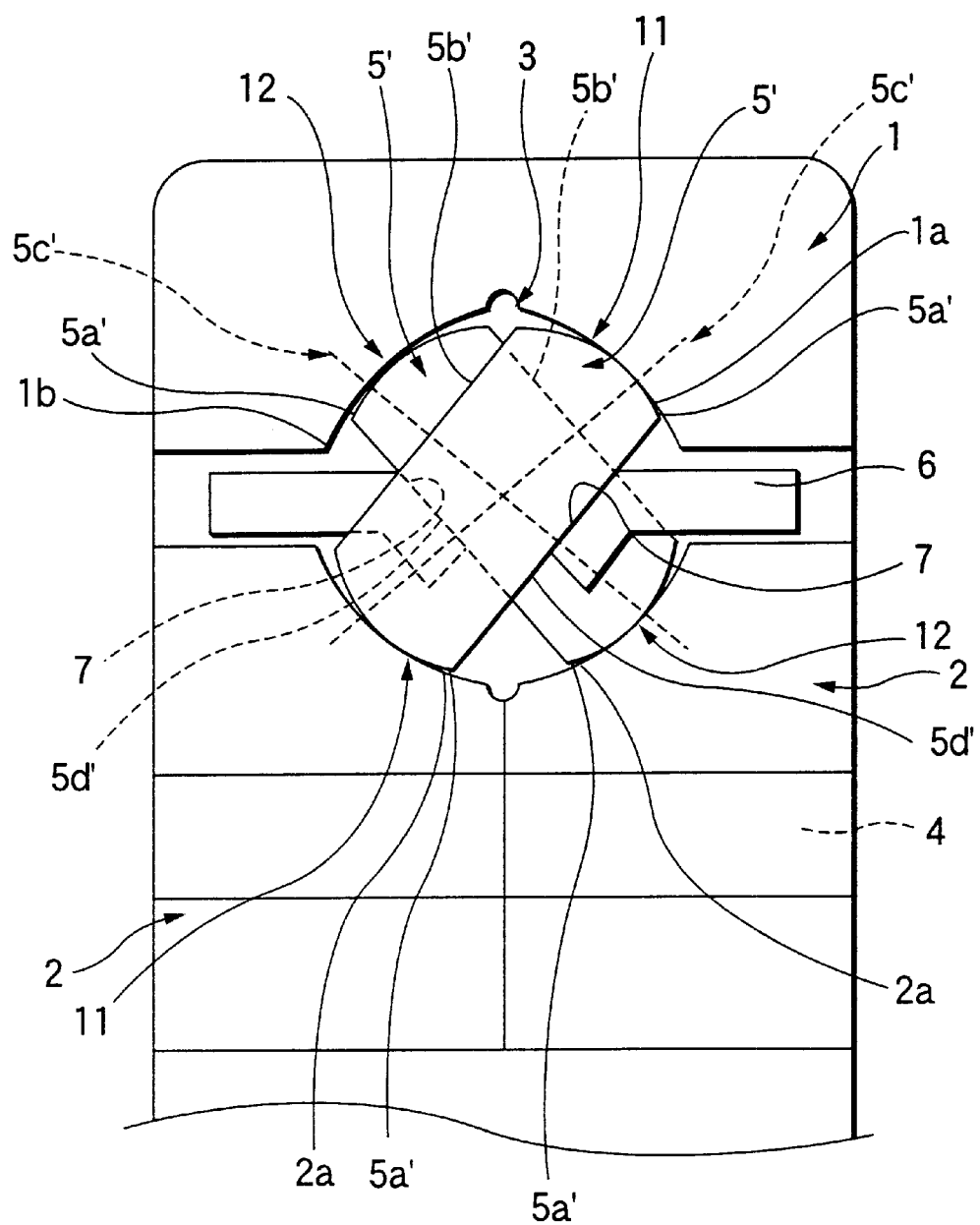
FIG. 10 is a longitudinal section view, omitted in part, of a rolling bearing according to a seventh embodiment of the invention.

Now, FIG. 10 shows a seventh embodiment of a rolling bearing according to the invention. In the present embodiment, the two divided inner races 2 and 2 are fixed together by a bolt or a rivet 4 to thereby eliminate the need for adjustment of a preload or a clearance between them.

The other remaining structures and operation effects of the present embodiment are the same as those of the sixth embodiment.

[Eighth Embodiment]

Figure 11:
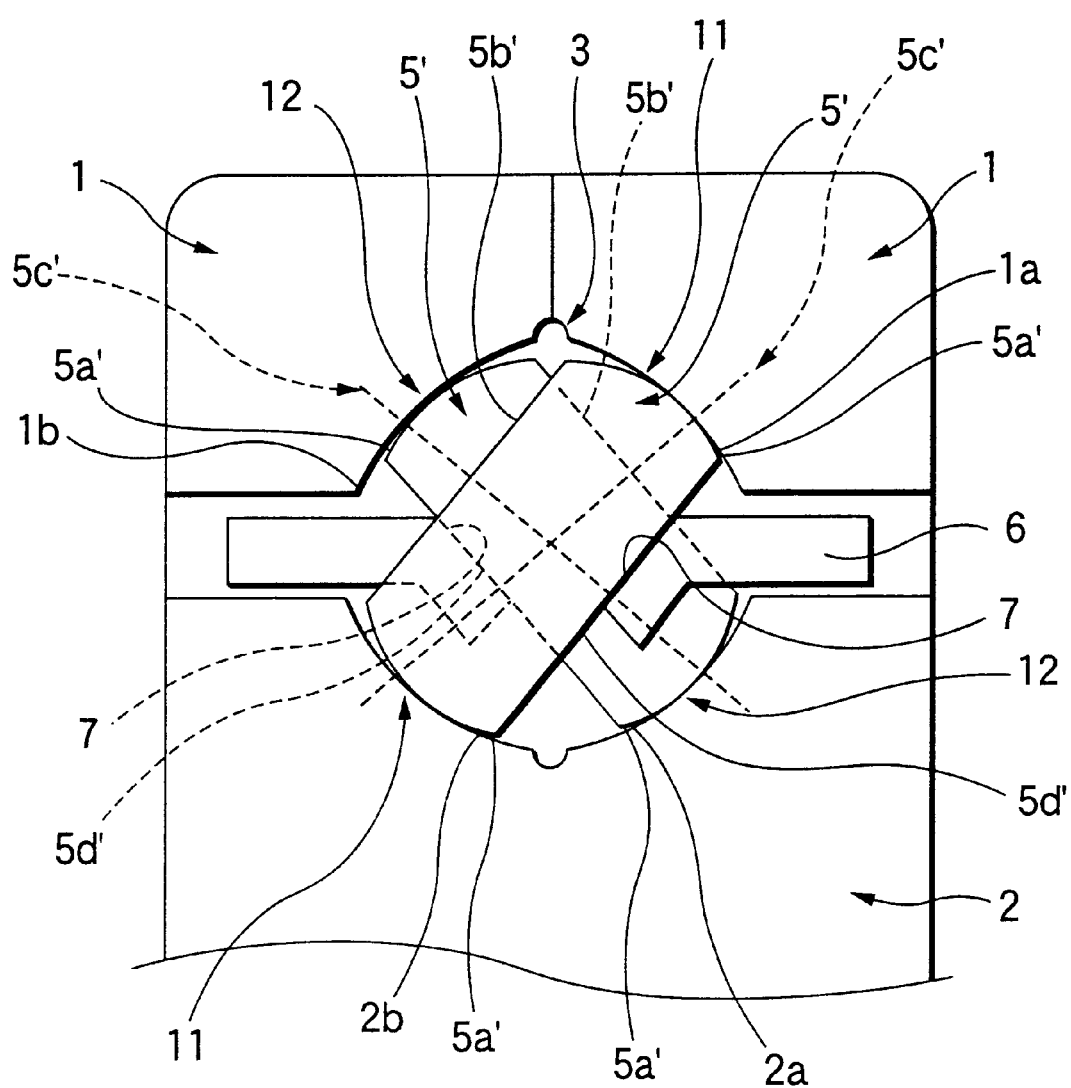
FIG. 11 is a longitudinal section view, omitted in part, of a rolling bearing according to an eighth embodiment of the invention.

Now, FIG. 11 shows an eighth embodiment of a rolling bearing according to the invention. In the present embodiment, instead of the integral outer race 1 and two divided inner races 2, 2 respectively employed in the first embodiment, there are employed two divided outer races 1, 1 and an integral inner race 2.

The other remaining structures and operation effects of the present embodiment are the same as those of the sixth embodiment.

[Ninth Embodiment]

Figure 12:
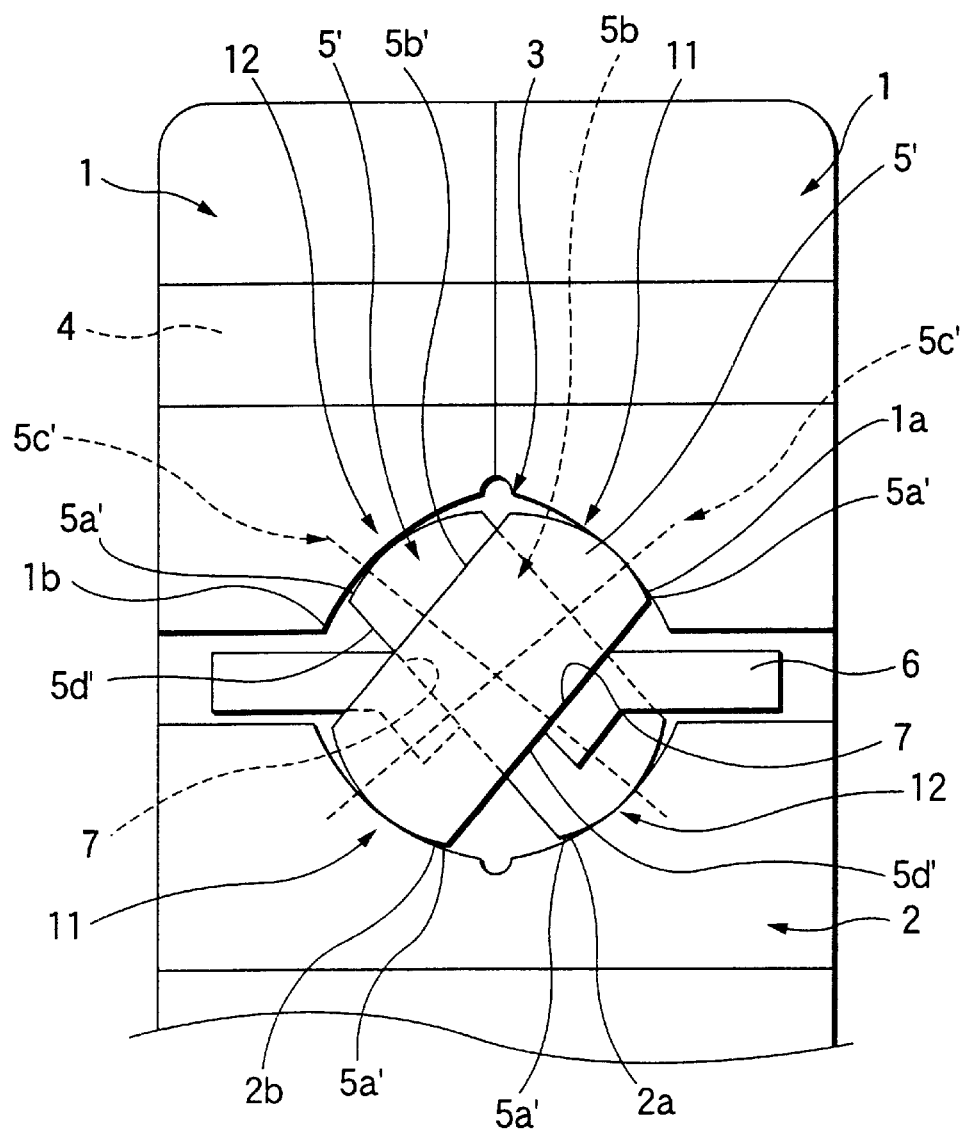
FIG. 12 is a longitudinal section view, omitted in part, of a rolling bearing according to a ninth embodiment of the invention.

Now, FIG. 12 shows a ninth embodiment of a rolling bearing according to the invention. In the present embodiment, the two divided outer races 1, 1 employed in the eighth embodiment are fixed together by a bolt or a rivet 4 to thereby eliminate the need for adjustment of a preload or a clearance between them. The other remaining structures and operation effects of the present embodiment are the same as those of the sixth embodiment.

[Tenth Embodiment]

Figure 13:
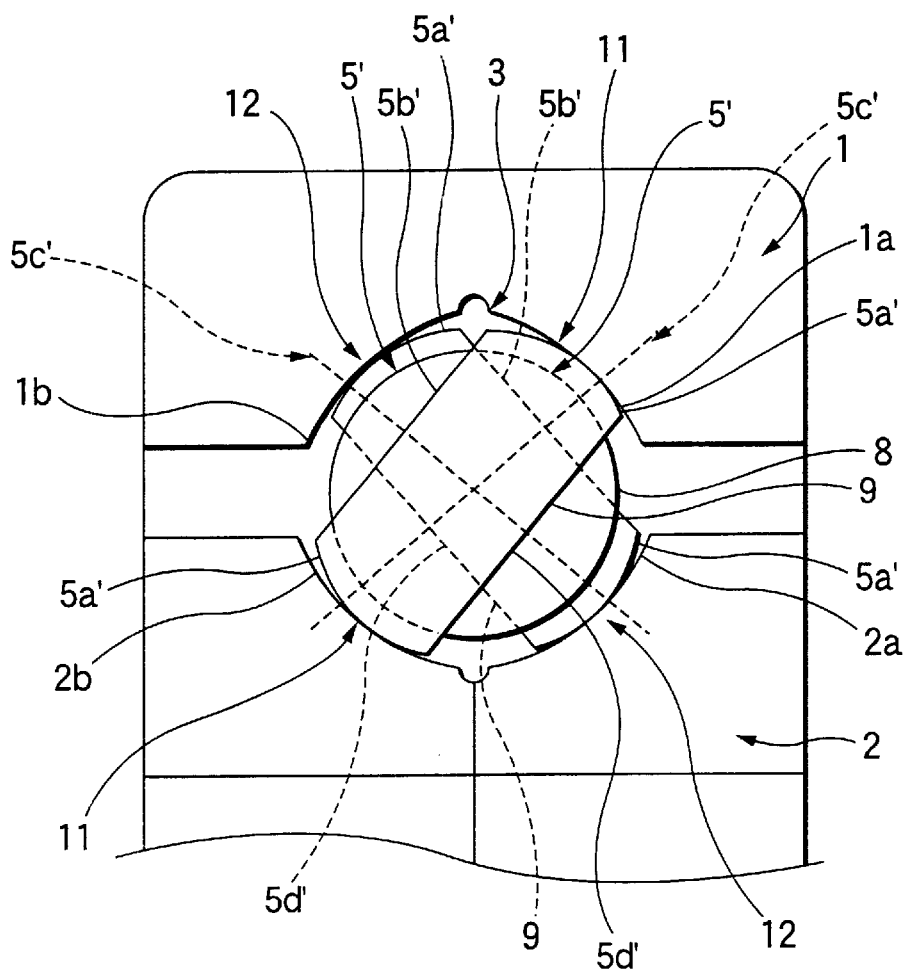
FIG. 13 is a longitudinal section view, omitted in part, of a rolling bearing according to a tenth embodiment of the invention.
Figure 14:
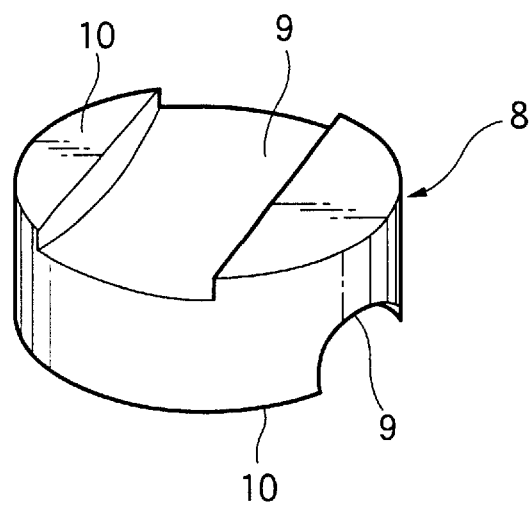
FIG. 14 is an enlarged perspective view of another embodiment of a separator employed in the invention.

Now, FIG. 13 shows a tenth embodiment of a rolling bearing according to the invention. In the present embodiment, as shown in FIG. 13, there are employed an integral outer race 1 and an integral inner race 2. In the outer race 1, there is formed a rolling element insertion hole. Also, instead of the retainer 6 used in the first embodiment, as shown enlargedly in FIG. 14, there is employed a separator (spacer) 8; that is, the rolling elements 5, 5 are guided by the separator 8. With use of this structure, the rolling bearing can be made more compact.

The other remaining structures and operation effects of the present embodiment are the same as those of the sixth embodiment.

[Eleventh Embodiment]

Figure 2B:
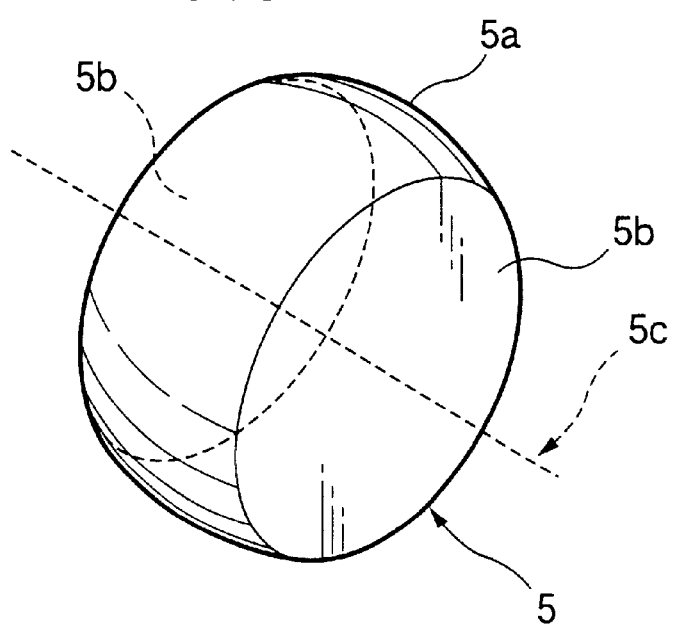
FIG. 2B is an enlarged perspective view of another embodiment of a rolling element employed in the invention.
Figure 15:
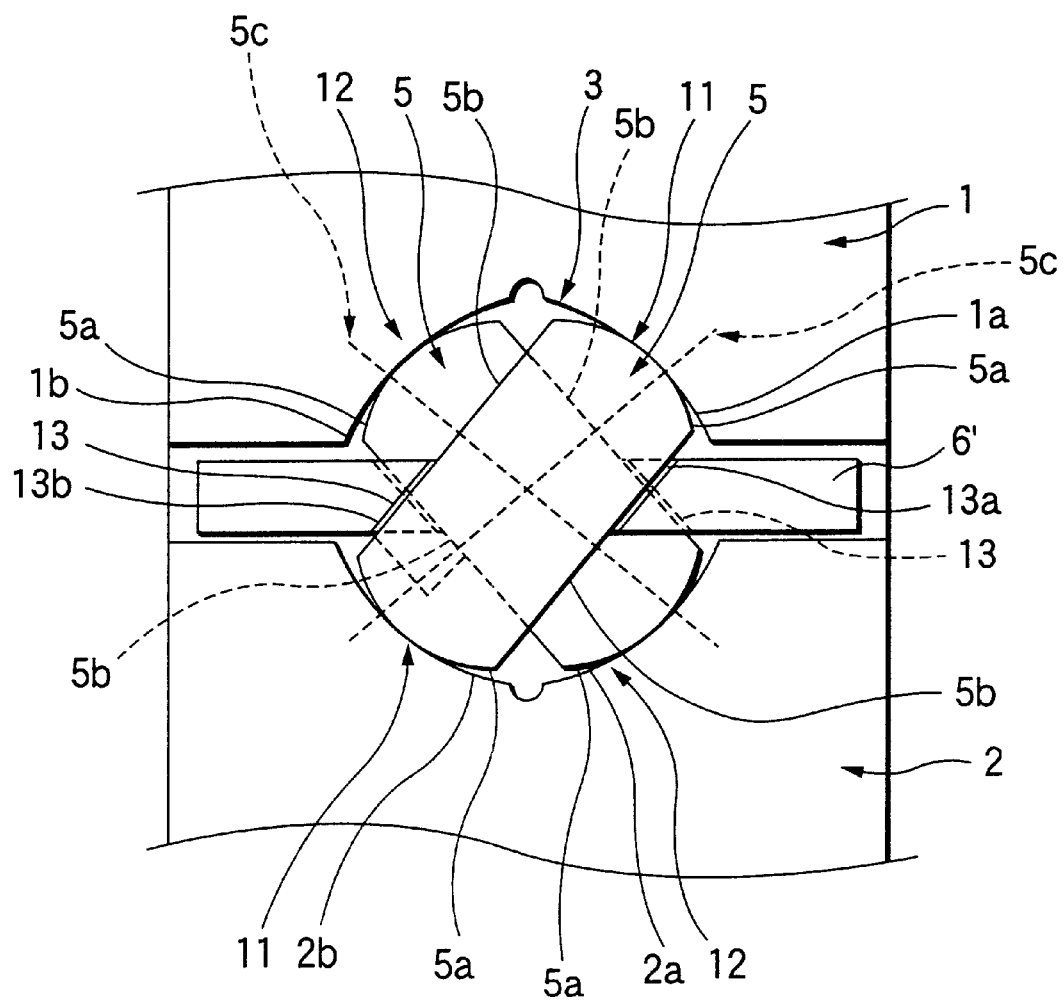
FIG. 15 is a longitudinal section view, omitted in part, of a rolling bearing according to a eleventh embodiment of the invention.
Figure 16:
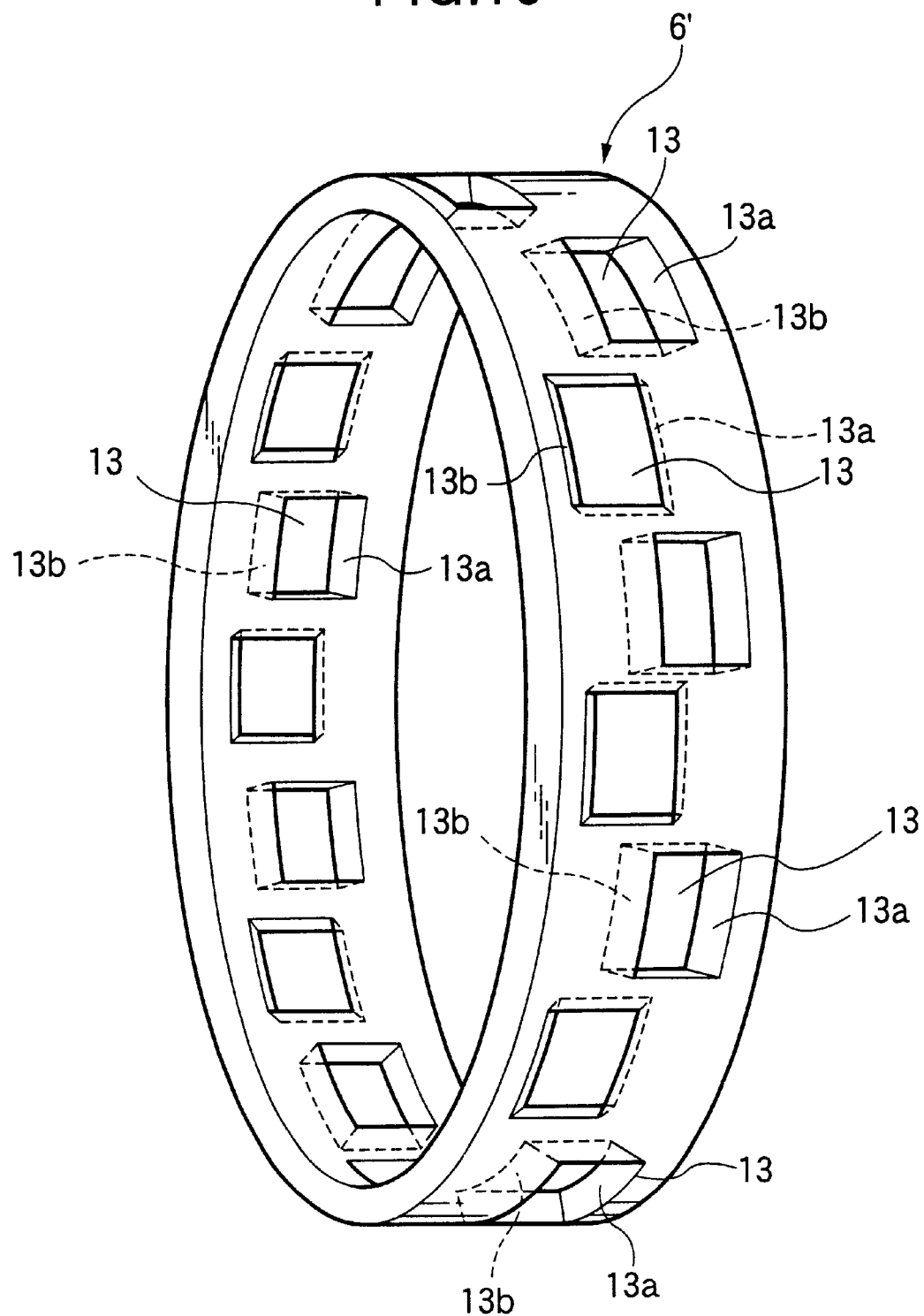
FIG. 16 is an enlarged perspective view of another embodiment of a retainer employed in the invention.

Now, FIGS. 15 to 16 show a eleventh embodiment of a rolling bearing according to the invention. FIG. 15 is a longitudinal section view, omitted in part, of a rolling bearing according to the eleventh embodiment of the invention. FIG. 16 is an enlarged perspective view of one example of a retainer employed in the invention. FIG. 2B is an enlarged perspective view of one example of a rolling element employed in the invention;

In the rolling bearing of the eleventh embodiment, instead of a retainer 6 used in the first embodiment and so on, a machined retainer 6' (an annular-shaped retainer) as shown in FIG. 16 is used in such a manner that a holding posture of each rolling element 5 is kept maintained by the machined retainer 6'.

The retainer 6' has a number of pockets 13, - - - into which the same number of rolling elements 5, 5 are respectively inserted, while the rotation axes 5c, 5c of ones of the mutually adjoining rolling elements perpendicular to their associated mutually opposing surfaces 5b, 5b and 5b, 5b cross each other. The pockets 13, - - - are alternatively disposed on a periphery portion of the retainer 6' in a staggered manner and arranged in a predetermined interval in the circumferential direction thereof.

Both side surfaces 13a, 13b of each pocket 13 in the axial direction of the retainer 6' are extended in parallel with each other, but their extending directions thereof are neither in parallel with nor perpendicular to the axial direction of the rolling bearing. Namely, each of the extending directions defines a predetermined angle (inclined angle) relative to the axial direction of the rolling bearing while the predetermined angle (inclined angle) is set to a level substantially equal to a contact angle of the respective rolling element 5.

A distance between the side surfaces 13*a*, 13*b* is made slightly larger than a wide of the rolling element 5.

Note that the entire shape of each pocket is not limited to a specific one described above. The shape of the pocket can be modified, while keeping a construction that the pocket 13 has the parallel extending inclined side surfaces 13*a*, 13*b* and also a distance between the side surfaces 13*a*, 13*b* is set to be slightly larger than the width of the rolling element 5.

Although in the eleventh embodiment the rolling elements 5, - - - and the pockets 13, - - - , the total number of which is the same as the rolling elements, are respectively arranged at the predetermined interval in the circumferential direction and are alternatively arranged on the peripheral portion of the retainer 6' in the staggered manner, a configuration of the retainer according to the present invention is not limited to such a specific one. If the total number of the pockets is the same as the rolling elements, it is possible to modify the configuration in such a manner that the rotation axes 5*c*, 5*c* of the mutually adjoining ones of the rolling elements 5 may cross each other two to two; or they may cross in the manner of two, one, one and two.

In addition, a material of the retainer 6' is not limited into a specific one. For example, a metal material (for example, brass, steel or the like) or a synthetic resin (for example, polyamide 66 (nylon 66), polyphenylene sulfide (PPS) or the like) can be selectively utilized. Further, a guiding system of the retainer 6' is not limited to a specific one. An inner race guiding type, an outer race guiding type or a rolling element guiding type can be utilized. Furthermore, a construction of the retainer 6, 6' is not limited to a specific one. Not only a single unit type but also a divided race components type can be selectively utilized.

There is a possibility that a spinning or skewing of the rolling element is occurred during the rotation of the rolling element because of influence based on various kinds of factors. Accordingly, in the case where the rolling posture of the rolling element can not be controlled well, there is a possibility that a rotational resistance of the rolling bearing is increased and in turn a smooth rotation of the rolling element is deteriorated.

However, in the present invention, each pocket 13 of the retainer 6' has parallel extending inclined side surfaces 13*a*, 13*b* which are inclined relative to the axial direction of the rolling bearing at a predetermined angle which is substantially equal to the level of the contact angle of the rolling element 5. The side surfaces 13*a*, 13*b* can suppress the changing of the posture of the rolling element 5 which is caused by the spinning or the skewing of the rolling element 5, so that a posture of each rolling element can be maintained stable, to thereby realize reduced torque of the rolling bearing.

The other remaining structures and operation effects of the present embodiment are the same as those of the first to fourth embodiments and those of the sixth to ninth embodiments.

Namely, although in the embodiments above both of the outer race 1 and the inner race 2 are made of a single unit type, a construction of each race is not limited to such a specific one. It is possible to modify it in such a manner that one or both of the inner and outer races is made of a divided race components type wherein the race is divided into two components at a center position in the width direction, or that one or both of the inner and outer races is made of the divided race components type. As one example of the divided race components type, note that there is an assembled one which is made by coupling the divided race components through a bolt/rivet 4 into an assembled single unit.

In addition, although as shown in FIG. 2B the rolling elements 5 utilized in the eleventh embodiment are the same as that of the first embodiment, in stead of this, it is possible to replace the rolling elements 5 with the rolling element 5' used in the sixth to ninth embodiments. That is, there is employed a rolling element (a top-and-bottom-cut-shaped ball) 5' including two asymmetric, mutually opposing surfaces 5*b'*, 5*b'* shown in FIG. 9, and the rolling element 5' is arranged in such a manner that the larger ends 5*d'* of the two mutually opposing surfaces 5*b'*, 5*b'* thereof are disposed opposed to the inner race 2 of the present rolling bearing. With use of this structure, the rotation of the rolling element 5' can be stabilized further, which makes it possible to realize further reduced torque. According to the present invention, since it has the above-mentioned structure, a single bearing is able to receive a radial load, axial loads in two directions and a moment load.

Also, according to the present invention, in addition to the above effect, there can be further obtained the following effects:

That is, because the rolling elements are always contacted at two points with the raceway groove of the race thereof, it is possible to control an increase in torque which is caused by the large spin slippage of the ball in the conventional four-point contact bearing.

Also, since the rolling element is formed in such a manner that its outside diameter serving as its rolling contact surface has a curvature in the axial direction thereof as well, when compared with a cross roller bearing, the rolling resistance of the rolling element can be reduced, which makes it possible to realize low torque.

[12th Embodiment]

Figure 17:
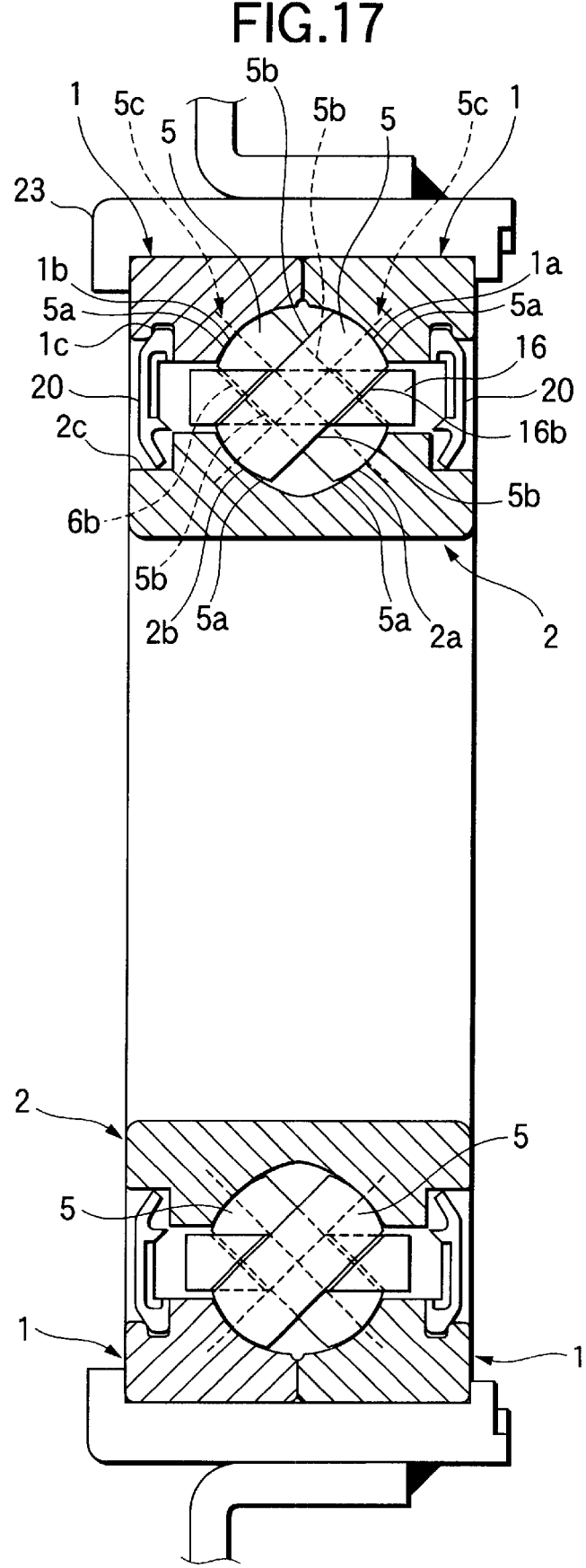
FIG. 17 is a longitudinal section showing a 12th embodiment of a bearing of the present invention.

A 12th embodiment of the present invention will be described with reference to FIG. 17.

In the Drawings: reference numeral 1 designates an outer race; numeral 2 an inner race; numeral 23 a pulley; numeral 5 a rolling element; numeral 16 a retainer; and numeral 20 a sealing plate.

A rolling bearing of the present invention can be widely applied within the scope of the present invention if it is used in a compressor pulley, and it should not be especially restrictively interpreted. For example, the rolling bearing can be applied not only to the pulley of a compressor using an electromagnetic clutch but also to the damper pulley of a compressor not using the electromagnetic clutch.

The outer race 1 has two right and left split races.

These two right and left raceway surfaces 1*a* and 1*b* are different at their center points of axial curvature.

The radius of curvature of the raceway surfaces 1*a* and 1*b* is set larger than that of the rolling element 5 and to a value of 50.3 to 54% of the diameter of the rolling element in the present embodiment.

The inner race 2 has raceway surfaces 2*a* and 2*b* formed into a Gothic arch shaped section, and the radius of curvature of the two groove ends is larger than that of the groove center.

The individual raceway surfaces are provided at portions slightly offset from the groove center.

The radius of curvature of the raceway surfaces 2*a* and 2*b* is set, as in the outer race 1, larger than that of the rolling element 5 and to a value of 50.3 to 54% of the diameter of the rolling element in the present embodiment.

Here, the inner race of the shown embodiment is given a structure in which the raceway surfaces of a non-arc shape are simultaneously ground. Where this grinding work is difficult because of the problem of facilities, however, a grinding clearance groove can be formed in the groove center to form two arc grooves having their individual curvature center points at different positions.

Moreover, the structure of the sealing grooves 1c and 2c of the outer race 1 and the inner race 2 should not be especially limited but can be suitably modified within the scope of the present invention.

In the bearing of the present invention, the rolling element cannot be incorporated into the race of the integral structure so that at least one race is given a split structure.

In the present embodiment, the outer race 1 of an interference fit is given the split structure so that it can retain a pre-load simply. However, the present invention should not be restrictively interpreted thereto but can contain a structure, in which the inner race 2 is divided or in which both the inner race 2 and the outer race 1 are divided, within its scope.

Moreover, the outer race 1 is press-fitted with an interference on the inside diameter surface of the compressor pulley 23, and is incorporated by applying a pressure till the split surface 1c comes into contact. The sizes of the individual portions are administered so that a proper pre-load may be applied when the pressure is applied till the split surface 1c comes into contact.

After the outer race 1 was press-fixed on the pulley 23, this pulley 23 is additionally fastened at its end face so that the outer race 1 may not move axially to change the pre-load.

The compressor pulley 23 should not be especially limited but can be arbitrarily constructed/modified within the scope of the present invention. A bushing of steel is welded to the inner diameter of the pulley which was rolled from a steel sheet, for example.

In the rolling element 5, an outside diameter 5a for a rolling contact surface has an arbitrary shape, in which it has a curvature in the axial direction, too, and a smaller radius than the individual ones of the raceway surfaces 1a and 1b, and 2a and 2b The two rolling elements adjoining in the circumferential direction are so incorporated that they may be alternately directed differently to have contact angles of inverse values. At the same time, the outside diameter 5a of each rolling element 5 always makes two-point contacts either with the raceway surface 1a of one race 1 and the raceway surface 2b of the other race 2 or with the raceway surface 1b of one race 1 and the raceway surface 2a of the other race 2.

The number of rolling elements 5 is made even for the two-point contact.

Figure 18:
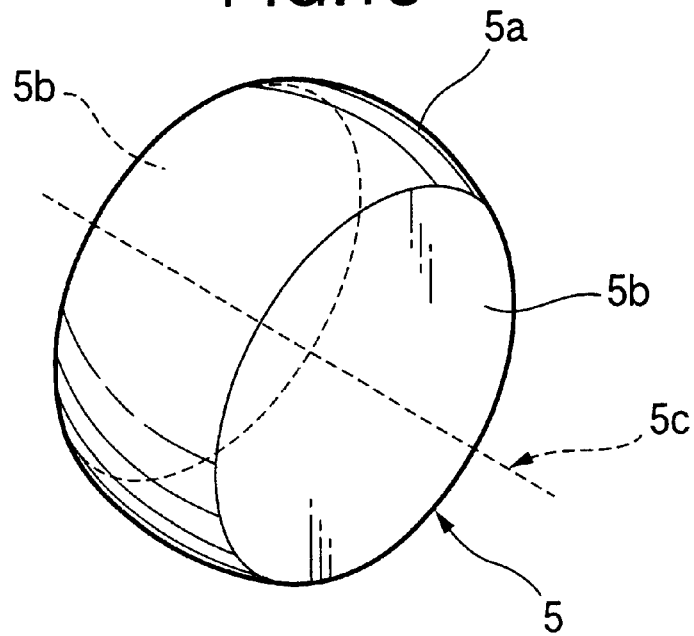
FIG. 18 is a perspective view showing one embodiment of a rolling element.

For example, the rolling element 5 is a two-end cut-away ball having a set of mutually opposing surfaces 5b and 5b(i.e., a structure having the mutually opposing surfaces 5b and 5b by cutting the two ends of a ball planarly, as in the following) (FIG. 18). The individual rolling elements 5, 5, - - - , and so on are so incorporated that the rotation axes 5c normal to the mutually opposing surfaces 5b and 5b cross each other, and the outside diameter 5a of each rolling element 5 always makes two-point contacts either with the raceway surface 1a of one race 1 and the raceway surface 2b of the other race 2 or with the raceway surface 1b of one race 1 and the raceway surface 2a of the other race 2.

The rolling element 5 should not be especially limited in the cut widths at its two ends, and the cut widths of the two ends may be equal or may not so that its ratio can be arbitrarily selected within the scope of the present invention.

In other words, the mutually opposing surfaces 5b and 5b of the rolling element 5 may be set symmetric or asymmetric, and either this symmetric or asymmetric setting falls within the scope of the present invention.

Here, the whole shape of the rolling element 5, the presence or absence of the mutually opposing surfaces 5b and 5b, and the size of the curvature of the outside diameter 5a in the axial direction should not be limited to the aforementioned specific ones at all, but they can be arbitrarily changed within the scope of the present invention.

That is, the rolling element 5 may include, instead of the mutually opposing surfaces 5b and 5b, two surfaces not parallel to each other, for example, and may also have its own rotation axis 5c normal to the two surfaces.

Figure 19:
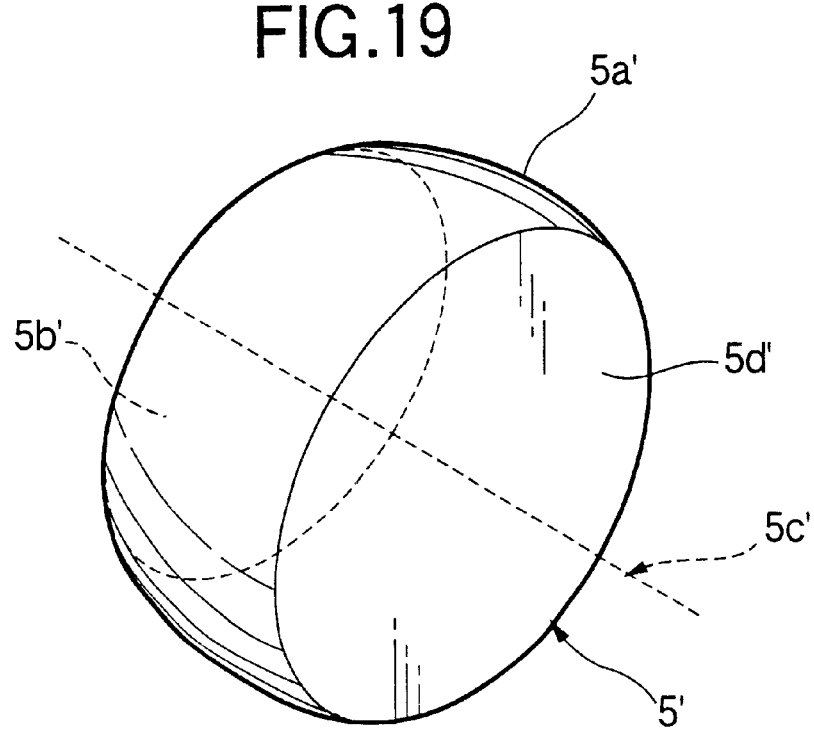
FIG. 19 is a perspective view showing another embodiment of a rolling element.

Moreover, the use of the rolling element shown in FIG. 19 also falls within the scope of the present invention. That is, a rolling element 5' (or a two-end cut ball) having asymmetric mutually opposing surfaces 5b' and 5d' is used, and the mutually opposing surfaces 5b' and 5d' are arranged such that the larger end side 5d' confronts the inner race 2 of the bearing. Then, the rotation of the rolling element 51 can be more stabilized to realize a lower torque.

Moreover, the rolling elements 5, 5, - - - , and so on are incorporated such that the rotation axes 5c and 5c normal to the individual mutually opposing surfaces 5b and 5b, 5b and 5b of the adjoining rolling elements 5 and 5 may cross each other alternately. However, the crossing manner may be at right angles or may not.

The motions of the individual rolling elements 5 and 5 are guided by the retainer 16.

Figure 20:
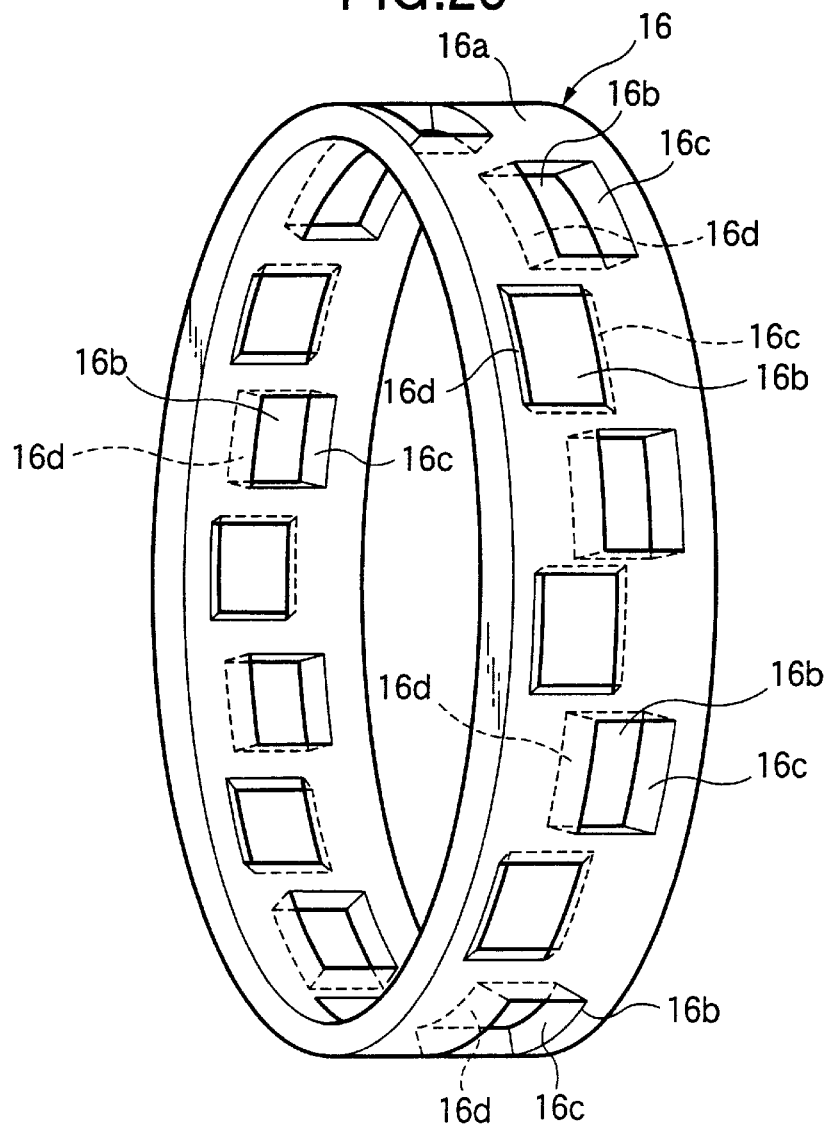
FIG. 20 is a perspective view showing one embodiment of a retainer.

The retainer 16, as exemplified by the present embodiment, is an annular retainer shown in FIG. 20 to hold the position of the individual rolling elements 5.

The retainer 16 is molded of a resin material such as nylon 66, nylon 46 or polyphenylene sulfide.

The retainer 16 is held by the rolling elements but could be guided by the inner race or the outer race.

In order to control the position of a rolling element in rotation, each of a plurality of pockets 16b, as formed in the circumferential direction of an annular-shaped member 16a of the retainer 16, is provided with two parallel side surfaces 16c and 16d at the same level as the contact angle of the rolling element 5. Therefore, the position of the rolling element 5 can be retained to realize a low torque of the bearing.

It is also possible to use a machined cage which is manufactured by cutting a brass or steel material.

The distance between the two side surfaces 16c and 16d of each pocket 16b is made slightly larger than the width of the rolling element 5.

The shape of the pocket 16b should not be restrictively interpreted in its entire shape but can be modified within the scope of the present invention, if it is formed to have the two sloped parallel side surfaces 16c and 1d and a rather larger distance between the two side surfaces 16c and 16d than the width of the rolling element 5.

Moreover, the construction of the retainer 16 should neither be especially limited but may be of the monolithic type or composed of several portions.

The retainer 16 should not be especially limited, if it is shaped to have a portion for retaining and guiding the rolling element 5, but can be arbitrarily selected and changed within the scope of the present invention.

Figure 21:
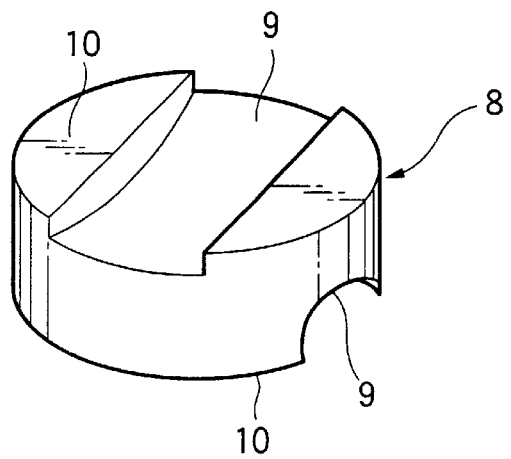
FIG. 21 is a perspective view showing one embodiment of a separator.

Moreover, the bearing, in which a separator (or spacer) 8 has recess-shaped arc grooves 9 and 9 shown in FIG. 21, also falls within the scope of the present invention.

The separator 8 has a smaller diameter than that of the rolling element 5. In mutually opposing surfaces 10 and 10, there are formed in a crossing shape the recess-shaped arc grooves 9 and 9 for holding the individual adjoining rolling elements 5 and 5 such that the rotation axes 5c and 5c normal to the mutually opposing surfaces 5b and 5b, and 5b and 5bmay cross each other, as described hereinbefore.

The curvature of this arc groove 9 is arbitrary and may be substantially equal to or larger than that of the outside diameter 5a of the rolling element.

If the separator 8 is thus used, the bearing can be made compact as a whole.

The sealing plate 20 is a plate seal having a core coated with rubber or a resin. The fixing portion (or outside diameter) of the sealing plate 20 is attached to the groove 1c formed in the outer race, and the seal lip (or inside diameter) is in sliding contact with the cylindrical surface 2c of the inner race, so that the sealing plate 20 is not influenced in its sealing performance by the working dispersion of the sized of the individual portions in the axial direction.

In the present embodiment, the contact type seal is adopted but may be replaced by a non-contact type seal or a non-contact shield. This seal should not be especially limited but can be suitably selected from the well-known shapes within the scope of the present invention.

Moreover, the presence or absence of the core is free, and the type with or without the core may be used separately, if necessary, but should not be restrictively interpreted.

With the construction thus far described, according to the present invention, the rolling element makes contact of only one point with each race so that it can be hardly slipped by spinning motions to reduce the offset wear at the spinning motion.

Moreover, the rolling elements are alternately arranged to cross on the circumference so that the two circumferentially adjacent rolling ones of the rolling element contacting with one of the two raceway surfaces formed on each race may contact with the other raceway surface. Therefore, the bearing has a high moment rigidity.

Therefore, it is possible to provide a bearing which is made more compact than the double row bearing of the prior art and which is superior in the moment rigidity and the spin wearing performance to the three-point contact bearing although having the sizes equal to those of the three-point contact bearing. As a result, the entire apparatus can be made compact and light and can be improved in durability and in a low cost.

Hereinafter, the other preferred embodiments according to the present invention will be explained.

[13th Embodiment]

As shown in FIGS. 22 to 35, a roller bearing according to the present invention comprises a race (outer race) 1; another race (inner race) 2; a plurality of rolling elements 5, 5, . . . incorporated into a raceway groove 3, the groove being defined between the inside diameter of the outer race 1 and the outside diameter of the inner race 2; and sealing plates 20 interposed between the outer and inner races 1 and 2.

The raceway groove 3 is formed into a desired shape by means of raceway surfaces 1a and 1b formed along the inside diameter of the race (outer race) 1 and raceway surfaces 2a and 2b formed along the outside diameter of the race (inner race) 2. A roller bearing including the races 1 and 2 of non-split type or a roller bearing including the races 1 and 2, either or both being axially split into two pieces along the widthwise center thereof, is employed.

Some ball bearings of two-way split type are assembled into one piece by use of bolts or rivets. If a ball bearing of two-way split type is fastened by use of bolts or rivets, a necessity for a pre-load or clearance adjustment is obviated.

The raceway groove 3 is defined by the raceway surfaces 1a, 1b, 2a, and 2b, each being larger in radius than the rolling element 5.

Each of the raceway surfaces 1a, 1b, 2a, and 2b may assume any shape, such as a cross-sectional profile of an arch, a letter V, a curve, or a straight line, so long as the raceway surface assumes a geometry suitable for rolling action of the rolling elements 5. In short, the raceway surface is not limited to a specific shape. For example, the cross-sectional profile of a Gothic arch is imparted to a surface.

The rolling element 5 may assume an arbitrary shape which imparts an axial curvature to an outside diameter 5a serving as a rolling contact surface and is smaller in radius than each of the raceway surfaces 1a, 1b, 2a, and 2b. The rolling elements 5 are arranged in such a way that they alternating rolling elements 5 cross each other at angles. Two points of contact exist between the outside diameter 5a of each rolling element 5 and the raceway groove 3 at all times; namely, the outside diameter 5a remains in contact with the raceway surfaces 1a and 2b, or the outside diameter 5a remains in contact with the raceway surfaces 1b and 2a.

For example, the rolling element 5 assumes the shape of a ball truncated on top and bottom, wherein the thus-truncated surfaces constitute opposing surfaces 5b, 5b (more specifically, a structure constituted by truncating the top and bottom of a ball, thereby forming the opposing surfaces 5a and 5b; and in the descriptions that follow the same also applies to any counterparts). The rolling elements 5, 5, are incorporated into the raceway groove 3 such that a rotation center axis 5c perpendicular to the opposing surfaces 5b, 5b of one rotating element 5 crosses that of another adjacent rotating element 5. Two points of contact always exist between the outside diameter 5a of each rolling element 5 and the raceway surfaces; namely, the outside diameter 5a remains in contact with the raceway surfaces 1a and 2b, or the outside diameter 5a remains in contact with the raceway surfaces 1b and 2a.

No specific dimensional limitations are imposed on the cut widths of the top and bottom of the rolling element 5. The cut widths may be equal to or different from each other. A ratio between the cut widths can be selected arbitrarily within the scope of the invention. The opposing surfaces 5b, 5b of the rolling element 5 may be symmetrical or asymmetrical, and both symmetrical and asymmetrical opposing surfaces fall within the scope of the invention.

The overall geometry of a rolling element 5, the presence or absence of the opposing surfaces 5b, 5b, and the size of axial curvature of the outside diameter 5a are not at all limited to the specific geometries set forth; they are susceptible to arbitrary modifications without departing from the scope of the invention.

For instance, a rolling element 5 may have non-parallel surfaces in place of the mutually-opposing surfaces 5b, 5b, as well as a rotation center axis 5c perpendicular to the surfaces.

Figure 24:
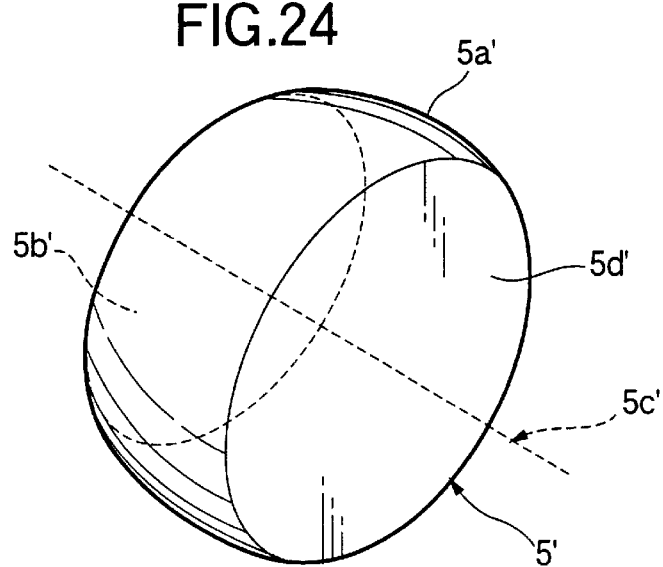
FIG. 24 is an enlarged perspective view showing another example of a rolling element.

Use of a rolling element such as that shown in FIG. 24 also falls within the scope of the invention. More specifically, rolling elements 5' having asymmetrical and mutually-opposing surfaces 5b', 5d' (the elements consisting of balls truncated on top and bottom) are employed. The rolling elements 5' are arranged such that a larger surface 5d' of the mutually-opposing surfaces 5b', 5d' faces the inner race 2 of the bearing. As a result, rotation of the rolling element 5' becomes more stable, and low torque can be achieved. The ball bearing described in connection with the first aspect of the invention is primarily used in high-speed applications.

The rolling elements 5, 5, are incorporated such that the rotation center axis 5c perpendicular to the mutually-opposing surfaces 5b, 5b of one rolling element 5 crosses that of another, adjacent rolling element 5 at a right angle or at an arbitrary angle.

So long as the rolling elements 5 oriented in one direction are equal in number with those oriented in another direction, crossing may arise every arbitrary number of rolling elements. In other words, the rolling elements 5 may cross each other alternately. Further, so long as the rolling elements 5 oriented in one direction are equal in number with those oriented in another direction, the rolling elements 5 may cross each other every two elements or in a pattern of two elements in a first orientation, one element in a second orientation, one element in the first orientation, and two elements in the second orientation. All of the rolling elements 5 set forth fall within the scope of the invention.

The motions of respective rolling elements 5, 5 . . . are guided by a retainer 6. The retainer 6 described in connection with the first aspect is an annular retainer such as that shown in FIG. 25. The annular retainer 6 holds the respective rolling elements 5 in position.

Pockets 6b are formed in the circumference of an annular member retainer 6a of the retainer 6 at uniform intervals and in a staggered arrangement so as to become identical in number with the rolling elements 6. The rolling elements 5 can be fitted into the pockets 6b such that the rotation center axis 5c perpendicular to a pair of opposing surfaces 5b, 5b of one rolling element crosses that of another adjacent rolling element 5.

Side surfaces 6c, 6d of each pocket 6b are parallel to each other and are tapered with respect to the rotation axis of the bearing at a certain angle; that is, at an angle substantially identical with a contact angle of the rolling element 5.

The axial distance between the side surfaces Gc and Gd of each pocket 6 is set so as to become slightly wider than the width of the rolling element 5.

The overall geometry of the pocket 6 is not limitedly construed to a specific geometry, so long as the pocket 6b has parallel tapered surfaces 6c, 6d and is configured such that the distance between the aide surfaces 6c and 6d is slightly greater than the width of the rolling element 5. The geometry of the pocket 6 is susceptible to modifications without departing from the scope of the invention.

In the first aspect, the pockets 6b identical in number with the rolling elements 5 are formed at uniform intervals in the circumferential direction of the retainer 6 in a staggered arrangement. The layout of the pockets 6b is not limited to any specific layout. So long as the pockets 6b tapered in one direction are equal in number with those tapered in another direction, the pockets 6b may be arranged in a staggered pattern alternating every two pockets or in a pattern of two pockets tapered in a first direction, one pocket tapered in a second direction, one pocket tapered in the first direction, and two pockets tapered in the second direction. The retainers 6 of all the geometries set forth fall within the scope of the invention.

No specific limitation is imposed on the manner of guiding of the retainer 6. The retainer 6 may guide an inner ring, an outer ring, or rolling members.

The configuration of the retainer 6 is not limited to any specific configuration. The retainer 6 may be formed integrally or may be assembled from several fragments.

There is a chance of spinning or skewing developing in a rolling member during rotation, due to various factors. If the positions of rolling elements are not well controlled, rotation resistance of a bearing will increase or the rolling elements will become unable to rotate smoothly.

In the first aspect of the invention, each of the pockets 6b formed in the retainer 6 has parallel side surfaces 6c and 6d which are tapered at a certain angle; that is, at an angle substantially identical with the contact angle of the rolling element 5. The side surfaces 6c and 6d of the pocket 6b suppress occurrence of changes in the rolling element 5, such as spinning or skewing. Since the position of the bearing can be retained, a low-torque bearing can be embodied.

The geometry of the retainer 6 is not limited to any specific geometry, so long as the retainer 6 has portions for retaining and guiding the rolling elements 5. The geometry of the retainer 6 is susceptible to arbitrary selection or modifications without departing from the scope of the invention.

A preferred retainer is selected, as the retainer 6, from a machined retainer, a pressed retainer, a resin retainer, or the like, as required. Accordingly, metal (e.g., brass, steel, or the like) or synthetic resin [e.g., polyamide 66 (i.e., nylon 66), polyphenylene sulfide (PPS), or the like] is selected without departing from the scope of the invention.

Figure 26:
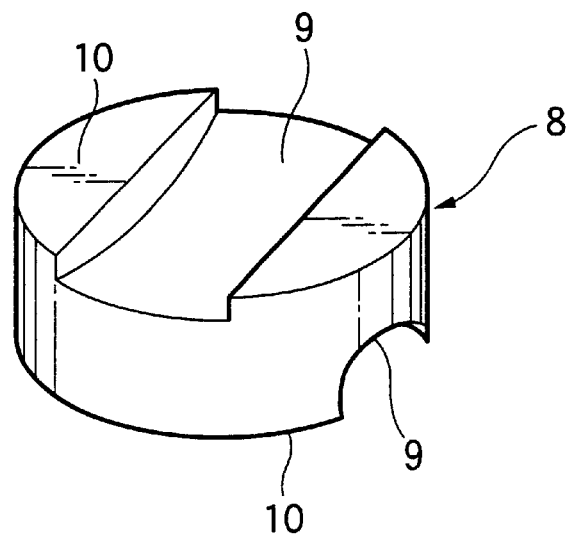
FIG. 26 is an enlarged perspective view showing an example of a separator.

A separator (spacer) 7 having arc-shaped recessed grooves 9, 9 such as that shown in FIG. 26 falls within the scope of the invention.

The separator 7 is smaller in diameter than the rolling element 5. The arc-shaped recessed grooves 9, 9 are formed in respective opposing surfaces 8, 8 so as to cross each other and to retain the rolling elements 5, 5 such that the rotation center axis 5c perpendicular to the mutually-opposing surfaces 5b, 5b crosses that of another, adjacent rolling element 5.

The curvature of the arc-shaped groove 9 may be set arbitrarily; namely, the curvature is made substantially identical with or greater than that of the outside diameter 5a of the rolling element 5.

Use of such a separator 7 renders the overall bearing compact.

No specific limitation is imposed on the state of a preload applied between the rolling element and the raceway surface. In other words, the pre-load may or may not be applied during manufacturing processes, either case falling within the scope of the present invention.

Bearing steel is usually employed as material of the races 1 and 2 and that of the rolling elements 5 of the bearing. If an attempt is made to improve the corrosion resistance or heat resistance of a bearing in accordance with a usage environment, stainless steel, heat resistant steel (e.g., M50), or ceramic may be selected, as required.

The sealing plate 20 corresponds to either a contact seal or a non-contact seal. No specific limitation is imposed on the geometry of the sealing plate 20; a known geometry may be selected without departing from the scope of the invention, as required.

No specific limitation is imposed on the arrangement of the sealing plate 20. If necessary, the sealing plate 20 may be provided on one side of the bearing or both sides of the same, each case falling within the scope of the invention. A sealing surface of the sealing plate 20 may face the outer race or the inner race, each case falling within the scope of the invention.

No specific limitation is imposed on the geometry of a seal; e.g., the geometry of a lip. Linear contact or surface contact may arise with respect to a sealing surface; either case falling within the scope of the invention.

Either the presence or absence of a metal core is arbitrarily selectable. A seal having a metal core or a seal not having a metal core may be selected, as necessary; the present invention is not specifically construed to a bearing of either type.

No specific limitations are imposed on the sealing groove structure of the outer race 1 and that of the inner race 2; the sealing groove structure is susceptible to modifications without departing from the scope of the invention, as required.

As mentioned above, the sealing plates 20 are provided because there may be a case where demand exists for a roller bearing according to the present invention having a sealing characteristic depending on usage conditions. For example, when a roller bearing is to be used in a ultra-clean environment, strict limitations are imposed on leakage of a lubricant or gas from a bearing. Further, when a roller bearing is to be used in a dusty environment, demand exists for prevention of entry of a toxic substance into the interior of a bearing.

If the sealing plates 20 are arranged in this manner, leakage of lubricant or a harmful gas from the interior of a bearing to the outside or prevention of entry of a harmful substance into the interior of a bearing can be prevented or diminished.

[13th Embodiment]

More specific descriptions of the roller bearing according to the 13th embodiment of the present invention are provided as follows.

FIRST EXAMPLE

Figure 22:
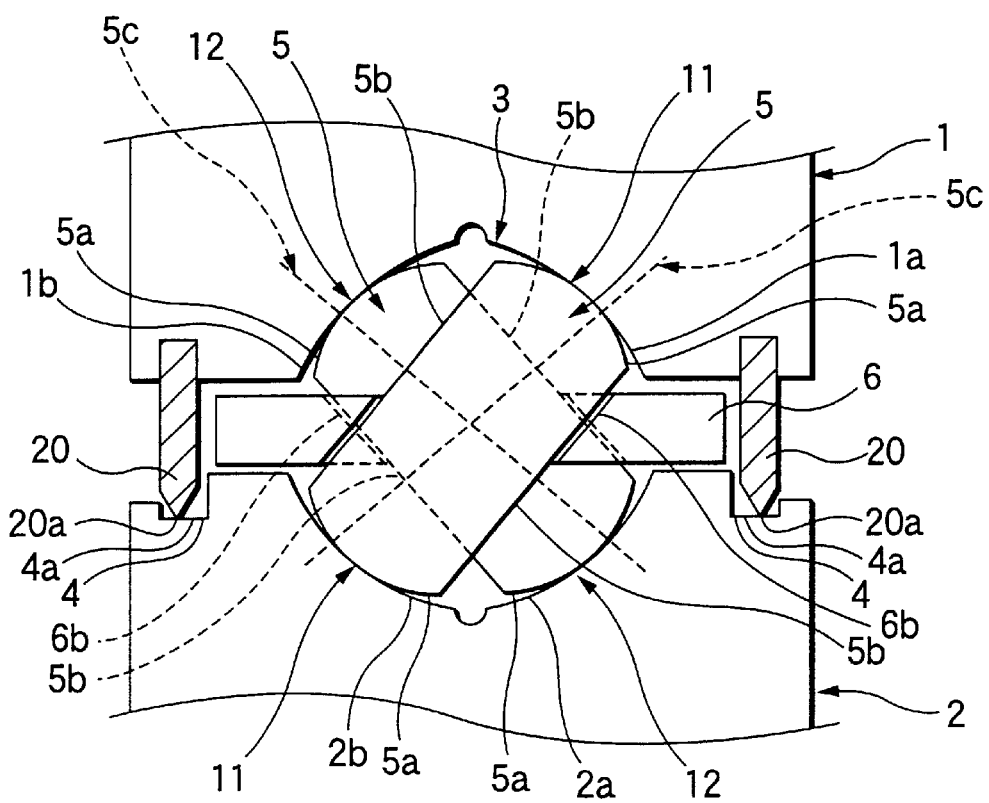
FIG. 22 is a partially-omitted longitudinal cross-sectional view showing a first example of a roller bearing according to a 13th embodiment of the present invention.
Figure 23:
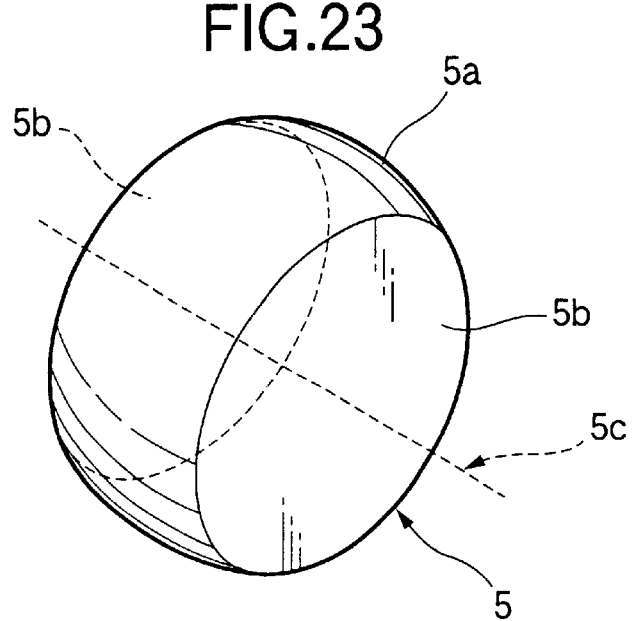
FIG. 23 is an enlarged perspective view showing an example of a rolling element.

FIG. 22 shows a roller bearing according to a first example of the 13th embodiment of the present invention, As shown in FIG. 23, each of the rolling elements 5, 5 is formed from a top-and-bottom truncated ball having a pair of opposing surfaces 5b, 5b. The rolling elements 5 are incorporated into a raceway groove 4 defined between an outer race 1 and an inner race 2. The rolling elements 5, 5 are retained and guided by a retainer shown in FIG. 25.

The sealing plates 20 are of contact type. A sealing surface 20a of the seal is taken as a sealing surface and is brought into hermetic contact with an inner bottom 4a of a sealing groove 4 of the inner race 2.

The sealing plate 20 employed in the present example represents a rough concept of the geometry thereof and is not at all limitedly construed to the illustrated geometry. The present example illustrates a mere example in which the sealing surface 20a of the seal is taken as a close-contact surface.

The raceway groove 3 according to the present example assumes the shape of a Gothic arch and is constituted of two raceway surfaces 1a and 1b, or 2a and 2b, each raceway surface being greater in radius than the rolling element 5. Further, the opposing surfaces 5b, 5b of the rolling element 5 (consisting of a top-and-bottom truncated ball) are made symmetrical.

The rotation center axis 5c perpendicular to the opposing surfaces 5b, 5b of one rolling element 5 crosses that of another, adjacent rolling element 5. The motions of the adjacent rolling elements 5, 5 are guided by the pockets 6b, 6b of the retainer 6.

Pockets 6b, 6b are alternately formed in the retainer 6 such that a pocket 6b formed in one side crosses another pocket formed in the other side with reference to the direction of circumference of the retainer 6, thereby enabling incorporation of the rolling elements 5, 5 into the raceway groove 3 such that the rotation center axis 5c perpendicular to the opposing surfaces 5b, 5b of one rolling element 5 crosses that of another, adjacent rolling element 5.

According to the first example, a point of contact 11 exists between the outside diameter 5a of the rolling element 5 and the raceway surface 1a of the outer race 1, and another point of contact 11 exists between the outside diameter 5a of the rolling element 5 and a raceway surface 2b of the inner race 2. Further, a point of contact 12 exists between the outside diameter 5a of another, adjacent rolling element 5 and the raceway surface 1b of the outer race 1, and another point of contact 12 exists between the outside diameter 5a of the rolling element 5 and the raceway surface 2a of the inner race 2.

The contact angles of the rolling elements 5, 5 cross each other in turn. Hence, one bearing can receive a radial load, axial loads in two directions, and a moment load.

Only two points of contact (11, 11) exist between the rolling element 5 and the raceway surfaces 1a, 2b, and only two points of contact (12, 12) exist between another adjacent rolling element 5 and the raceway surfaces 1b, 2a. Hence, there can be obviated the chance of occurrence of great spinning, which would otherwise arise in a related-art four-point contact bearing.

The rolling elements 5, 5 come into contact with the outer and inner races 1 and 2 in the same manner as in an ordinary ball bearing. Hence, the ball bearing according to the present invention can realize rolling resistance and torque which are smaller than those developing in a cross roller.

SECOND EXAMPLE

Figure 27:
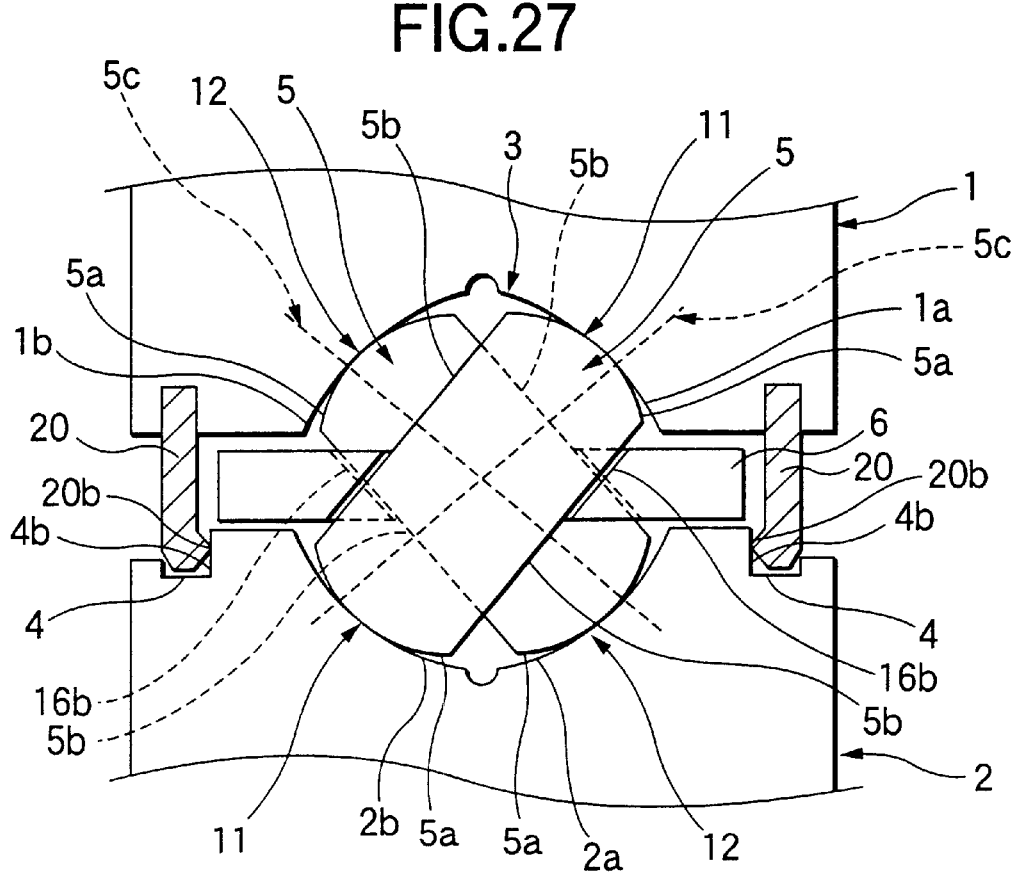
FIG. 27 is a longitudinal cross-sectional view showing a second example of the roller bearing with portions thereof being omitted.
Figure 28:
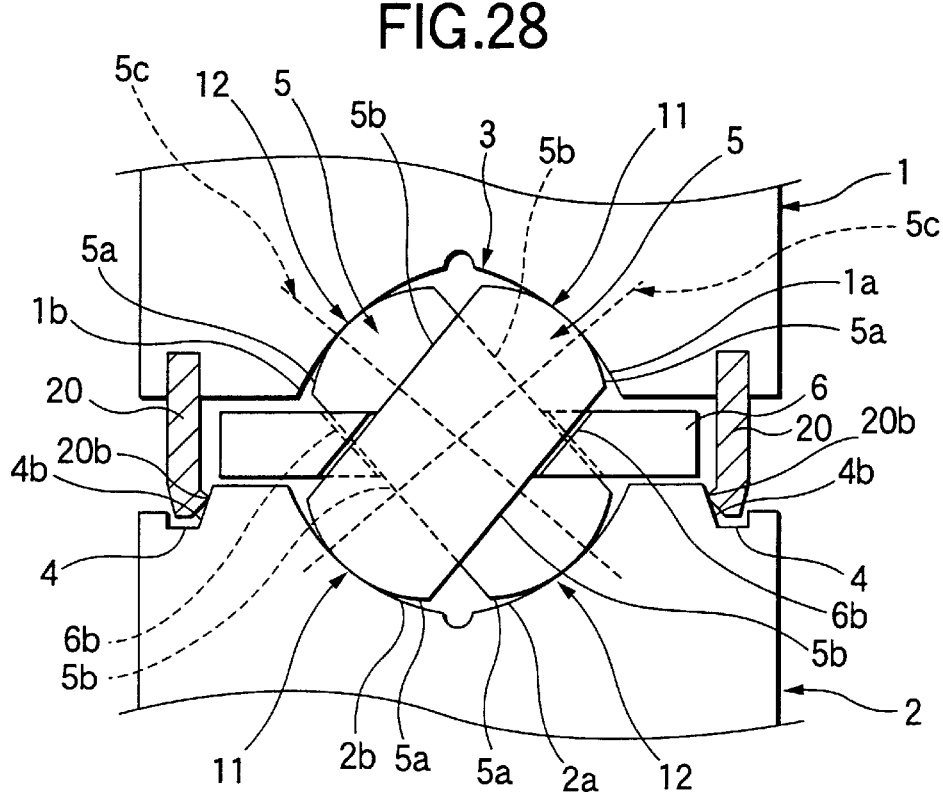
FIG. 28 is a longitudinal cross-sectional view showing a third example of the roller bearing with portions thereof being omitted.

FIGS. 27 and 28 show a roller bearing according to a second example of the present invention.

In the present example, a contact seal is used as the sealing plate 20, and a sealing surface 20b of the seal is taken as a sealing surface. The sealing surface 20b is brought into hermetic contact with an end face 4b of the sealing groove 4 of the inner race 2.

In other respects, the roller bearing according to the present example is identical in configuration and working-effect with that described in connection with the first example. The same reference numerals are assigned to those elements which are the same as those described in connection with the first example. Hence, their repeated explanations are omitted.

As shown in FIG. 27, the sealing surface 20b may be brought into contact with a sealing groove end face (bearing end face) 4b of the inner race 2. Alternatively, as shown in FIG. 28, the end face 4b may be tapered and brought into inclined contact with the sealing surface 20b.

THIRD EXAMPLE

Figure 29:
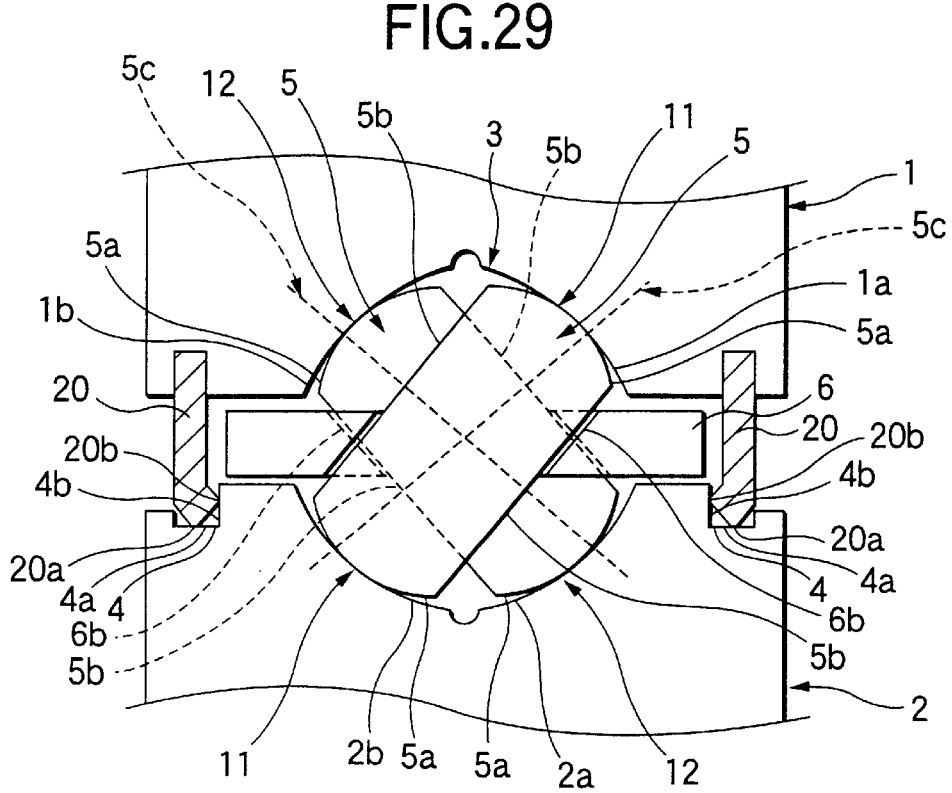
FIG. 29 is a longitudinal cross-sectional view showing a fourth example of the roller bearing with portions thereof being omitted.

FIG. 29 shows a third example of the roller bearing according to the present invention.

In the present example, a contact seal is employed as the sealing plate 20. Sealing surfaces 20a and 20b of the contact seal are taken as sealing surfaces. The sealing surface 20a is brought into hermetic contact with the inner bottom 4a, and the sealing surface 20b is brought into hermetic contact with the end face 4b.

In other respects, the roller bearing according to the present example is identical in configuration and working-effect with that described in connection with the first example. The same reference numerals are assigned to those elements which are the same as those described in connection with the first example. Hence, their repeated explanations are omitted.

FOURTH EXAMPLE

Figure 30:
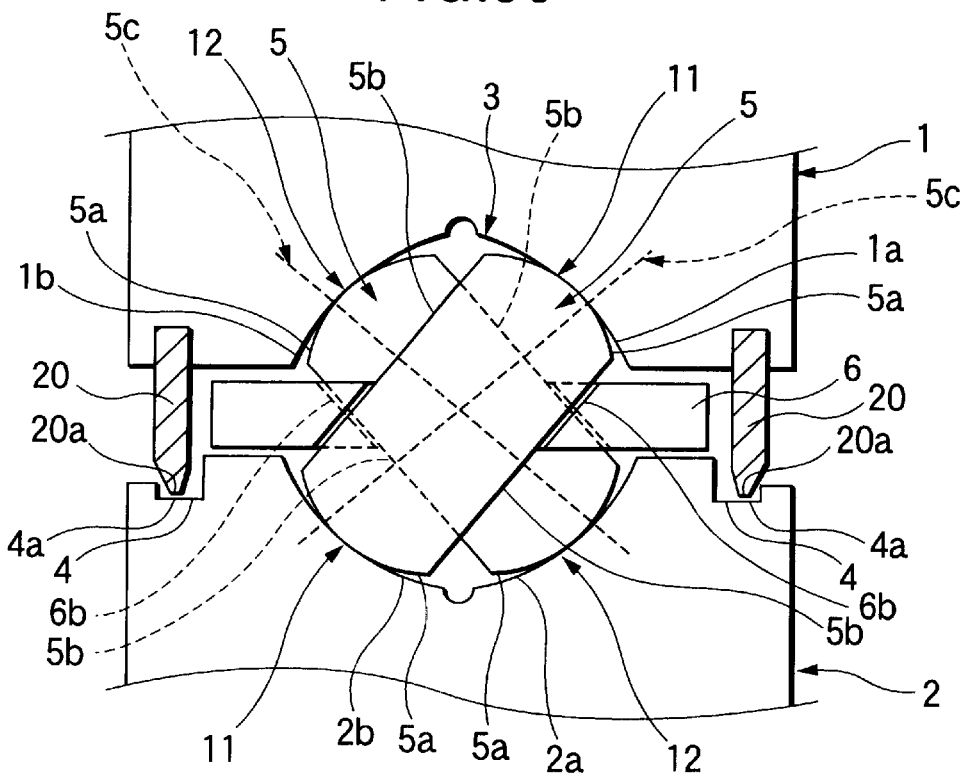
FIG. 30 is a longitudinal cross-sectional view showing a fifth example of the roller bearing with portions thereof being omitted.

FIG. 30 shows a fourth example of the roller bearing according to the present invention.

According to the present example, a non-contact seal is employed as the sealing plate 20. The sealing surface 20a of the seal is taken as a sealing surface, and a non-contact sealing section is constituted between the sealing surface 20a and the inner bottom 4a of the sealing groove 4 of the inner race 2.

In other respects, the roller bearing according to the present example is identical in configuration and working-effect with that described in connection with the first example. The same reference numerals are assigned to those elements which are the same as those described in connection with the first example. Hence, their repeated explanations are omitted.

FIFTH EXAMPLE

Figure 31:
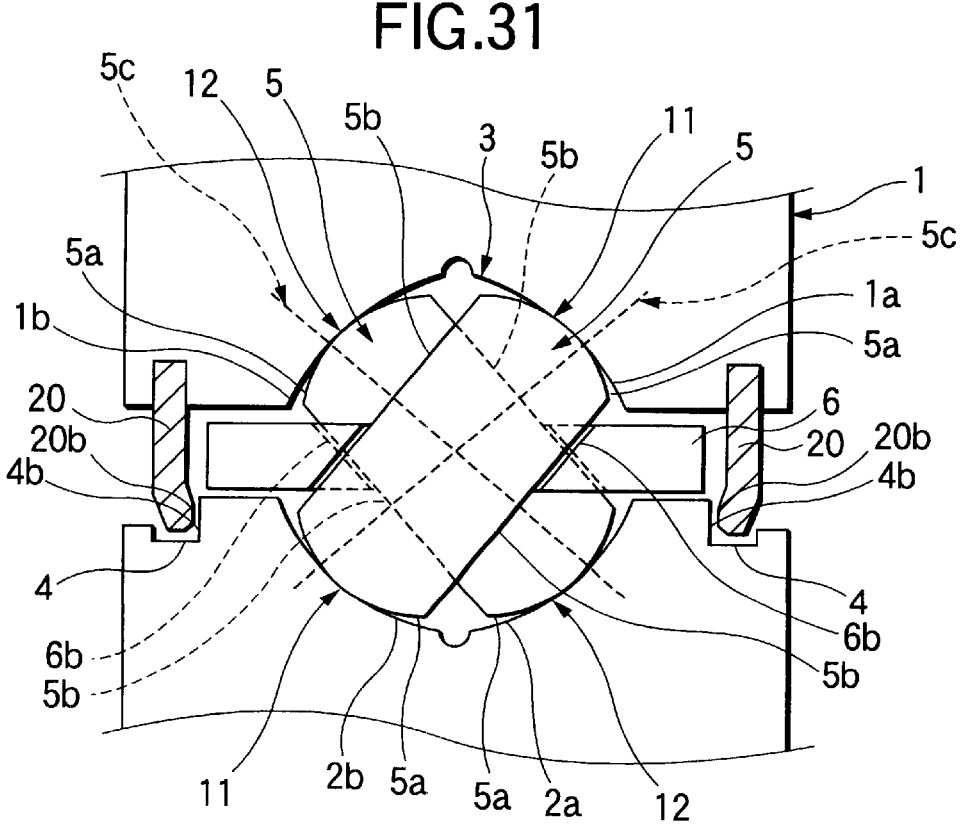
FIG. 31 is a longitudinal cross-sectional view showing a sixth example of the roller bearing with portions thereof being omitted.

FIG. 31 shows a fifth example of the roller bearing according to the present invention.

According to the present example, a non-contact seal is employed as the sealing plate 20. The sealing surface 20b of the seal is taken as a sealing surface, and a non-contact sealing section is constituted between the sealing surface 20b and the end face 4b of the sealing groove 4 of the inner race 2.

In other respects, the roller bearing according to the present example is identical in configuration and working-effect with that described in connection with the first example. The same reference numerals are assigned to those elements which are the same as those described in connection with the first example. Hence, their repeated explanations are omitted.

SIXTH EXAMPLE

Figure 32:
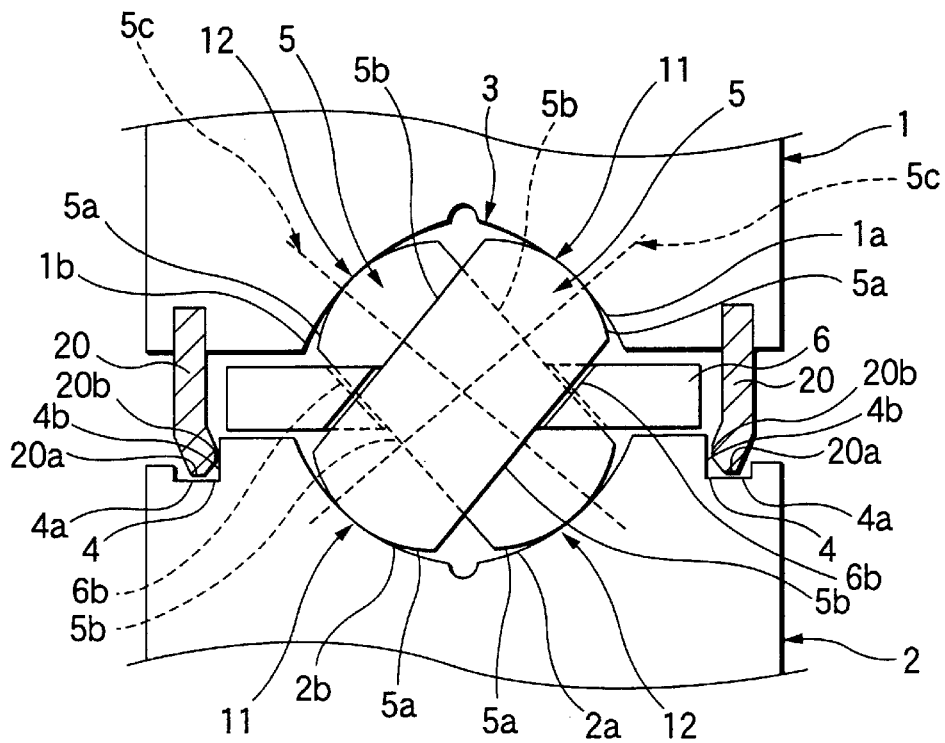
FIG. 32 is a longitudinal cross-sectional view showing a seventh example of the roller bearing with portions thereof being omitted.

FIG. 32 shows a sixth example of the roller bearing according to the present invention.

According to the present example, a non-contact seal is employed as the sealing plate 20. Sealing surfaces 20a and 20b of the contact seal are taken as sealing surfaces. A non-contact sealing section is constituted between the sealing surface 20a and the inner bottom 4a of the sealing groove 4 of the inner race 2, and another non-contact sealing section is constituted between the sealing surface 20b and the end face 4b of the sealing groove 4 of the inner race 2.

In other respects, the roller bearing according to the present example is identical in configuration and working-effect with that described in connection with the first example. The same reference numerals are assigned to those elements which are the same as those described in connection with the first example. Hence, their repeated explanations are omitted.

SEVENTH EXAMPLE

Figure 33:
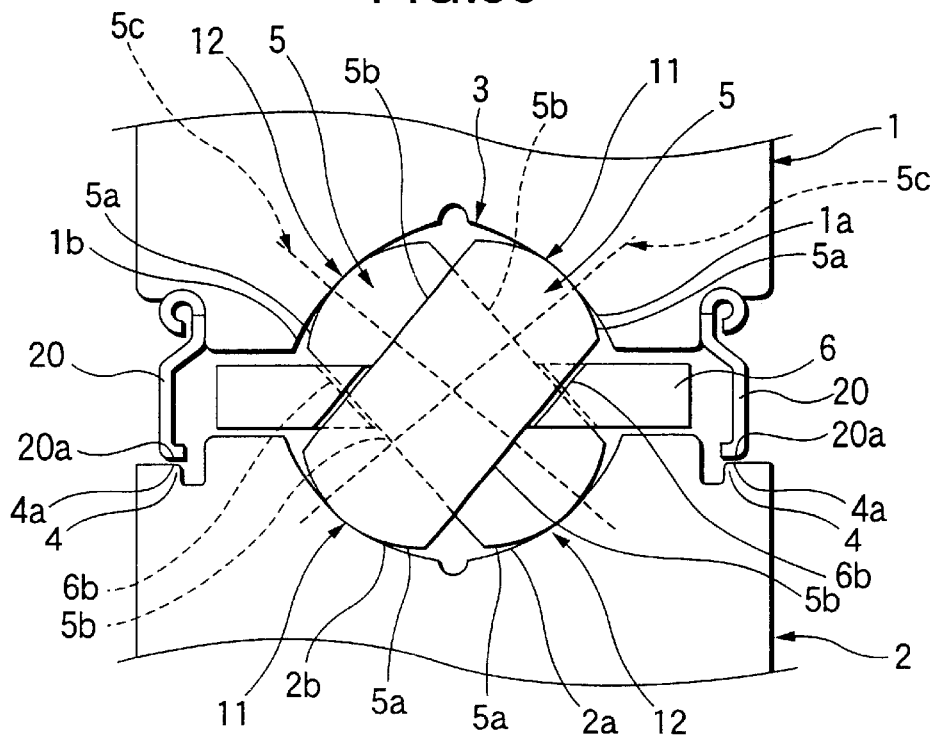
FIG. 33 is a longitudinal cross-sectional view showing an eighth example of the roller bearing with portions thereof being omitted.

FIG. 33 shows a seventh example of the roller beating according to the present invention.

According to the present example, a non-contact seal is employed as the sealing plate 20. The sealing surface 20a of the seal is taken as a sealing surface, and a non-contact sealing section is constituted between the sealing surface 20a and the inner bottom 4a of the sealing groove 4 of the inner race 2.

In other respects, the roller bearing according to the present example is identical in configuration and working-effect with that described in connection with the first example. The same reference numerals are assigned to those elements which are the same as those described in connection with the first example. Hence, their repeated explanations are omitted.

EIGHTH EXAMPLE

Figure 34:
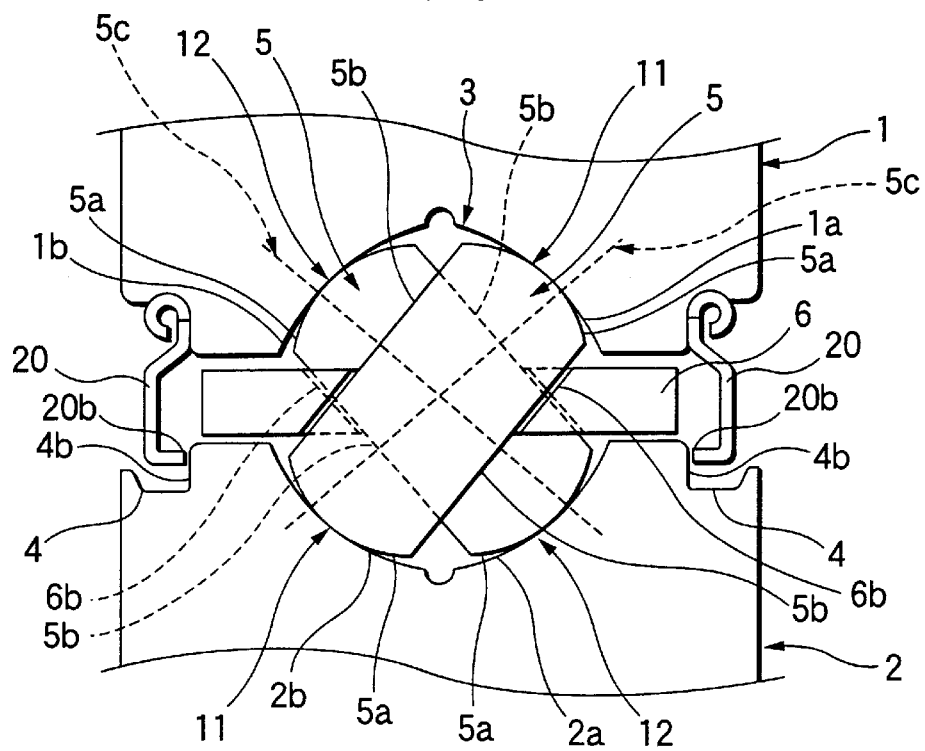
FIG. 34 is a longitudinal cross-sectional view showing a ninth example of the roller bearing with portions thereof being omitted.
Figure 35:
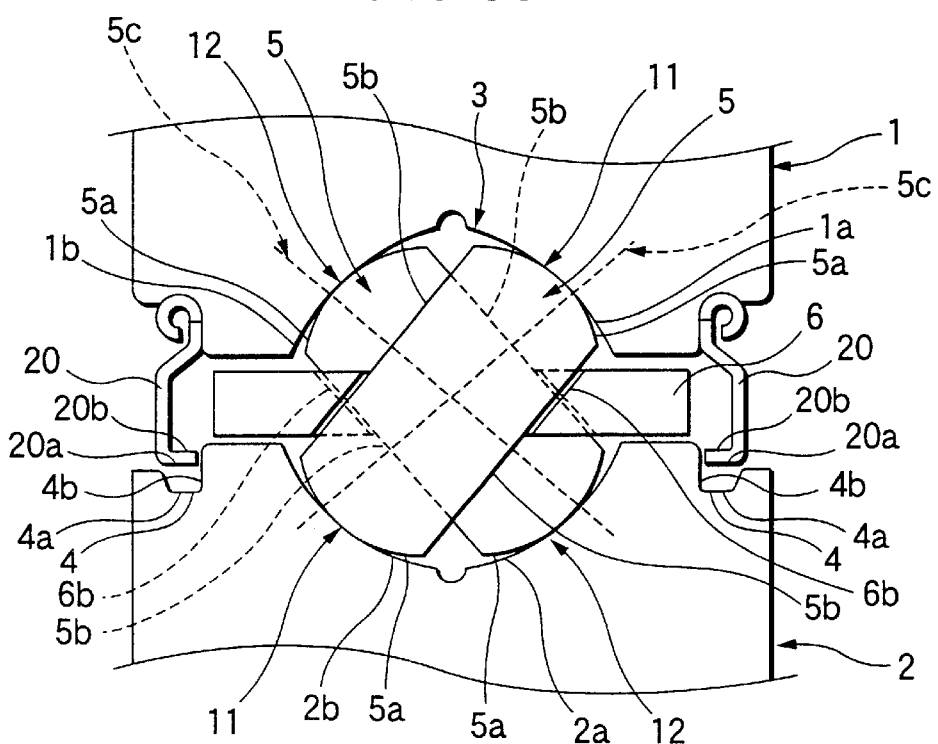
FIG. 35 is a longitudinal cross-sectional view showing a tenth example of the roller bearing with portions thereof being omitted.

FIGS. 34 and 35 show an eighth example of the roller bearing according to the present invention.

According to the present example, a non-contact seal is employed as the sealing plate 20. The sealing surface 20a of the seal is taken as a sealing surface.

In the example shown in FIG. 34, the sealing surface 20b of the sealing plate 20 is taken as a sealing surface, and a non-contact sealing section is constituted between the sealing surface 20b and the end face 4b of the sealing groove 4 of the inner race 2.

In the example shown in FIG. 35, the sealing surfaces 20a and 20b of the sealing plate 20 are taken as sealing surfaces. A non-contact sealing section is constituted between the sealing surface 20a and the inner bottom 4a of the sealing groove 4 of the inner race. Another non-contact sealing section is constituted between the sealing surface 20b and the end face 4b of the sealing groove 4 of the inner race 2.

In other respects, the roller bearing according to the present example is identical in configuration and working-effect with that described in connection with the first example. The same reference numerals are assigned to those elements which are the same as those described in connection with the first example. Hence, their repeated explanations are omitted.

[14th Embodiment]

A roller bearing according to the 14th embodiment of the present invention comprises a race (outer race) 1; another race (inner race) 2; a plurality of rolling elements 5, 5, . . . incorporated into a raceway groove 3, the groove being defined between the inside diameter of the outer race 1 and the outside diameter of the inner race 2; and a flange 13 provided on either or both of the outer race 1 and the inner race 2.

Except for the flange 13, the roller bearing according to the second aspect is identical in configuration, operation, and advantage with that described in connection with the first aspect of the invention. Hence, the explanations are applied in their present form to the roller bearing according to the second aspect. In relation to the common configuration and working-effect, the same reference numerals are assigned to the same elements, and their repeated explanations are omitted.

No specific limitation are imposed on the geometry, structure, and location of the flange 13. The axial dimension of the flange 13 may be symmetrical or asymmetrical. No limitations are imposed on the axial dimension of the flange 13.

A tap may be formed in the flange 13 for increasing the accuracy of mounting of the flange 13 to a counterpart component.

In the case of a two-way split ring, if the flange 13 is provided on either half ring, the half rings may be fixed together by means of fastening the flanges 13.

In the present example, the sealing plates 20 are incorporated into the ball bearing as illustrated. The sealing plate 20 of the roller bearing according to the present aspect is not indispensable and may be selected arbitrarily. The sealing plate 20 can be arbitrarily applied to the structures that hare been described in connection with the first aspect of the present invention.

As mentioned above, an objective of use of the flange 13 in the present invention, the operation of the flange 13, and an advantage of use of the flange 13 are as follows.

As in the case of a bearing of another type, the bearing of this type usually employs the inner race 2 attached to a shaft and the outer race 1 attached to a housing (in the related art).

However, such a structure poses the following problems which remain to be solved.

(1) Rigorous demand exists for dimensional accuracy of a fitting surface of a bearing.

(2) When a tight fit exists between fitting surfaces, there is a necessity for use of a special tool or machine for mounting and disassembling a bearing.

(3) Since a special tool or machine can be used for mounting and disassembling a bearing, structural limitations are imposed on a counterpart component of a bearing attachment section. (For example, in order to remove an inner race from a bearing through use of an extraction jig, there is a necessity for rendering the shoulder height of a shaft somewhat smaller than the cross-sectional height of the inner race of the bearing in original design of a counterpart component to be attached. However, if the shoulder height of the shaft becomes excessively small, there may arise a fear of positioning of the shoulder height of the shaft becoming uncertain. Particularly, in the case of a thin bearing having a comparatively small cross-sectional bearing size, a problem arises.

(4) Replacement of a bearing involves consumption of much time.

(5) There is a necessity for a housing for supporting a bearing. As a result, the size of periphery of a bearing is increased, which in turn works against miniaturization of a product and results in an increase in total costs.

The foregoing configuration of the invention enables integration of a race and flange of a bearing. As a result, the dimensional accuracy of an outer or inner peripheral surface of a bearing can be set low. A bearing and a counterpart component can be quickly and easily attached to each other or disassembled by way of a flange and through use of a bolt. Thus, mounting costs are curtailed.

Further, there is obviated a necessity for a housing, thereby rendering a product compact and curtailing total costs (see the object and working-effect of the invention).

More specific descriptions of the roller bearing according to the second aspect of the present invention are provided as follows.

FIRST EXAMPLE

Figure 36:
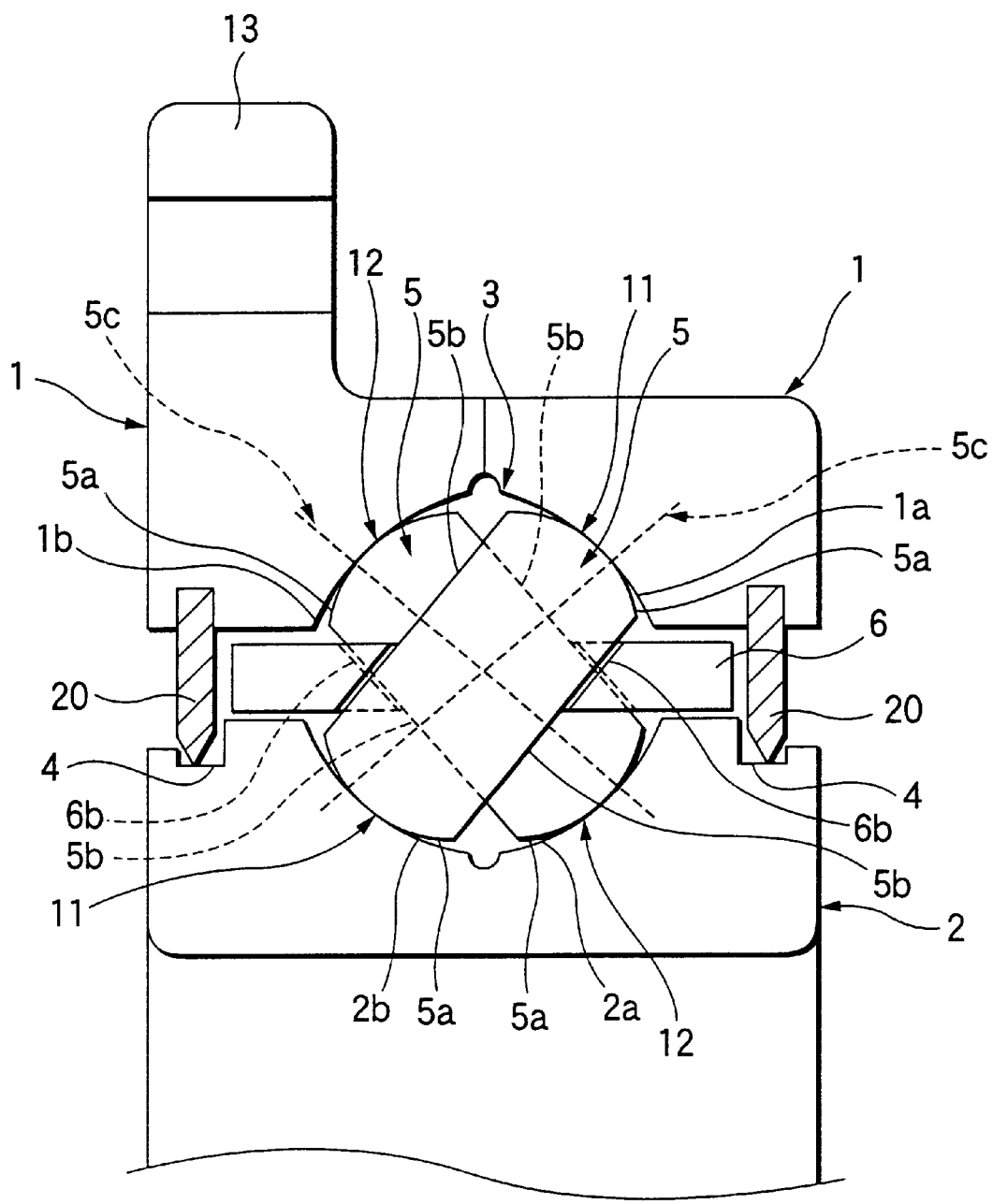
FIG. 36 is a partially-omitted longitudinal cross-sectional view showing a first example of a roller bearing according to a 14th embodiment of the present invention.

In the bearing according to the present example of the 14th embodiment, the outer race 1 is split into two pieces, and the inner race 2 is integrated. The flange 13 is attached to one of the two pieces of the outer race 1 (see FIG. 36).

SECOND EXAMPLE

Figure 37:
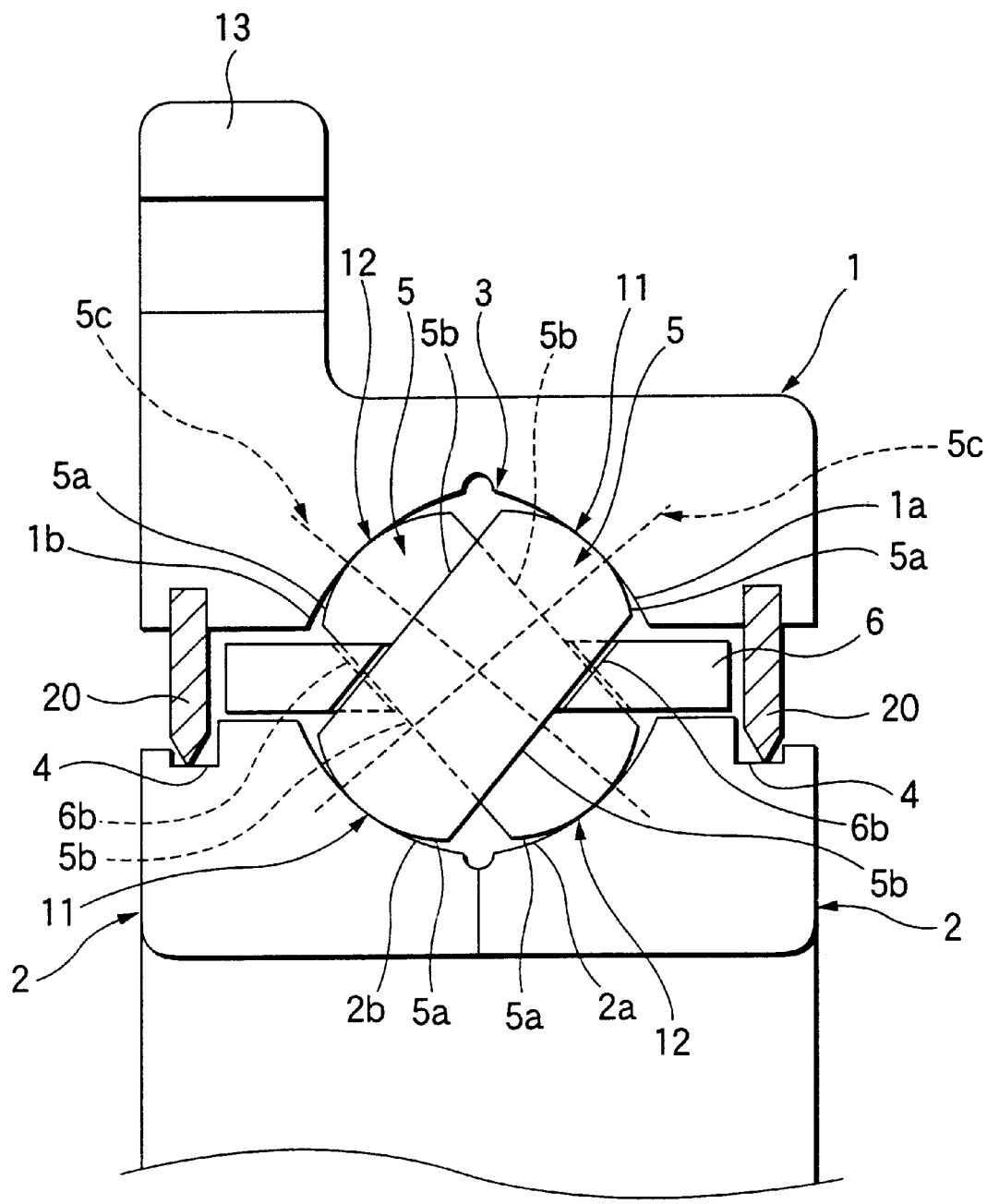
FIG. 37 is a longitudinal cross-sectional view showing a second example of the roller bearing with portions thereof being omitted.

In the bearing according to the present example, the outer race 1 is integrated, and the inner race 2 is split into two pieces. The flange 13 is attached to the outer race 1 (see FIG. 37).

THIRD EXAMPLE

Figure 38:
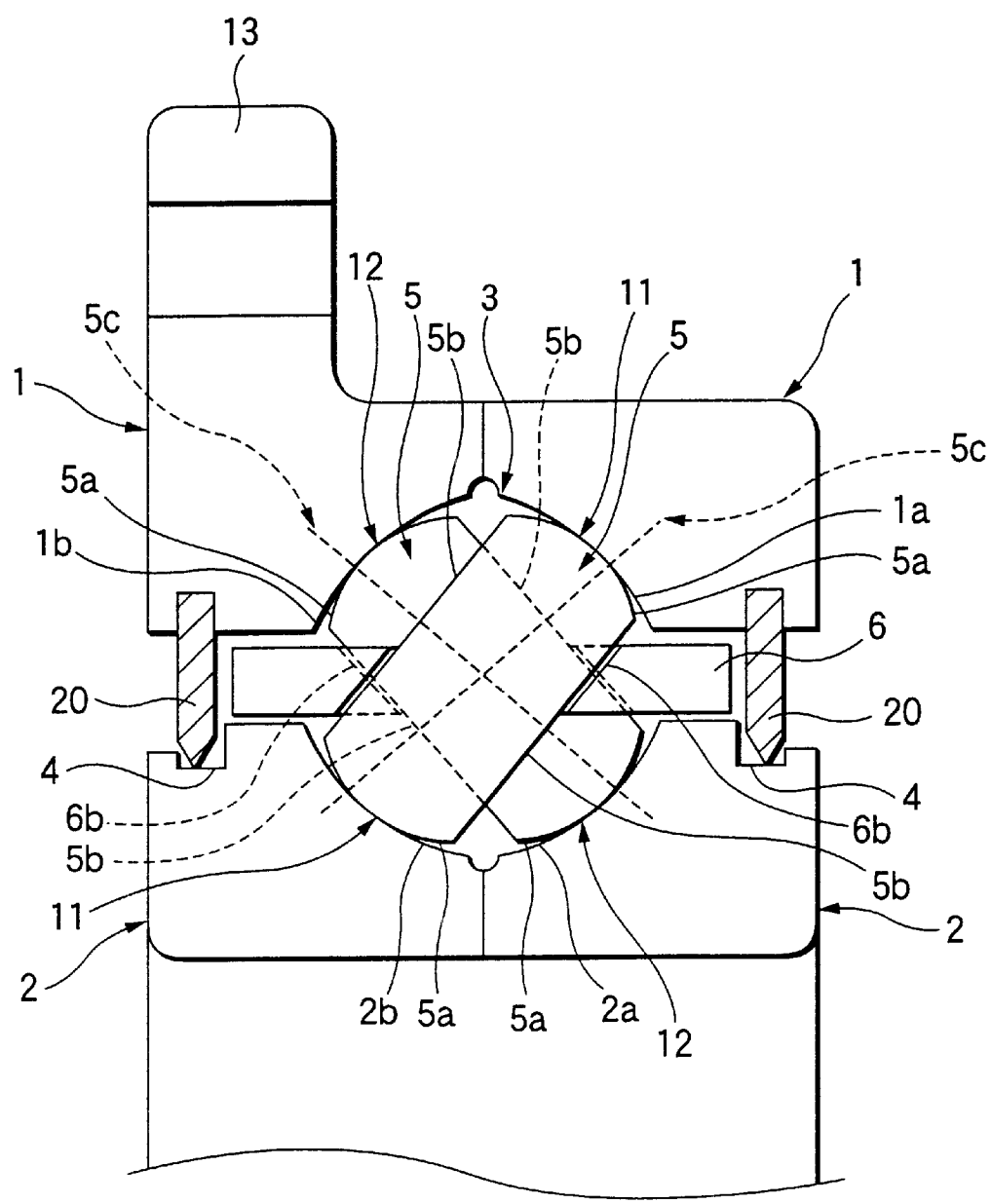
FIG. 38 is a longitudinal cross-sectional view showing a third example of the roller bearing with portions thereof being omitted.

In the bearing according to the present example, each of the outer race 1 and the inner race 2 is split into two pieces. The flange 13 is attached to one of the two pieces of the outer race 1 (see FIG. 38).

FOURTH EXAMPLE

Figure 39:
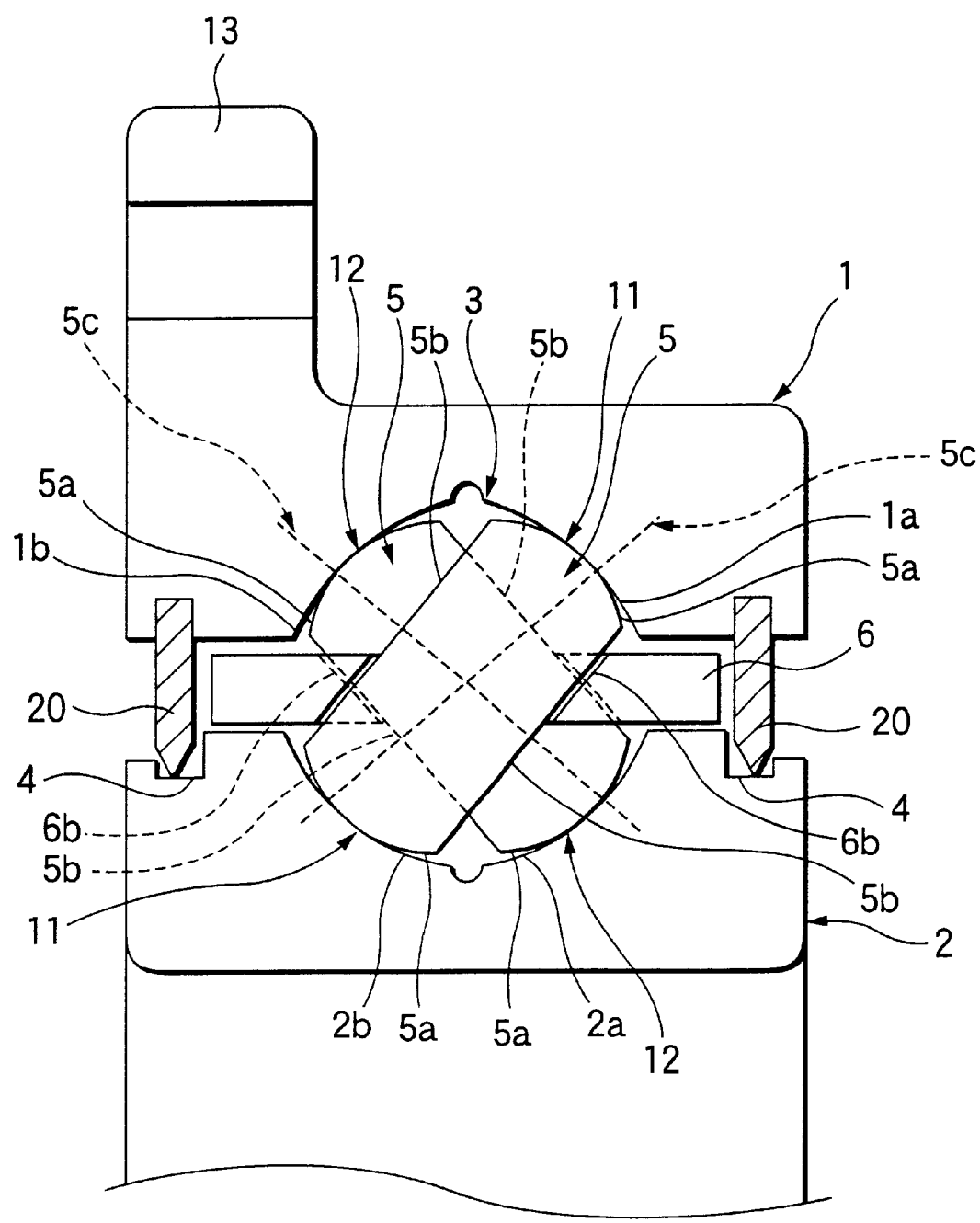
FIG. 39 is a longitudinal cross-sectional view showing a fourth example of the roller bearing with portions thereof being omitted.

In the bearing according to the present example, each of the outer race 1 and the inner race 2 is integrated. The flange 13 is attached to the outer race 1 (see FIG. 39).

FIFTH EXAMPLE

Figure 40:
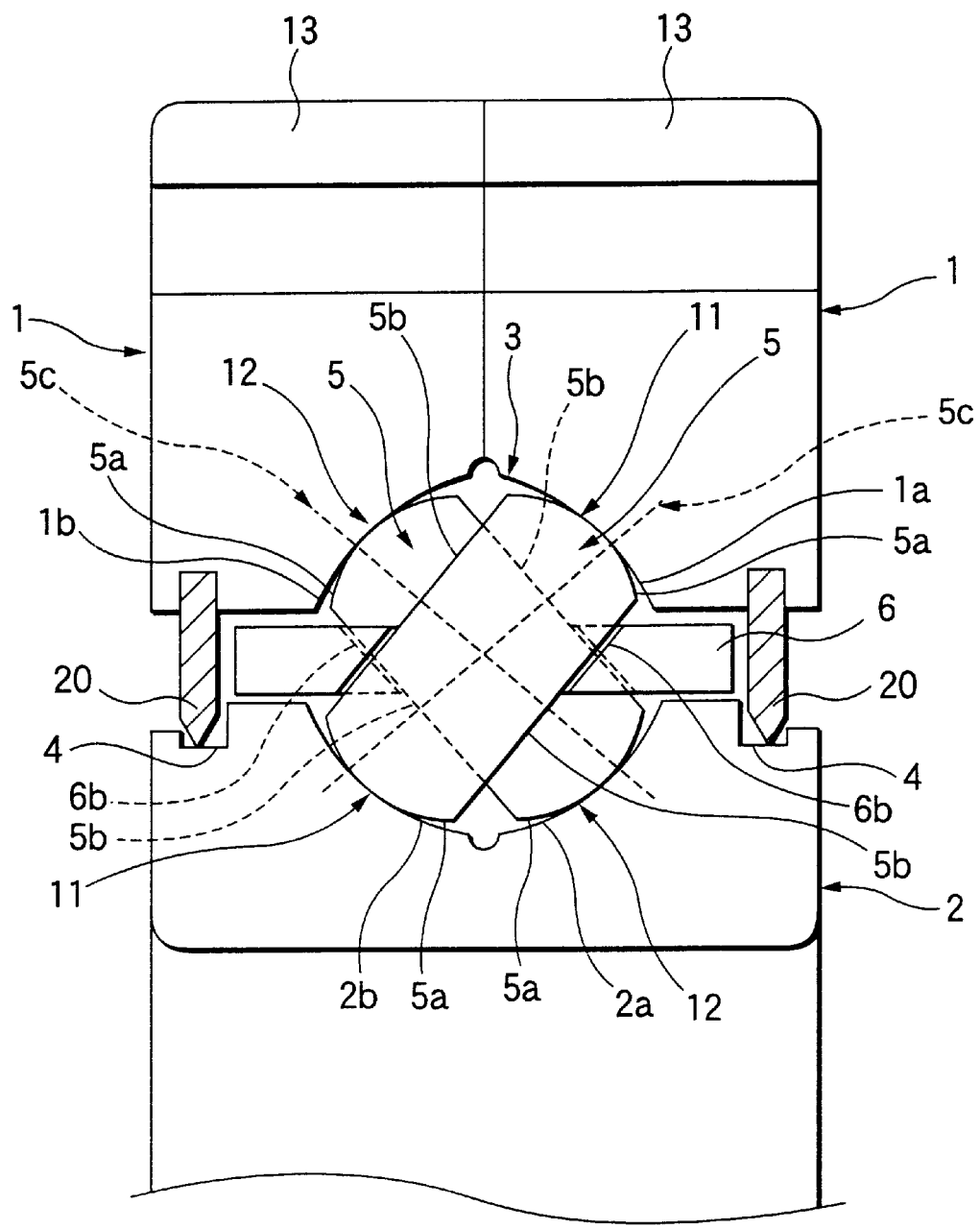
FIG. 40 is a longitudinal cross-sectional view showing a fifth example of the roller bearing with portions thereof being omitted.

In the bearing according to the present example, the outer race 1 is split into two pieces, and the inner race 2 is integrated. The flange 13 is attached to each of the two pieces constituting the outer race 1, and the flange 13 assumes an axially symmetrical geometry. (see FIG. 40).

SIXTH EXAMPLE

In the bearing according to the present example, the outer race 1 is split into two pieces, and the inner race 2 is integrated. The flange 13 is attached to each of the two pieces constituting the outer race 1, and the flange 13 assumes an axially asymmetrical geometry.

Figure 41:
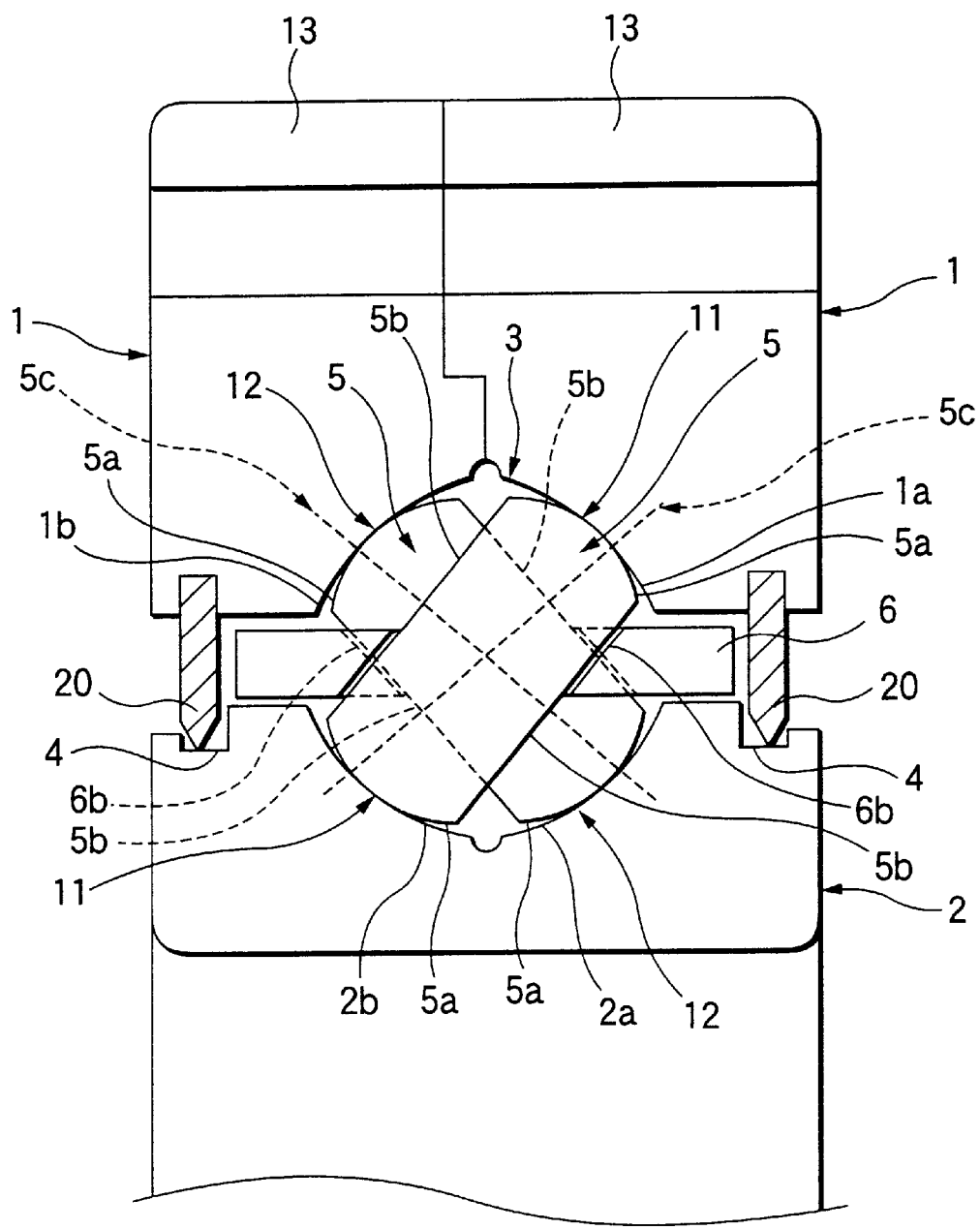
FIG. 41 is a longitudinal cross-sectional view showing a sixth example of the roller bearing with portions thereof being omitted.

In the present example, in order to facilitate mutual alignment of cores of the half flanges 13, a tap structure is formed in the flanges 13 (see FIG. 41).

SEVENTH EXAMPLE

Figure 42:
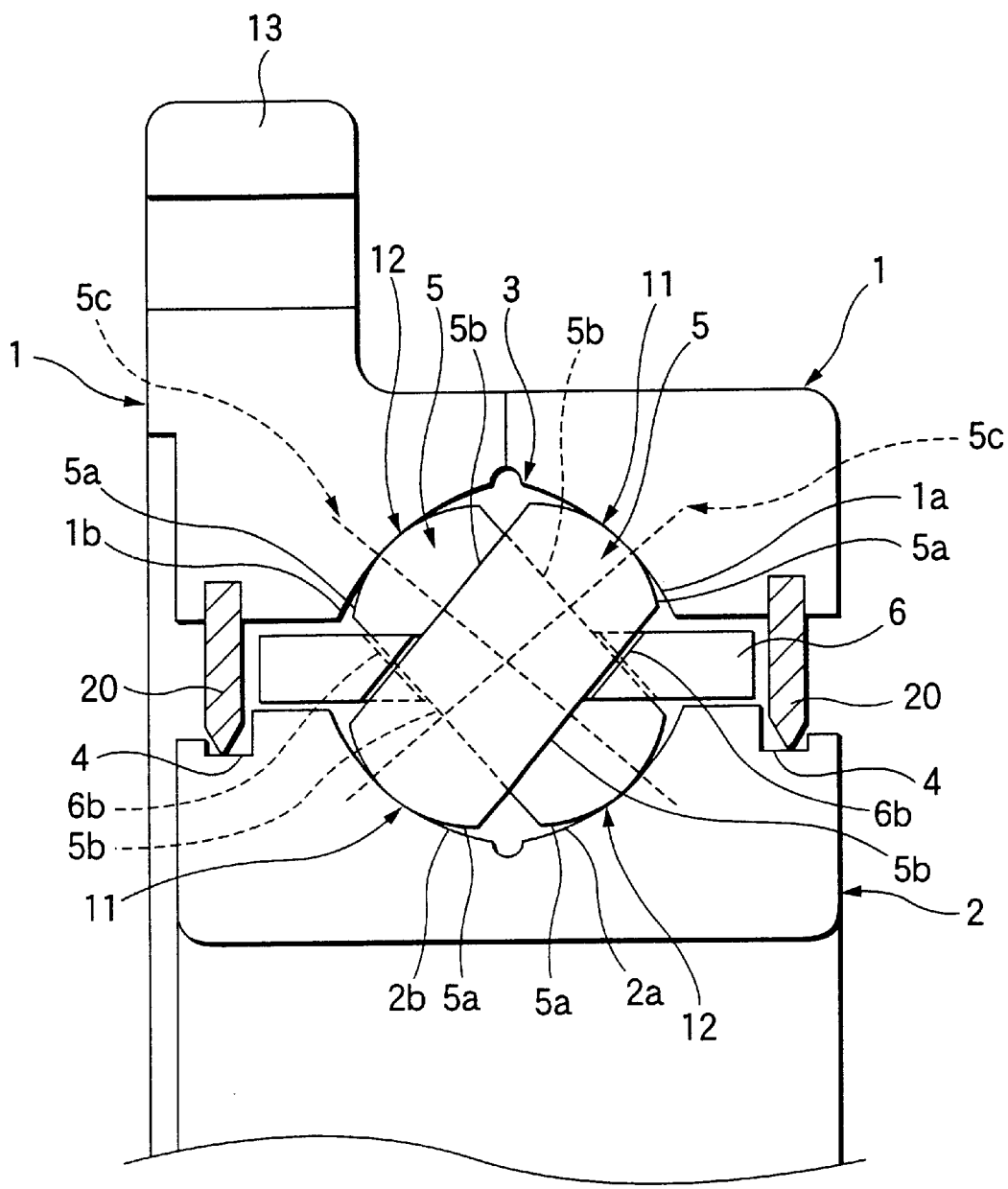
FIG. 42 is a longitudinal cross-sectional view showing a seventh example of the roller bearing with portions thereof being omitted.

In the bearing according to the present example, the outer race 1 is split into two pieces, and the inner race 2 is integrated. The flange 13 is attached to one of the two pieces constituting the outer race 1. In the present example, in order to facilitate alignment of a core of the flange 13 with a counterpart component, a tap structure is formed in the flange 13 (see FIG. 42).

EIGHTH EXAMPLE

Figure 43:
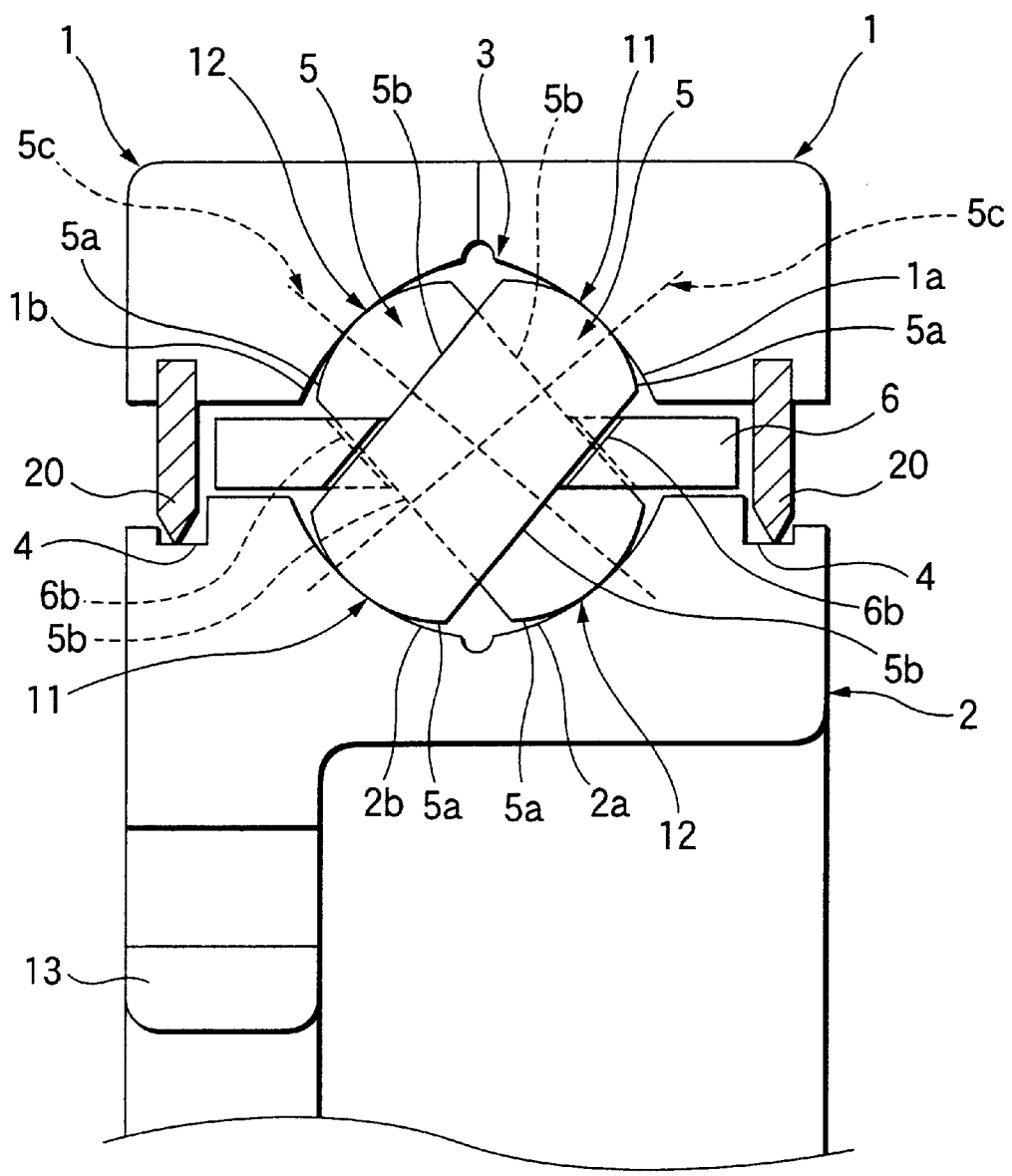
FIG. 43 is a longitudinal cross-sectional view showing an eighth example of the roller bearing with portions thereof being omitted.

In the bearing according to the present example, the outer race 1 is split into two pieces, and the inner race 2 is integrated. The flange 13 is attached to the inner race 2 (see FIG. 43).

NINTH EXAMPLE

Figure 44:
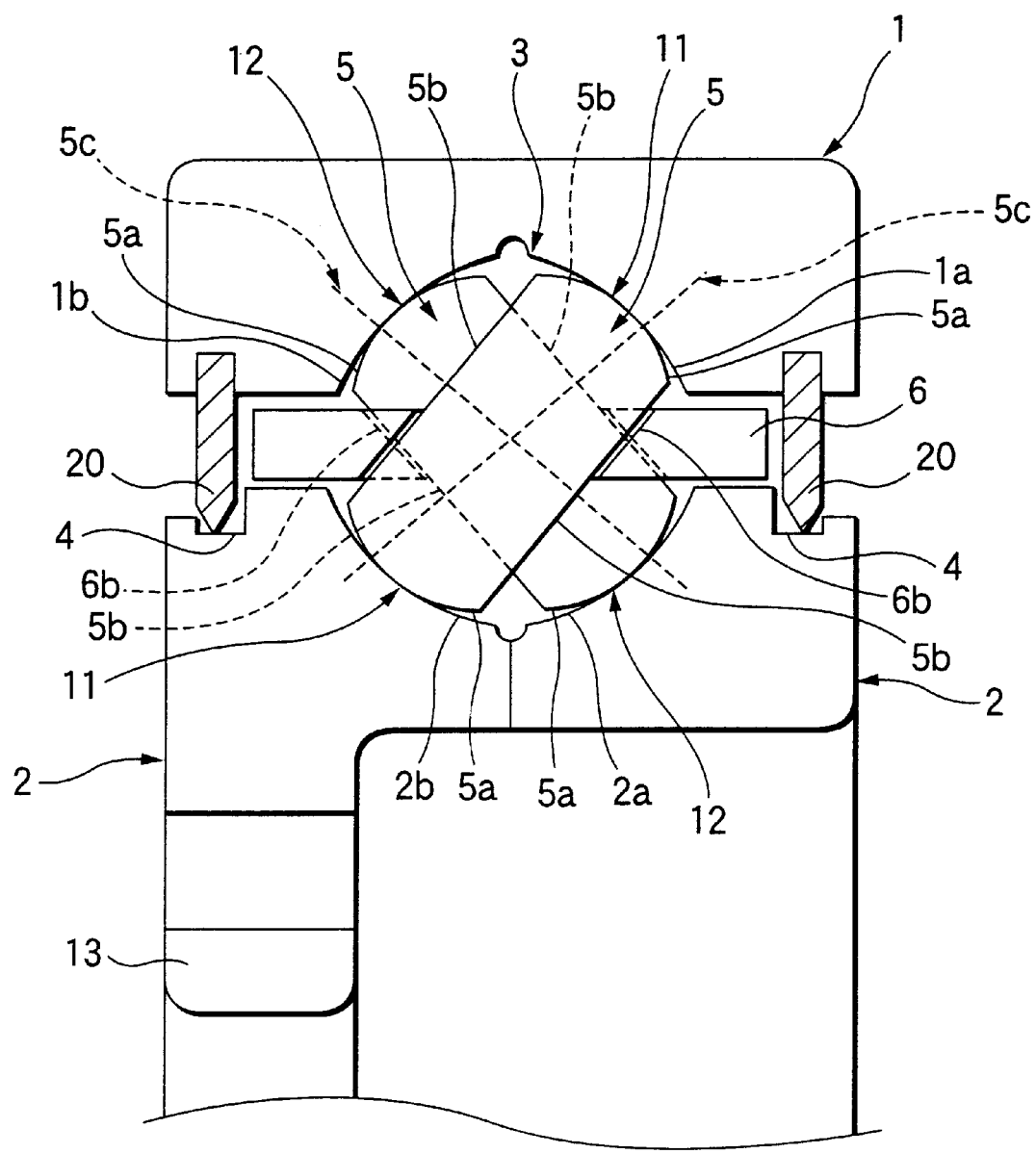
FIG. 44 is a longitudinal cross-sectional view showing a ninth example of the roller bearing with portions thereof being omitted.

In the bearing according to the present example, the outer race 1 is integrated, and the inner race 2 is split into two pieces. The flange 13 is attached to one of the two pieces of the inner race 2 (see FIG. 44).

TENTH EXAMPLE

Figure 45:
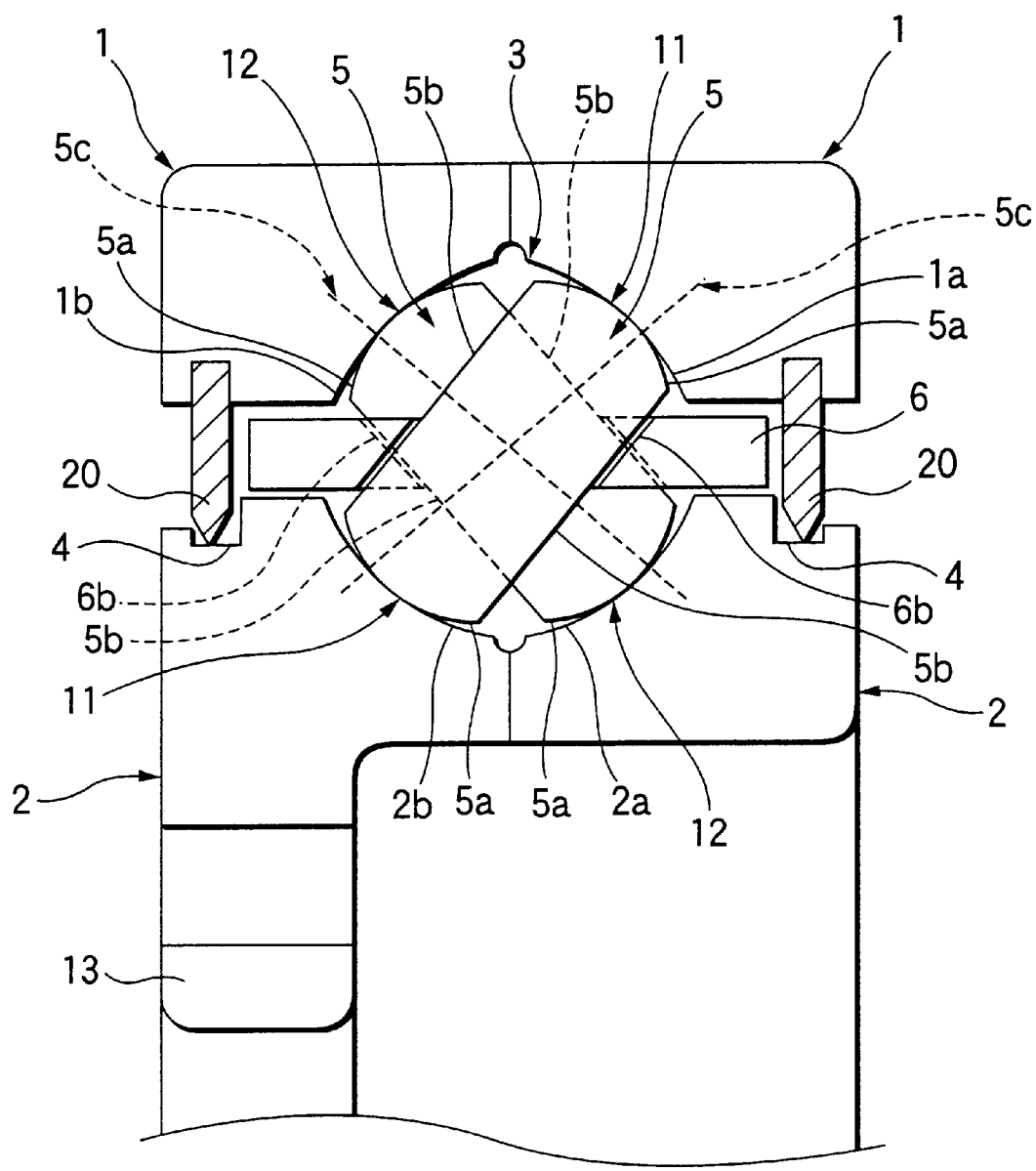
FIG. 45 is a longitudinal cross-sectional view showing a tenth example of the roller bearing with portions thereof being omitted.

In the bearing according to the present example, each of the outer race 1 and the inner race 2 is split into two pieces. The flange 13 is attached to one of the two pieces of the inner race 2 (see FIG. 45).

ELEVENTH EXAMPLE

Figure 46:
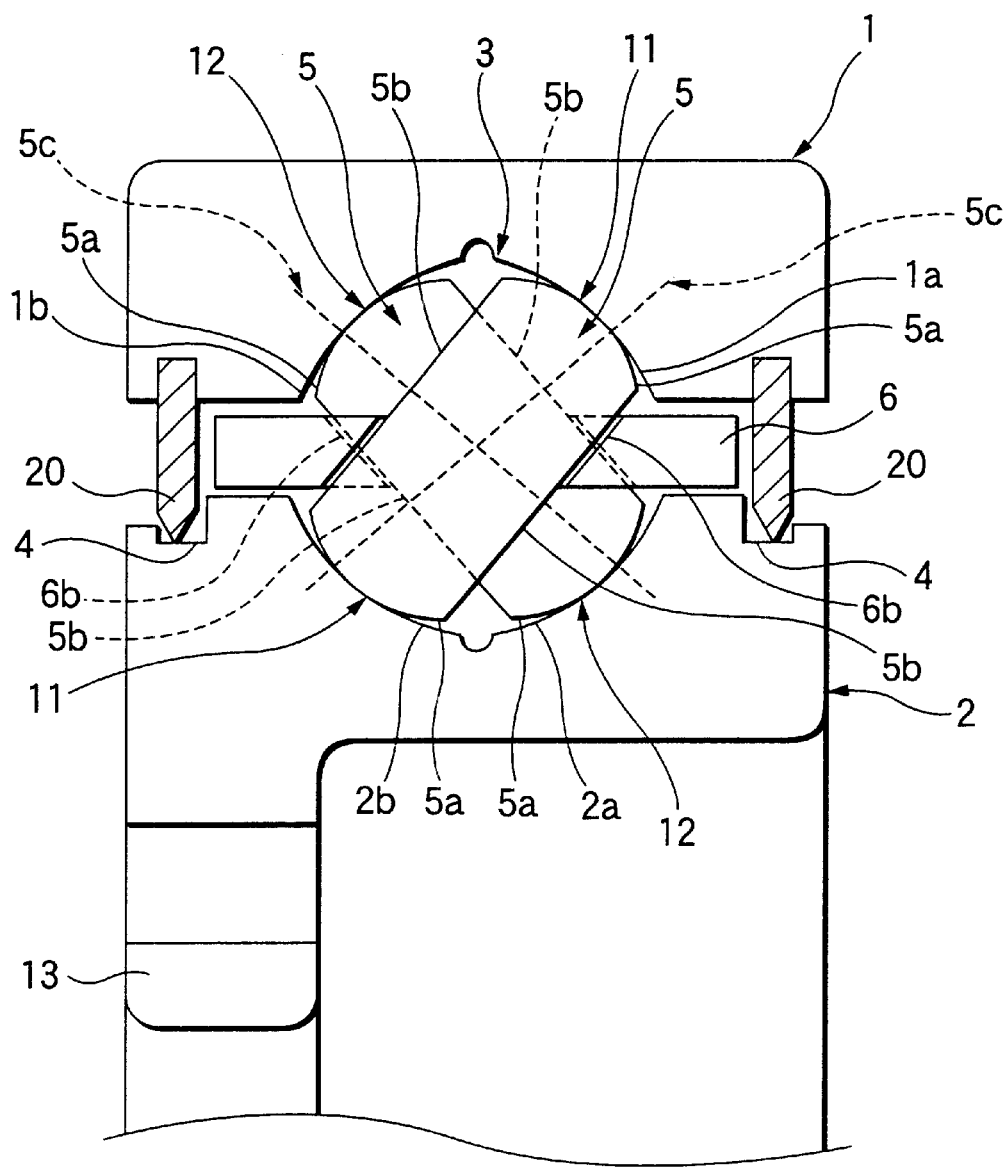
FIG. 46 is a longitudinal cross-sectional view showing an eleventh example of the roller bearing with portions thereof being omitted.

In the bearing according to the present example, each of the outer race 1 and the inner race 2 is integrated. The flange 13 is attached to the inner race 2 (see FIG. 46).

TWELFTH EXAMPLE

Figure 47:
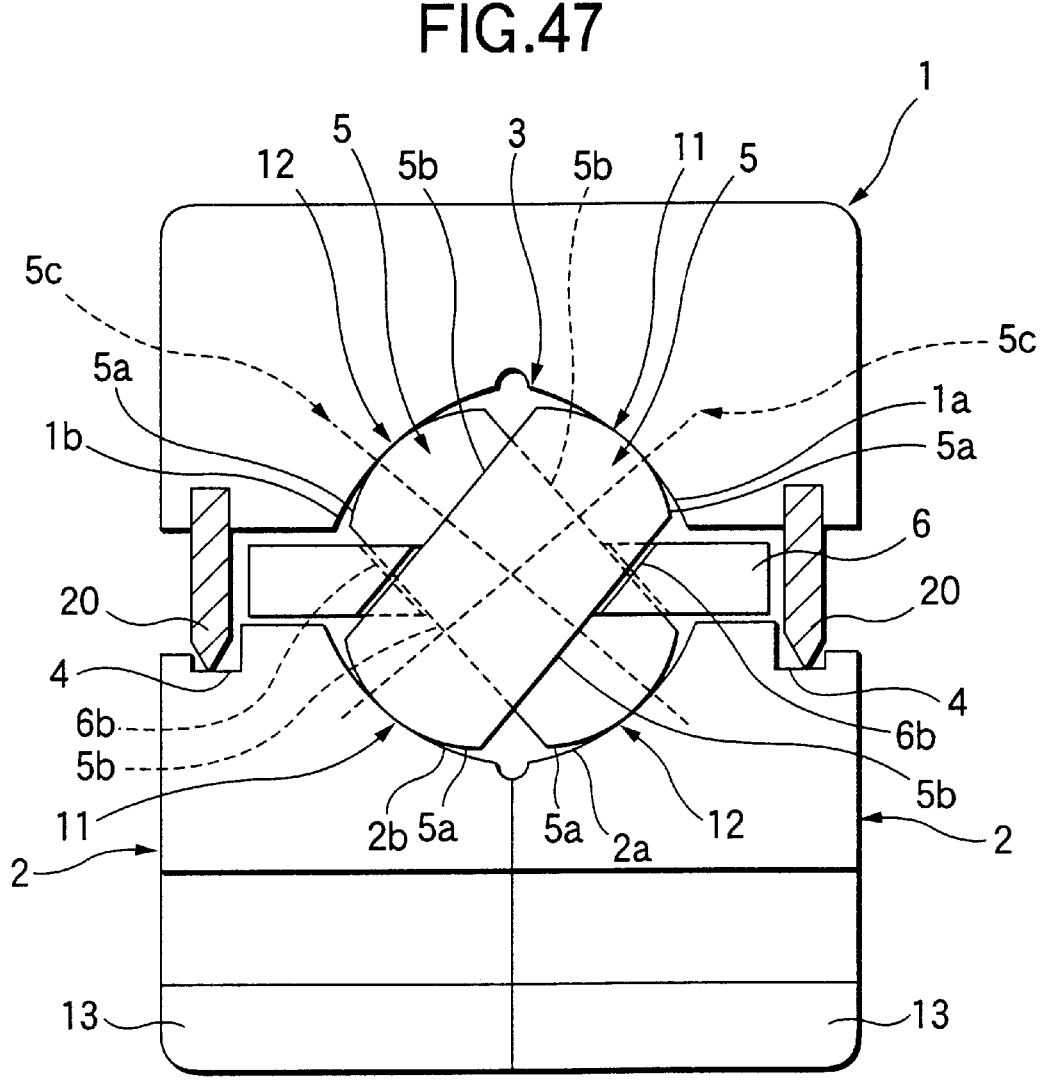
FIG. 47 is a longitudinal cross-sectional view showing a twelfth example of the roller bearing with portions thereof being omitted.

In the bearing according to the present example, the outer race 1 is integrated, and the inner race 2 is split into two pieces. The flange 13 is attached to each of the two pieces constituting the inner race 2, and the flange 13 assumes an axially symmetrical geometry. (see FIG. 47).

THIRTEENTH EXAMPLE

Figure 48:
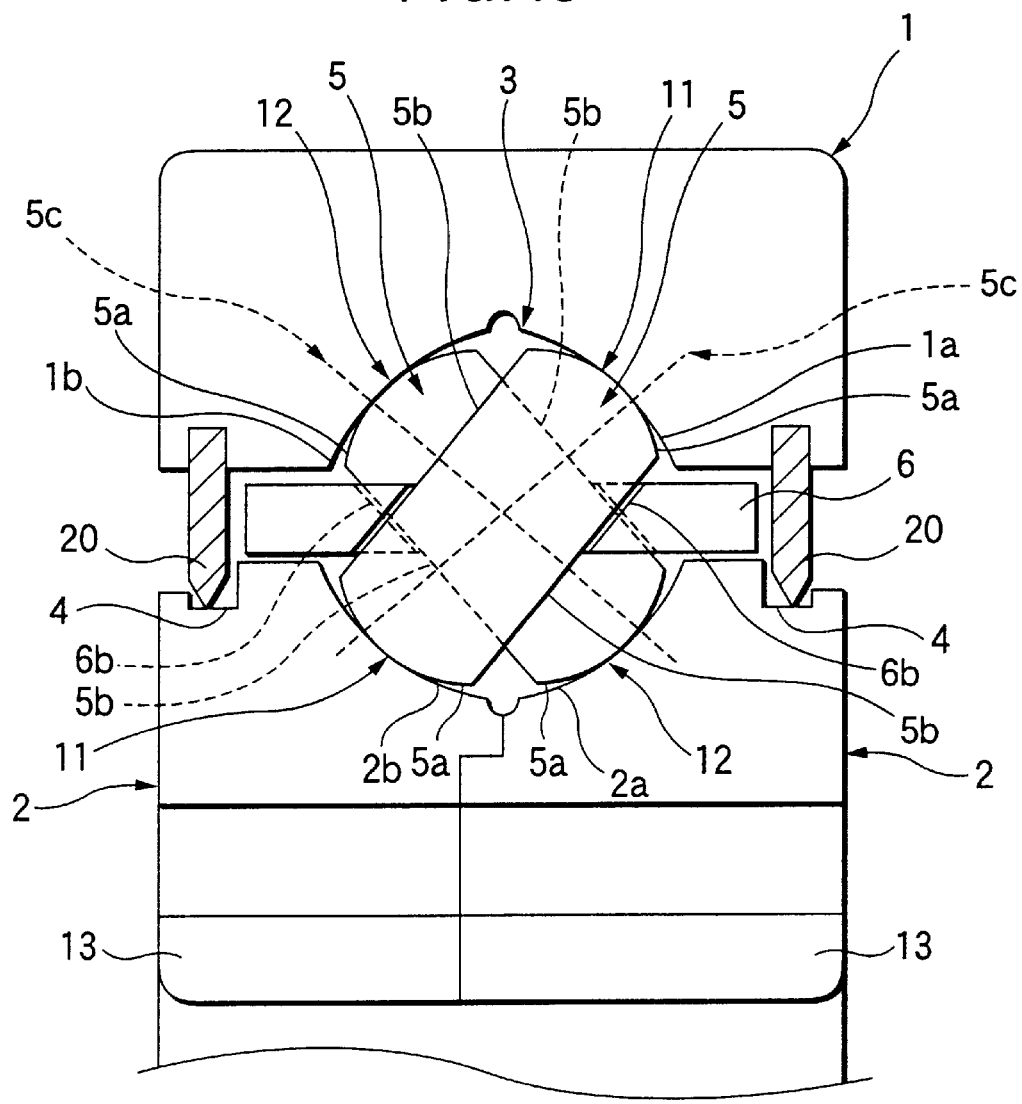
FIG. 48 is a longitudinal cross-sectional view showing a thirteenth example of the roller bearing with portions thereof being omitted.

In the bearing according to the present example, the outer race 1 is integrated, and the inner race 2 is split into two pieces. The flange 13 is attached to each of the two pieces constituting the inner race 2, and the flange 13 assumes an axially asymmetrical geometry. In the present example, in order to facilitate alignment of cores of the flange 13 with each other, a tap structure is formed in the flanges 13 (see FIG. 48).

FOURTEENTH EXAMPLE

Figure 49:
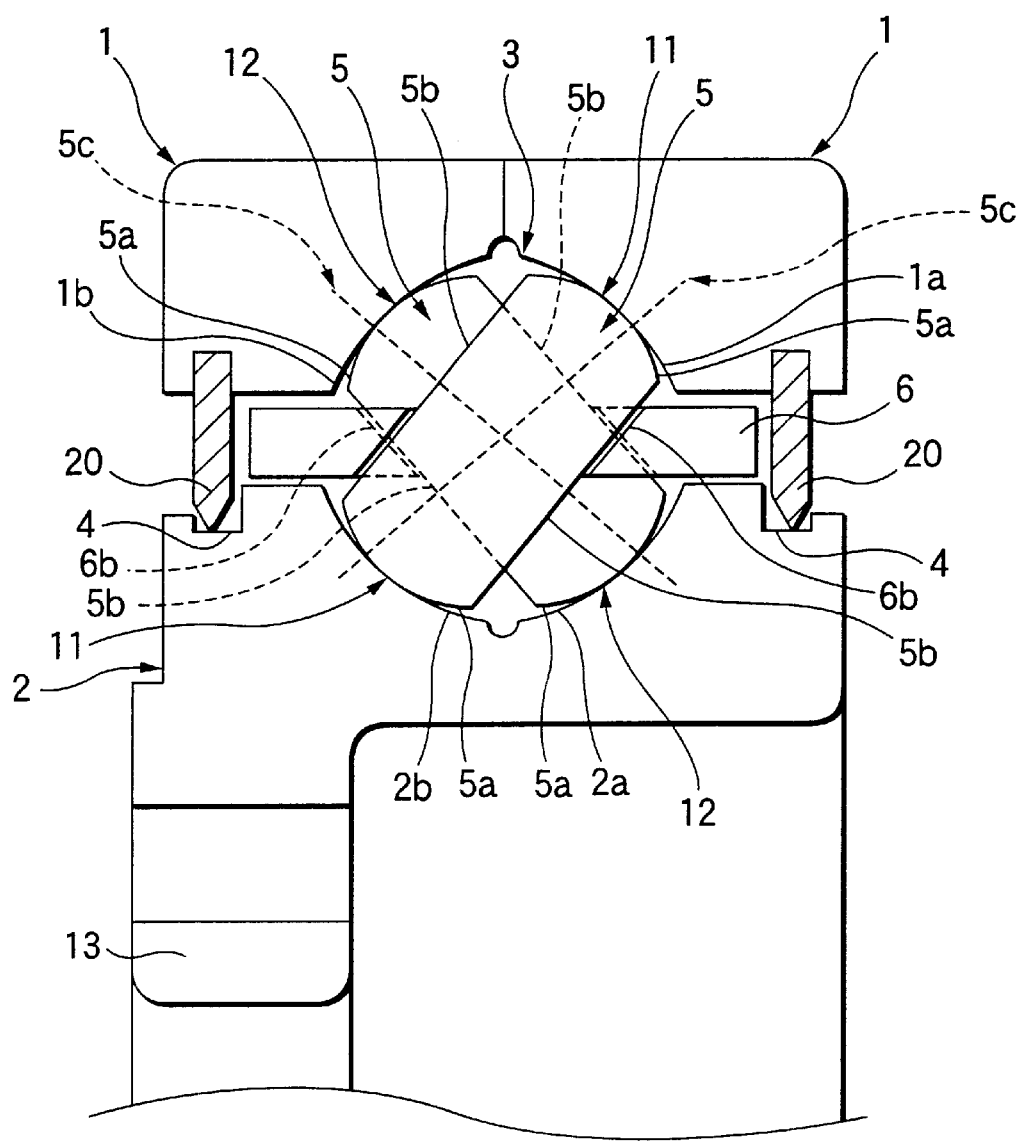
FIG. 49 is a longitudinal cross-sectional view showing a fourteenth example of the roller bearing with portions thereof being omitted.

In the bearing according to the present example, the outer race 1 is split into two pieces, and the inner race 2 is integrated. The flange 13 is attached to the inner race 2. In the present example, in order to facilitate alignment of the flange 13 with a counterpart component, a tap structure is formed in the flanges 13 (see FIG. 49).

FIFTEENTH EXAMPLE

Figure 50:
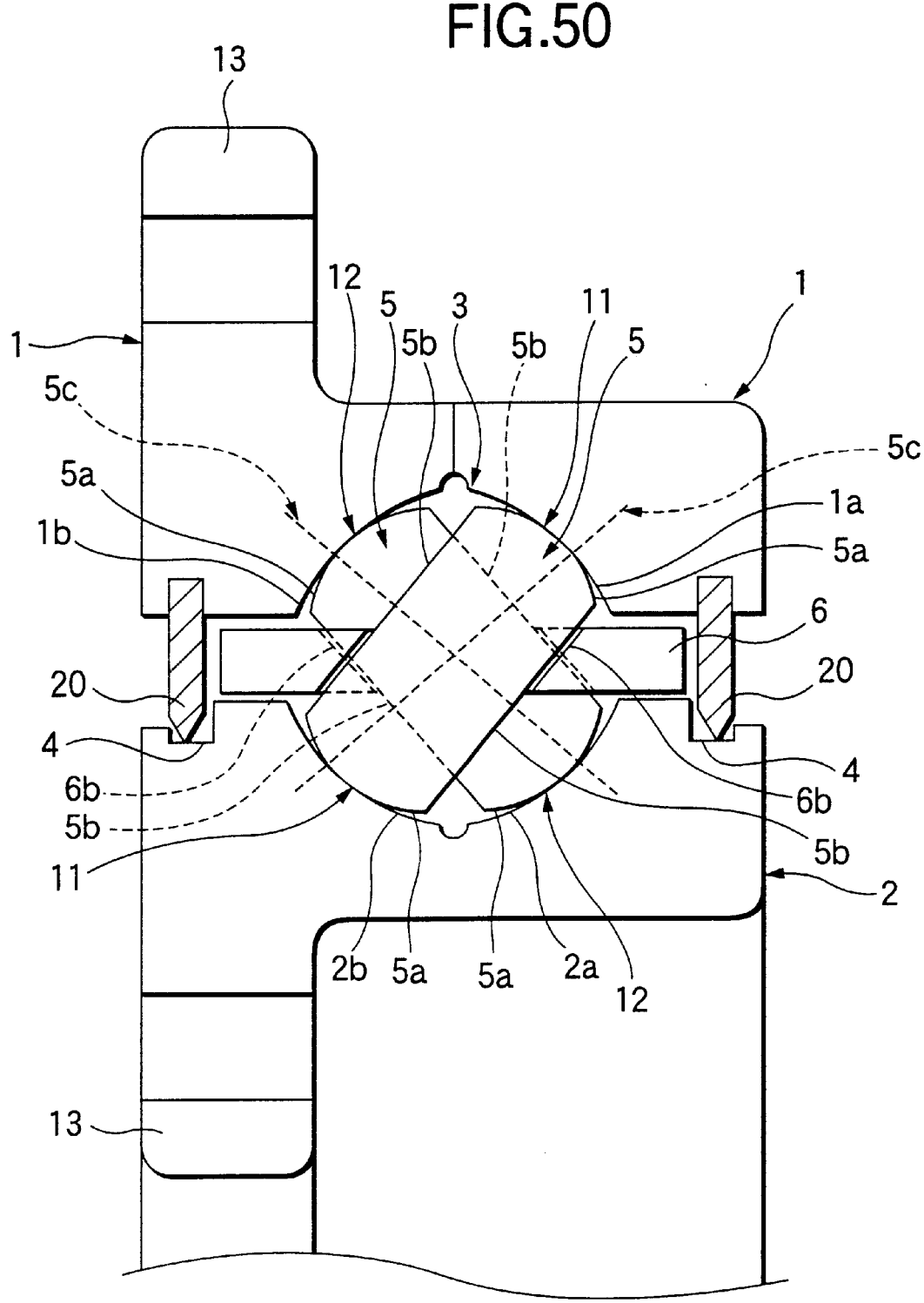
FIG. 50 is a longitudinal cross-sectional view showing a fifteenth example of the roller bearing with portions thereof being omitted.

In the bearing according to the present example, the outer race 1 is split into two pieces, and the inner race 2 is integrated. The flange 13 is attached to one of the two pieces constituting the outer race 1 and to the inner race 2 (FIG. 50).

SIXTEENTH EXAMPLE

Figure 51:
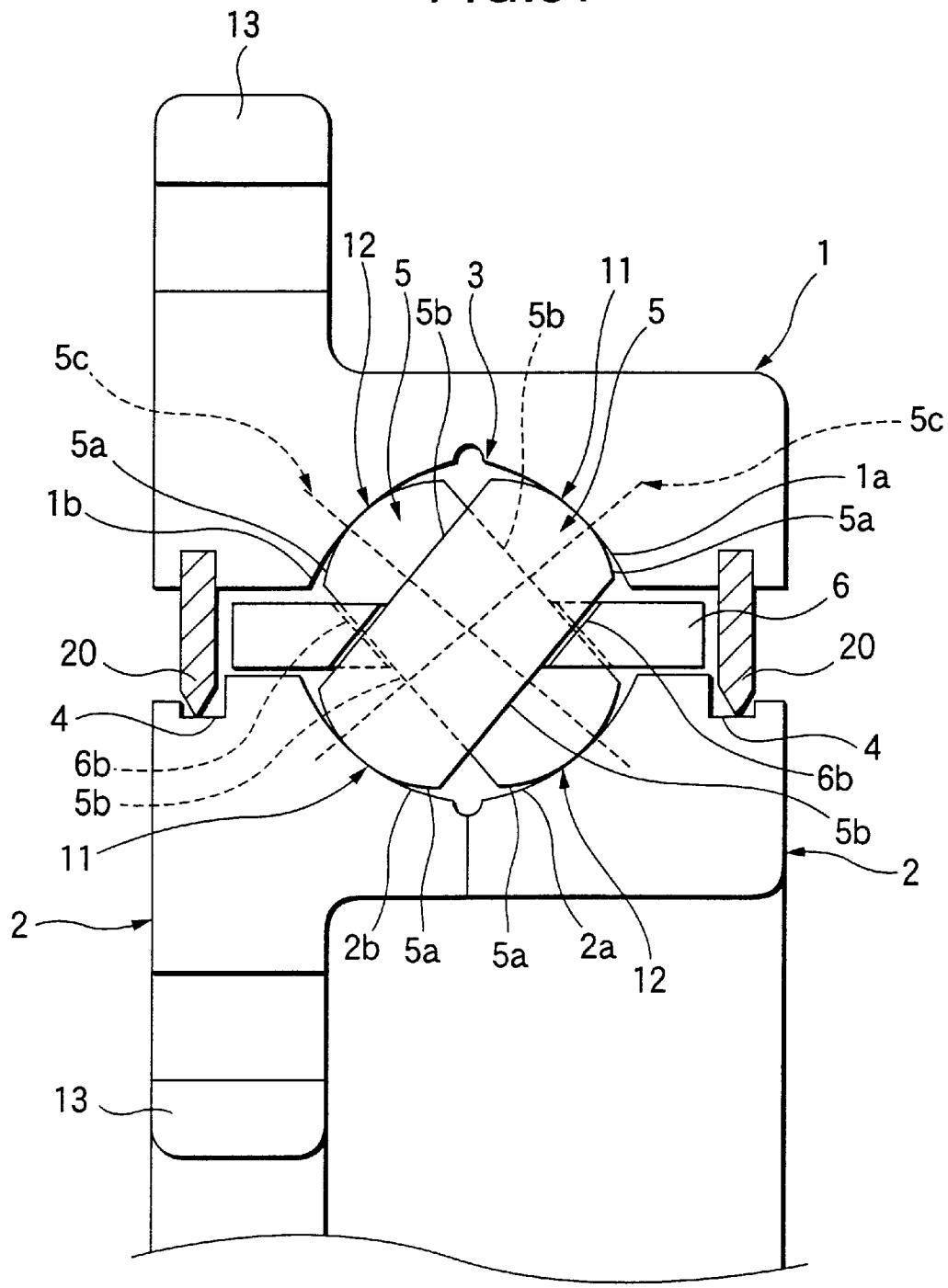
FIG. 51 is a longitudinal cross-sectional view showing a sixteenth example of the roller bearing with portions thereof being omitted.

In the bearing according to the present example, the outer race 1 is integrated, and the inner race 2 is split into two pieces. The flange 13 is attached to the outer race 1 and to one of the two pieces of the inner race 2 (see FIG. 51).

SEVENTEENTH EXAMPLE

Figure 52:
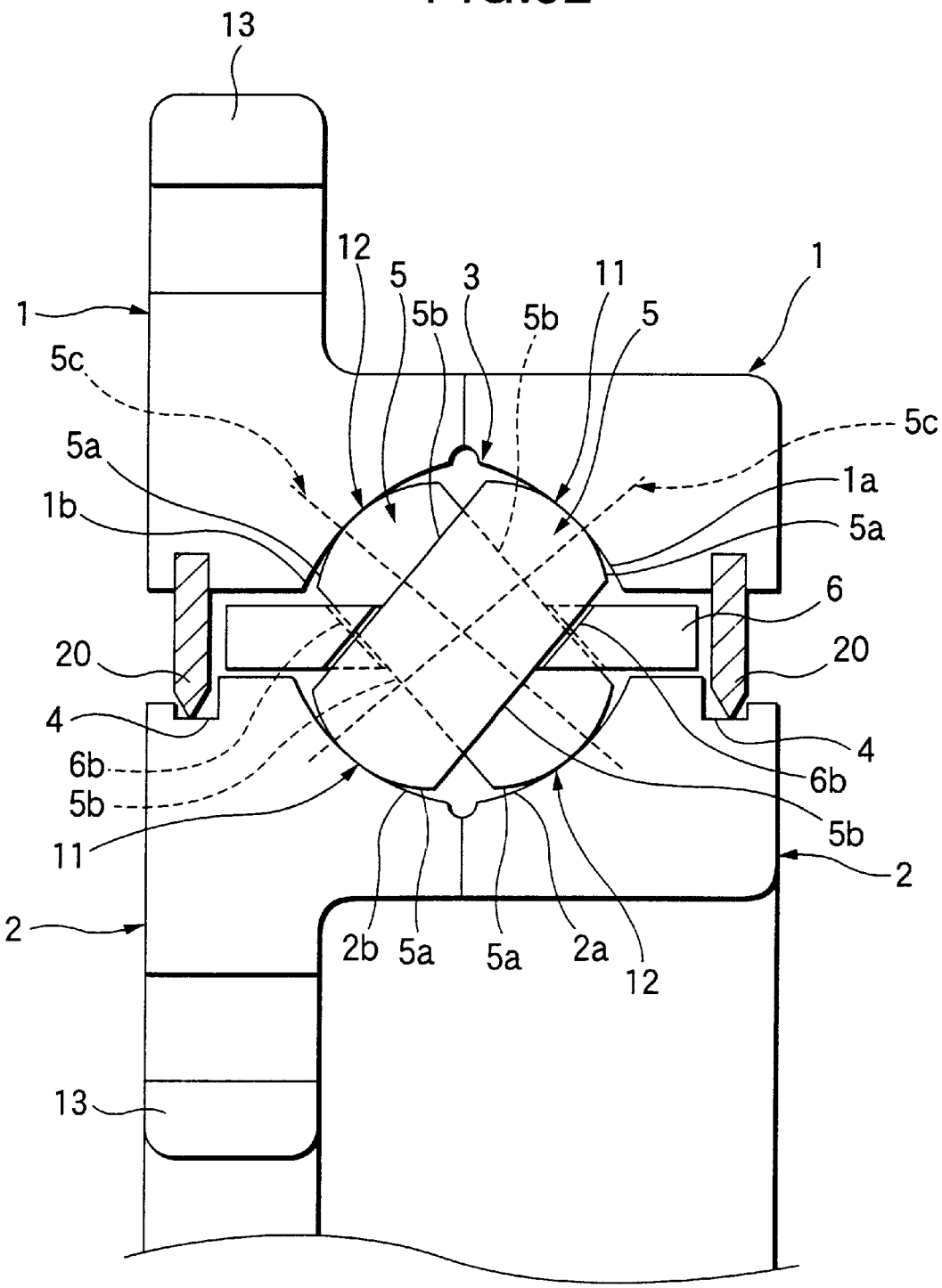
FIG. 52 is a longitudinal cross-sectional view showing a seventeenth example of the roller bearing with portions thereof being omitted.

In the bearing according to the present example, each of the outer race 1 and the inner race 2 is split into two pieces. The flange 13 is attached to one of the two pieces constituting the outer race 1 and to one of the two pieces constituting the inner race 2 (see FIG. 52).

EIGHTEENTH EXAMPLE

Figure 53:
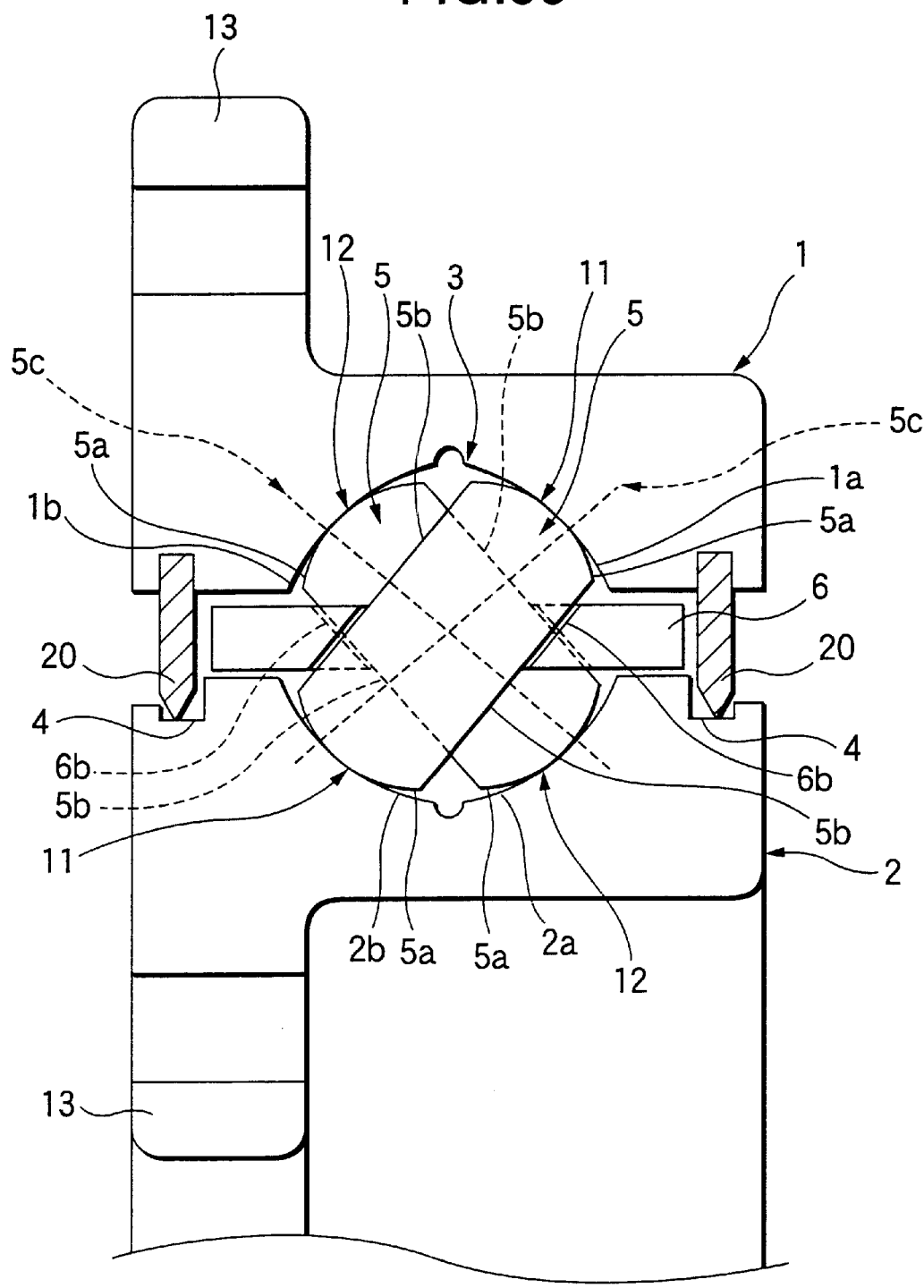
FIG. 53 is a longitudinal cross-sectional view showing an eighteenth example of the roller bearing with portions thereof being omitted.

In the bearing according to the present example, each of the outer race 1 and the inner race 2 is integrated. The flange 13 is attached to the outer race 1 and to the inner race 2 (see FIG. 53).

NINETEENTH EXAMPLE

Figure 54:
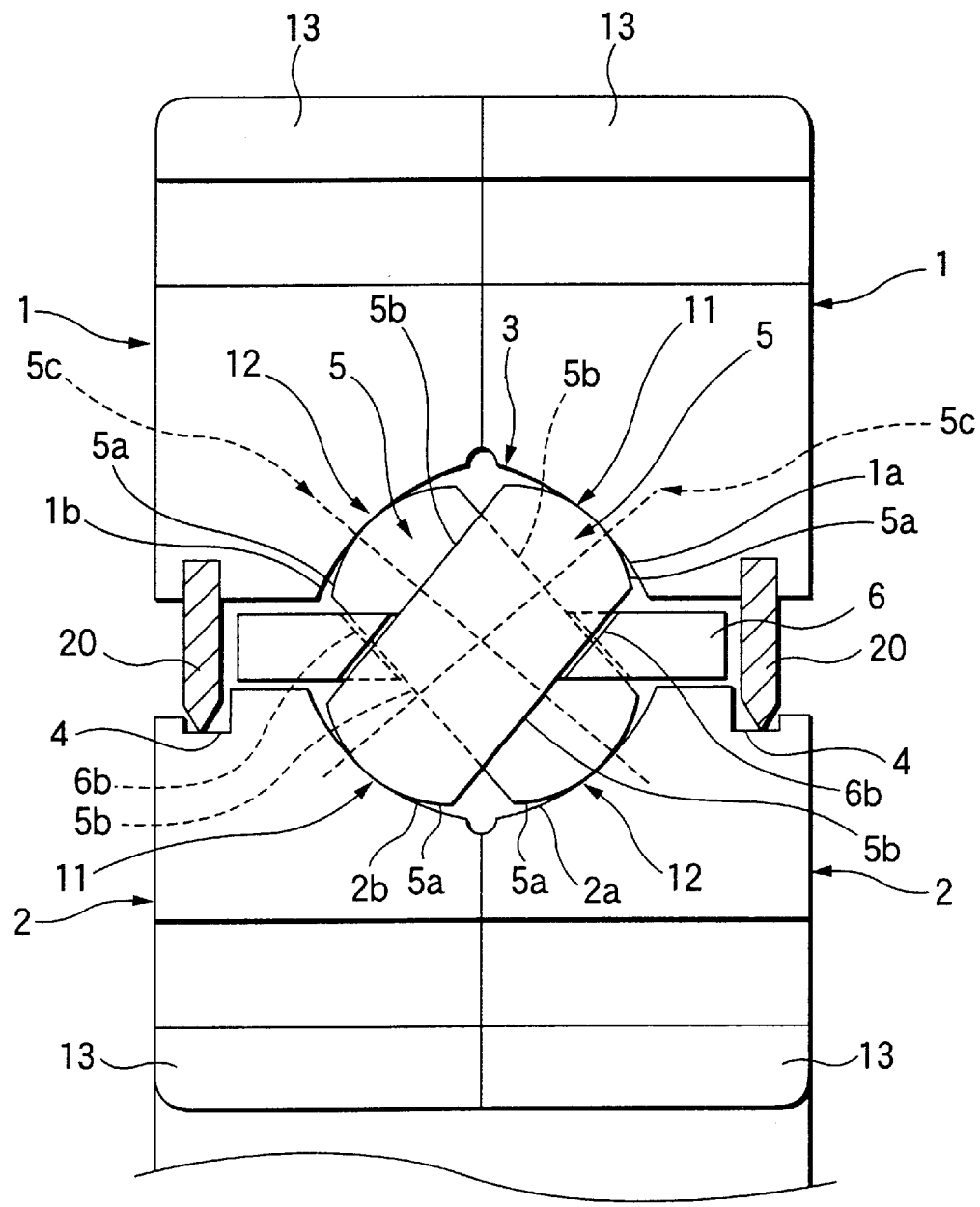
FIG. 54 is a longitudinal cross-sectional view showing a nineteenth example of the roller bearing with portions thereof being omitted.

In the bearing according to the present example, each of the outer race 1 and the inner race 2 is split into two pieces. The flange 13 is attached to each of the two pieces constituting of the outer race 1 and to each of the two pieces constituting the inner race 2. The flange 13 assumes an axially symmetrical geometry. (see FIG. 54).

TWENTIETH EXAMPLE

In the bearing according to the present example, each of the outer race 1 and the inner race 2 is split into two pieces. The flange 13 is attached to each of the two pieces constituting of the outer race 1 and to each of the two pieces constituting the inner race 2 The flange 13 assumes an axially asymmetrical geometry.

Figure 55:
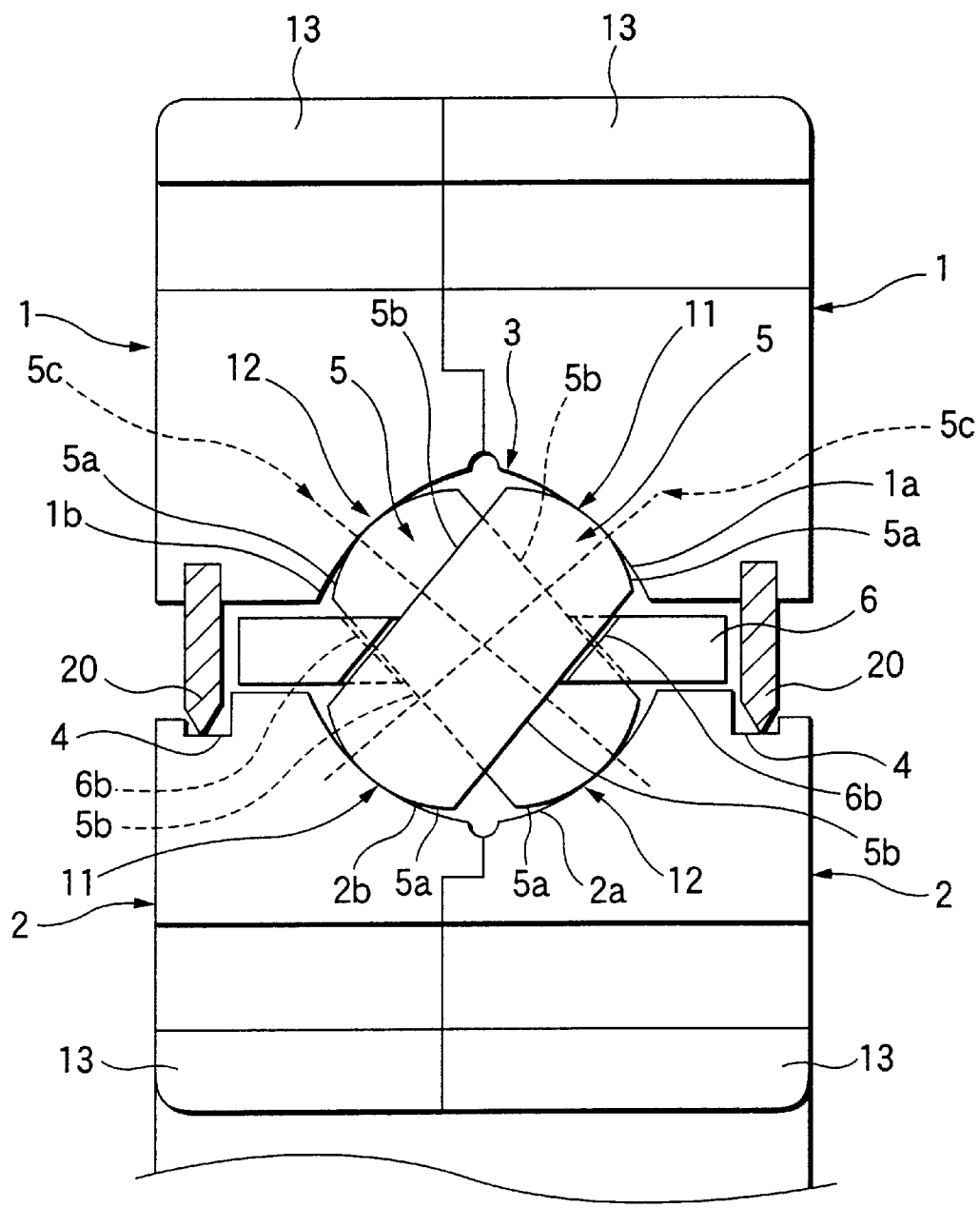
FIG. 55 is a longitudinal cross-sectional view showing a twentieth example of the roller bearing with portions thereof being omitted.

In the present example, in order to facilitate alignment of cores of the flange 13 with each other, a tap structure is formed in the flanges 13 (see FIG. 55).

TWENTY-FIRST EXAMPLE

Figure 56:
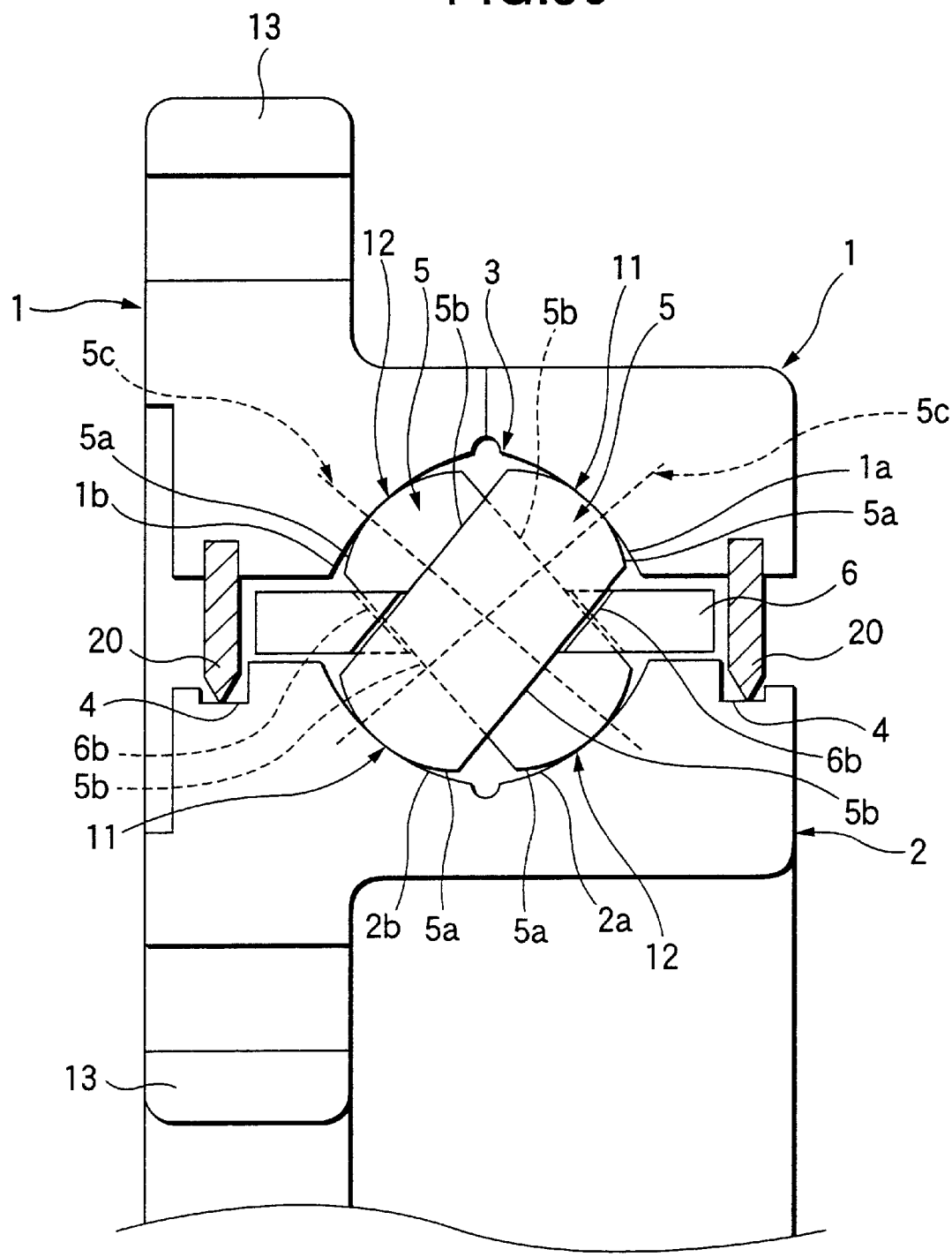
FIG. 56 is a longitudinal cross-sectional view showing a twenty-first example of the roller bearing with portions thereof being omitted.

In the bearing according to the present example, the outer race 1 is split into two pieces. The flange 13 is attached to one of the two pieces constituting the outer race 1 and to the inner race 2. In order to facilitate alignment of the flanges 13 with counterpart components, a tap structure is formed in the flanges 13 (see FIG. 56).

[15th Embodiment]

A roller bearing according to the 15th embodiment of the present invention comprises a race (outer race) 1; another race (inner race) 2; a plurality of rolling elements 5, 5, . . . incorporated into a raceway groove 3, the groove being defined between the inside diameter of the outer race 1 and the outside diameter of the inner race 2; and a lubricant-containing polymer member 14 filling a space within the bearing.

Except for the lubricant-containing polymer member 14 filling the space within a bearing, the roller bearing according to the third aspect is identical in configuration and working-effect with that described in connection with the first aspect of the invention. Hence, the explanations are applied in their present form to the roller bearing according to the second aspect. In relation to the common configuration and working-effect, the same reference numerals are assigned to the same elements, and their repeated explanations are omitted.

In the present example, unless otherwise specified, the lubricant-containing polymer member 14 is composed, by means of mixing at least one type of polymer selected from a polyα-olefin-polymer-based group comprising polyethylene, polypropylene, polybutylene and polymethylpentene with, as a lubricant, at least one type of oil selected from among a paraffin-based hydrocarbon oil such as polyα-olefin oils, naphthene-based hydrocarbon oils, petrolatum, ether oils such as a dialkyldiphenylether, and ester oils such as phthalate ester and trimellitate.

In the present invention, grease containing the lubricant as a base oil can be employed in place of the lubricant. In this case, an appropriate amount of known metallic soap, such as a lithium soap, is added to a lubricant, thus preparing grease.

Polymers are of the same molecular structure and have different mean molecular weights. Mean molecular weights of polymers range from $1\times10^3$ to $5\times10^6$. Comparatively-low-molecular-weight polymers having a means value of $1\times10^3$ to $1\times10^6$ or ultrahigh-molecular-weight polymers having a mean value of $1\times10^6$ to $5\times10^6$ are used solely or in a mixed manner, as required.

As the polymer of the lubricant-containing polymer material, there may be employed polypropylene, which is a highly-oil-absorptive polymer, polystyrene, polyethylene, polyurethane, acrylic resin such as polyethylmethacrylate, or polynolbornane.

A composition ratio of the lubricant-containing polymer member is such that polyα-based olefin-based polymer constitutes 20% to 80% the total weight of the polymer member and that lubricant constitutes 80% to 20% the total weight. When the polyα-based olefin-based polymer constitutes less than 20% by weight, there cannot be obtained a polymer member of a certain level of hardness and strength. When the polyα-based olefin-based polymer constitutes 80% by weight or more (i.e., when lubricant constitutes less than 20% by weight), the amount of lubricant to be supplied becomes smaller, and as a result an effect of diminishing abrasion of a sliding section is diminished. Various additives, such as an oxidation inhibitor, a rust-preventive agent, an abrasion-preventive agent, a defoaming agent, and an extreme-pressure agent may be added to the polymer member, as required.

Particularly when demand exists for heat resistance, there is preferably employed a lubricant-containing polymer member based on thermosetting resin such as that described below, in lieu of the above-described polyα-polyolefine-based polymer.

The thermosetting rein includes diallyl phthalate, phenolic resin, and polycarbodimide. More specifically, diallyl phthalate further includes a homopolymer consisting of a monomer or a prepolymer such as diallyl phthalate, diallyl isophthalate, and diallyl terephthalate; a copolymer consisting of two or more monomers or pre-polymers selected from the above; and a-mixture of the homopolymer and the copolymer.

Diallyl phthalate resin cannot be heated or cured in its present form. Therefore, a peroxide must usually be used as a curing agent (polymerization initiator). As a peroxide, there can be employed benzoylperoxide, m-toluoylperoxide, t-butylperoxide, t-butylperoxidebenzoate, di-t-butylperoxideisophthalate, 2,5-dimethyl-2,5-di(benzoylperoxi)hexane, and dicumyl peroxide. Such a curing agent is added to resin so as to constitute several percent by weight or thereabouts; usually, 1% by weight or thereabouts, at the time of polymerization.

Phenolic resin which can be employed in the present invention includes pure phenolic resin of resol type, pure phenolic resin of novolak type, and various denatured phenolic resins. For example, as denatured phenolic resins there can be employed cashew-modified phenolic resin (of novolak or resol type), and oil-modified phenolic resin (of novolak type).

Phenolic resin of novolak type does not cure in unmodified form; hexamine or phenolic resin of resol type must be added as a curing agent to the phenolic resin of novolak type. In contrast, phenolic resin of resol type is heated and cured without use of an additive.

The oil-modified phenolic resin has low capability of retaining a lubricant at the time of curing and cannot be used solely. For these reasons, there is a necessity of using the oil-modified phenolic resin in combination with another phenolic resin.

Polycarbo-di-imide resin which can be employed in the present invention is heated and cured without use of additives.

A lubricant which can be used in the present invention in combination with the thermosetting resin must have compatibility with the thermosetting resin set forth. For example, as such a lubricant there can be mentioned di-isodecyl phthalate, di-2-ethylhexylsebacate, an ester oil such as tri-2-ethylhexyltrimellitate, a polyolester oil, octadecyldiphenylether, tetraphenylether, and a phenylether oil such as pentaphenylether.

Depending on the kind of thermosetting resin, the type of lubricant having compatibility may change. Even if resin is dissolved uniformly before curing, there may arise a case where resin is separated from a lubricant or grease after curing. Hence, there is a necessity of paying attention to a combination of resin and a lubricant.

Diallyl phthalate resin is compatible with the lubricant or all types of grease. Hence, any combination between the lubricant and grease may yield a composition possessing lubricity. However, when phenolic resin or carbodiimide resin is used, limitations are imposed on combination. Desired combinations include, for example, a combination of pure phenolic resin and a polyphenylether oil, a combination of cashew-modified phenolic resin and a di-ester oil or polyol ester oil, and a combination of oil-modified phenolic resin and a polyphenylether oil or alkylpolyphenylether oil. Further, in the case of polycarbo-di-imide resin, use of a polyphenylether oil is desirable.

With a view toward reinforcing mechanical strength or improving moldability, a filler may be added to the lubricant-containing polymer member; for instance, minerals such as calcium carbonate, talc, silica, clay, mica; inorganic whiskers such as potassium titanate whisker and bornyl aluminum whisker; inorganic fibers such as glass fibers, asbestos, quartz wool, and metal fiber; and a cloth woven from any of these fillers. In the case of an organic compound, there can be added as a filler any one of various thermosetting resins, such as carbon black, graphite powder, carbon fiber, aramid fiber, polyester fiber, polyimide, and polybenzimidazole with a view toward improving heat conductivity of a lubricant-containing polymer member, there may be added to the polymer member carbon fiber, metal fiber, graphite powder, metal powder, or zinc oxide powder.

Production of such a lubricant-containing polymer member will now be described.

In the case of a lubricant-containing polymer member based on poly-α-olefin-polymer, a mixture consisting of polymer and a lubricant is charged into a predetermined mold, and the mixture is heated and melted at a temperature higher than the fusing point of polymer. Subsequently, the polymer is cooled and cured.

In the case of a lubricant-containing polymer member based on thermosetting resin, after having been charged into a predetermined mold, a mixture consisting of the polymer and a lubricant is heated to an appropriate temperature, so that the mixture can be cured.

No sealing plate is accommodated in the roller bearing according to the present example. However, the case where a sealing plate is accommodated into the roller bearing also falls within the scope of the invention. In this case, the structure of the sealing plate 20 described in connection with the first aspect of the invention can be applied. Further, there can also be adopted the structure in which the flange 13 described in connection with the second aspect of the invention is provided on either the outer race 1 or the inner race 2.

As mentioned above, filling the space of a bearing with the lubricant-containing polymer member 14 in the present invention is for the following purpose and yields the following working-effects.

Grease is usually used for lubricating purpose (the related art).

However, in relation to a roller bearing capable of receiving a radial load, axial loads in two directions, and a moment load through use of a single bearing, such as that described in connection with the present invention, if grease is used as a lubricating agent, there is a necessity for maintenance operation such as periodic greasing for replenishing grease. Further, there is yielded a problem of leakage grease staining the surroundings of a bearing.

(Problems to be Solved)

Accordingly, in the present invention, a lubricant is supplied over a long period of time to a lubricated section of a roller bearing from the lubricant-containing polymer member 14. Hence, good lubrication is ensured between the raceway surfaces of the outer and inner races 1 and 2 and a rolling contact surface, thereby obviating a necessity for maintenance operation, such as replenishment of a lubricant, which have been hitherto required when grease is used for lubricating a bearing. Further, there can be prevented occurrence of staining of surroundings of a bearing, which would otherwise be caused by grease leaking from the end face of the bearing. Further, the lubricant-containing polymer member 14 is liquid and does not flow end also possesses a dust-proof property. Hence, extension of life of a bearing in a water/dust environment can also be expected (The object and working-effect of the intention).

More specific descriptions of the roller bearing according to the third aspect of the present invention are provided as follows.

FIRST EXAMPLE

Figure 57:
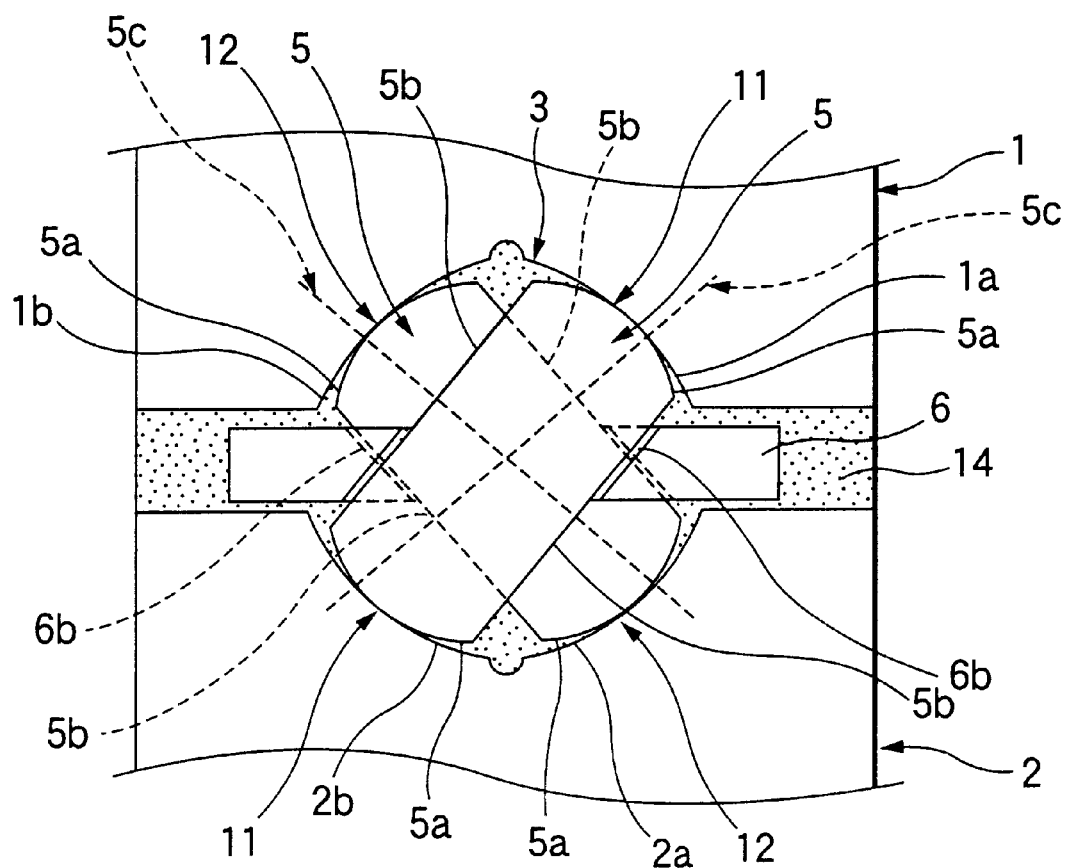
FIG. 57 is a partially-omitted longitudinal cross-sectional view showing a first example of a roller bearing according to a 15th embodiment of the present invention.

According to the present example, in a roller bearing which guides the rolling elements 5 through use of the retainer 6, the space of a bearing is filled with the lubricant-containing polymer member 14 (FIG. 57).

Figure 25:
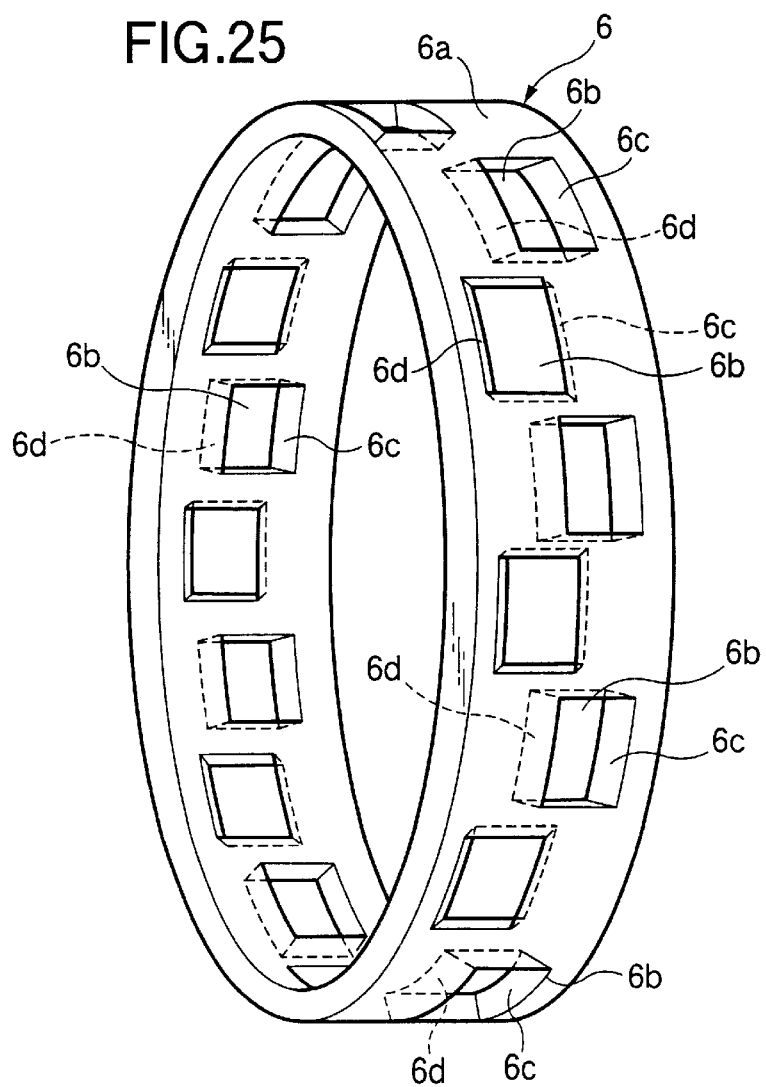
FIG. 25 is an enlarged perspective view of a retainer.

Although the present example employs the rolling elements 5 shown in FIG. 23 and described in connection with the first aspect and the retainer 4 shown in FIG. 25, no specific limitations are imposed on the rolling elements 5 and the retainer 6. Further, no particular limitations are imposed on the geometry of the outer race 1 and that of the inner race 2.

SECOND EXAMPLE

Figure 58:
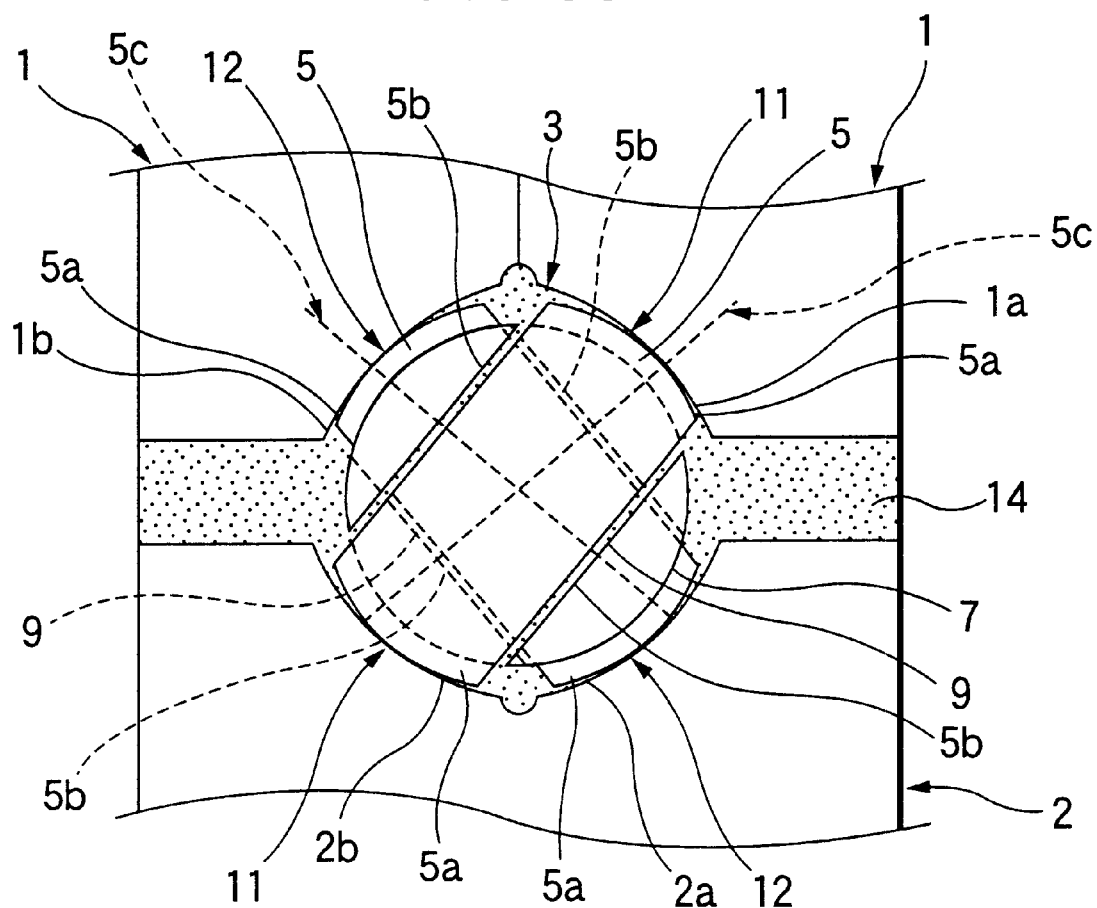
FIG. 58 is a longitudinal cross-sectional view showing a second example of the roller bearing with portions thereof being omitted.
Figure 59:
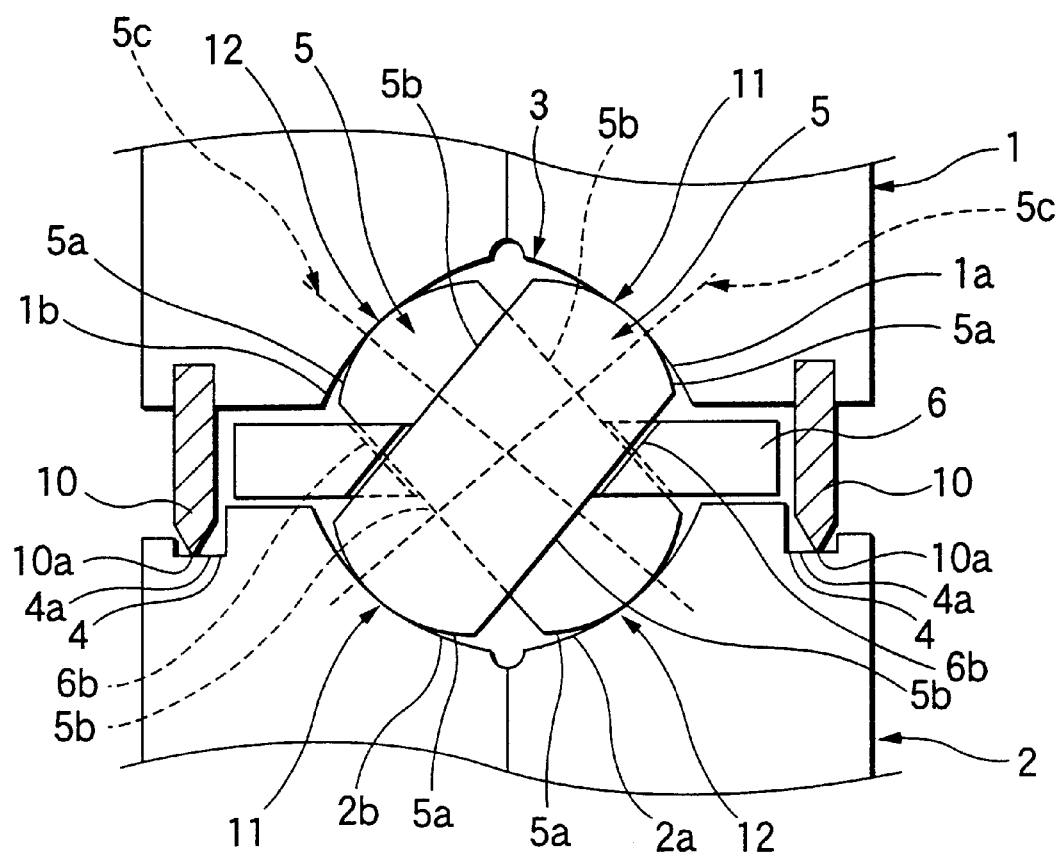
FIG. 59 is a partially-omitted longitudinal cross-sectional view showing a 15th embodiment of a roller bearing according to the present invention.
Figure 60:
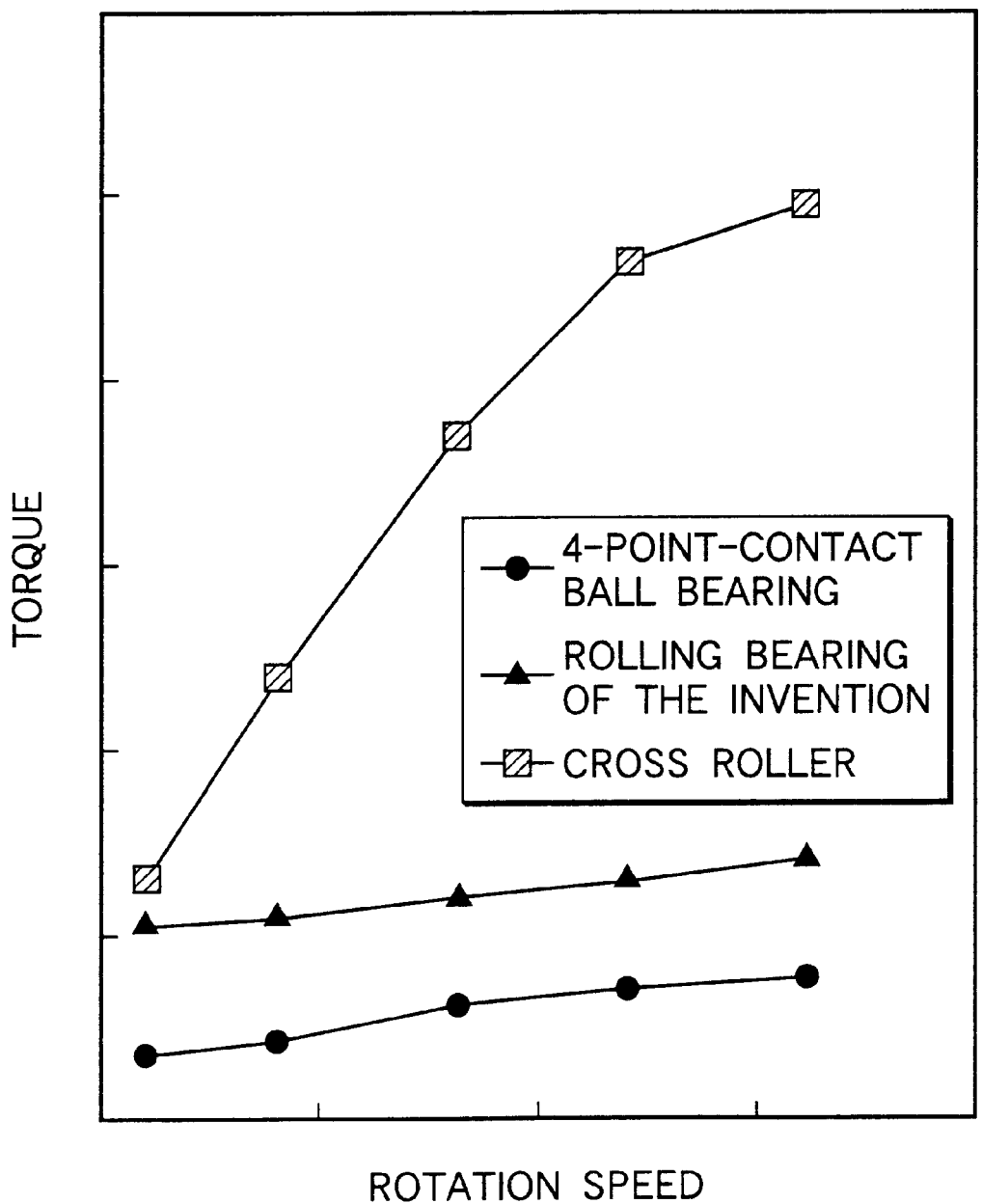
FIG. 60 is a plot showing results of a comparison test pertaining to torque.
Figure 61:
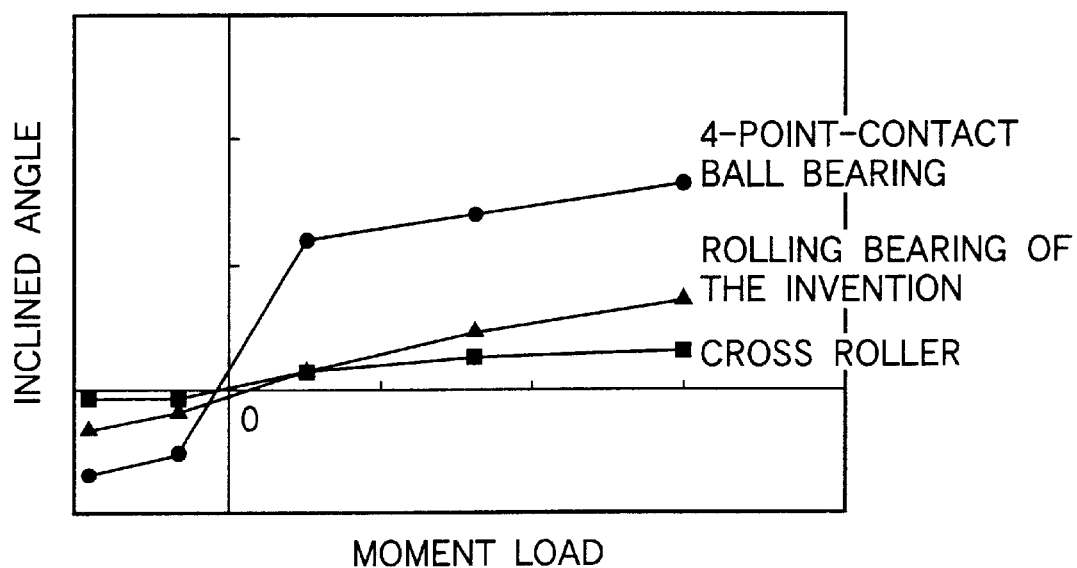
FIG. 61 is a plot showing results of a comparison test pertaining to moment rigidity.

According to the present example, in a roller bearing which guides the rolling elements 5 through use of the separator 7, the space of a bearing is filled with the lubricant-containing polymer member 14 (FIG. 58).

Although the present example employs the rolling elements 5 shown in FIG. 23 and described in connection with the first aspect and the separator 7 shown in FIG. 26, no specific limitations are imposed on the rolling elements 5 and the separator 7. Further, no particular limitations are imposed on the geometry of the outer race 1 and that of the inner race 2.

According to the present invention, a roller bearing has the foregoing construction, and a single bearing can receive a radial load, axial loads in two directions, and a moment load.

The present invention yields the following working effect in addition to the foregoing working-effects.

Two points of contact always exist between each of rolling elements and a raceway groove of a race, thereby preventing occurrence of an increase in torque, which would otherwise be caused by large spinning action of balls in a related-art four-point contact bearing.

A rolling element is formed such that the outside diameter of the rolling element; that is, a rolling contact surface of the rolling element, has curvature in an axial direction. In contrast with a cross roller, the bearing has smaller rolling resistance and achieves lower torque.

According to the 13th embodiment of the invention, sealing plates are provided in a bearing. A roller bearing having the construction described in connection with the present invention can reduce or prevent leakage of a lubricant or toxic gas from the bearing to the outside or entry of harmful substances into the bearing.

According to the 14th embodiment of the invention, depending on usage conditions, a flange is provided on an outer race or inner race of a bearing or on both outer and inner races of the bearing. As a result, the dimensional accuracy of external and internal peripheries of the bearing can be set low.

Further, quick and easy attachment of a bearing to a counterpart component or disassembly of the bearing from the counterpart component can be effected, thus curtailing mounting costs. Further, a necessity for a housing is obviated, thereby rendering a product compact and curtailing total costs.

According to the 15th embodiment of the invention, the internal space of a bearing is filled with a lubricant-containing polymer member, thereby obviating a maintenance operation, such as replenishment of grease, which has hitherto been required when the bearing is filled with grease. Thus, there can be implemented a maintenance free roller bearing. Further, there can be prevented staining of surroundings of a bearing, which would otherwise be caused by leakage of grease from the end face of the bearing. Further, extension of life of a bearing in a water/dust environment can be expected.

[16th Embodiment]

A 16th embodiment of a roller bearing according to the present invention will be described hereinbelow. However, this embodiment can apply to any one of the bearing of the other embodiments of the present invention, and therefore, a detailed explanation of its constructions will be eliminated here.

In the 16 embodiment, a bearing internal clearance is set to be a negative value.

Note that No particular limitation is imposed on the presence/absence of the sealing plate 20. Regardless of whether or not the sealing plate 20 is provided in a roller bearing, the roller bearing falls within the scope of this 14th embodiment according to the present invention.

In relation to torque and moment rigidity, a test has been conducted by means of comparing the roller bearing (1) according to the 16th embodiment whose internal clearance has been set to a negative value with a four-point contact ball bearing and a cross roller bearing.

The test results show that the roller bearing according to the present embodiment for which clearance has been set to a negative value yields torque smaller than that yielded by the cross roller bearing, as in the case of the four-point contact ball bearing, and that moment rigidity yielded by the bearing is higher then that yielded by the four-point contact ball bearing, as in the case of the cross roller bearing.

The roller bearing according to the present embodiment for which clearance has been set to a negative value yields low torque in the same manner as does the four-point contact ball bearing, while yielding high moment rigidity in the same manner as does the cross roller bearing.

Since the present invention has been embodied in the manner as mentioned above, in a bearing for which clearance has been set to a negative value, points of contact arise between rolling elements and races, as in the case of a four-point contact ball bearing. Rolling resistance developing in the bearing becomes smaller than that of a line-contact cross roller, and hence the bearing yields low torque.

Since pre-load is applied to the inside of a bearing, there can be prevented occurrence of a drop in rigidity, which would otherwise be caused by internal clearance of a bearing when the bearing receives load, thus yielding high moment rigidity.

[17th Embodiment]

Hereinafter, a 17th embodiment according to the present invention will be explained.

Referring now to the accompanying drawings, there are shown preferred embodiments of rolling bearings of the invention.

The embodiments are only embodiments disclosed for describing the rolling bearings of the invention and it is to be understood that the invention is not limited to the specific embodiments thereof and the combination and arrangement of parts may be resorted to without departing from the spirit and the scope of the invention.

The rolling bearing comprises a plurality of rolling elements 36, 36 . . . built in a raceway groove 33 formed between the inner diameter of a race (outer race) 31 and the outer diameter of a race (inner race) 32.

The races 31 and 32 may be each one piece or either or both of the races 31 and 32 may be divided into two parts axially at any desired position in a width direction and assembled into one piece with a bolt, rivet, etc.

The raceway groove 33 is formed of raceway surfaces 34 and 35 each having a larger radius of the radius of the rolling element 36. The raceway surface 34, 35 of the raceway groove 3 of at least either of the races 31 and 32 is made up of two raceway surfaces 34a and 34b, 34a and 35b each having a larger radius than the radius of the rolling element 36.

Each raceway surface 34 (24*a* and 34*b*), 35 (35*a* and 35*b*) may be of any shape, such as arch or V in cross section, and may be shaped like a curve, a line, or the like and is not limited if it has a shape appropriate for rolling of the rolling element 36. For example, a Cothic arch, etc., formed of both circular arcs with circle centers placed like a cross is applied.

In the embodiment, a grinding relief is formed at the intersection point of the raceway surfaces for facilitating grinding, but a raceway groove shaped like a continuous ellipse can also be formed without forming the grinding relief.

The rolling element 36 is of an arbitrary shape having an outer diameter 36*a* as a rolling contact face having a curvature in the axial direction and having a smaller radius than the radius of the raceway surface 34 (34*a* and 34*b*), 35 (35*a* and 35*b*) The adjacent rolling elements 36 are placed like a cross alternately and the outer diameter 36*a* of each rolling element 36 is always in contact with one point on the raceway surface 34 (34*a* and 34*b*) of one race 31 and one point on the raceway surface 35 (35*a* and 35*b*) of the other race 32.

For example, the rolling element 36 is a ball shaped with the top and bottom cut having a pair of opposed faces 36*b* and 36*b* (of a structure wherein the top and bottom parts of the ball are cut to form the opposed faces 36*b* and 36*b*). The rolling elements 36, 36 . . . , are built in so that rotation center axes 36*c* perpendicular to the opposed faces 35*b* and 36*b* cross each other, and the outer diameter 36*a* of each rolling element 36 is always in contact with one point on the raceway surface 34 (or 34*a* and 34*b*) of one race 31 and one point on the raceway surface 35 (or 35*a* and 35*b*) of the other race 32.

The top and bottom cut widths of the rolling element 36 are not limited and the cut percentage of the top and the bottom may be even or may not be even and can be selected as desired without departing from the spirit and the scope of the invention. That is, the opposed faces 36*b* and 36*b* of the rolling element 36 may be symmetric or asymmetric; the symmetric opposed faces and the asymmetric opposed faces are within the spirit and the scope of the invention.

The whole shape of the rolling element 36, the presence or absence of the opposed faces 36*b* and 36*b*, the magnitude of the curvature in the axial direction in the outer diameter 36, and the like are not limited to the specific shapes described above and can be changed as desired without departing from the spirit and the scope of the invention. That is, for example, the rolling element may comprise both faces in nonparallel with each other in place of the opposed faces 36*b* and 36*b* and may have rotation center axis 36*c* perpendicular to both the faces.

The rolling elements 36, 36 . . . , are built in so that the rotation center axes 36*c* and 36*c* perpendicular to the planes 36*b* and 36*b*, 36*b* and 36*b* in the adjacent rolling elements 36 and 36 cross each other alternately, and the cross state may be orthogonal or may not be orthogonal.

The manner in which the rolling elements 36 are placed like a cross is not limited if the number of rolling elements is the same as that of rolling elements crossing the rolling elements. That is, the rolling elements 36 may be placed like a cross every rolling element or may be placed like a cross every two rolling elements or may be placed like a cross in such a manner of two rolling elements, one rolling element, one rolling element, two rolling elements, . . . if the number of rolling elements is the same as that of rolling elements crossing the rolling elements; each manner is within the spirit and the scope of the invention.

The movement of each rolling element 36, 36 is guided by a cage 37 or a separator (spacer) 39.

The cage 37 or the separator (spacer) 39 is not limited if it is of shape having a pocket 38 for retaining and guiding the rolling element 36 or grooves 40 and 40; the shape can be selected or changed as desired without departing from the spirit and the scope of the invention.

The guide manner of the cage 37 is not limited and may be inner race guide, outer race guide, or rolling element guide. The structure, the shape, and the like of the cage 37 are not limited; for example, the cage 37 may be of integral type or may be made up of several parts.

For example, the cage 37 is structured that as many pockets 36 . . . as the number of the rolling elements 36 . . . in which the adjacent rolling elements 36, 36 can be built so that the rotation center axes 36*c* and 36*c* cross each other alternately are placed with equal spacing and like a cross alternately on the circumference of an annular ring.

Both sides 38*a* and 38*b* of each pocket 38 in the axial direction thereof are parallel with each other, are neither perpendicular to nor parallel with the rotation axis of the bearing, and are at a constant angle (slope) at equal level to the contact angle of the rolling element 36.

The distance between both the sides 38*a* and 38*b* of each pocket 38 in the axial direction thereof is made slightly larger than the width of the rolling element 36.

The whole shape of the pocket 38 is not limited if the pocket 38 has both the parallel sides 38*a* and 38*b* each shaped like a slope and the distance between both the sides 38*a* and 38*b* is formed slightly larger than the width of the rolling element 36; the whole shape of the pocket 38 can be changed without departing from the spirit and the scope of the invention.

In the embodiment, as many pockets 38 . . . as the number of the rolling elements 36 . . . are placed with equal spacing and like a cross alternately on the circumference, but the invention is not limited to it. The packets 38 . . . may be placed like a cross every two pockets or may be placed like a cross in such a manner of two pockets, one pocket, one pocket, two pockets, . . . if the number of pockets is the same as that of pockets crossing the pockets; each manner is within the spirit and the scope of the invention.

There is a possibility that spin or skew may occur in the rolling element being rotated because of the effects of various factors, and if the attitude of the rolling element cannot well be controlled, there is a possibility that the rotation resistance of the bearing may become large or that smooth rotation may become unable to be provided.

Therefore, according to the embodiment, each pocket 38 of the cage 37 comprises both the parallel sides 38*a* and 38*b* made almost the same as the constant angle at the equal level to the contact angle of the rolling element 36 and attitude change of the rolling element 36 caused by spin, skew, etc., of the rolling element 36 can be suppressed by both the sides 38*a* and 38*b* of the pocket for retaining the attitude of the bearing, so that low torque of the bearing can be provided.

The separator 39 is shaped like a smaller diameter than the diameter of the rolling element 36 and is formed with concave circular arc grooves 40 and 40 like a cross in opposed faces 41 and 41 for retaining the adjacent retained rolling elements 36 and 36 so that the rotation center axes 36*c* and 36*c* perpendicular to the opposed faces 36*b* and 36*b*, 36*b* and 36*b* cross each other as described above.

The curvature radius of the circular arc groove 10 may be made roughly the same as or larger than the curvature radius of the outer diameter 36*a* of the rolling element 36; it may be arbitrary.

If the separators 39 are thus used, the whole bearing can be compacted.

The state in which a preload is given between the rolling element and the raceway surface is not limited, namely, a preload may be given or may not be given at the manufacturing stage; giving a preload and giving no preload at the manufacturing stage are within the spirit and the scope of the invention.

Normally, bearing steel is used as the materials of the races 31 and 32 and the rolling elements 35, but anticorrosive coating, stainless steal, heat-resistant steel, such as M50, ceramics, and the like are selected appropriately and the materials are not limited to improve corrosion resistance and heat resistance in response to the use environment.

Since a machined cage, a press cage, a resin cage, or the like is selected appropriately as the material of the cage 37, for example, metal of brass, iron, etc., or synthetic resin, such as polyamide 66 (nylon) or polyphenylene sulfide (PPS), is selected within the spirit and the scope of the invention.

Figure 64:
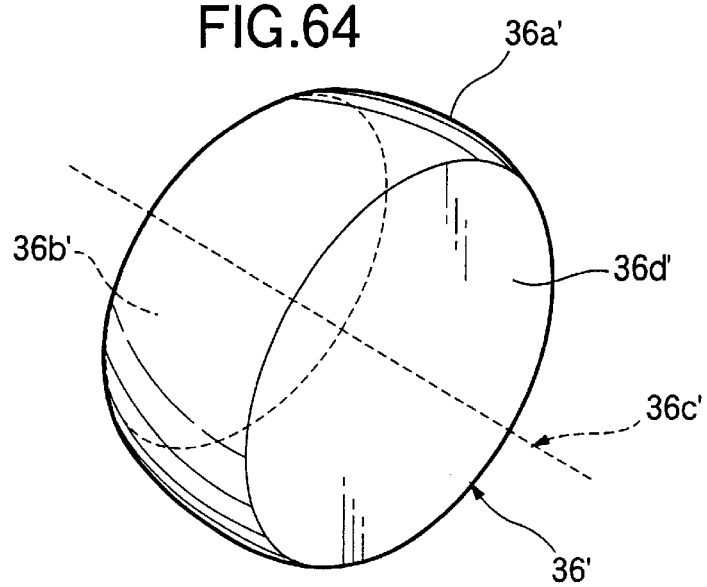
FIG. 64 is an enlarged perspective view to show another example of a rolling element in the 17th embodiment.

FIG. 64 shows one embodiment of a rolling element 36' with opposed faces which are asymmetric. The rolling element 36' of the embodiment is used particularly for high-speed rotation.

The rolling element 36' of the embodiment is a rolling element (ball shaped with the top and bottom cut) 36' having asymmetric opposed faces 36b' and 36d' and is placed so that the large end 36d' of the opposed faces 36b' and 36d' is directed toward the inner race 32 of the bearing, whereby rotation of the rolling element 36' becomes stabler and lower torque can be provided. Numeral 36a' denotes an outer diameter and numeral 36c' denotes a rotation center axis.

Other components and advantages are similar to those of the rolling element 36 described above and will not be discussed again.

The gap in the bearing can be set small or negative (minus) as required. Accordingly, higher moment rigidity of the bearing can be provided.

Numeral 44 in the figure denotes a seal plate. As the seal plate 44, any of a contact seal, a non-contact seal, or a contact shield is applied and the shape of the seal plate 44 is not limited and a seal plate of a known shape is selected appropriately without departing from the spirit and the scope of the invention.

Numeral 44a in the figure denotes a seal face of the seal plate 44 (hermetic seal face) coming in intimate contact with the inner bottom of an inner race seal groove 32a.

The placement manner of the seal plate 44 is not limited and the seal plate 44 may be placed on both sides or a single side as required; placing the seal plate 44 on both sides and placing the seal plate 44 on a single side are within the spirit and the scope of the invention. The seal face may be on the outer race side or the inner race side; either case is within the spirit and the scope of the invention.

The shape of the seal, such as a lip shape, is not limited and line contact with the seal face and face contact with the seal face are within the spirit and the scope of the invention.

Whether or not a cored bar exists may be determined as desired and the type having a cored bar and the type having no cored bar may be used properly as required.

The seal groove structures of the outer race 31 and the inner race 32 are not limited either and can be changed whenever necessary without departing from the spirit and the scope of the invention.

The presence or absence of the seal plate 44 is not limited and the seal plate 44 may be installed or may not be installed as required; installing the seal plate 44 and installing no sealing plate 44 are within the spirit and the scope of the invention.

EXAMPLES

Next, specific embodiments of the invention will be discussed with reference to the accompanying drawings.

FIRST EXAMPLE

Figure 62:
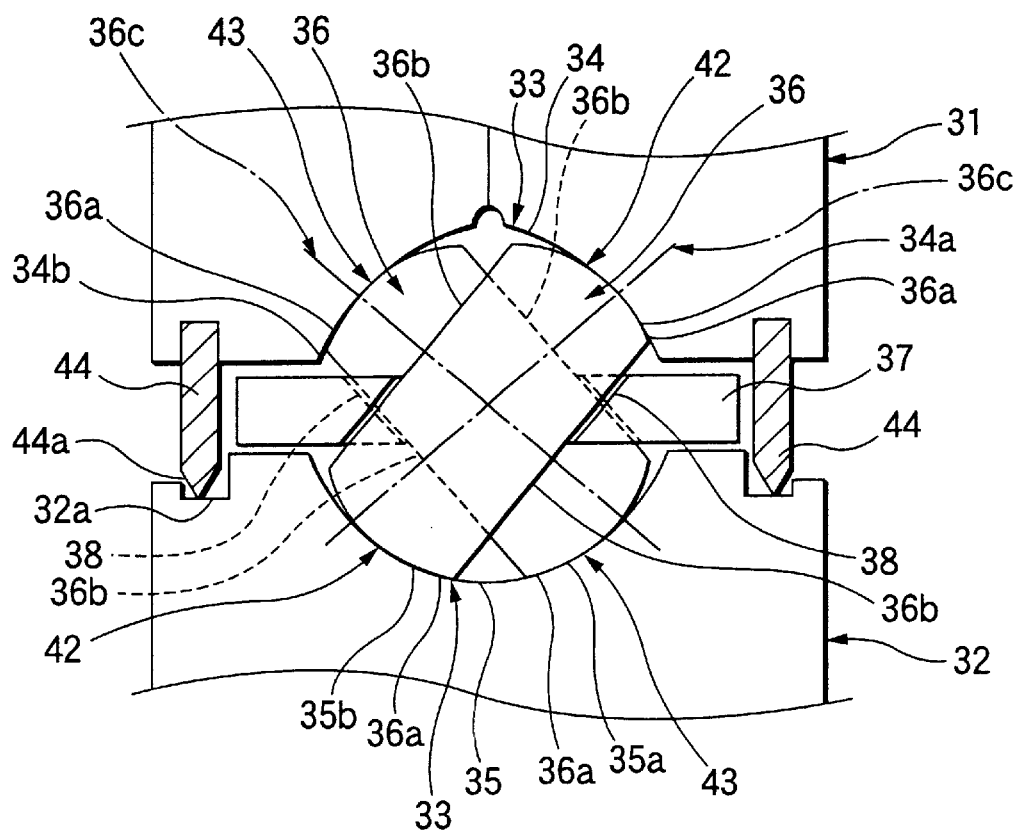
FIG. 62 is a longitudinal sectional view to show 17th embodiment of the invention.

FIG. 62 shows a first example of a rolling bearing of the 17th embodiment according to the present invention.

Figure 63:
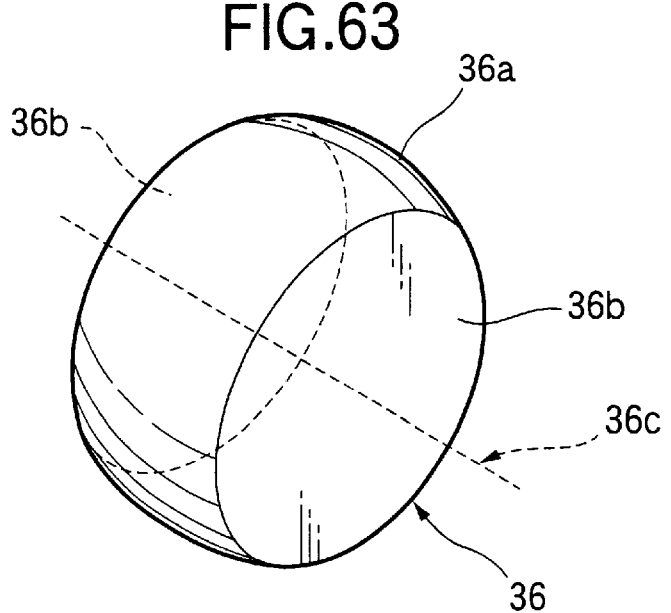
FIG. 63 is an enlarged perspective view to show one example of a rolling element in the 17th embodiment.

Each rolling element 36, 36 is a ball shaped with the top and bottom cut having a pair of opposed faces 36b and 36b as shown in FIG. 63 and the rolling bearing comprises outer races 31 and 1 divided as two pieces, an inner race 32 formed in one piece, and raceway grooves 33 and 33.

In the example, one raceway groove 33 consists of two raceway surfaces 34a and 34b each having a larger radius than that of the rolling element 36 and another raceway groove 33 is made of one raceway surface 35 having a larger radius than that of the rolling element 36 and the opposed faces 36b and 36b of the rolling element (ball shaped with the top and bottom cut) 36 are made symmetric.

The rolling elements 36, 36 are placed so that rotation center axes 36c and 36c of the rolling elements perpendicular to the opposed faces 36b and 36b cross each other alternately, and the movement of each rolling element 36, 36 is guided by a pocket 38, 38 of a cage 37.

In the cage 37, as many pockets 38 . . . as the number of the rolling elements 36 . . . in which the adjacent rolling elements 36, 36 can be built so that the rotation center axes 36c and 36c perpendicular to the opposed faces 36b and 36b, 36b and 36b cross each other alternately are placed with equal spacing and like a cross alternately on the circumference of an annular ring, as described above.

Therefore, according to the first example, the outer diameter 36a of the rolling element 36 comes in contact with one point on the raceway surface 34a of the outer race 31 and one point on the raceway surface 35 of the inner race 32 (the contact points are denoted by 42 and 42), the outer and inner races facing each other, and the adjacent rolling element 36 comes in contact with one point on the raceway surface 34b of the outer race 31 and one point on the raceway surface 35 of the inner race 32 (the contact points are denoted by 43 and 43).

Since the rolling elements 36 and 36 cross each other alternately at contact angle, one bearing can receive a radial load, axial loads in both directions, and a moment load.

One rolling element 36 is in point contact only with one point on the raceway surface 34a (42) and one point on the raceway surface 35 (42) and another rolling element 36 is in point contact only with one point on the raceway surface 34b (43) and one point on the raceway surface 35 (43), so that large spin in the four point contact ball bearing in the related art can be eliminated.

Further, the manner in which the rolling element 36, 36 and the outer race 31, the inner race 32 come in contact with each other is the same as that in a general ball bearing, so that rolling resistance is small and low torque can be provided as compared with the cross roller bearing.

[18th Embodiment]

Figure 67:
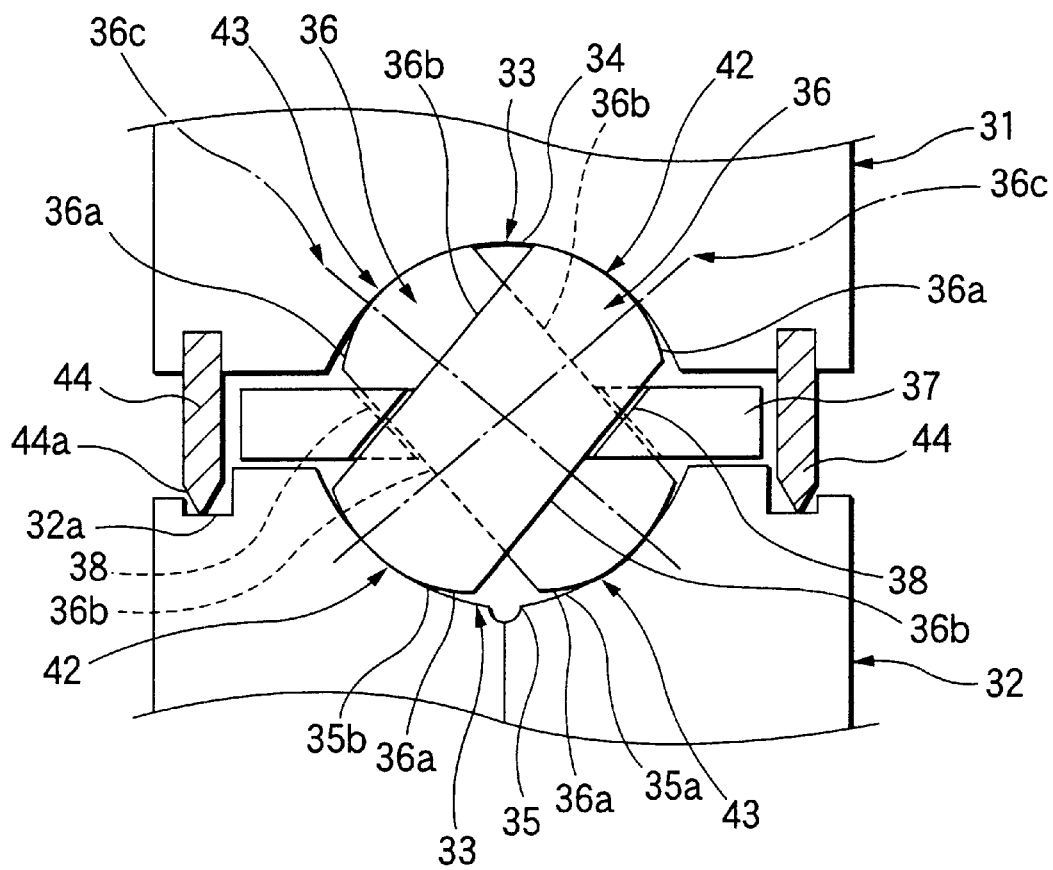
FIG. 67 is a longitudinal sectional view to show an 18th embodiment of the invention.

FIG. 67 shows an 18th embodiment of the invention. In the embodiment, an outer race 31 has one raceway surface and an inner race 32 has two raceway surfaces; the outer race 31 is of integral type and the inner race 32 is of two-division type.

Other components and advantages are similar to those in the first example.

[19th Embodiment]

Figure 68:
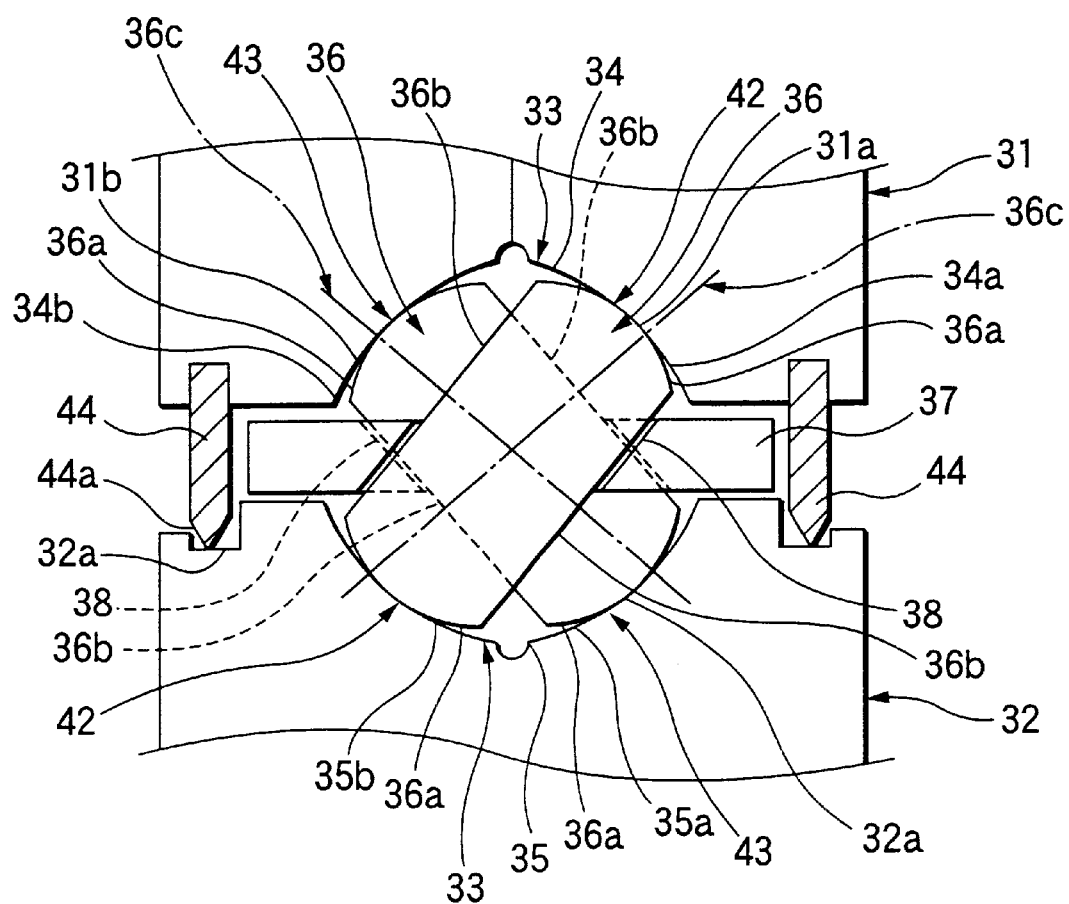
FIG. 68 is a longitudinal sectional view to show a 19th embodiment of the invention.

FIG. 68 shows a 19th embodiment of the invention. In the embodiment, an outer race 31 has two raceway surfaces 31a and 31b and an inner race 32 has two raceway surfaces 32a and 32b; the outer race 31 is of two-division type and the inner race 32 is of integral type.

Other components and advantages are similar to those in the first example.

Each of an outer race 31 and an inner race 32 may consist of two races as in the example and the outer race 31 may be of integral type and the inner race 32 may be of two-division type or both the outer race 31 and the inner race 32 may be of two-division type.

In the invention, between the outer and inner races, the rolling elements are placed so as to cross each other alternately on the circumference, so that one bearing can receive a radial load, axial loads in both directions, and a moment load. Since each rolling element is always in contact only with two points on the outer and inner races, the slip caused by large spin in the four-point contact ball bearing or the three-point contract ball bearing in the related art is small and the spin wear resistance characteristic can be improved.

Since the bearing gap can be set small or negative as required, high moment rigidity can be provided. Further, the rolling element is a ball and the rolling element and the race come in point contact with each other, so that rolling resistance is small and low torque can be provided as compared with the cross roller bearing. Consequently, the whole apparatus can be compacted, reduced in weight, and improved in durability, and costs can also be reduced.

[20th Embodiment]

Referring now to the accompanying drawings, there are shown preferred embodiments of rolling bearings of the invention.

The embodiments are only embodiments disclosed for describing the rolling bearings of the invention and it is to be understood that the invention is not limited to the specific embodiments thereof and the combination and arrangement of parts may be resorted to without departing from the spirit and the scope of the invention.

The rolling bearing of the invention is used, for example, in corrosive atmosphere environments of high humidity, a spray of water, underwater, acid, alkali, reactive gas, etc., in a conveyor, a food machine, a cleaning apparatus, a fishing machine, chemical facilities, a medical apparatus, a semiconductor/liquid crystal manufacturing apparatus, etc., and corrosion resistance is required for the rolling bearing.

The rolling bearing comprises a plurality of rolling elements 36, 36 . . . built in a raceway groove 33 formed between the inner diameter of a race (outer race) 31 and the outer diameter of a race (inner race) 32.

The races 31 and 32 may be each one piece or either or both of the races 31 and 32 nay be divided into two parts axially at any desired position in a width direction and assembled into one piece with a bolt, rivet, etc. If the race is divided into two parts and a flange part exists, the flange part may be fixed also for fixing the race divided into two parts. In this case, the shape and the structure of the flange are not limited and the axial dimension of the flange may be symmetric or asymmetric and is not limited and the design can be changed without departing from the spirit and the scope of the invention. To improve the attaching position accuracy of the flange and the part to which the flange is attached, the flange may be formed with a tap structure, etc.

The raceway groove 33 is formed of raceway surfaces 34 and 35 each having a larger radius of the radius of the rolling element 36. The raceway surface 34, 35 of the raceway groove 33 of at least either of the races 31 and 32 is made up of two raceway surfaces 34a and 34b, 35a and 35b each having a larger radius than the radius of the rolling element 36.

Each raceway surface 34 (34a and 34b), 35 (35a and 35b) may be of any shape, such as arch or V in cross section, and may be shaped like a curve, a line, or the like and is not limited if it has a shape appropriate for rolling of the rolling element 36. For example, a Gothic arch, etc., formed of both circular arcs with circle centers placed like a cross is applied.

In the embodiment, a grinding relief is formed at the intersection point of the raceway surfaces for facilitating grinding, but a raceway groove shaped like a continuous ellipse can also be formed without forming the grinding belief.

The rolling element 36 is of an arbitrary shape having an outer diameter 36a as a rolling contact face having a curvature in the axial direction and having a smaller radius than the radius of the raceway surface 34 (34a and 34b), 35 (35a and 35b). The adjacent rolling 'elements 36 are placed like a cross alternately and the outer diameter 36a of each rolling element 36 is always in contact with one point on the raceway surface 34 (34a and 34b) of one race 31 and one point on the raceway surface 35 (35a and 35b) of the other race 32.

Figure 65:
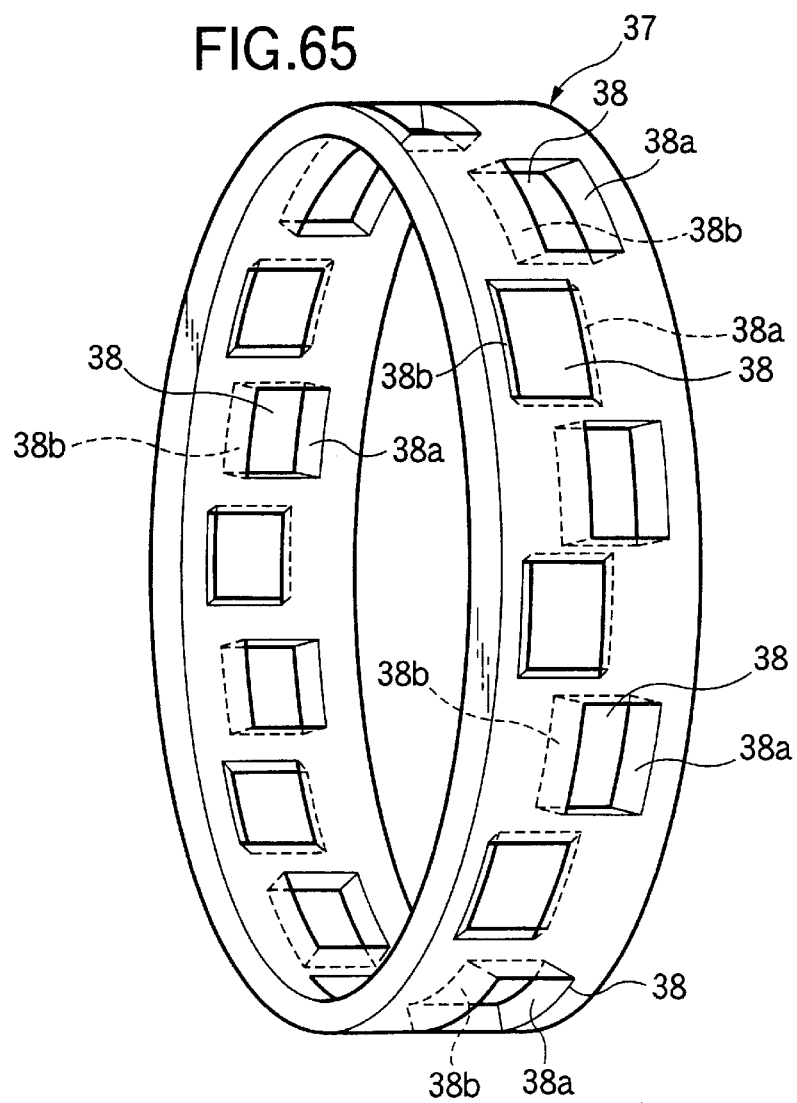
FIG. 65 is a perspective view to show one example of a cage in the 17th embodiment.

For example, the rolling element 36 shown in FIG. 65 is a ball shaped with the top and bottom cut having a pair of planes (opposed faces) 36b and 36b (of a structure wherein the top and bottom parts of the ball are cut to form the planes 36b and 36b). The rolling elements 36, 36 . . . , are built in so that rotation center axes 36c perpendicular to the planes 36b and 36b cross each other, and the outer diameter 36a of each rolling element 36 is always in contact with one point on the raceway surface 34 (34a and 34b) of one race 31 and one point on the raceway surface 35 (35a and 35b) of the other race 32.

The top and bottom cut widths of the rolling element 36 are not limited and the cut percentage of the top and the bottom may be even or may not be even and can be selected as desired without departing from the spirit and the scope of the invention. That is, the opposed faces 36b and 36b of the rolling element 36 may be symmetric or asymmetric; the symmetric opposed faces and the asymmetric opposed faces are within the spirit and the scope of the invention.

FIG. 64 shows one example of a rolling element having two planes which are asymmetric. The embodiment is used particularly for high-speed rotation.

The rolling element 36' of the embodiment has asymmetric planes (opposed faces) 36b' and 36d' and is placed so that the large end 36d of the planes (opposed faces) 36b' and 36d' is directed toward the inner race 32 of the bearing, whereby rotation of the rolling element 36' becomes stabler and lower torque can be provided. Numeral 36a' denotes an outer diameter and numeral 36c' denotes a rotation center axis.

Other components and advantages are similar to those of the rolling element 36' previously described with reference to FIG. 63 and will not be discussed again.

Figure 70:
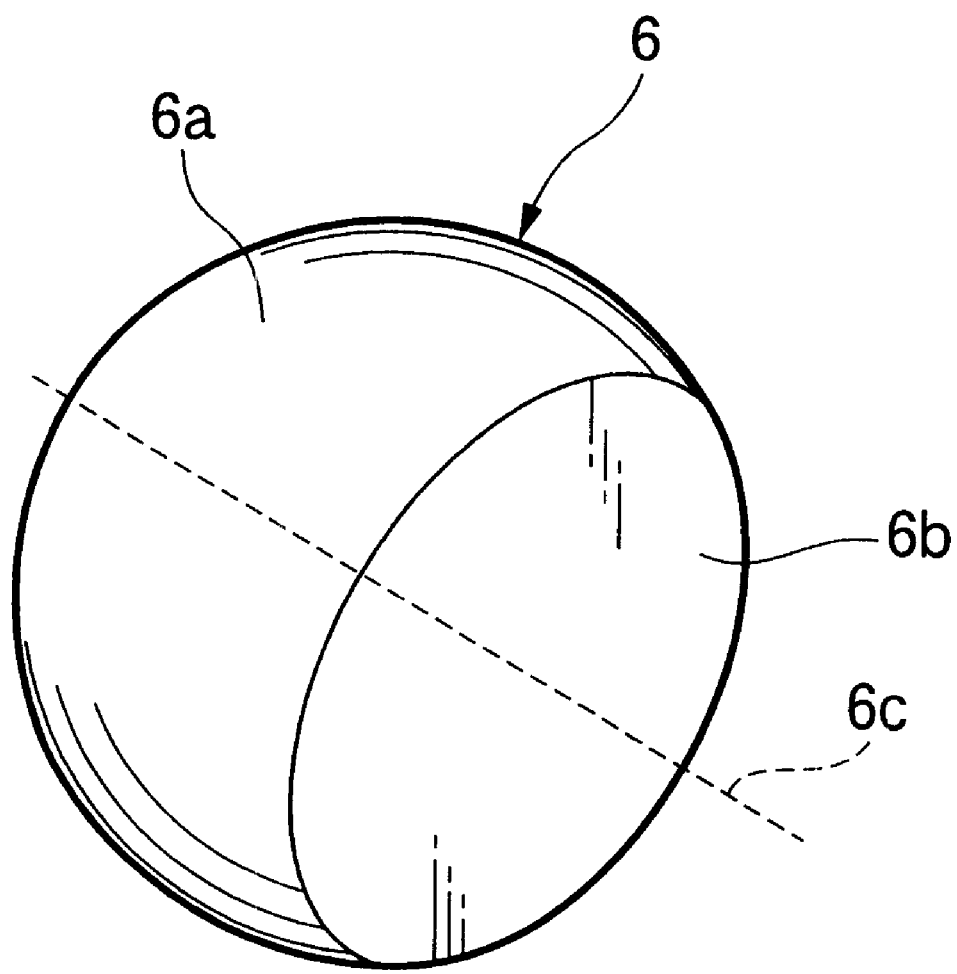
FIG. 70 is an enlarged perspective view to show a modification of a rolling element in the 20th embodiment.

The rolling element 36 may be shaped like a ball comprising one plane formed by cutting the top or the bottom of the ball, as shown in FIG. 70.

The whole shape of the rolling element 36, the presence or absence of the opposed faces 36b and 36b (36d), the magnitude of the curvature in the axial direction in the outer diameter 36, and the like are not limited to the specific shapes described above and can be changed as desired without departing from the spirit and the scope of the invention. That is, for example, the rolling element may comprise both faces in non-parallel with each other in place of the opposed faces 36b and 36b and may have rotation center axis 36c perpendicular to both the faces.

The rolling elements 36, 36 . . . , are built in so that the rotation center axes 36c and 36c perpendicular to the planes 36b and 36b, 36b and 36b in the adjacent rolling elements 36 and 36 cross each other alternately, and the cross state may be orthogonal or may not be orthogonal.

The manner in which the rolling elements 36 are placed like a cross is not limited if the number of rolling elements is the same as that of rolling elements crossing the rolling elements. That is, the rolling elements 36 may be placed like a cross every rolling element or may be placed like a cross every two rolling elements or may be placed like a cross in such a manner of two rolling elements, one rolling element, one rolling element, two rolling elements 36, . . . if the number of rolling elements is the same as that of rolling elements crossing the rolling elements; each manner is within the spirit and the scope of the invention.

The movement of each rolling element 36, 36 is guided by a cage 37 or a separator (spacer) 39.

The cage 37 or the separator (spacer) 39 is not limited if it is of shape having a pocket 38 for retaining and guiding the rolling element 36 or grooves 40 and 40; the shape can be selected or changed as desired without departing from the spirit and the scope of the invention.

The guide manner of the cage 37 is not limited and may be inner race guide, outer race guide, or rolling element guide.

The structure, the shape, and the like of the cage 37 are not limited; for example, the cage 37 may be of integral type or may be made up of several parts.

The material of the cage is not limited. Since a machined cage, a press cage, a resin cage, or the like is selected appropriately, for example, metal of brass, iron, stainless steel, etc., or synthetic resin such as polyethylene (PE) resin, polypropylene (PP) resin, polyacetal (POM) resin, polyarylane sulfide resin represented by polyphenylene sulfide (PPS) resin, polyether ether ketone (PEEK), polyether nitrile (PEN), aromatic polyimide (PI), thermoplastic polyimide (TPI), polyamide imide (PAI), aromatic polyester (LCP), or fluorine-containing resin is selected within the spirit and the scope of the invention.

For example, the cage 37 is structured that as many pockets 38 . . . as the number of the rolling elements 36 . . . in which the adjacent rolling elements 36, 36 can be built so that the rotation center axes 36c and 36c cross each other alternately are placed with equal spacing and like a cross alternately on the circumference of an annular ring.

Both sides 38a and 38b of each pocket 38 in the axial direction thereof are parallel with each other, are neither perpendicular to nor parallel with the rotation axis of the bearing, and are at a constant angle (slope) at equal level to the contact angle of the rolling element 36.

The distance between both the sides 38a and 38b of each pocket 38 in the axial direction thereof is made slightly larger than the width of the rolling element 36.

The whole shape of the pocket 38 is not limited if the pocket 38 has both the parallel sides 38a and 38b each shaped like a slope and the distance between both the sides 38a and 38b is formed slightly larger than the width of the rolling element 36; the whole shape of the pocket 38 can be changed without departing from the spirit and the scope of the invention.

In the embodiment, as many pockets 38 . . . as the number of the rolling elements 36 . . . are placed with equal spacing and like a cross alternately on the circumference, but the invention is not limited to it. The packets 38 . . . may be placed like a cross every two pockets or may be placed like a cross in such a manner of two pockets, one pocket, one pocket, two pockets, . . . if the number of pockets is the same as that of pockets crossing the pockets; each manner is within the spirit and the scope of the invention.

There is a possibility that spin or skew may occur in the rolling element being rotated because of the effects of various factors, and if the attitude of the rolling element cannot well be controlled, there is a possibility that the rotation resistance of the bearing may become large or that smooth rotation may become unable to be provided.

Therefore, according to the embodiment, each pocket 38 of the cage 37 comprises both the parallel sides 38a and 38b made almost the same as the constant angle at the equal level to the contact angle of the rolling element 36 and attitude change of the rolling element 36 caused by spin, skew, etc., of the rolling element 36 can be suppressed by both the sides 38a and 36b of the pocket for retaining the attitude of the bearing, so that low torque of the bearing can be provided.

Figure 66:
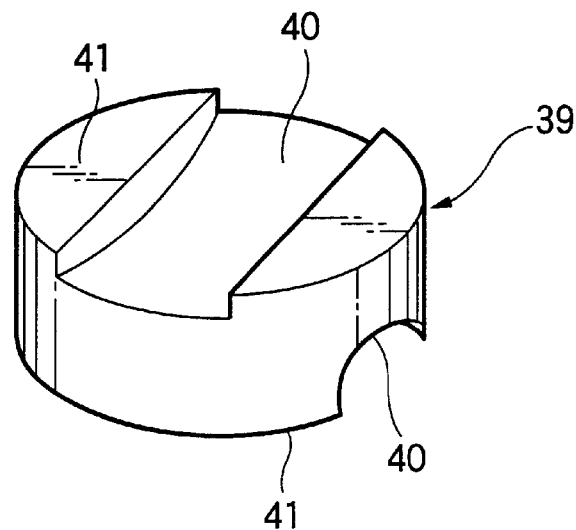
FIG. 66 is a perspective view to show one example of a separator in the 17th embodiment.

The separator 39 shown in FIG. 66 is shaped like a smaller diameter than the diameter of the rolling element 36 and is formed with concave circular arc grooves 40 and 40 like a cross in opposed faces 41 and 41 for retaining the adjacent retained rolling elements 36 and 36 so that the rotation center axes 36c and 36c cross each other as described above. The curvature radius of the circular arc groove 40 may be made roughly the same as or larger than the curvature radius of the outer diameter 36a of the rolling element 36; it may be arbitrary.

If the separators 39 are thus used, the whole bearing can be compacted.

The state in which a preload is given between the rolling element and the raceway surface is not limited, namely, a preload may be given or may not be given at the manufacturing stage; giving a preload and giving no preload at the manufacturing stage are within the spirit and the scope of the invention.

The gap in the bearing can be set small or negative (minus) as required. Accordingly, higher moment rigidity of the bearing can be provided.

Numeral 44 in the figure denotes a seal plate. As the seal plate 44, any of a contact seal, a non-contact seal, or a contact shield is applied and the shape of the seal plate 44 is not limited and a seal plate of a known shape is selected appropriately without departing from the spirit and the scope of the invention.

Numeral 44a in the figure denotes a seal face of the seal plate 44 (hermetic seal face) coming in intimate contact with the inner bottom of an inner race seal groove. The material of the seal or the shield is not limited; preferably it is nitrile rubber or stainless steel.

The placement manner of the seal plate 44 is not limited and the seal plate 44 may be placed on both sides or a single side as required; placing the seal plate 44 on both sides and placing the seal plate 44 on a single side are within the spirit and the scope of the invention. The seal face may be on the outer race side or the inner race side; either case is within the spirit and the scope of the invention.

The shape of the seal, such as a lip shape, is not limited and line contact with the seal face and face contact with the seal face are within the spirit and the scope of the invention.

Whether or not a cored bar exists may be determined as desired and the type having a cored bar and the type having no cored bar may be used properly as required.

The seal groove structures of the outer race 31 and the inner race 32 are not limited either and can be changed whenever necessary without departing from the spirit and the scope of the invention.

The presence or absence of the seal plate 44 is not limited and the seal plate 44 may be installed or may not be installed as required; installing the seal plate 44 and installing no sealing plate 44 are within the spirit and the scope of the invention.

In the invention, stainless steel, ceramics, resin, etc., is used as the material of all or at least one of the three elements of the race (outer race) 31, the race (inner race) 32, and the rolling elements 36 or anticorrosive coating treatment is executed on the surfaces of all or at least one of the three elements of the outer race 31, the inner race 32, and the rolling elements 36 depending on the use environment (corrosive atmosphere environment).

The "stainless steel" is not limited and may be ostennitic stainless steel, martensitic stainless steel, or precipitation hardening family stainless steel and can be changed without departing from the spirit and the scope of the invention.

The type of "ceramic material" is not limited and ceramic material for structure, such as alumina family, zirconia family, silicon nitride family, or silicon carbide family, can be selected.

The base material of the "anticorrosive coating" is not limited; for example, bearing steel, carburized steel, stainless steel, ceramics, etc., is selected appropriately. The "anticorrosive coating" is not limited; for example, soft metal such as gold, silver, or lead, a layered compound such as molybdenum disulfide or tungsten disulfide, black lead, fluorine resin such as polytetrafluoroethylene, hard chromium plating, electroless nickel plating, low-temperature chromic fluoride coating, ceramic coating, etc., is selected appropriately. Further, the anticorrosive coating may be single coating or composite-layer coating; either case is within the spirit and the scope of the invention.

The "resin material" is not limited; preferably it is polyethylene (PE) resin, polypropylene (PP) resin, polyacetal (POM) resin, polyarylane sulfide resin represented by polyphenylene sulfide (PPS) resin, polyether ether ketone (PEEK), polyether nitrile (PEN), aromatic polyimide (PI), thermoplastic polyimide (TPI), polyamide imide (PAI), aromatic polyester (LCP), or fluorine-containing resin. The fluorine-containing resin is not limited; tetrafluoroethylene-perfluoro alkyl vinyl ether copolymer (PEA), tetrafluoroethylene-ethylene copolymer (ETFE), polyvinylidene fluoride (PVDF), tetrafluoroethylene-hexafluoropropylene copolymer (FEP), polychlorotrifluoroethylene (PCTFE), chlorotrifluoroethylene-ethylene copolymer (ECTFE), etc., can be named.

A fiber filler can be mixed with the resin used in the invention to improve the mechanical strength, heat resistance, size stability, etc.

The fiber filler is not limited; boric acid aluminum whisker, potassium titanate whisker, carbon whisker, aramid fiber, aromatic polyimide fiber, liquid crystal polyester fiber, graphite whisker, glass fiber, carbon fiber, boron fiber, silicon carbide whisker, silicon nitride whisker, alumina whisker, aluminum nitride whisker, wollastonite, etc., can be named. Various additives may be mixed without departing from the spirit and the scope of the invention.

For example, an anti-oxidant, a heat stabilizer, an ultraviolet absorbing agent, a light protection agent, a fire retardant, a chemical destaticizer, a fluidity improvement agent, an incoherent property giving agent, a crystallization accelerating agent, a nucleus increasing agent, pigment, dye, etc., can be named.

Figure 69:
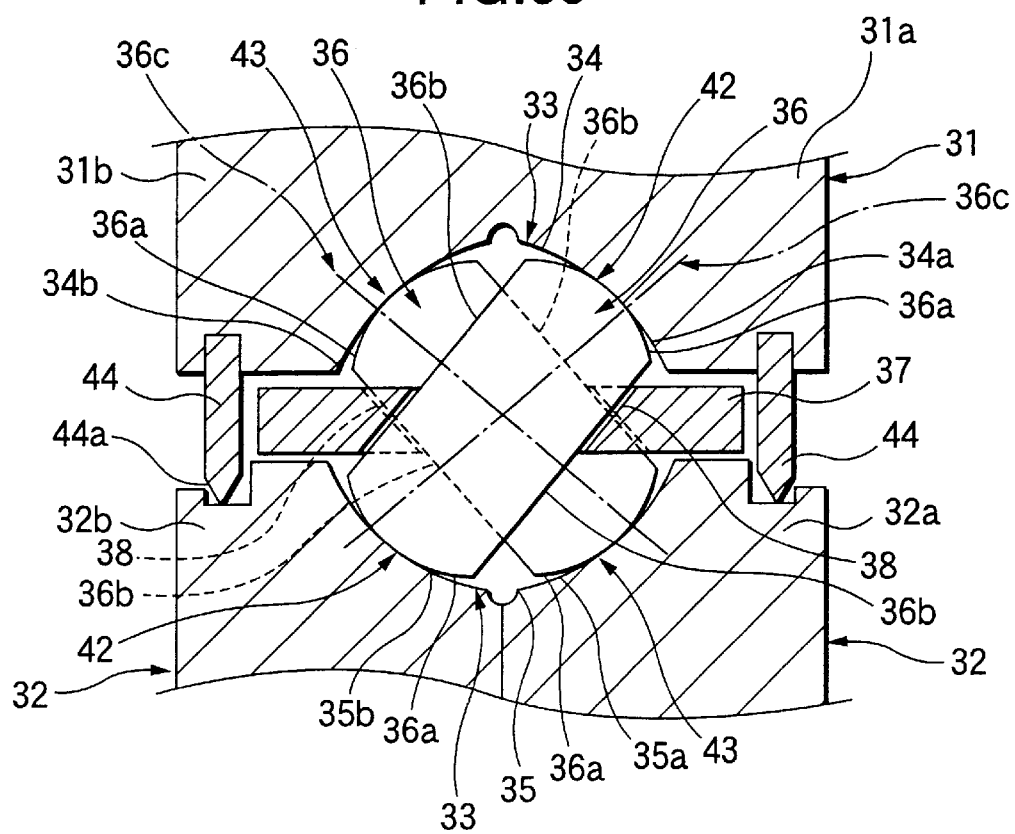
FIG. 69 is a longitudinal sectional view to show a 20th embodiment of the invention.

Next, examples will be discussed based on the specific embodiment shown in FIG. 69. Bearings shown in examples 1 to 9 have the following common basic structure:

First, each of the bearings in the examples basically is made up of a race (outer race) 31, a race (inner race) 32, and rolling elements (balls each shaped with the top and bottom cut) 36. The race (outer race) 31 has a raceway groove 33 consisting up of two raceway surfaces 34a and 34b each having a larger radius than the radius of the rolling element 36 as shown in FIG. 69, the race (inner race) 32 has a raceway groove 33 consisting up of two raceway surfaces 35a and 35b each having a larger radius than the radius of the rolling element 36 as shown in FIG. 69, and the form of the rolling element (ball shaped with the top and bottom cut) 36 shown in FIG. 63 with planes (opposed faces) 36b and 36b being symmetric is adopted.

The rolling elements are placed so that rotation center axes 36c and 36c of the rolling elements perpendicular to the planes (opposed faces) 36b and 36b cross each other, and the movement of each rolling element 36, 36 is guided by a pocket 30, 38 of a cage 37 shown in FIG. 65.

In the cage 37, as many pockets 38, as the number of the rolling elements 36 . . . in which the adjacent rolling elements 36, 36 can be built so that the rotation center axes 36c and 36c cross each other alternately are placed with equal spacing and like a cross alternately on the circumference of an annular ring, as described above.

Example 1

In example 1, outer race 31, inner race 32, and rolling elements 36 are all formed of stainless steel material.
Outer and inner races: Martensitic stainless steel
Rolling elements: Martensitic stainless steel
Cage: Resin
Lubricant: Lithium-family grease
Seal plate: Contact rubber seal made of nitrile rubber
Corrosive environment in which the bearing is used: The bearing is used in a high-humidity environment.
Feature: According to the example, corrosion resistance more excellent than that of a bearing using bearing steel can be provided.

Example 2

In example 2, outer race 31 and inner race 32 are formed of stainless steel material, and rolling elements 36 are formed of ceramic material.
Outer and inner races: Martensitic stainless steel
Rolling elements: Silicon nitride family ceramics
Cage: Fluorine resin
Lubricant: Water-resistant grease
Seal plate: Shield made of stainless steel (non-contact seal plate)
Corrosive environment in which the bearing is used: The bearing is used in high-humidity, water spray, underwater environments.
Feature: According to the example, while the bearing has corrosion resistance, it has a longer life than that of the bearing in the example 1 in water environment.

Example 3

In example 3, outer race 31 and inner race 32 are formed of ceramic material, and rolling elements 36 are formed of stainless steel material.
Outer and inner races: Silicon nitride family ceramics
Rolling elements: Martensitic stainless steel
Cage: Fluorine resin
Lubricant: Water-resistant grease
Seal plate: Shield made of stainless steel (non-contact seal plate)
Corrosive environment in which the bearing is used: The bearing is used in high-humidity, water spray, underwater environments.

Feature: According to the example, while the bearing has corrosion resistance, it has a longer life than that of the bearing in the example 1 in water environment.

Example 4

In example 4, outer race 31 and inner race 32 are formed of stainless steel material, and rolling elements 36 are formed of ceramic material.
Outer and inner races: Precipitation hardening family stainless steel
Rolling elements: Silicon nitride family ceramics
Cage: Fluorine resin
Lubricant: Solid lubrication
Seal plate: Shield made of stainless steel (non-contact seal plate)
Corrosive environment in which the bearing is used: The bearing is used in high-humidity, water spray, underwater, weak acid environments.
Feature: According to the example, the bearing has higher corrosion resistance than the bearing formed of martensitic stainless steel. Preferably, the bearing in the example is used for light load although the use of the bearing is not limited.

Example 5

Example 5 provides a bearing with anticorrosive coating wherein outer race 31 and inner race 32 are covered with anticorrosive coating and rolling elements 36 are formed of stainless steel material.
Outer and inner races: Stainless steel+low-temperature chromic fluoride coating
Rolling elements: Stainless steel
Cage: Fluorine resin
Lubricant: Water-resistant grease
Seal plate: Shield made of nitrile rubber (contact seal plate)
Corrosive environment in which the bearing is used: The bearing is used in high-humidity, water spray, underwater, weak acid environments.
Feature: According to the example, the bearing has higher corrosion resistance and more excellent durability than those of the bearing in the example 1 in environments of water, weak acid, etc.

Example 6

Example 6 provides a bearing with anticorrosive coating wherein anticorrosive coating treatment is conducted for all of outer race 31, inner race 32, and rolling elements 36.
Outer and inner races: Martensitic stainless steel+nickel alloy coating
Rolling elements: Martensitic stainless steel+nickel alloy coating
Cage: Fluorine resin
Lubricant: Water-resistant grease
Seal plate: Shield made of stainless steel (non-contact seal plate)
Corrosive environment in which the bearing is used: The bearing is used in high-humidity, water spray, underwater, weak acid, chemical, alkali environments.
Feature: According to the example, the bearing has higher corrosion resistance and higher hardness than those of the bearing using martensitic stainless steel and hard chromium plating.

Example 7

In example 7, outer race 31, inner race 32, and rolling elements 36 are all formed of ceramic material. No seal plate is used in the example.
Outer and inner races: Alumina family ceramics
Rolling elements: Silicon nitride ceramics
Cage: Fluorine resin
Lubricant: Solid lubrication
Corrosive environment in which the bearing is used: The bearing is used in high-humidity, water spray, underwater, weak acid, alkali environments.
Feature: According to the example, the bearing has a longer life than the bearing in the example 1 or 2. The advantage that the alumina family ceramics are more inexpensive than other ceramics is also provided.

Example 8

In example 8, outer race 31, inner race 32, and rolling elements 36 are all formed of ceramic material. No seal plate is used in the example.
Outer and inner races: Silicon carbide family ceramics
Rolling elements: Silicon carbide family ceramics
Cage: Fluorine resin
Lubricant: Solid lubrication
Corrosive environment in which the bearing is used: The bearing is used in high-humidity, water spray, underwater, weak acid, strong acid, strong alkali, reactive gas environments.
Feature: In the example, the ceramics used for the outer and inner races and the rolling elements have higher corrosion resistance than other ceramics, so that the bearing in the example has a long life even in the strong acid environment.

Example 9

In example 9, outer race 31 and inner race 32 are formed of resin material, and rolling elements 36 are formed of ceramic material.
Outer and inner races: Fluorine resin
Rolling elements: Ceramics
Cage: Fluorine resin
Lubricant: Solid lubrication
Corrosive environment in which the bearing is used: The bearing is used in high-humidity, water spray, underwater, weak acid, strong acid, strong alkali, reactive gas environments.
Feature: According to the example, the bearing has higher durability than that of the bearing in the example 1 under light load. It also has corrosion resistance equal to that of the bearing using ceramics for the outer and inner races. The bearing in the example is also at low cost.

Therefore, according to the examples, the outer diameter 36a of the rolling element 36 comes in contact with one point on the raceway surface 34a of the outer race 31 and one point on the raceway surface 35b of the inner race 32 (the contact points are denoted by 42 and 42), the outer and inner races facing each other, and the adjacent rolling element 36 comes in contact with one point on the raceway surface 34b of the outer race 31 and one point on the raceway surface 35a of the inner race 32 (the contact points are denoted by 43 and 43).

Since the rolling elements 36 and 36 cross each other alternately at contact angle, one bearing can receive a radial load, axial loads in both directions, and a moment load.

One rolling element 36 is in point contact only with one point on the raceway surface 34a (42) and one point on the raceway surface 35b (42) and another rolling element 36 is in point contact only with one point on the raceway surface 34b (43) and one point on the raceway surface 35a (43), so that slip caused by large spin in the four point contact ball bearing or the three-point contract ball bearing in the related art is small and the spin wear resistance characteristic can be improved.

Further, the rolling element 36, 36 and the outer race 31, the inner race 32 come in point contact with each other, so that rolling resistance is small and low torque can be provided as compared with the cross roller bearing.

Consequently, the whole apparatus can be compacted, reduced in weight, and improved in durability, and costs can also be reduced.

Stainless steel, ceramics, resin, and the like are used for the inner race, the outer race, and the rolling elements of the bearing, whereby the corrosion resistance of the bearing is improved and anticorrosive coating treatment is conducted, whereby corrosive substance cannot directly corrode the underlying portion of the bearing material and thus the bearing can be provided with a long life.

According to the invention, between the outer and inner races, the rolling elements are placed so as to cross each other alternately on the circumference, so that one bearing can receive a radial load, axial loads in both directions, and a moment load. Since each rolling element is always in contact only with two points on the outer and inner races, the slip caused by large spin in the four-point contact ball bearing or the three-point contract ball bearing in the related art is small and the spin wear resistance characteristic can be improved. Since the bearing gap can be set small or negative as required, high moment rigidity can be provided. Further, the rolling element and the race come in point contact with each other, so that rolling resistance is small and low torque can be provided as compared with the cross roller bearing. Consequently, the whole apparatus can be compacted, reduced in weight, and improved in durability, and costs can also be reduced.

Stainless steel, ceramics, resin, and the like are used for the inner race, the outer race, and the rolling elements of the bearing, whereby the corrosion resistance of the bearing is improved and anticorrosive coating treatment is conducted, whereby corrosive substance cannot directly corrode the underlying portion of the bearing material and thus the bearing can be provided with a long life.

The another embodiments of a rolling bearing device of the present invention will be described with reference to the accompanying drawings. However, a retainer and a roller is the same as the above-mentioned embodiment, so that detailed description thereof is omitted.

The rolling bearing device of the present invention is constructed such that the spindle of a machine tool or the rotation shaft of another general high-speed rotary machine is supported by using at least one rolling bearing having the following construction. In other words, the number of the rolling bearings supporting the rotation shaft should not be especially limited but may be one or more, as suitably selected if necessary. Moreover, this rolling bearing may be used in combination of another type bearing such as a cylindrical roller bearing.

Figure 71A:
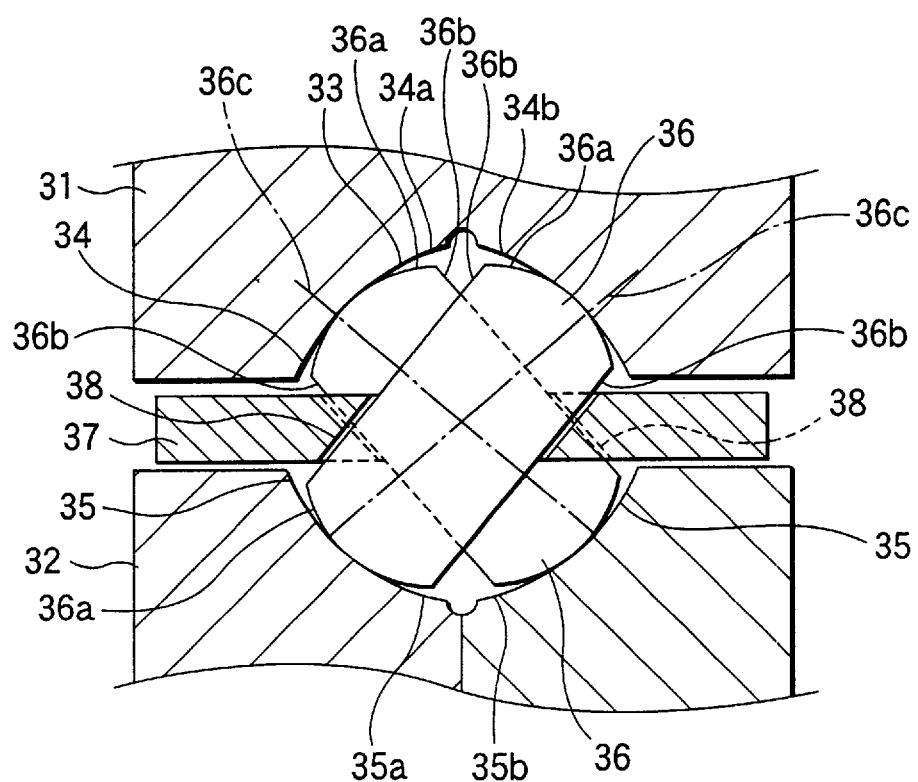
FIG. 71A is a sectional view showing a portion of a rolling bearing constructing a rolling bearing device of the present invention, in an enlarged scale.
Figure 71B:
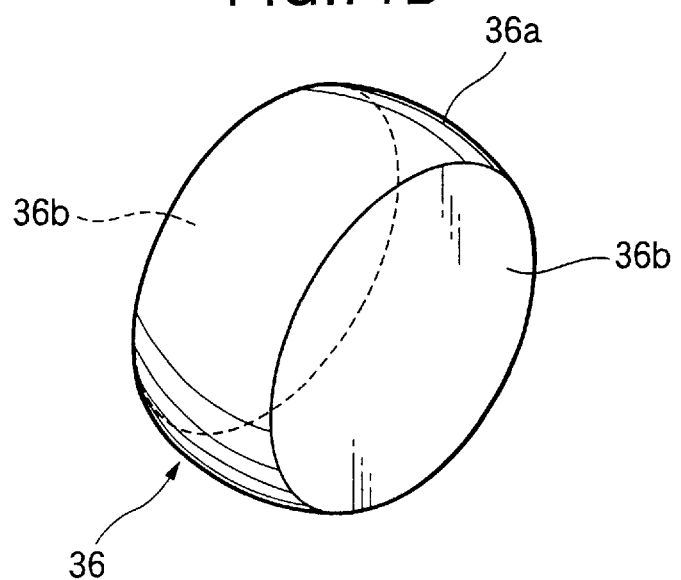
FIG. 71B is a perspective view of a rolling element to be incorporated into the bearing shown in FIG. 71A.
Figure 72:
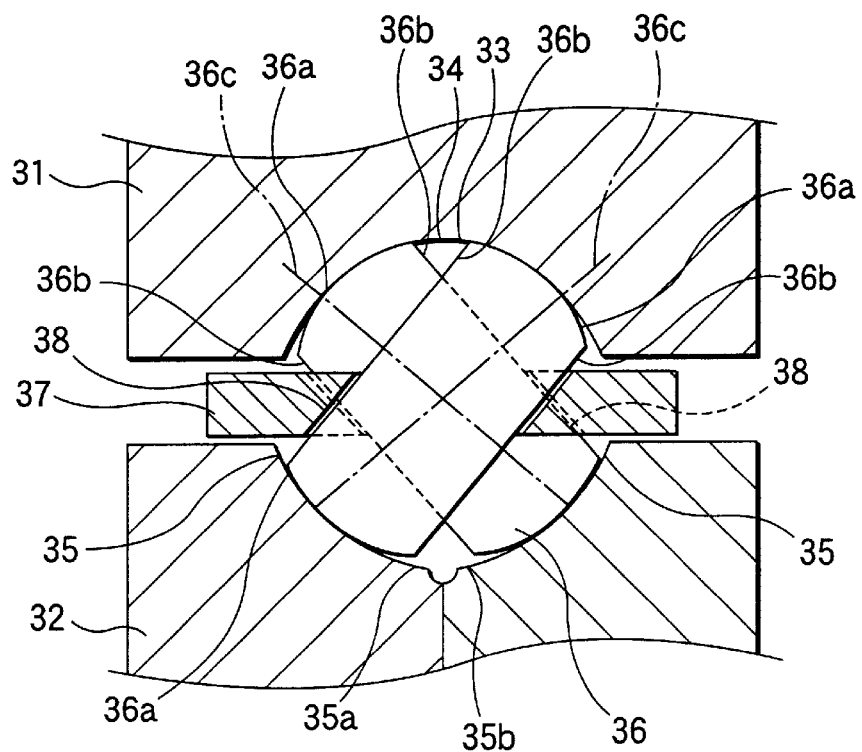
FIG. 72 is a sectional view showing another embodiment of the rolling bearing.
Figure 73:
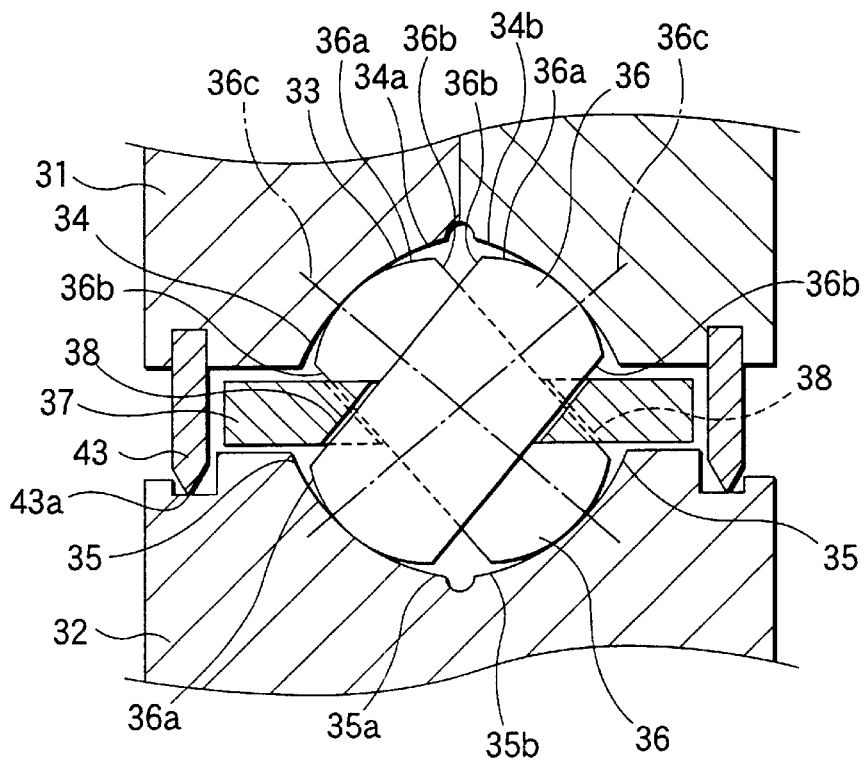
FIG. 73 is a sectional view showing another embodiment of the rolling bearing.

FIG. 71 shows one example of the type having an integral outer race and a split inner race which have two raceway surfaces 34a and 34b, 35a and 35b, respectively; FIG. 72 shows one example of the type having an integral outer race and a split inner race, of which the outer race has one raceway surface 34 whereas the inner race has two raceway surfaces 35a and 35b; and FIG. 73 shows one example of the type having a split outer race and an integral inner race, which have two raceway surfaces 34a and 34b, and 35a and 35b, respectively.

The rolling element 36 is an upper/lower cut-away ball having a set of flat surfaces (or mutually opposing surfaces) 36b and 36b (i.e., a structure having the mutually opposing surfaces 36b and 36b by cutting the upper and lower portions of a ball, as in the following). The individual rolling elements 36, 36, - - - , and so on are so incorporated that the rotation axes 36c normal to the flat surfaces 36b and 36b cross each other, and the outside diameter 36a of each rolling element 36 always makes individual two-point contacts either with the raceway surface 34 (34a) of one race 31 and the raceway surface 35 (35b) of the other race 32 or with the raceway surface 34 (34b) of one race 31 and the raceway surface 35 (35a) of the other race 32.

The rolling element 36 should not be especially limited in the cut widths at its upper/lower portions, and the cut widths of the upper/lower ends may be equal or may not so that its ratio can be arbitrarily selected within the scope of the present invention. In other words, the mutually opposing surfaces 36b and 36b of the rolling element 36 may be set symmetric or asymmetric, and either this symmetric or asymmetric setting falls within the scope of the present invention.

Figure 74A:
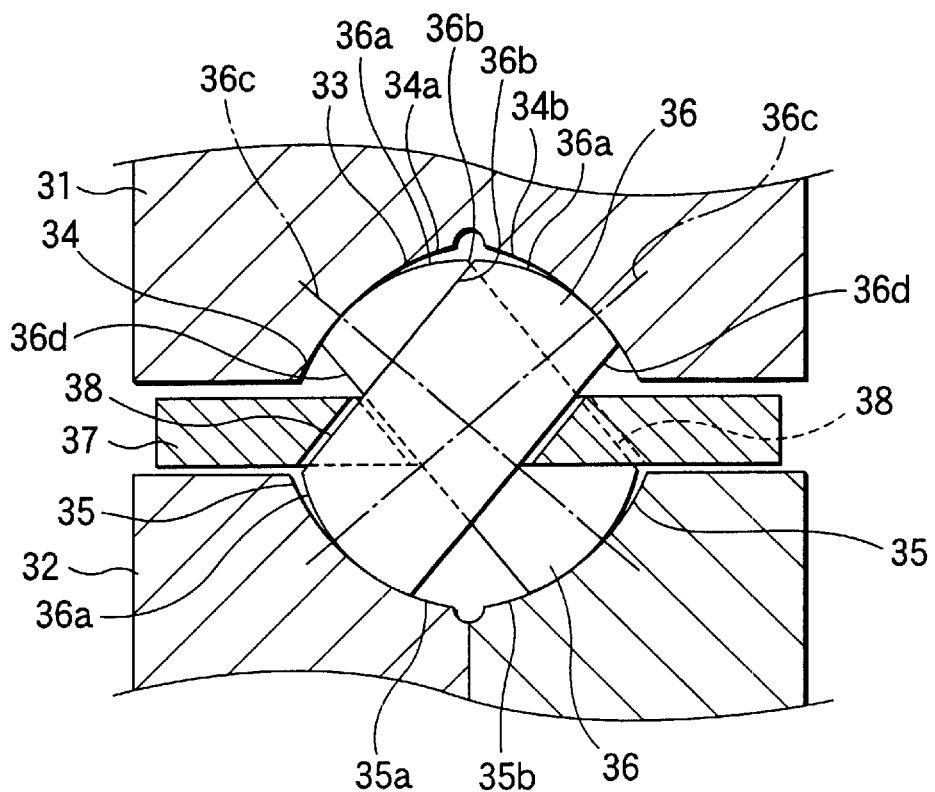
FIG. 74A is a sectional view showing another embodiment of the rolling bearing.
Figure 74B:
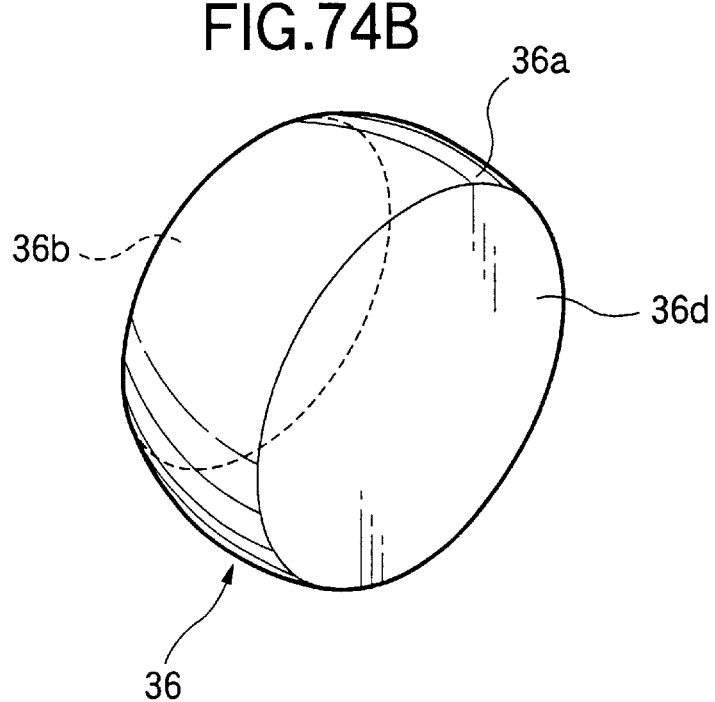
FIG. 74B is a perspective view showing a rolling element to be incorporated into the bearing shown in FIG. 74A.

FIGS. 74A and 64B show one embodiment of a rolling element having one set of asymmetric flat surfaces, as used especially for the case of high-speed rotations.

The rolling element 36 of the present embodiment has the asymmetric flat surfaces (or mutually opposing surfaces) 36b and 36d, and is enabled to stabilize its rotation more and to realize a lower torque by arranging the larger ends 36d of the flat surfaces (or mutually opposing surfaces) toward the inner race 32. Reference characters 36a designate the outside diameter, and characters 36c designate rotation axes.

The remaining constructions, actions and effects will be omitted because they are similar to those of the rolling element 36 which has been described with reference to FIG. 71.

Figure 75A:
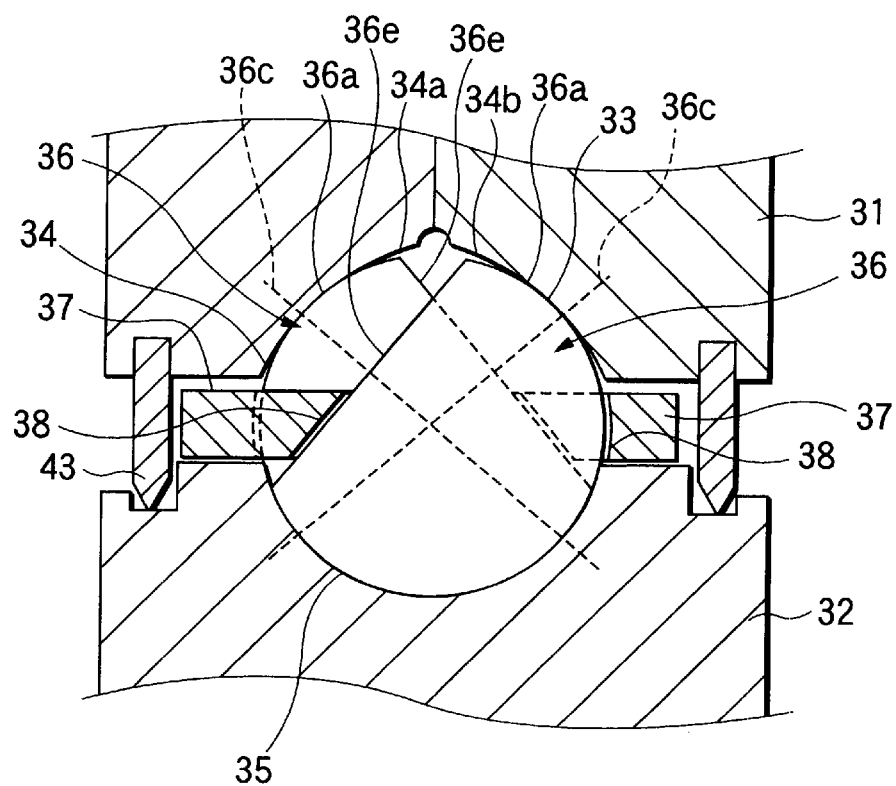
FIG. 75A is a sectional view showing another embodiment of the rolling bearing.
Figure 75B:
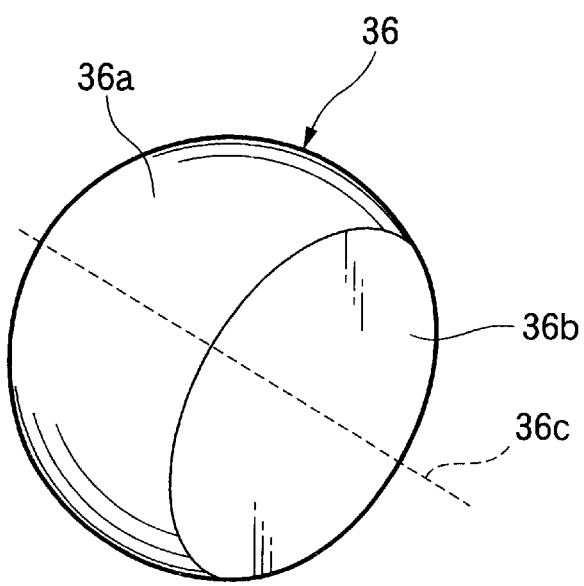
FIG. 75B is a perspective view showing a rolling element to be incorporated into the bearing shown in FIG. 75A.

Moreover, the rolling element 36 may have a ball shape (or one-side cut spherical shape) by cutting either the upper or lower portion to form one flat surface (or cut surface) 36e, as shown in FIGS. 75A and 75B. The cut (or removed) width of this one-side cut surface 36e should not be especially limited, and the shape of the cut surface 36e should not be limited to the flat surface but can select an arbitrary shape. This one-side cut bail construction thus made has less portions worked than the aforementioned upper/lower cut ball so that it can be manufactured at a lower cost.

Here, the entire shape of the rolling element 36, the presence or absence of the mutually opposing surfaces 36b and 36b (and 36d), and the value of the curvature in the axial direction of the outside diameter 36a should not be limited to the aforementioned specific values at all but can be arbitrarily modified within the scope of the invention. For example, the mutually opposing surfaces 36b and 36b may be replaced by two non-parallel surfaces and may have rotation axes normal to the two surfaces.

Figure 76:
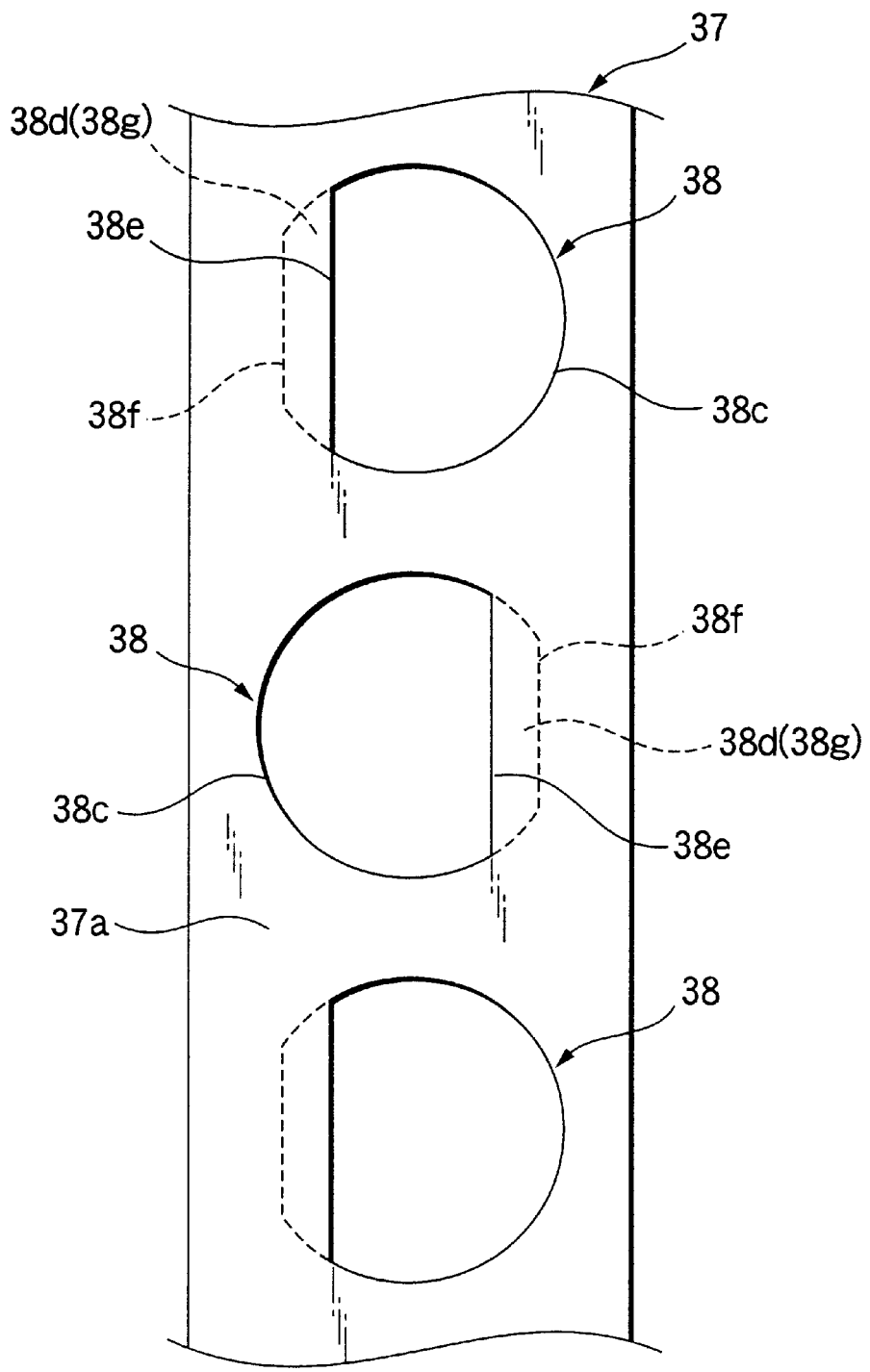
FIG. 76 is a partially enlarged view showing one embodiment of a retainer to be incorporated into the bearing of FIG. 75.

In a retainer 37 shown in FIG. 76, there are alternately formed in the circumferential direction pockets 38, 38, - - - , and so on, which can incorporate the adjoining individual rolling elements 36, 36, - - - , and so on alternately so that the rotation axes 36c and 36c normal to the cut surfaces 36e and 36e may cross each other.

Figure 77A:
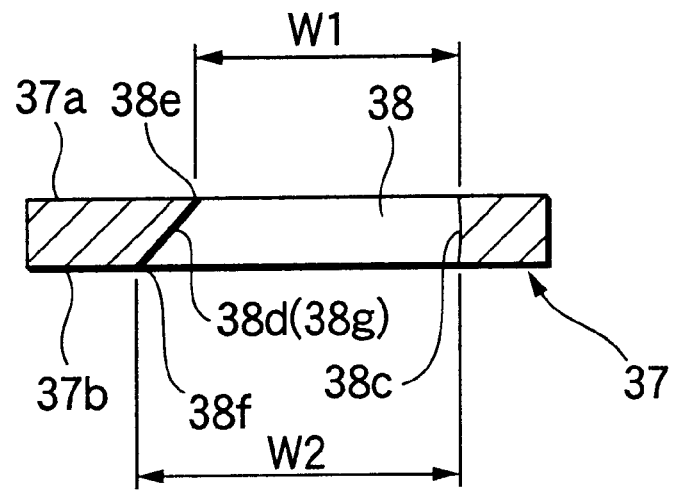
FIG. 77A is a partially sectional diagram of a pocket portion of the retainer of FIG. 76.

The pocket 38 is formed into a dope shape, as seen in a top plan view, to have an arc surface 38c of a slightly larger diameter than that of the rolling element 36, and a flat surface 38d joining the end portions of the arc surface 38c. One side 38e on the side of an outside diameter 7a and one side 38f on the side of an inside diameter 37b are joined through a slope surface 38g from the outside diameter 37a to the inside diameter 37b, and an opening width w31 on the side of the outside diameter 37a is made diametrically smaller than an opening width w32 on the side of the inside diameter 37b (as shown in FIG. 76 and FIG. 77A).

Moreover, the centers of the arc surfaces 37a of the individual pockets 38 adjoining in the circumferential direction are arranged on a common circumference, and the one side 38e on the side of the outside diameter 37a is displaced in the width direction, as seen in a top plan view. In other words, the individual pockets 38 adjoining in the circumferential direction are arranged to have their slope surfaces 38g alternately on the right and left sides for the individual pockets 38 (as referred to FIG. 76).

When the retainer 37 exemplified in the present embodiment, therefore, the rolling element 36 arranged in each pocket 30 is retained to have its cut surfaces 36e and 36e directed toward the outside diameter 37a, i.e., toward the outer race 31 so that the rotation axes 36c and 36c of the individual rolling elements 36 and 36 adjoining each other may cross each other alternately.

Figure 77B:
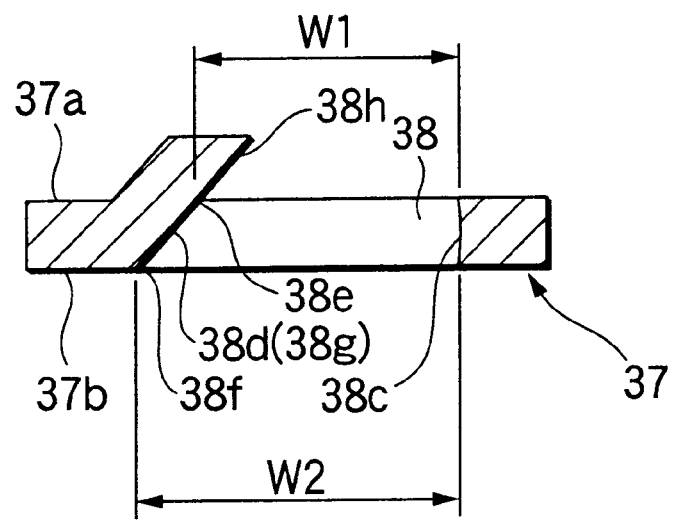
FIG. 77B is a partially sectional view showing another embodiment.

As shown in FIG. 77B, moreover, there can be adopted a structure in which a one-side fall preventing member 38h is formed to rise from the outside diameter 37a on the extension of the slope surface 38g with an equal slope. The one-side fall preventing member 38h should not be especially limited to the shown shape, but a construction have no influence upon the rotation of the rolling element 36 would fall within the scope of the present invention.

Figure 78:
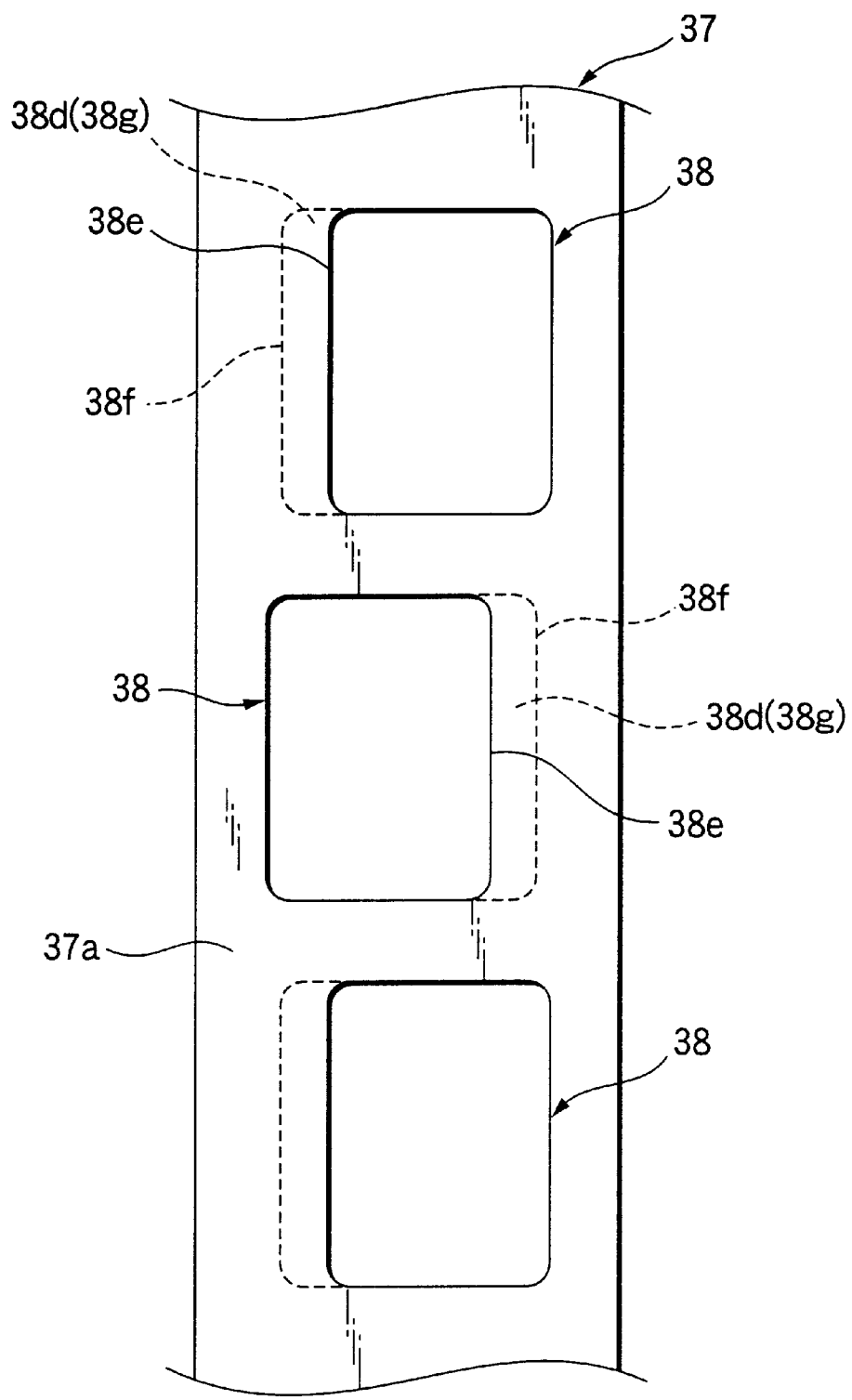
FIG. 78 is a partially enlarged view showing another embodiment of the retainer.

The retainer 37 can also adopt a retainer structure shown in FIG. 78.

Figure 79:
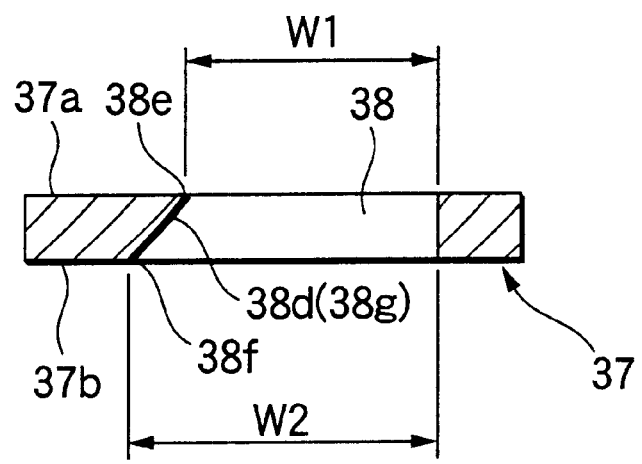
FIG. 79 is a sectional view of the pocket portion of the retainer of FIG. 78.

In the present embodiment, the pocket 38 is formed into a rectangular shape, as shown in a top plan view. The one side 38e extending in the circumferential direction on the side of the outside diameter 37a and the one side 38f located below the former on the side of the inside diameter 37b are joined on the slope surface 38g from the outside diameter 37a to the inside diameter 37b, and the opening width w31 on the side of the outside diameter 37a is made diametrically smaller than the opening width w32 on the side of the inside diameter 37b (as shown in FIG. 78 and FIG. 79).

Moreover, the individual pockets 38 to be arranged in the circumferential direction are arranged alternately displaced in a top plan view.

In other words, the individual pockets 38 adjoining in the circumferential direction are alternately staggered at every pockets 38 (as shown FIG. 78).

For the retainer 37 of the present embodiment, a larger grease retaining space can be taken than that for the retainer 37 of FIG. 76. The remaining actions and effects are similar to those of the mode of the retainer shown in FIG. 86.

Figure 80:
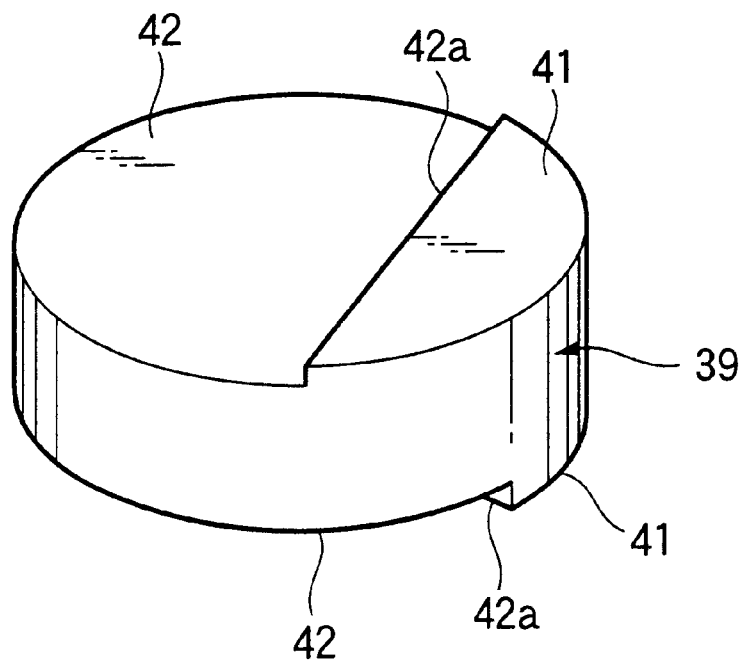
FIG. 80 is a perspective view of a separator for the rolling element shown in FIG. 75B.

Moreover, the arrangement of a separator (or spacer) 39 having a recessed surface 42, as shown in FIG. 80, also falls within the scope of the present invention.

The separator 39 is made to have a smaller diameter than that of the rolling element 36, and the recessed surfaces 42 and 42 are so formed on mutually opposing surfaces 41 and 41 as to hold the individual rolling elements 36 and 36 to be retained adjacent to each other, so that the rotation axes 36c and 36c normal to the cut surfaces 36e and 36e may cross each other, as has been described hereinbefore. In short, the cut surface 36e of the rolling element is held to oppose a stepped portion 42a of the recessed surface 42. Here, the separator shape, as exemplified in the present embodiment, presents just one embodiment so that it can be arbitrarily modified in design without any restriction.

The state, in which a pre-load is applied between the rolling element and the race, is not restrictive. Specifically, the pre-load may be applied at the manufacture stage or may not, and either falls within the scope of the present invention. The application of the pre-load is advantageous for improving the rigidity of the bearing.

Moreover, the clearance in the bearing is set less than necessary or set negative (or minus). Then, it is possible to realize a higher moment rigidity of the bearing.

The presence or absence of the sealing plate is not especially restrictive, and the sealing plate may be mounted or may not within the scope of the present invention.

The sealing plate may be any of a contact type seal, a non-contact type seal and a shield type. The shape is not especially restrictive but can be suitably selected from the well-known shapes. The material for the seal or shield is not especially restrictively interpreted but may preferably be nitrile rubber or stainless steel.

The arrangement of the sealing plate is not especially restrictive. The sealing plate may be arranged on the two sides or on one side, if necessary, within the scope of the present invention. The sealing surface may be provided on the side of the outer race or the inner race within the scope of the present invention.

The seal shape is not especially limited to a lip shape and may cause a linear contact or a facial contact with the sealing surface within the scope of the present invention.

Moreover, the presence or absence of the core is arbitrary, and the type with and without the core may be employed separately, if necessary, and should not be especially restrictively interpreted.

Here, FIG. 73 shows the case in which the inner race 32 is integrated whereas the outer race 31 is halved and in which a sealing plate (or contact seal) 43 is disposed on the end surface of the outer race 31. Reference characters 43a designate the seal surface of a sealing plate 44, which comes into close contact with the inner bottom of the inner race seal groove.

Moreover, the seal groove structures of the outer race 31 and the inner race 32 are not especially restrictive but can be suitably modified within the scope of the present invention.

The material for the outer race 31, the inner race 32 and the rolling element 36 should not be especially restrictive but may be exemplified by any of bearing steel, blister steel, stainless steel, heat resisting steel such as M50 and ceramics, and these materials fall within the scope of the present invention.

The stainless steel is not especially restricted in its components but can be modified in austenitic stainless steel, martensitic stainless steel or precipitation hardened stainless steel within the scope of the present invention.

The kinds of ceramics materials are not especially restrictive but can be selected from structural ceramic materials including alumina, zirconia, silicon nitride and silicon carbide.

Moreover, it is not restrictive to employ the common material for the outer race 31, the inner race 32 and the rolling element 36. If necessary, individually different materials can be used (as a hybrid) for a modification within the scope of the present invention. For example, the material for the outer race 31 and the inner race 32 can be exemplified by bearing steel, and the material for the rolling element 36 can be exemplified by ceramics (e.g., silicon nitride).

The surface treatment of the outer race 31, the inner race 32 and the rolling element 36 is not especially restrictive but may be exemplified by a curvurizing or nitriding surface strengthening treatment, or by a surface filing treatment within the scope of the present invention. In this filming treatment, a metal, a metal compound or a ceramic film is suitably selected as the filming material. The film may be either single or composite within the scope of the present invention. For example, the rolling element 36 it coated on its surface with a silicon nitride film The lubricating agent for the bearing is not especially restricted but may be exemplified by grease, oil or water. Moreover, the lubrication method is not especially restricted either but selects grease, a circulation feed, a spray feed, an oil air feed or a jet feed suitably.

Figure 81:
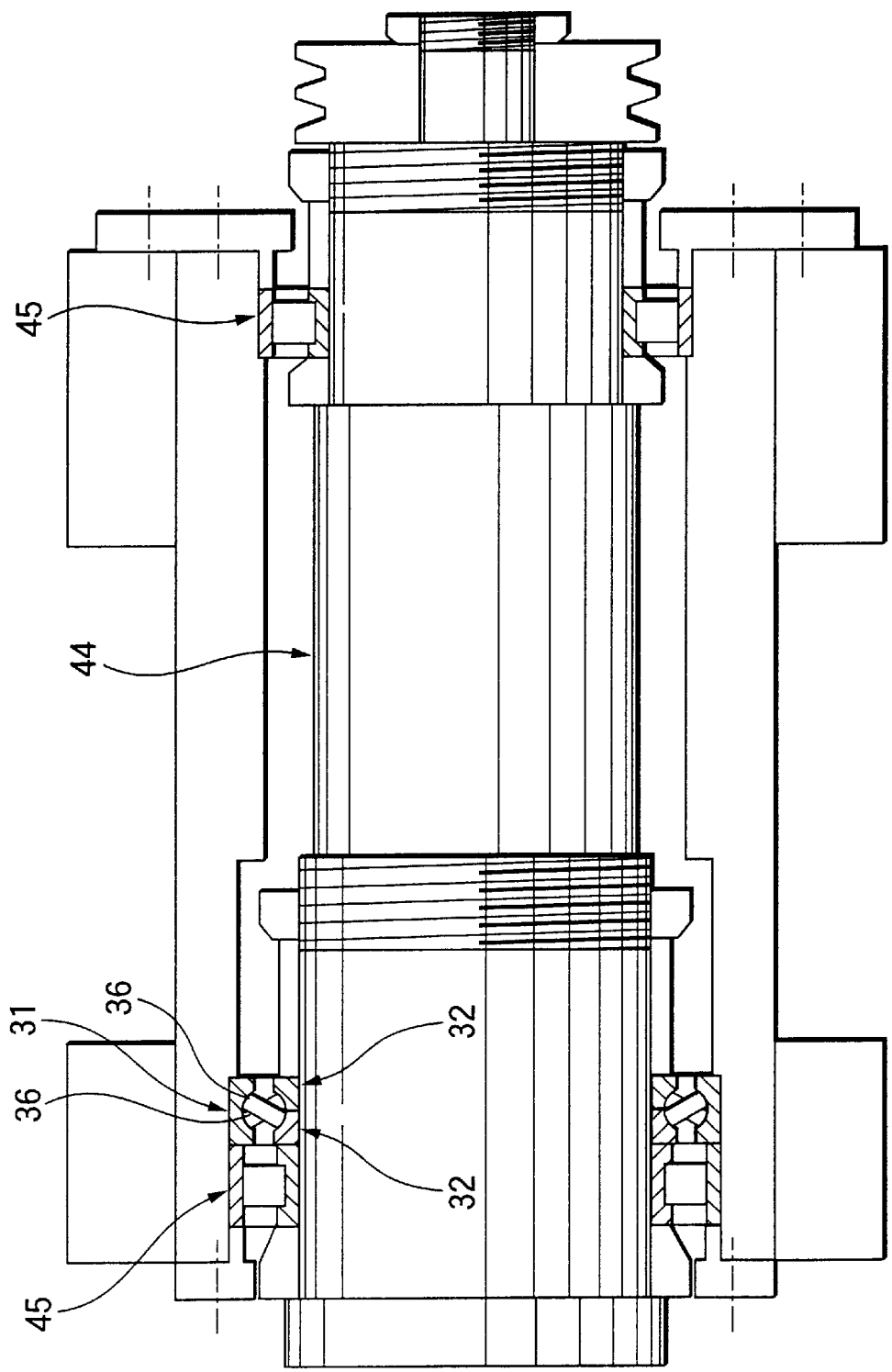
FIG. 81 is a sectional view showing a 21st embodiment of the bearing device of the present invention.

[21st Embodiment (FIG. 81)]

This embodiment is constructed by using two ordinary cylindrical roller bearings 45 and one aforementioned rolling bearing on the outer circumference of a shaft 44. Specifically, in the present embodiment, the rolling bearing shown in FIG. 71, in which the outer race 31 and the inner race 32 are composed of the two races 34a and 34b, and 35a and 35b of different curvatures and in which the outer race 31 is integral whereas the inner race 32 is divided, is employed in place of the two angular ball bearings in the bearing device of the prior art. In order to improve the axial rigidity of the bearing device, moreover, the internal clearance of the bearing is set negative.

Figure 82:
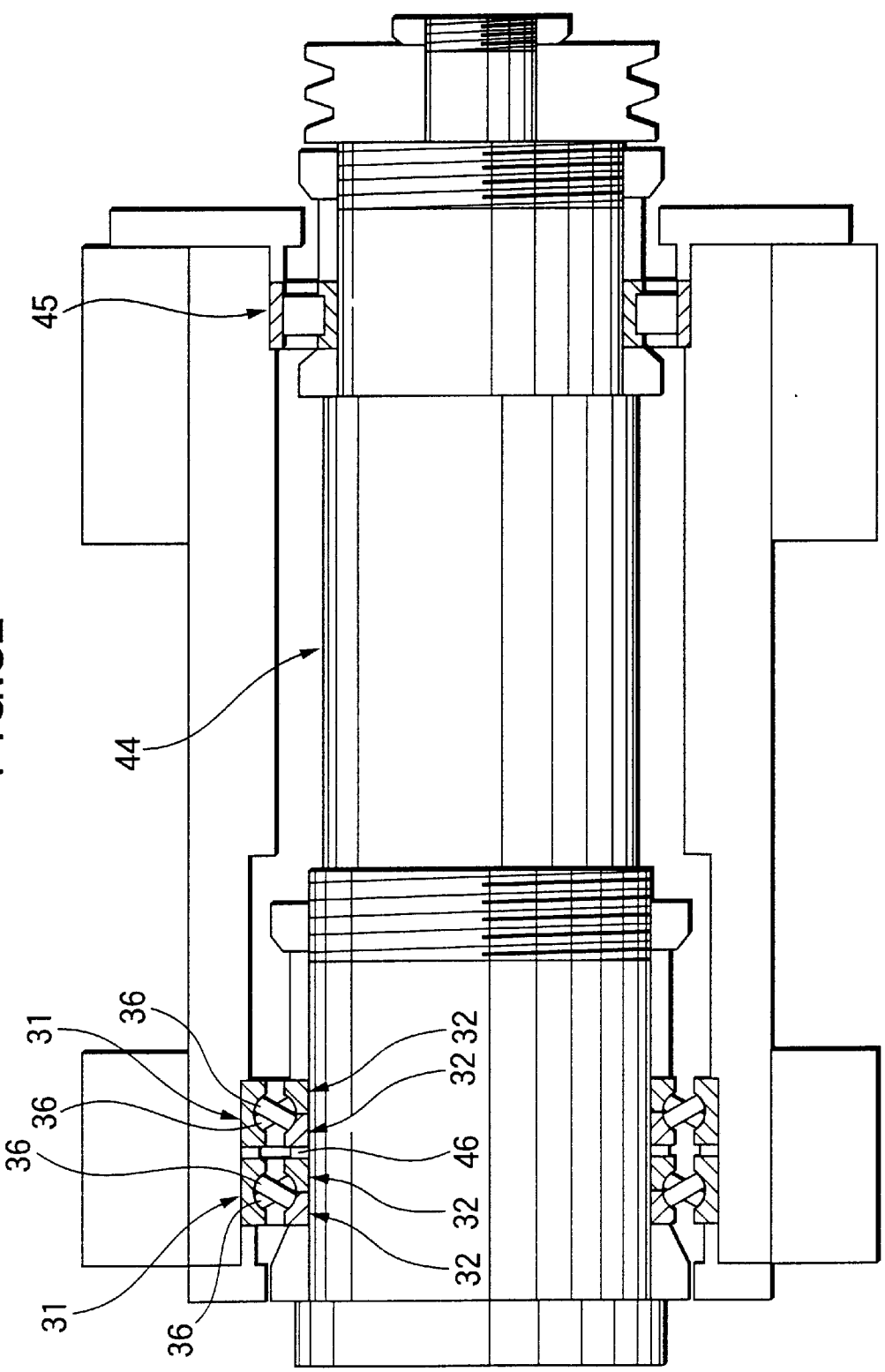
FIG. 82 is a sectional view showing a 22th embodiment of the bearing device of the present invention.

[22th Embodiment (FIG. 82)]

This embodiment is constructed by using one ordinary cylindrical roller bearing 45 and two aforementioned rolling bearings on the outer circumference of a shaft 44. Specifically, in the present embodiment, the rolling bearing shown in FIG. 71, in which the outer race 31 and the inner race 32 are composed of the two races 34a and 34b, and 35a and 35b of different curvatures and in which the outer race 31 is integral whereas the inner race 32 is divided, is employed in place of the four angular ball bearings in the bearing device of the prior art.

Therefore, the rolling elements 36 are so arranged between the outer and inner races 31 and 32 as to stagger alternately on the circumference so that the radial load, the axial loads in the two directions, and the moment load can be borne by the single bearing. This single bearing acts as two angular bearings. Moreover, the each rolling element 36 contacts at only two portions with the outer and inner raceway surfaces 34 and 35 so that the large slippage, as might otherwise be caused by the four-point contact ball bearing of the prior art, can be reduced while improving the spin resisting wear characteristics. If necessary, moreover, the bearing clearance can be set small or negative to realize a high rigidity. Moreover, the rolling element 36 and the outer and inner races 31 and 32 make the point contacts so that the rolling resistance can be reduced to realize high-speed rotations.

By employing the bearing, as shown in FIG. 71, in a high-speed rotating bearing device such as the spindle of a machine tool, according to this invention, the functions of two angular bearings can be realized by the single bearing. Moreover, a higher spin resisting wear, a lower torque and a higher rigidity than those of the four-point contact ball bearing can be obtained to make the axial size of the supporting bearing device of the prior art smaller so that the entire device can be made compact and light and improved in durability and cost.

Referring now to the accompanying drawings, a 23rd embodiment of a rolling bearing according to the present invention will be explained.

The embodiments are only embodiments disclosed for describing the rolling bearings of the invention and it is to be understood that the invention is not limited to the specific embodiments thereof and the combination and arrangement of parts may be resorted to without departing from the spirit and the scope of the invention.

A roller bearing according to the present invention comprises a race (outer race) 61; another race (inner race) 62; a plurality of rolling elements 65, 65, . . . incorporated into a raceway groove 62, the groove being defined between the inside diameter of the outer race 61 and the outside diameter of the inner race 62.

The outer race 61 has a raceway groove 63 that is formed into a desired shape by means of raceway surfaces 61a and 61b formed along the inside diameter of the race (outer race) 61. A roller bearing including the races 61 and 62 of non-split type or a roller bearing including the races 61 and 62, either or both being axially split into two pieces along the widthwise center thereof, may be employed.

Some ball bearings of two-way split type are assembled into one piece by use of bolts or rivets. If a ball bearing of two-way split type is fastened by use of bolts or rivets, a necessity for a pre-load or clearance adjustment is obviated.

The bearing comprises an inner race 61 and outer race 62. A plurality of rolling elements 65, 65, . . . are rotatably interposed between the raceway grooves 63 thereof. When only either of the races consists of two raceway surfaces, in the race consisting of two raceway surfaces, each raceway surface 51a, 61a' (62a, 62a') has a larger radius than that of the rolling element 65 and in the race made of one raceway surface, the raceway surface 61a (62a) has a larger radius than that of the rolling element 65. When each race consists of two raceway surfaces, each of the raceway surfaces 61a and 61a' and 62a and 62a' has a larger radius than that of the rolling element 65.

Each raceway surface 61a (61a'), 62a (62a') may be of any shape, such as arch or V in cross section, and may be shaped like a curve, a line, or the like and is not limited if it has a shape appropriate for rolling of the rolling element 65. For example, a Gothic arch, etc., is applied.

Figure 84:
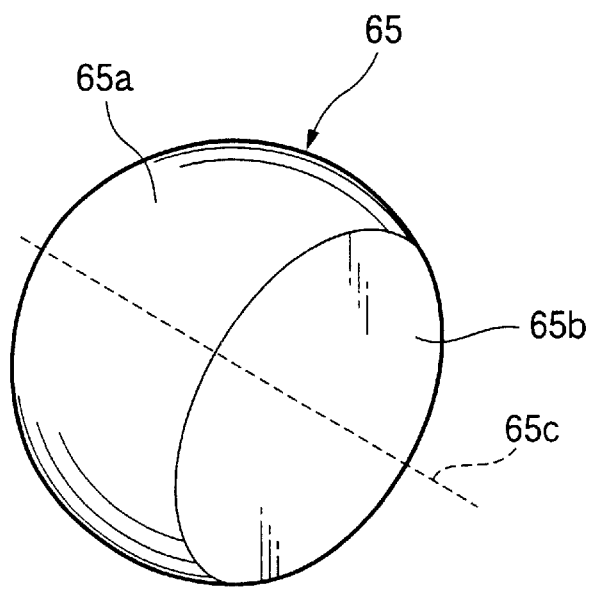
FIG. 84 is a perspective view to show one embodiment of a rolling element built in the rolling bearing of the invention.

Each of rolling elements 65 has an outer diameter portion acting as a rolling contact surface that has a radius of curvature in an axial direction thereof. As shown in FIG. 84, the rolling element 65 is formed into a sphere with a cut portion. The sphere has a radius that is smaller than a radius of curvature of 'the raceway surfaces 61a (61a') and 62a (62a') of the inner or outer race. Namely, the rolling element has a ball shape (or one-side cut spherical shape) by cutting either the upper or lower portion to form one flat surface (or cut surface) 65b.

The rolling elements are arranged in a circumferential direction of the bearing in such a manner that the cut surfaces 65b of adjacent rolling elements are crossed alternatively and the outer diameter portion 65a of each rolling element is always contact at two points with one of the raceway surface 61a (or 61a') of the race 61 and the raceway surface 62a (62a') of the race 62.

For example, the rolling elements 65 are assembled in such a manner that theirs rotating center axes extended normal to the cut surfaces 65b are alternatively intersected/crossed each other while the outer diameter portion 65a of each rolling element 65 is always contacted at two points with of one of the raceway surface 61a (or 61a') of the race 61 and the raceway surface 62a (62a') of the race 62.

The cut width of the cut face 65b of one side of the rolling element 65 is not limited and the shape of the cut face 65b is not limited to the flat face either and can be selected as desired without departing from the spirit and the scope of the invention.

Generally, as rolling elements of the same size, balls can be manufactured at lower costs and with higher accuracy than rollers.

The closer to a complete ball as the shape of the rolling element, the lower the manufacturing costs of the rolling element. In the embodiment, the rolling element 65 has the outer shape like a ball with one side cut and the number of parts to be worked on becomes smaller than that of the rolling element shaped like a ball with both sides cut; the rolling element in the embodiment can be manufactured at lower costs.

The rolling elements 65, 65, ... are incorporated such that the rotation center axis 65c perpendicular to the mutually opposing surfaces 65b, 65b of one rolling element 65 crosses that of another, adjacent rolling element 65 at a right angle or at an arbitrary angle.

So long as the rolling elements 65 oriented in one direction are equal in number with those oriented in another direction, crossing may arise every arbitrary number of rolling elements. In other words, the rolling elements 65 may cross each other alternately. Further, so long as the rolling elements 65 oriented in one direction are equal in number with those oriented in another direction, the rolling elements 65 may cross each other every two elements or in a pattern of two elements in a first orientation, one element in a second orientation, one element in the first orientation, and two elements in the second orientation. All of the rolling elements 65 set forth fall within the scope of the invention.

The motions of respective rolling elements 65, 65 . . . are guided by a retainer 6.

The cage 66 is formed like an annular ring having pockets 67 . . . for retaining and guiding the rolling elements 65. The shape of the cage 66 is not limited to the shape shown in the embodiment and can be selected or changed as desired without departing from the spirit and the scope of the invention.

The guide manner of the cage 66 is not limited and may be inner race guide, outer race guide, or rolling element guide. The structure of the cage 66 is not limited; the cage 6 may be of integral type or may be made up of several parts.

For example, the cage 66 is formed with pockets 67, 67 . . . alternately in a circumferential direction in which the adjacent rolling elements 65, 65 can be built so that the rotation center axes 65c and 65c perpendicular to the cut faces 65b and 65b cross each other alternately.

Figure 85:
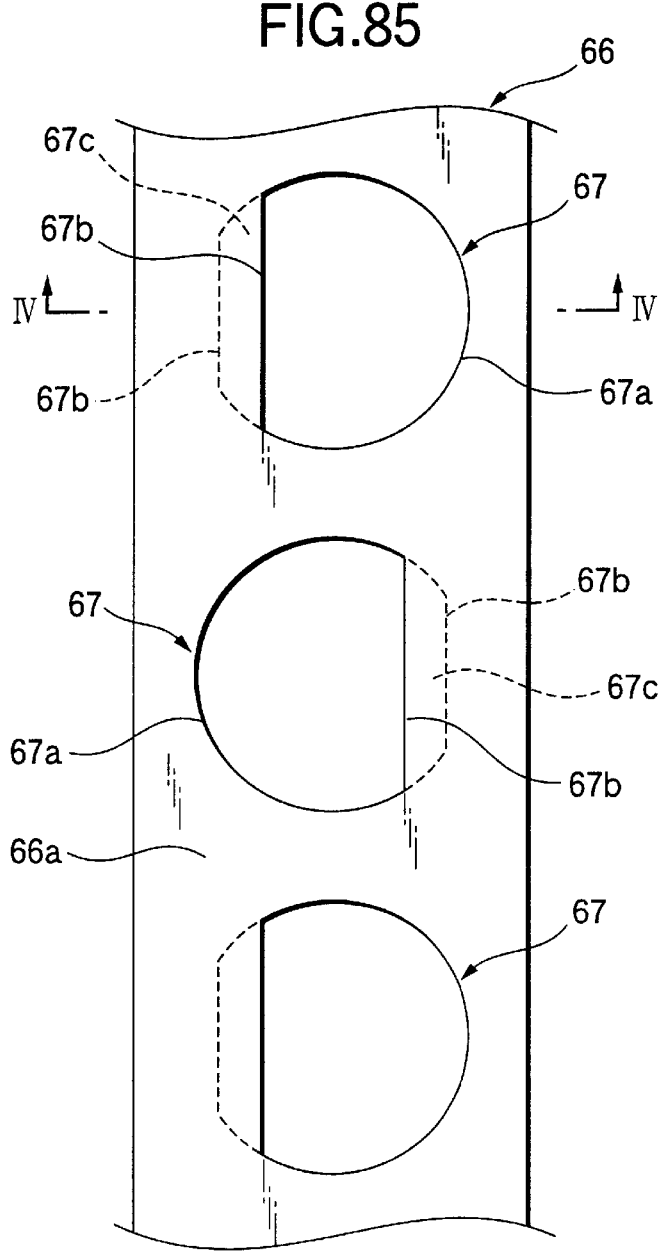
FIG. 85 is a development to show one embodiment of a cage built in the rolling bearing of the invention with a part omitted.
Figure 86:
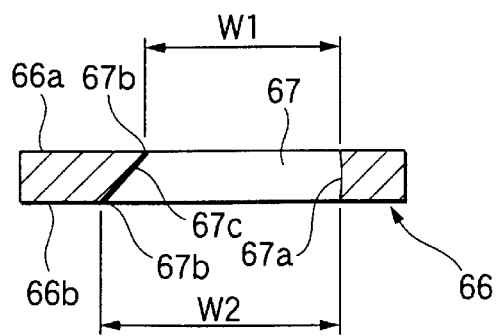
FIG. 86 is a sectional view taken on line IV—IV in FIG. 85.

The pocket 67 is formed like a dome on a plan view made up of a circular arc face 67a shaped like a slightly larger diameter than that of the rolling element and a flat face 67c connecting the end parts of the circular arc face 67a, and one side 67b on the side of the outer diameter 66a and one side 67b on the side of the inner diameter 66b communicate with each other on a slope 67c from the side of the outer diameter 66a toward the side of the inner diameter 66b and an opening width w2 on the side of the inner diameter 66b is made to have a larger diameter than an opening width w1 on the side of the outer diameter 66a (FIGS. 85 and 86).

The centers of the circular arc faces 67a of the pockets 67 adjacent in the circumferential direction are placed on the same circumference and the position of one side 67b on the side of the outer diameter 66a is shifted in the width direction of the plan view. That is, the pockets 67 adjacent in the circumferential direction have the slopes 67c placed left and right alternately (see FIG. 85).

Therefore, if the cage 66 shown in the embodiment is used, the rolling elements 65 placed in the pockets 67 are retained so that the cut faces 65b and 65b are directed toward the side of the outer diameter 66a, namely, the side of the outer race 61 so that the rotation center axes 65c and 65c of the adjacent rolling elements 65 cross each other alternately.

Figure 87:
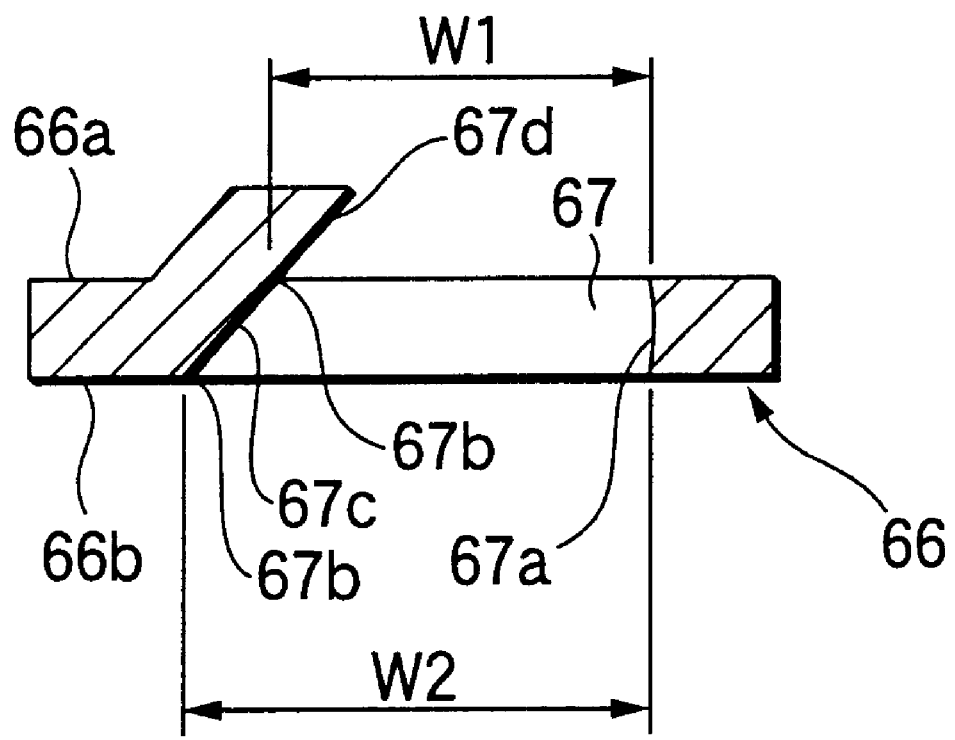
FIG. 87 is a sectional view to show a modified embodiment in FIG. 85.

A structure provided with a one-side fall prevention piece 67d formed on the outer diameter 66a like a slope on the extension of the slope 67c as shown in FIG. 87 can also be adopted. The one-side fall prevention piece 67d is not limited to the shape shown in the figure and if the shape of the one-side fall prevention piece 67d does not affect rotation of the rolling element 65, it is within the spirit and the scope of the invention.

Figure 88:
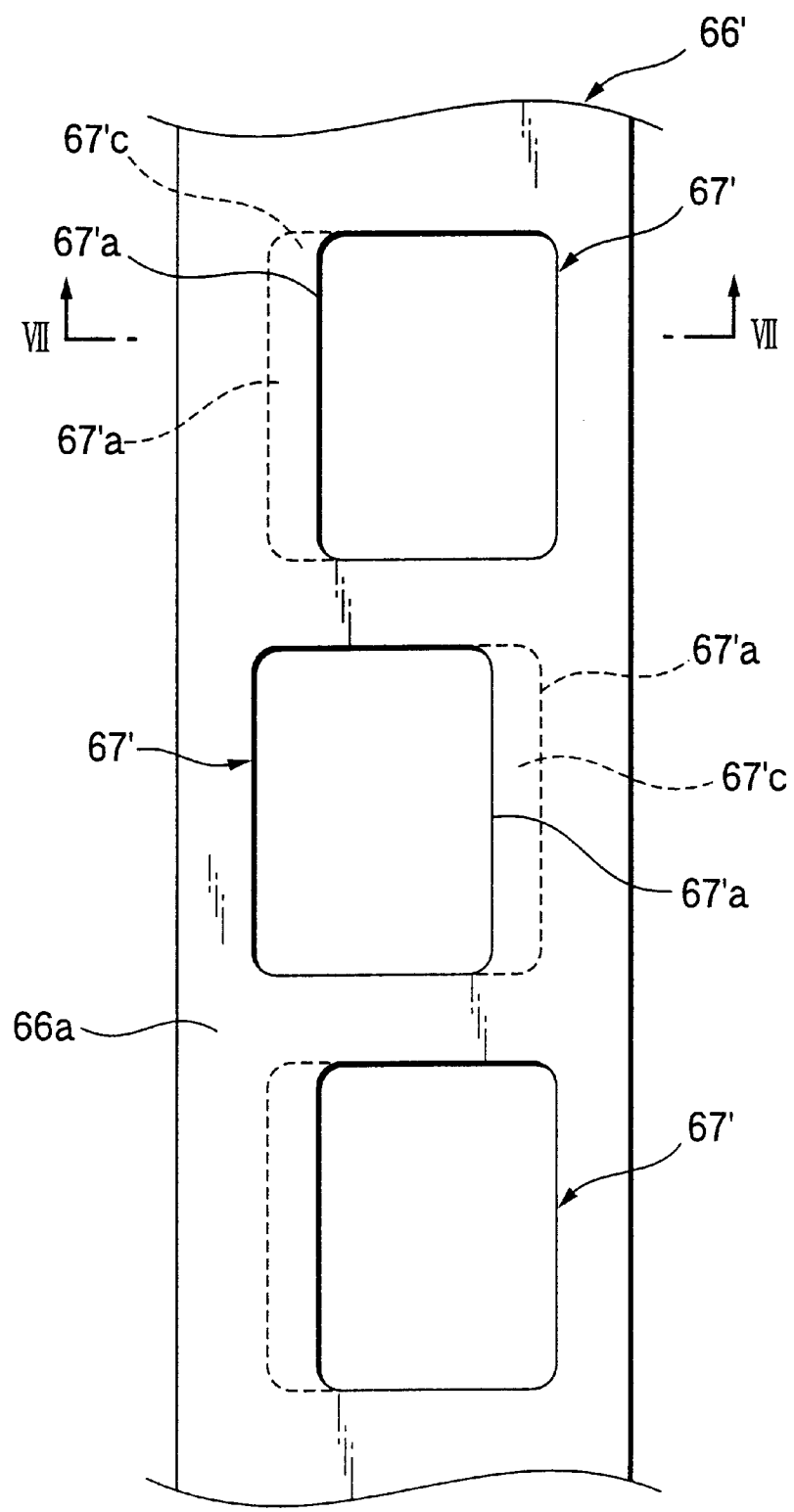
FIG. 88 is a development to show another embodiment of a cage with a part omitted.

For the cage, a cage 66' structure shown in FIG. 88 can also be adopted.

Figure 89:
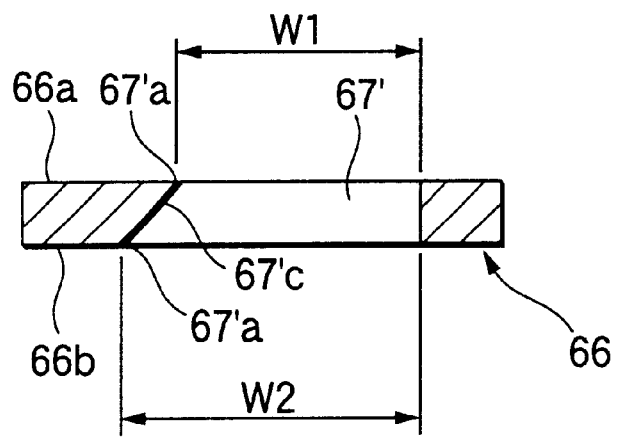
FIG. 89 is a sectional view taken on line VII—VII in FIG. 88.
Figure 90:
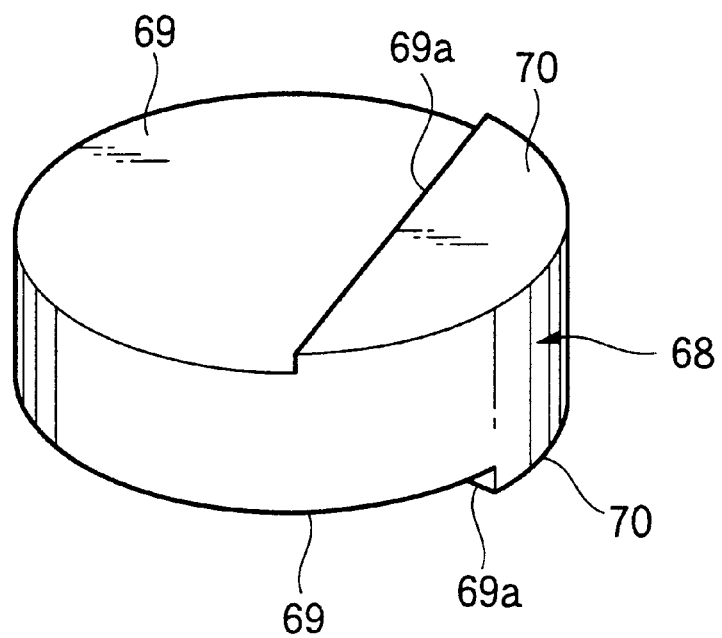
FIG. 90 is a perspective view to show one embodiment of a separator.

In the embodiment, a pocket 67' is formed like a rectangle on the plan view, and one side 67'a on the side of the outer diameter 66a extended in the circumferential direction and one side 67'a on the side of the inner diameter 66b below that one side 67'a communicate with each other on a slope 67'c from the side of the outer diameter 66a toward the side of the inner diameter 66b and an opening width w2 on the side of the inner diameter 66b is made to have a larger diameter than an opening width w1 on the side of the outer diameter 66a (FIGS. 88 and 89).

The pockets 67' placed in the circumferential direction are placed as shifted in position alternately in the width direction of the plan view.

That is, the pockets 67' adjacent in the circumferential direction have the slopes 67'c placed left and right alternately (FIG. 88).

If the cage 66' in the embodiment is used, a larger grease retention space can be provided than that of the cage 66 in FIG. 85. Other advantages are similar to those of the cage in FIG. 55.

A rolling bearing comprising separators (spacers) 68 having concave faces 69 as shown in FIG. 89 is also within the spirit and the scope of the invention.

The separator 68 is shaped like a smaller diameter than the diameter of the rolling element 65 and is formed with the concave faces 69 and 69 like a cross in opposed faces 70 and 70 for retaining the adjacent retained rolling elements 65 and 65 so that the rotation center axes 65c and 65c perpendicular to the cut faces 65E and 65b cross each other as described above. That is, the cut face 65b of the rolling element 65 is opposed to a step part 69a of the concave face 69 for retaining the rolling element. The separator shape shown in the embodiment is only one embodiment and can be changed in design as desired without any limitation.

The state in which a preload is given between the rolling element and the raceway surface is not limited, namely, a preload may be given or may not be given at the manufacturing stage; giving a preload and giving no preload at the manufacturing stage are within the spirit and the scope of the invention.

The gap in the bearing can be set small or negative (minus) as required. Accordingly, higher moment rigidity of the bearing can be provided.

Normally, bearing steel is used as the materials of the races 61 and 62 and the rolling elements 65, but stainless steal, ceramics, and the like are selected appropriately to improve corrosion resistance and heat resistance in response to the use environment.

Since a machined cage, a press cage, a resin cage, or the like is selected appropriately as the material of the cage 66, 66', for example, metal of brass, iron, etc., or synthetic resin, such as polyamide 66 (nylon), polyphenylene sulfide (PPS), or fluorine resin, is selected within the spirit and the scope of the invention.

Next, specific embodiments of the invention will be discussed with reference to the accompanying drawings.

Figure 83:
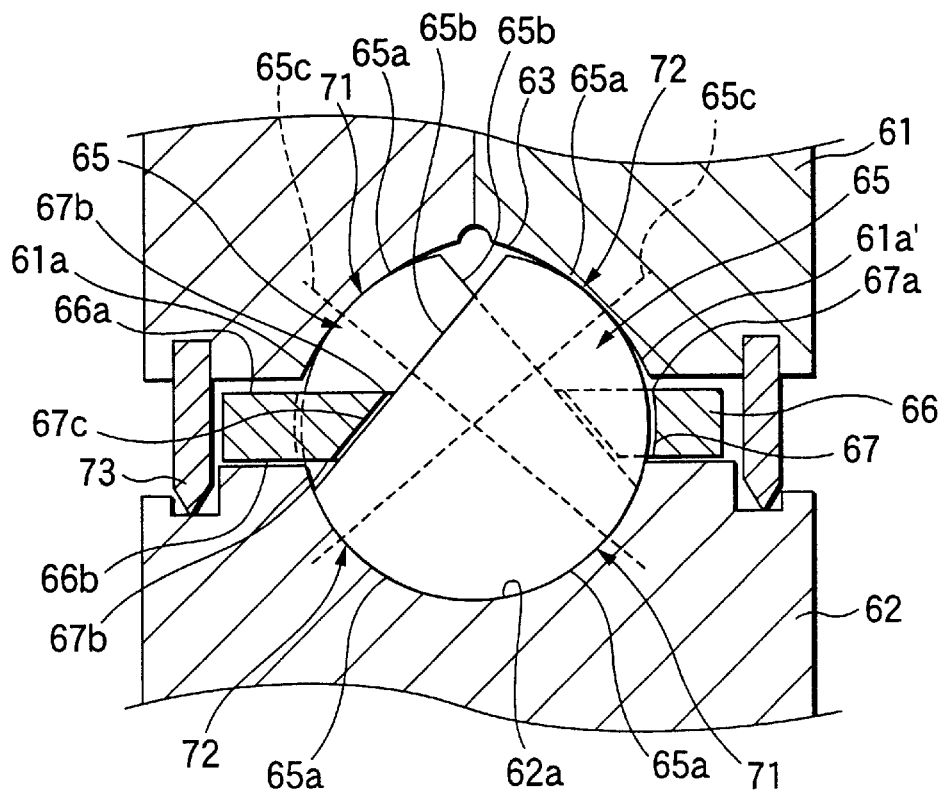
FIG. 83 is a sectional view to show a 23rd embodiment of a rolling bearing of the invention with a part omitted.
Figure 91:
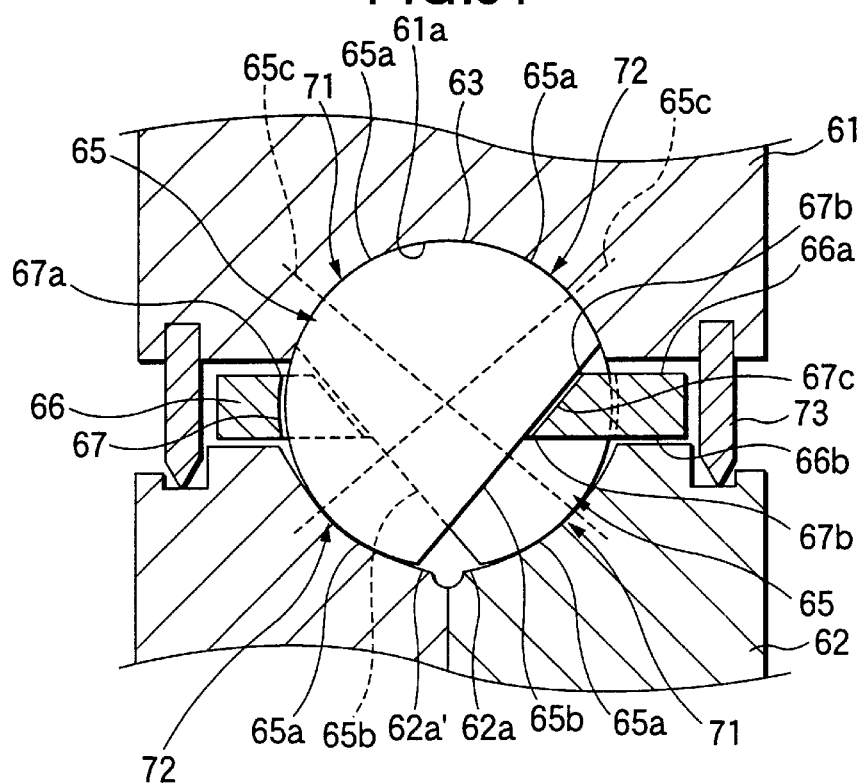
FIG. 91 is a sectional view to show a 24th embodiment of the invention with a part omitted.
Figure 92:
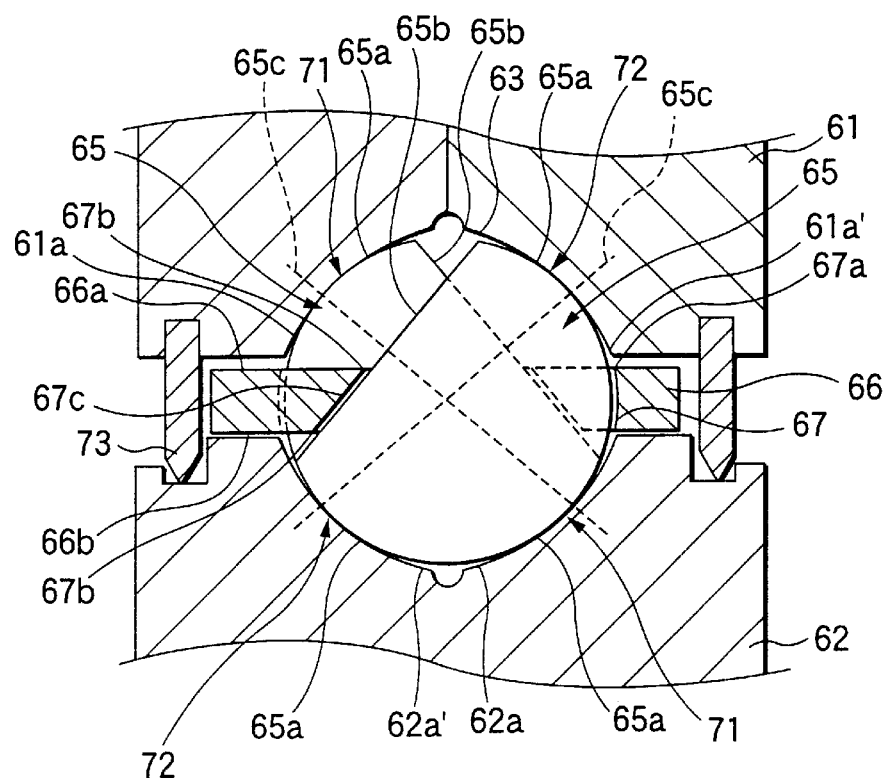
FIG. 92 is a sectional view to show a 25th embodiment of the invention with a part omitted.
Figure 93:
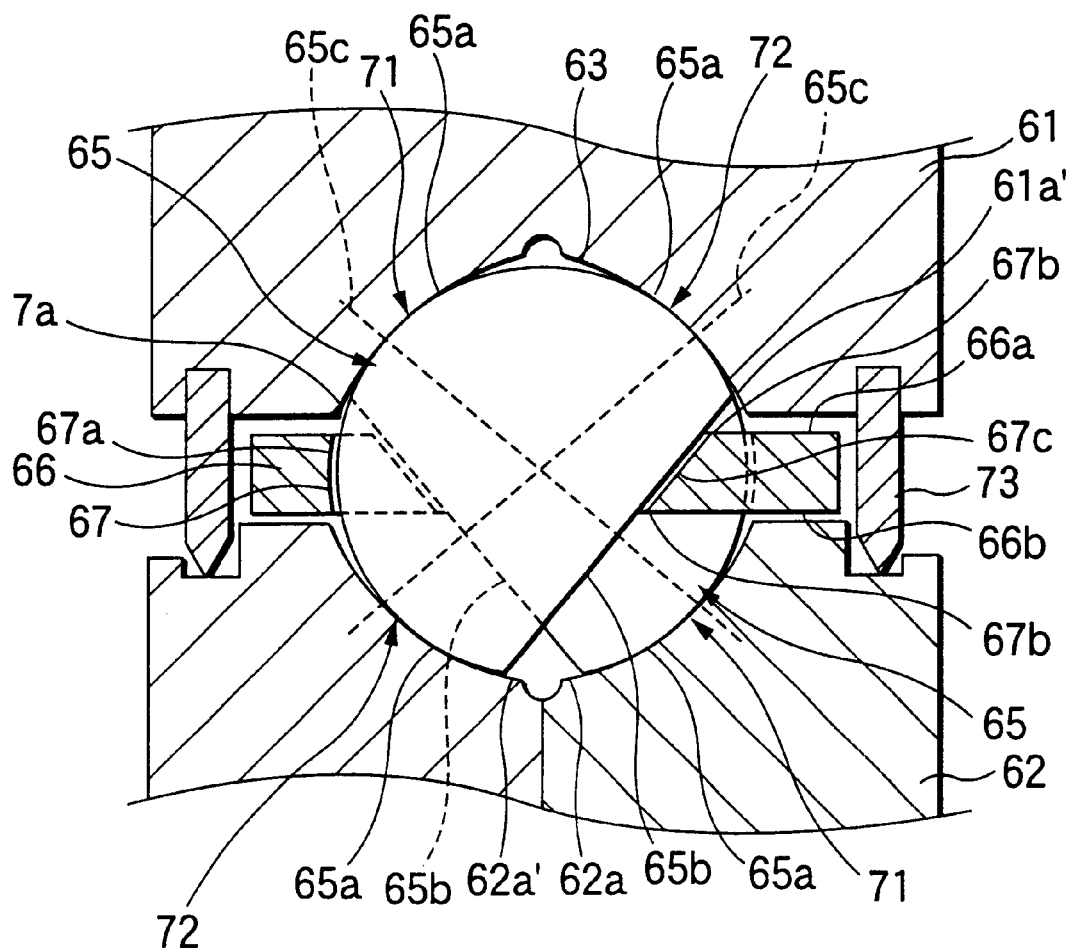
FIG. 93 is a sectional view to show a 26th embodiment of the invention with a part omitted.
Figure 94:
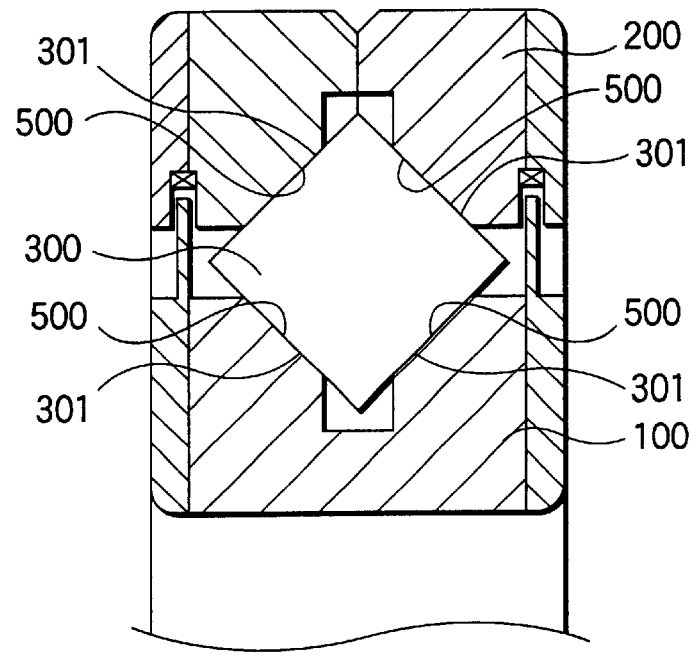
FIG. 94 is a longitudinal section view of a conventional cross roller bearing.
Figure 95:
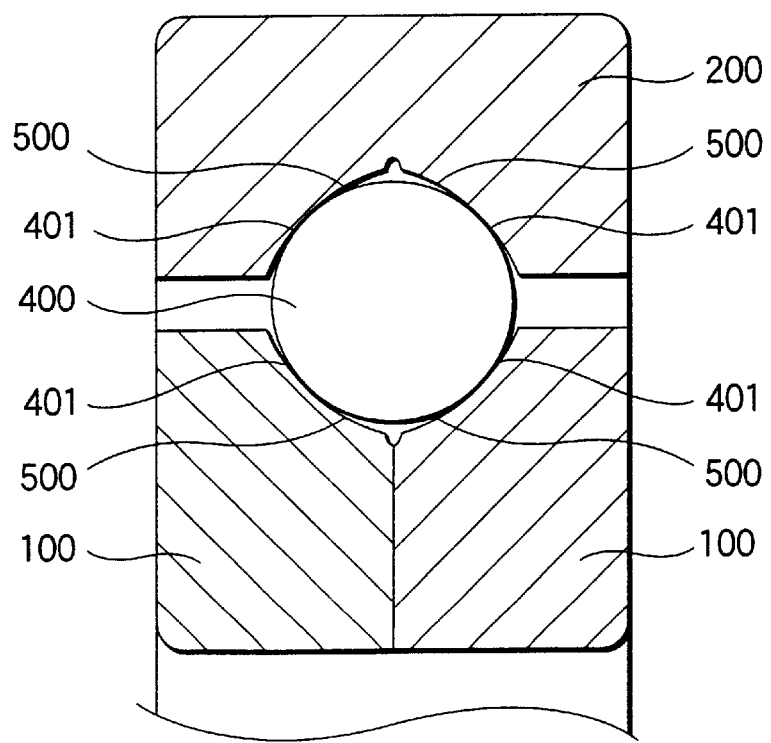
FIG. 95 is a longitudinal section view of a conventional four-point contact ball bearing.
Figure 96:
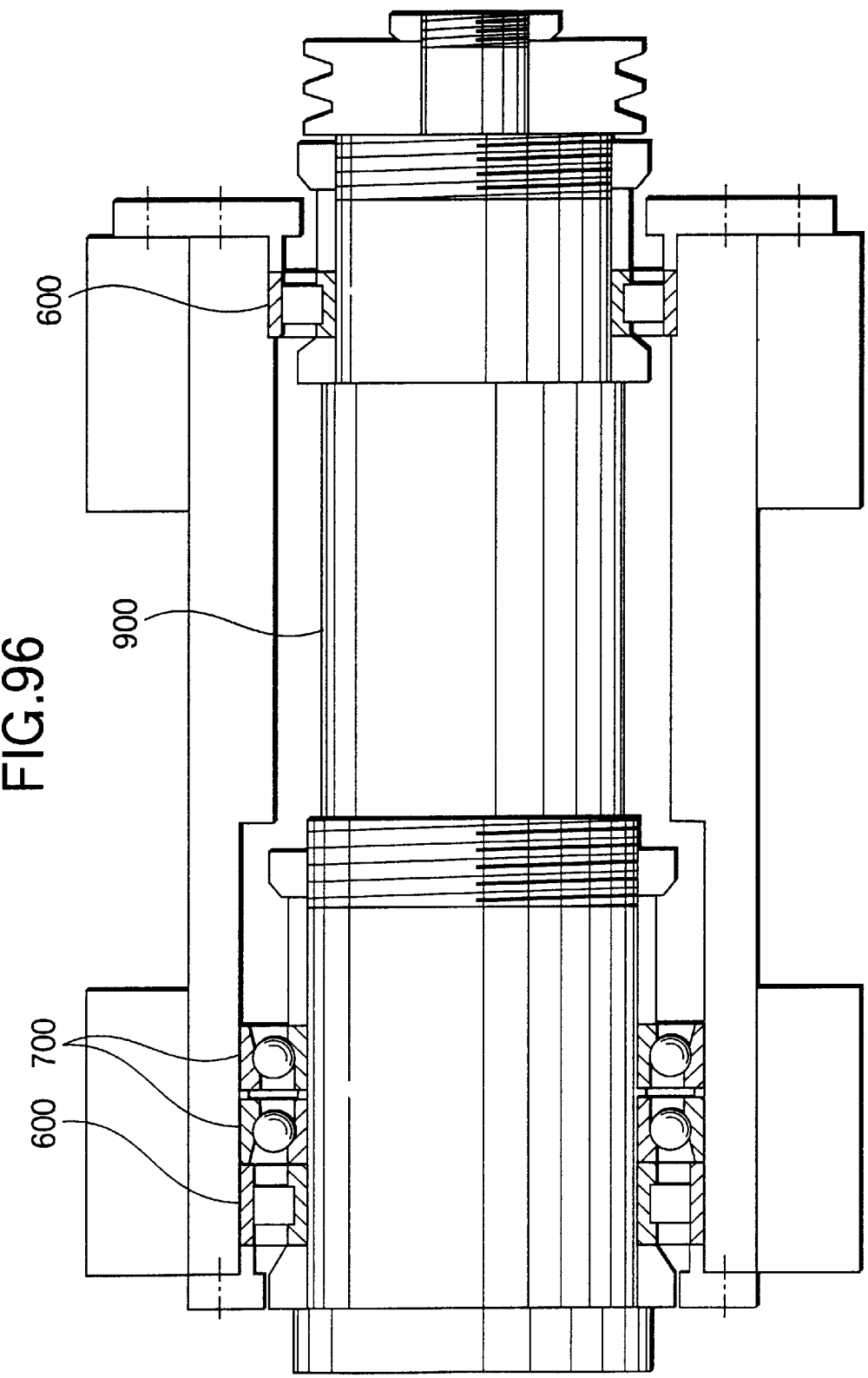
FIG. 96 is a sectional view of a prior art.
Figure 97:
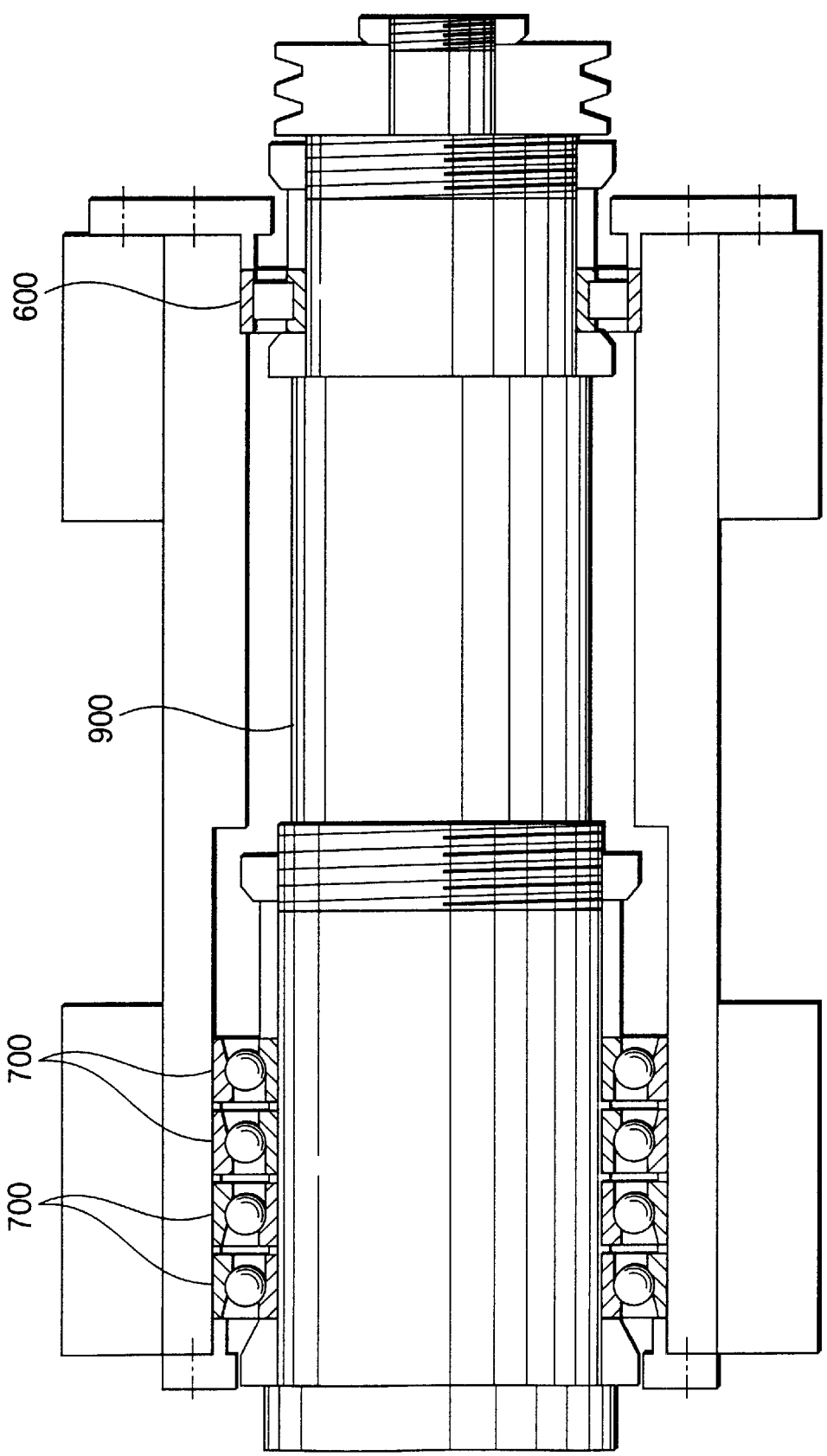
FIG. 97 is a sectional view of another prior art.
Figure 98:
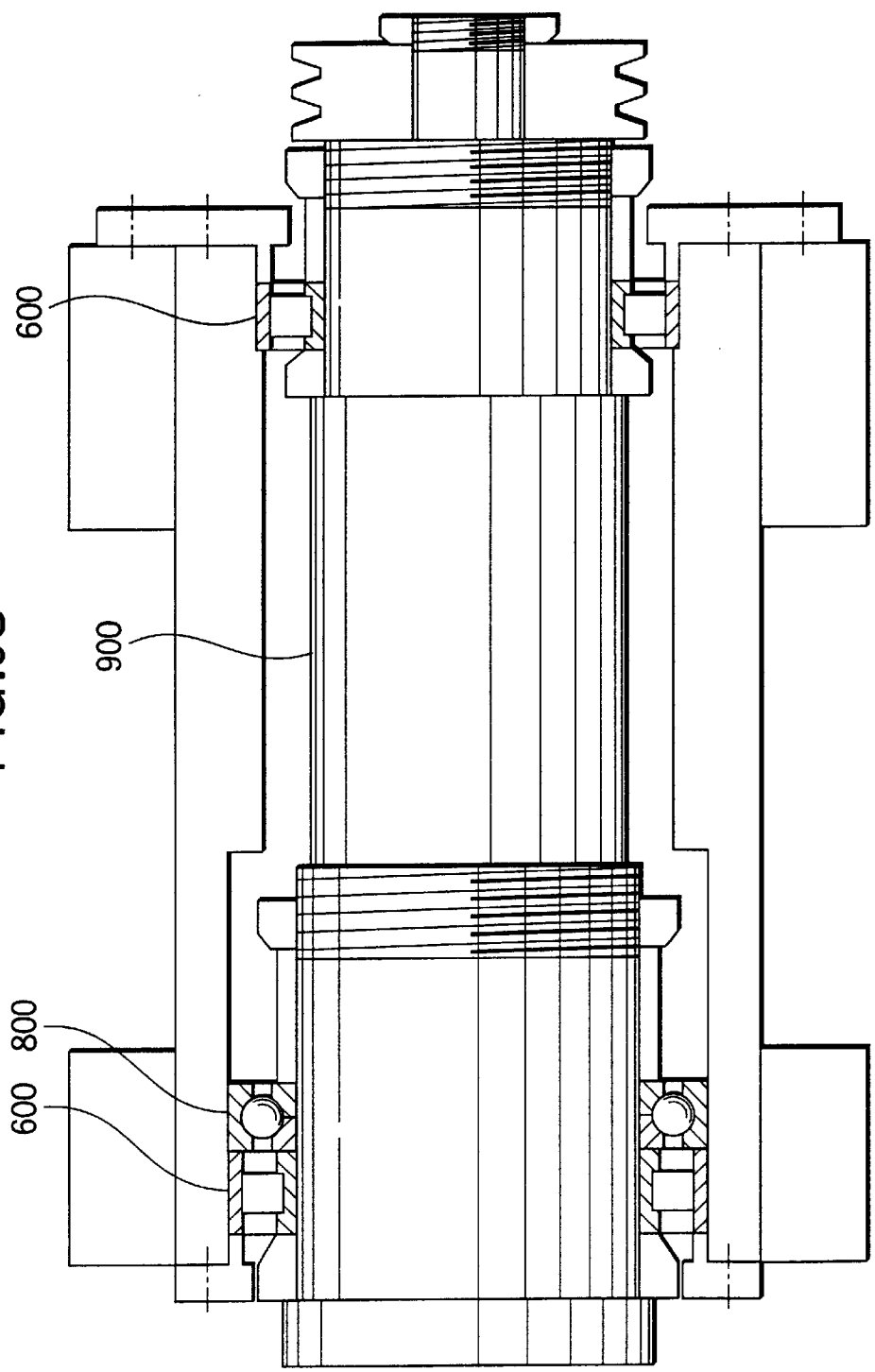
FIG. 98 is a sectional view of another prior art.
Figure 99:
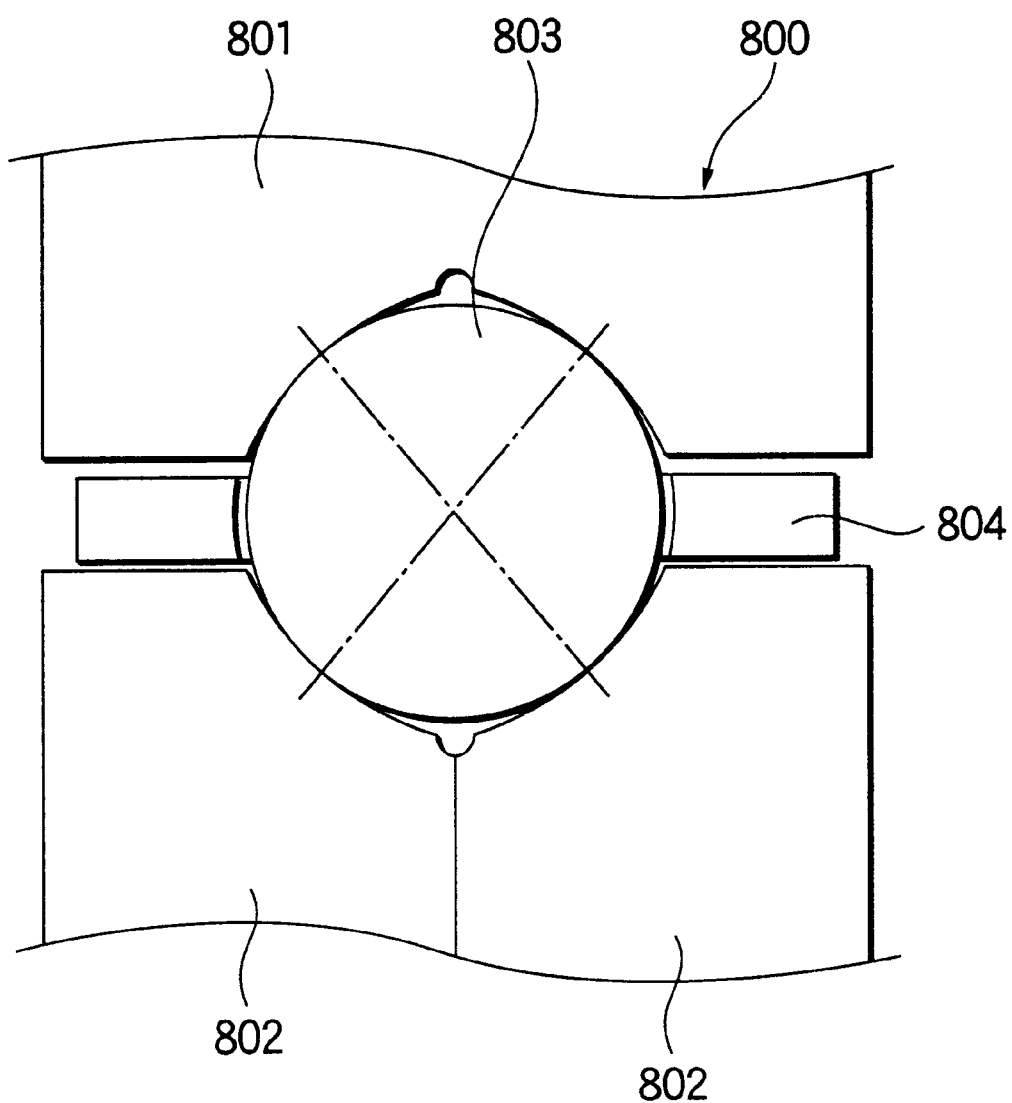
FIG. 99 is a sectional view of a four-point contact ball bearing used in FIG. 98.

FIG. 83 shows a 23rd embodiment, FIG. 91 shows a 24th embodiment, FIG. 92 shows a 25th embodiment, and FIG. 93 shows a 26th embodiment. The specific embodiments described below are only embodiments and the invention is not limited to the embodiments.

[23rd Embodiment]

FIG. 83 shows a 23rd embodiment of a rolling bearing of the invention.

In the embodiment, an outer race 61 consists of two raceway surfaces 61a and 61a', an inner race 62 is made of one raceway surface 62a, and rolling elements 65 have each a cut face 65b directed toward the side of the outer race 61 and are placed like a cross alternately on the circumference (FIG; 83).

In the embodiment, a Gothic arch consisting of two raceway surfaces 61a and 61a' each having a larger diameter than the radius of the rolling element 65 is adopted. Numeral 73 in the figure denotes a seal plate (seal or shield).

The rolling elements 65 are placed so that rotation center axes 65c and 65c of the rolling elements perpendicular to the cut faces 65b and 65b cross each other, and the movement of each rolling element 65 is guided by a pocket 67 of a cage 66.

As the cage 66, the cage shown in FIGS. 85 and 86 is used. The cage 66' shown in FIGS. 88 and 89 may be used.

Therefore, according to the 23rd embodiment, to use any desired types of loads such as a radial load, axial loads in both directions, and a moment load, the outer diameter 65a of the rolling element 65 comes in contact with one point on the raceway surface 61a of the outer race 61 and one point on the raceway surface 62a of the inner race 62 (the contact points are denoted by 71 and 71), the outer and inner races facing each other, and the adjacent rolling element 65 comes in contact with one point on the raceway surface 61a' of the outer race 61 and one point on the raceway surface 62a of the inner race 62 (the contact points are denoted by 72 and 72).

Since the rolling elements 65 and 65 cross each other alternately at contact angle, one bearing can receive a radial load, axial loads in both directions, and a moment load.

One rolling element 65 is in point contact only with one point on the raceway surface 61a (71) and one point on the raceway surface 62a (71) and another rolling element 65 is in point contact only with one point on the raceway surface 61a' (72) and one point on the raceway surface 62a (72), so that large spin in the four-point contact ball bearing in the related art can be eliminated.

Further, the manner in which the rolling element 65, 65 and the outer race 61, the inner race 62 come in contact with each other is the same as that in a general ball bearing, so that rolling resistance is small and low torque can be provided as compared with the cross roller bearing.

[24th Embodiment]

FIG. 91 shows a 24th embodiment of a rolling bearing of the invention.

In the embodiment, an outer race 61 is made of one raceway surface 61a, an inner race 62 consists of two raceway surfaces 62a and 62a', and rolling elements 65 have each a cut face 65b directed toward the side of the inner race 62 and are placed like a cross alternately on the circumference (FIG. 91).

Therefore, according to the embodiment, to use any desired types of loads such as a radial load, axial loads in both directions, and a moment load, one of the adjacent rolling elements 65 comes in point contact with the raceway surface 1a of the outer race 61 and the raceway surface 62a of the inner race 62, the raceway surfaces facing each other, and the other of the adjacent rolling elements 65 comes in point contact with the raceway surface 1a of the outer race 61 and the raceway surface 62a' of the inner race 62, Other components and advantages are similar to those in the 23rd embodiment.

In the 24th embodiment, the shape of the pocket 67 of the cage used in the 23rd embodiment is reversed in the front and the back of the pocket (see FIG. 91).

That is, cage 66 of the type wherein an opening width w1 on the side of the outer diameter 66a is made to have a larger diameter than an opening width w2 on the side of the inner diameter 66b and a slope 67c is directed in the direction of the outer diameter 66a is used.

In the embodiment, the type wherein the outer race 61 is not divided into two parts is adopted in the description; however, the type wherein the outer race 61 is divided into two parts may be adopted as the embodiment and the type wherein the inner race 62 is not divided can also be adopted.

[25th Embodiment]

FIG. 92 shows a 25th embodiment of a rolling bearing of the invention.

In the embodiment, an outer race 61 consists of two raceway surfaces 61a and 61a', an inner race 62 consists of two raceway surfaces 62a and 62a', and rolling elements 65 have each a cut face 65b directed toward the side of the outer race 61 and are placed like a cross alternately on the circumference.

Therefore, to receive axial load, moment load, one of the adjacent rolling elements 65 comes in point contact with the raceway surface 61a of the outer race 61 and the raceway surface 62a of the inner race 62, the raceway surfaces facing each other, and the other of the adjacent rolling elements 65 comes in point contact with the raceway surface 61a' of the outer race 61 and the raceway surface 62a' of the inner race 62. To receive radial load, the rolling element and the races may come in contact with each other at a total of three points depending on the load condition.

The configuration and advantages of the 25th embodiment are the same as those of the 23rd embodiment except that the inner race 62 has two raceway surfaces 62a and 62a'.

In the 25th embodiment, the type wherein the inner race 62 is not divided into two parts is adopted in the description; however, the type wherein the inner race 62 is divided into two parts may be adopted as the embodiment and the type wherein the outer race 61 is not divided can also be adopted.

[26th Embodiment]

FIG. 93 shows a 26th embodiment of a rolling bearing of the invention.

In the embodiment, an outer race 61 consists of two raceway surfaces 61a and 61a', an inner race 62 consists of two raceway surfaces 62a and 62a', and rolling elements 65 have each a cut face 65b directed toward the side of the inner race 62 and are placed like a cross alternately on the circumference.

Therefore, to receive axial load, moment load, one of the adjacent rolling elements 65 comes in point contact with the raceway surface 61a of the outer race 61 and the raceway surface 62a of the inner race 62, the raceway surfaces facing each other, and the other of the adjacent rolling elements 65 comes in point contact with the raceway surface 61a' of the outer race 61 and the raceway surface 62a' of the inner race 62. To receive radial load, the rolling element and the races may come in contact with each other at a total of three points depending on the load condition.

The configuration and advantages of the 26th embodiment are the same as those of the 24th embodiment except that the outer race 61 has two raceway surfaces 61a and 61a'.

In the 26th embodiment, the type wherein the outer race 61 is not divided into two parts is adopted in the description; however, the type wherein the outer race 61 is divided into two parts may be adopted as the embodiment and the type wherein the inner race 62 is not divided can also be adopted.

In the invention, using a rolling element shaped like a ball with one side cut, the number of parts to be worked on becomes smaller than that of the rolling element shaped like a ball with both sides cut in the related art; the rolling element can be worked on at low costs.

Between the outer and inner races, the rolling elements each shaped like a ball with one side cut are placed so as to cross each other alternately on the circumference, and each rolling element is always in contact only with two points on the outer and inner races, so that while providing the advantage of the low cost described above, the rolling bearing can receive a radial load, axial loads in both directions, and a moment load while it has excellent characteristics of low torque, high moment rigidity, high spin wear resistance, etc.

Note that in the above-mentioned descriptions, the embodiments according to the present invention are separately explained, whereas it is possible for a person skilled in the art to combine some of them in accordance with the needs.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A rolling bearing comprising:
    a first race and a second race, each having at least one raceway surface; and
    a plurality of rolling elements rotatably disposed between the first race and the second race, each of the rolling elements having a rolling contact peripheral surface defined by rotating a curved bus line about a rotation axis of the rolling element, the curved bus line having a predetermined curvature that is smaller than a radius of the at least one raceway surface,
    wherein the rolling contact peripheral surface of each of the rolling elements always contacts one point on each of the at least one raceway surface of the first race and the at least one raceway surface of second race, and wherein mutually adjoining rolling elements are arranged in a circumferential direction of the rolling bearing such that their rotation axes alternately cross one another.

2. The rolling bearing according to claim 1, wherein each of the rolling elements includes at least one flat surface.

3. The roller bearing according to claim 2, wherein each of the rolling elements includes two mutually opposing and flat-surfaces.

4. The rolling bearing according to claim 3, wherein each of the rolling elements is a top and bottom cut-shaped ball which is formed by cutting upper and lower portions of a ball so as to define the two mutually opposing and flat-surfaces.

5. The rolling bearing according to claim 3, wherein each of the rolling elements includes two mutually opposing and flat-surfaces having a different area from one another.

6. The rolling bearing according to claim 5, wherein for each of the rolling elements, the flat-surface having a larger area is disposed so as to face the raceway surface of the second race, and wherein the second race is an inner race.

7. The rolling bearing according to claim 2, wherein each of the rolling elements is a top or bottom cut-shaped ball.

8. The rolling bearing according to claim 1, wherein the second race comprises a first and a second raceway surface.

9. The rolling bearing according to claim 8, wherein the second race further comprises a fastener operable to secure the first and second raceway surfaces to one another.

10. The rolling bearing according to claim 1, further including a placement device into which the mutually adjoining rolling elements are incorporated in such a manner that their rotation axes alternately cross one another.

11. The roller bearing according to claim 10, wherein the placement device is a retainer having alternately formed two-hold portions.

12. The rolling bearing according to claim 10, wherein the placement device is a plurality of separators each having a diameter smaller than a diameter of each of the rolling elements and also having two recess-shaped arc grooves at mutually opposing surfaces in a crossing manner.

13. The rolling bearing according to claim 10 wherein the placement device is a retainer having a number of pockets into which a same number of the rolling elements are respectively inserted, wherein the pockets are alternatively disposed on a periphery portion of the retainer in a staggered manner and arranged in a predetermined interval in the circumferential direction thereof.

14. The rolling bearing according to claim 1, wherein at least one of the at least one raceway surface and the plurality of rolling elements includes a stainless steel.

15. The rolling bearing according to claim 1, wherein at least one of the at least one raceway surface and the plurality of rolling elements includes a ceramic material.

16. The rolling bearing according to claim 1, wherein at least one of the at least one raceway surface and the plurality of rolling elements includes a resin material.

17. The rolling bearing according to claim 1, wherein at least one of the at least one raceway surface and the plurality of rolling elements includes an anti-corrosive coating on a surface thereof.

18. The rolling bearing according to claim 1, further including sealing plates interposed between the first race and the second race.

19. The rolling bearing according to claim 1, further including a flange formed in at least one of the first race and the second race.

20. The roller bearing according to claim 1, further including a lubricant-containing polymer member disposed in an internal space of the bearing.

21. The roller bearing according to claim 1, wherein an internal clearance of the bearing is set to a negative value.

22. The rolling bearing according to claim 1, wherein the first race comprises a first and a second raceway surface.

23. The rolling bearing according to claim 22, wherein the first race further comprises a fastener operable to secure the first and second raceway surfaces to one another.

24. A rolling bearing device for supporting a rotation shaft by a bearing comprising:
    at least one bearing, the bearing including:
        a first race and a second race, each having at least one raceway surface; and
        a plurality of rolling elements rotatably disposed between the first race and the second race, each of the rolling elements having a rolling contact peripheral surface defined by rotating a curved bus line about a rotation axis of the rolling element, the curved bus line having a predetermined curvature that is smaller than a radius of the at least one raceway surface,
        wherein the rolling contact peripheral surface of each of the rolling elements always contacts one point on each of the at least one raceway surface of the first race and the at least one raceway surface of second race, and wherein mutually adjoining rolling elements are arranged in a circumferential direction of the rolling bearing such that their rotation axes alternately cross one another.

25. A rolling bearing for a compressor pulley comprising:

at least one bearing, the bearing including:
  a first race and a second race, each having at least one raceway surface; and
  a plurality of rolling elements rotatably disposed between the first race and the second race, each of the rolling elements having a rolling contact peripheral surface defined by rotating a curved bus line about a rotation axis of the rolling element, the curved bus line having a predetermined curvature that is smaller than a radius of the at least one raceway surface,
  wherein the rolling contact peripheral surface of each of the rolling elements always contacts one point on each of the at least one raceway surface of the first race and the at least one raceway surface of second race, and wherein mutually adjoining rolling elements are arranged in a circumferential direction of the rolling bearing such that their rotation axes alternately cross one another.

26. A rolling bearing comprising:

a first race and a second race, each having at least one raceway surface; and a plurality of rolling elements rotatably disposed between the first race and the second race, each of the rolling elements having a rolling contact peripheral surface defined by rotating a curved bus line about a rotation axis of the rolling element, the curved bus line having a predetermined curvature that is smaller than a radius of the at least one raceway surface, wherein the rolling contact peripheral surface of each of the rolling elements always contacts one point on each of the at least one raceway surface of the first race and the at least one raceway surface of the second race, and wherein at least adjacent two rolling elements are arranged in a circumferential direction of the rolling bearing such that their rotation axes cross one another.

27. The rolling bearing according to claim 26, wherein four consecutive ones of the plurality of rolling elements are disposed so that a consecutive two of them have rotation axes that are disposed parallel to one another, and a second consecutive two of them have rotation axes that are parallel to one another but cross with the rotation axes of the first two consecutive rolling elements.

28. The rolling bearing according to claim 26, wherein four consecutive ones of the plurality of rolling elements are disposed so that a first and fourth of them have rotation axes that are disposed parallel to one another, and a second and third of them have rotation axes that are parallel to one another but cross with the rotation axes of the first and fourth rolling elements.

* * * * *